(12) United States Patent
Carlson et al.

(10) Patent No.: US 12,226,750 B2
(45) Date of Patent: Feb. 18, 2025

(54) NANONETS FOR REMOVAL OF CONTAMINANTS FROM AQUEOUS SOLUTIONS, KITS THEREFOR AND METHODS OF THEIR USE

(71) Applicant: CARBONET NANOTECHNOLOGIES INC., Vancouver (CA)

(72) Inventors: Michael Carlson, Vancouver (CA); Macarena Cataldo-Hernandez, Vancouver (CA); Anne Marie Culotta, Seabrook, TX (US); Khatera Hazin, Vancouver (CA)

(73) Assignee: CARBONET NANOTECHNOLOGIES INC., Vancouver (CA)

( * ) Notice: Subject to any disclaimer, the term of this patent is extended or adjusted under 35 U.S.C. 154(b) by 689 days.

(21) Appl. No.: 17/299,462

(22) PCT Filed: Dec. 3, 2019

(86) PCT No.: PCT/CA2019/051739
§ 371 (c)(1),
(2) Date: Jun. 3, 2021

(87) PCT Pub. No.: WO2020/113330
PCT Pub. Date: Jun. 11, 2020

(65) Prior Publication Data
US 2023/0035776 A1 Feb. 2, 2023

Related U.S. Application Data

(60) Provisional application No. 62/774,822, filed on Dec. 3, 2018, provisional application No. 62/775,682, filed
(Continued)

(51) Int. Cl.
*B01J 20/26* (2006.01)
*B01J 20/22* (2006.01)
(Continued)

(52) U.S. Cl.
CPC .......... *B01J 20/264* (2013.01); *B01J 20/223* (2013.01); *B01J 20/265* (2013.01);
(Continued)

(58) Field of Classification Search
CPC ...... B01J 20/264; B01J 20/223; B01J 20/265; B01J 20/2803; B01J 20/22; C02F 1/001;
(Continued)

(56) References Cited

U.S. PATENT DOCUMENTS 3,415,745 A 12/1968 Isaacson et al.
3,444,151 A 5/1969 Verdol et al.
(Continued)

FOREIGN PATENT DOCUMENTS

CA 1341392 10/2002
CA 2450592 6/2004
(Continued)

OTHER PUBLICATIONS

Narita, JP2007196222 A, English Machine translation (Year: 2007).*
(Continued)

*Primary Examiner* — Clare M Perrin
(74) *Attorney, Agent, or Firm* — Sheridan Ross P.C.

(57) ABSTRACT

Provided are nanonets comprising a) a surfactant aggregate having an average aggregate diameter; and b) a polymer having an average particle diameter which average particle diameter is the same or smaller than the average aggregate diameter, wherein the nanonet has a diameter larger than the
(Continued)

average particle diameter. Also provided are kits therefor and methods for sequestering non-water moieties from aqueous solutions using nanonets.

75 Claims, 29 Drawing Sheets

Related U.S. Application Data on Dec. 5, 2018, provisional application No. 62/775,696, filed on Dec. 5, 2018, provisional application No. 62/775,708, filed on Dec. 5, 2018.

(51) Int. Cl.

| | | |
|---|---|---|
| B01J 20/28 | (2006.01) | |
| C02F 1/00 | (2023.01) | |
| C02F 1/28 | (2023.01) | |
| C02F 1/52 | (2023.01) | |
| C02F 1/54 | (2023.01) | |
| C02F 1/56 | (2023.01) | |
| C08L 25/08 | (2006.01) | |
| B01D 21/01 | (2006.01) | |
| C02F 1/24 | (2023.01) | |
| C02F 101/20 | (2006.01) | |
| C02F 101/32 | (2006.01) | |
| C02F 103/08 | (2006.01) | |
| C02F 103/10 | (2006.01) | |

(52) U.S. Cl.
CPC ........... *B01J 20/2803* (2013.01); *C02F 1/285* (2013.01); *C02F 1/5272* (2013.01); *C02F 1/547* (2013.01); *C02F 1/56* (2013.01); *C08L 25/08* (2013.01); *B01D 21/01* (2013.01); *C02F 1/001* (2013.01); *C02F 1/24* (2013.01); *C02F 2101/20* (2013.01); *C02F 2101/203* (2013.01); *C02F 2101/32* (2013.01); *C02F 2103/08* (2013.01); *C02F 2103/10* (2013.01)

(58) Field of Classification Search
CPC .......... C02F 1/24; C02F 1/285; C02F 1/5272; C02F 1/547; C02F 1/56; C02F 2101/20; C02F 2101/203; C02F 2101/32; C02F 2103/08; C02F 2103/10; C02F 1/38; C02F 1/442; C02F 1/444; C02F 1/484; C02F 1/76; C02F 2103/32; C02F 2305/04; C02F 2305/08; C02F 1/00; C02F 1/26; C02F 1/28; C02F 1/52
See application file for complete search history.

(56) References Cited

U.S. PATENT DOCUMENTS

| | | | |
|---|---|---|---|
| 3,507,787 A * | 4/1970 | Pratt | C08F 8/00 |
| | | | 210/734 |
| 3,580,891 A | 5/1971 | Rainer | |
| 3,687,906 A | 8/1972 | Hanson et al. | |
| 3,819,589 A | 6/1974 | Fauke et al. | |
| 3,929,635 A | 12/1975 | Burkis et al. | |
| 4,160,742 A * | 7/1979 | Raman | B01D 17/047 |
| | | | 210/708 |
| 4,251,410 A | 2/1981 | Danner et al. | |
| 4,502,959 A | 3/1985 | Hanser | |
| 4,618,655 A | 10/1986 | Dehm et al. | |
| 4,966,712 A | 10/1990 | Nishibayashi et al. | |
| 5,308,499 A | 5/1994 | Dixon et al. | |
| 5,391,300 A | 2/1995 | Webb et al. | |
| 5,853,596 A | 12/1998 | Gibson | |
| 6,310,024 B1 * | 10/2001 | Gill | C11D 3/378 |
| | | | 510/261 |
| 6,316,507 B1 * | 11/2001 | Inagaki | C08F 8/30 |
| | | | 525/379 |
| 6,524,485 B1 | 2/2003 | Dubin et al. | |
| 6,830,657 B1 | 12/2004 | Betremieux et al. | |
| 8,115,046 B2 | 2/2012 | Burns et al. | |
| 8,933,010 B2 | 1/2015 | Scheuing et al. | |
| 9,067,807 B2 | 6/2015 | Soane et al. | |
| 9,441,118 B2 | 9/2016 | Bhargava et al. | |
| 10,085,442 B2 | 10/2018 | Nettleton-Hammond et al. | |
| 10,927,292 B2 | 2/2021 | Borrell et al. | |
| 11,208,766 B2 | 12/2021 | Luo et al. | |
| 11,479,485 B2 | 10/2022 | Carson et al. | |
| 2005/0230319 A1 | 10/2005 | Mori et al. | |
| 2007/0093610 A1 | 4/2007 | Kim et al. | |
| 2009/0245939 A1 | 10/2009 | Burns et al. | |
| 2013/0085248 A1 | 4/2013 | Musa et al. | |
| 2015/0259231 A1 | 9/2015 | Webber et al. | |
| 2016/0214874 A1 | 7/2016 | Domb et al. | |
| 2018/0099884 A1 | 4/2018 | McGowan | |

FOREIGN PATENT DOCUMENTS

| | | | | |
|---|---|---|---|---|
| CA | 2878022 | 4/2017 | | |
| CA | 3074804 | 4/2019 | | |
| CN | 1202144 | 12/1988 | | |
| CN | 102872836 | 1/2013 | | |
| CN | 103483594 | 1/2014 | | |
| EP | 0172154 | 11/1990 | | |
| GB | 929225 | 6/1963 | | |
| JP | 2007196222 A * | 8/2007 | | |
| WO | WO 90/014310 | 11/1990 | | |
| WO | WO 98/014490 | 4/1998 | | |
| WO | WO 2009/151490 | 12/2009 | | |
| WO | WO 2010/117406 | 10/2010 | | |
| WO | WO 2012/059553 | 5/2012 | | |
| WO | WO 2012/084621 | 6/2012 | | |
| WO | WO-2012084621 A1 * | 6/2012 | ............ | C02F 1/5245 |
| WO | WO 2012/170241 | 12/2012 | | |
| WO | WO 2016/079511 | 5/2016 | | |
| WO | WO 2018/218374 | 12/2018 | | |

OTHER PUBLICATIONS

Lade O, Gbagba Z (Nov. 2018) Sustainable water supply: Potential of recycling laundry wastewater for domestic use. J Civil Eng Environ Sci 4(2): 056-060. DOI: http://doi.org/10.17352/2455-488X.000029 (Year: 2018).*
Cosmetic, Safety Assessment of Polyglyceryl Fatty Acid Esters as Used in Cosmetics, Mar. 2016 (Year: 2016).*
Raffa, Polymeric surfactants for enhanced oil recovery: A review, Journal of Petroleum Science and Engineering 145 (2016) 723-733 (Year: 2016).*
Vargas et al. (Nanoscale, 2015, 7, 20685). (Year: 2015).*
HPV Chemicals, 2004, pp. 1-4 (accessed online at https://hpvchemicals.oecd.org/ui/handler.axd?id=e3cc01ef-0965-4035-bbc8-c0bce6ba02d9#:~:text=In%20the%20presence%20of%20water,to%20be%20approximately%2022%20seconds. (Year: 2004).*
International Search Report and Written Opinion for International (PCT) Patent Application No. PCT/CA2019/051739, dated Feb. 27, 2020, 10 pages.
Bourgeat-Lami E., et al., Polymer encapsulation of inorganic particles; in Functional coastings, S.K. Ghosh (ed.); Wiley-VCH, Weinheim; Chapter 4, pp. 85-152 (2006).
Craig et al. "Tuning the Size of Styrene-Maleic Acid Copolymer-Lipid Nanoparticles (SMALPs) Using RAFT Polymerization for Biophysical Studies." Biochimica et Biophysica Acta, 2016, 1858 (11): 2931-39.(2016).
Ladj et al. "Polymer Encapsulation of Inorganic Nanoparticles for Biomedical Applications," Internat. J. Pharm., 2013, (458) 230-241. Abstract provided.
Liu et al. "Cooperative Self-Assembly of Nanoparticle Mixtures in Lamellar Diblock Copolymers: A Dissipative Particle Dynamics Study." Macromolecular Rapid Communications, 2006, 27 (6): 458-62. (2006).

(56) References Cited

OTHER PUBLICATIONS

Liu et al. "Self-Assembly of Mixtures of Block Copolymers of Poly(styrene-B-Acrylic Acid) with Random Copolymers of Poly-(styrene-Co-Methacrylic Acid)." Langmuir: The ACS Journal of Surfaces and Colloids, 2006, 22 (1): 419-24. (2006).
Long et al. "The Styrene-Maleic Acid Copolymer Extracts Active Complexes from Native Biomembranes." Biophysical Journal, Feb. 2013, 104 (2): 523a.(2013).
Maly et al. "Self-Assembly of Nanoparticle Mixtures in Diblock Copolymers: Multiscale Molecular Modeling." Industrial & Engineering Chemistry Research, 2008, 47 (15): 5023-38 (2008).
Sommertune, J., et al., "Polymer/Iron oxide nanoparticles composites—a straight forward and scalable synthesis approach", Int. J. Mol. Sci. (16) 19752-19768 (2015).
Vargas et al. "Nanoparticle Self-Assembly in Mixtures of Phospholipids with Styrene/maleic Acid Copolymers or Fluorinated Surfactants." Nanoscale2015, 7 (48): 20685-96. (2015).
Xuan, et al., "Biodegradable oligo (poly-L-lysine) as high-performance hydration inhibitor for shale", RSC Advances, 2015, vol. 5, pp. 84947-84958, (2015).
International Search Report and Written Opinion for PCT/CA2018/050664 date mailed Aug. 24, 2018, 8 pages.
Official Action (with English machine translation) for Colombia Patent Application No. NC2021/0008833, dated Jul. 16, 2024, 26 pages.

\* cited by examiner

A

B

C

D

E

A

B

NANONETS FOR REMOVAL OF CONTAMINANTS FROM AQUEOUS SOLUTIONS, KITS THEREFOR AND METHODS OF THEIR USE

CROSS REFERENCE TO RELATED APPLICATIONS

This application is a national stage application under 35 U.S.C. 371 and claims the benefit of PCT Application No. PCT/CA2019/051739 having an international filing date of 3 Dec. 2019, which designated the United States, and which PCT application claimed the benefit of U.S. Provisional Application No. 62/774,822 filed 3 Dec. 2018; U.S. Provisional Application No. 62/775,682 filed 5 Dec. 2018; U.S. Provisional Application No. 62/775,696 filed 5 Dec. 2018; and U.S. Provisional Application No. 62/775,708 filed 5 Dec. 2018, the contents of each of which are incorporated herein by reference in their entireties.

TECHNICAL FIELD

This invention relates to the field of sequestering and more particularly in the field of sequestering material from aqueous environments.

BACKGROUND

The decontamination and disposal of organic waste materials such as sewage sludge, animal manure, food processing waste, fracking fluid, oil and gas, and other industrial wastewater presents both environmental and public health concerns. The handling and disposal of contaminated water has significant social, environmental, and economic implications. Currently, residual wastewater sludge is commonly digested, incinerated, deposited in landfills, returned to the same environment, or used as fertilizer through agricultural land application of the residual biosolids.

The encapsulation of inorganic particles with polymers has been demonstrated (E. Bourgeat-Lami and E. Duguet: Polymer encapsulation of inorganic particles; in Functional coatings, S. K. Ghosh (ed.); 2006, Wiley-VCH, Weinheim; Chapter 4, pp. 85-152). In biomedical applications, the coating of inorganic nanoparticles with a polymer, or their encapsulation in a polymer matrix or layer of detergent is important for properties such as enhanced solubility (R. Ladj et al. Polymer encapsulation of inorganic nanoparticles for biomedical applications; Internat. J. Pharm. 2013 (458) 230-241). In the fields of physics and engineering, magnetic fluids comprised of magnetic nanoparticles coated with a polymer and/or surfactant to stabilize the particle in the host liquid are studied. Various synthetic methods for the preparation of such systems have been published (e.g. J. Sommertune et al. Polymer/Iron oxide nanoparticles composites—a straight forward and scalable synthesis approach; Int. J. Mol. Sci. 2015 (16) 19752-19768).

SUMMARY

This invention is based, at least in part, on the elucidation that nanonet formation depends on surfactant average aggregate diameter, and the length of the surrounding polymer is determinative of the minimum surfactant aggregate diameter size for nanonet formation. Contrary to solubilization studies of lipid bilayers with styrene-maleic acid polymers, association of a surfactant with a polymer does not exclusively lead to a decrease in surfactant aggregate size. Rather, the combination of a polymer and a surfactant aggregate may result in an associated combination that is either larger than, or smaller than, a surfactant aggregate alone in solution. In the latter case, the polymer may cause relatively larger surfactant aggregates to dissociate into the smaller associated combination of surfactant aggregate and polymer. Further, utilizing a longer polymer length for nanonet formation may result in accelerated or delayed flocculation, which may be beneficial for removal of precipitated nanonets by physical separation or enhanced contact in a treated fluid. Consequently, a nanonet composed of a different molecular weight polymer may have advantages when applied to various wastewater treatment processes.

In illustrative embodiments, there is provided a kit for sequestering non-water moieties from an aqueous solution, the kit comprising: a) a surfactant aggregate having an average aggregate diameter; and b) a polymer having an average particle diameter which average particle diameter is the same or smaller than the average aggregate diameter; and c) a precipitation agent, provided that when the surfactant is selected from the group consisting of: Triton X-100™, Triton X-305™, N-dodecyl-beta-D-maltoside (DDM), sodium oleate, sodium cholate, sodium deoxycholate (DOC), beta-octyl glucoside (Beta-OG), lauryl dimethylamine n-oxide (LDAO), then the polymer is not selected from the group consisting of: SMA-2000™ SMA-2021™, and Di-isobutylene-co-maleic acid (DIBMA).

In illustrative embodiments, there is provided a kit described herein wherein the precipitation agent is selected from the group consisting of: a cation generator, a cation, an acid, a divalent cation, a trivalent cation and mixtures thereof.

In illustrative embodiments, there is provided a kit described herein wherein the precipitation agent is selected from the group consisting of: acetic acid, malic acid, citric acid, tartaric acid, fumaric acid, lactic acid, hydrochloric acid, sulfuric acid, and phosphoric acid.

In illustrative embodiments, there is provided a kit described herein wherein the surfactant is selected from the group consisting of: anionic surfactants, nonionic surfactants, sugar-derived surfactants, glycidyl-derived surfactants, fatty acid alcohol-derived surfactants, nonionic surfactants, saccharide polyethyleneoxide combination surfactants, saccharide ester surfactants, sulfonated sugar based surfactants, aldonamide based surfactants, amide sugar based surfactants, amino alcohol surfactants, amino acid based surfactants, polyol surfactants, 1,2 glycol surfactants, and zwitterionic surfactants.

In illustrative embodiments, there is provided a kit described herein wherein the surfactant is a nonionic surfactant.

In illustrative embodiments, there is provided a kit described herein wherein the surfactant is an ionic surfactant.

In illustrative embodiments, there is provided a kit described herein wherein the surfactant is an anionic surfactant.

In illustrative embodiments, there is provided a kit described herein wherein the surfactant has a neutral charge.

In illustrative embodiments, there is provided a kit described herein wherein the surfactant is an uncharged surfactant.

In illustrative embodiments, there is provided a kit described herein wherein the surfactant is soluble in water.

In illustrative embodiments, there is provided a kit described herein wherein the surfactant is insoluble in water.

In illustrative embodiments, there is provided a kit described herein wherein the polymer is a long polymer.

In illustrative embodiments, there is provided a kit described herein wherein the polymer has a molecular weight of at least 1,500 Da.

In illustrative embodiments, there is provided a kit described herein wherein the polymer has a molecular weight of at least 26,000 Da.

In illustrative embodiments, there is provided a kit described herein wherein the polymer has a molecular weight of at least 100,000 Da.

In illustrative embodiments, there is provided a kit described herein wherein the polymer has a molecular weight of at least 125,000 Da.

In illustrative embodiments, there is provided a kit described herein wherein the polymer is an amphipathic polymer.

In illustrative embodiments, there is provided a kit described herein wherein the polymer comprises an alkyl chain having at least 8 carbon atoms in length.

In illustrative embodiments, there is provided a kit described herein wherein the polymer is a block co-polymer.

In illustrative embodiments, there is provided a kit described herein wherein the polymer comprises a ratio of hydrophobic:hydrophilic groups of from about 1:1 to about 4:1.

In illustrative embodiments, there is provided a kit described herein wherein the polymer comprises a ratio of hydrophobic:hydrophilic groups of from about 1:1 to about 3:1.

In illustrative embodiments, there is provided a kit described herein wherein the polymer comprises a ratio of hydrophobic:hydrophilic groups of from about 2:1 to about 3:1.

In illustrative embodiments, there is provided a kit described herein wherein the polymer comprises a ratio of hydrophobic:hydrophilic groups of about 2:1.

In illustrative embodiments, there is provided a kit described herein wherein the polymer comprises a ratio of hydrophobic:hydrophilic groups of about 3:1.

In illustrative embodiments, there is provided a kit described herein wherein the surfactant is selected from the group consisting of: octylphenol ethoxylates, nonylphenol ethoxylates, PGL1, PGL2. PGL3, PGL4, PGL5, Triton X-45™, Triton X-100™, Triton X-305™, sodium oleate, LDAO, and mixtures thereof.

In illustrative embodiments, there is provided a kit described herein wherein the surfactant is a mixture of PGL5 and sodium oleate.

In illustrative embodiments, there is provided a kit described herein wherein the surfactant is a mixture of PGL5 and potassium oleate.

In illustrative embodiments, there is provided a kit described herein wherein the polymer is selected from the group consisting of: SMA-725™, SMA-2000™, SMA-3000™, SMA-2021™, polymethacrylate, DIBMA, styrene carbamate block co-polymers, and styrene maleimide block co-polymers.

In illustrative embodiments, there is provided a kit described herein wherein the polymer is SMA-725™.

In illustrative embodiments, there is provided a kit described herein wherein at least a portion of the polymer is hydrolyzed.

In illustrative embodiments, there is provided a nanonet comprising: a) a surfactant aggregate having an average aggregate diameter; and b) a polymer having an average particle diameter which average particle diameter is the same or smaller than the average aggregate diameter, provided that when the surfactant is selected from the group consisting of: Triton X-100™, Triton X-305 ™, N-dodecyl-beta-D-maltoside (DDM), sodium oleate, sodium cholate, sodium deoxycholate (DOC), beta-octyl glucoside (Beta-OG), lauryl dimethylamine n-oxide (LDAO), then the polymer is not selected from the group consisting of: SMA-2000™ SMA-2021™, and Di-isobutylene-co-maleic acid (DIBMA).

In illustrative embodiments, there is provided a nanonet described herein wherein the nanonet has a diameter larger than the average polymer particle diameter.

In illustrative embodiments, there is provided a nanonet described herein wherein the surfactant is selected from the group consisting of: anionic surfactants, nonionic surfactants, sugar-derived surfactants, glycidyl-derived surfactants, fatty acid alcohol-derived surfactants, nonionic surfactants, saccharide polyethyleneoxide combination surfactants, saccharide ester surfactants, sulfonated sugar based surfactants, aldonamide based surfactants, amide sugar based surfactants, amino alcohol surfactants, amino acid based surfactants, polyol surfactants, 1,2 Glycol surfactants, and zwitterionic surfactants.

In illustrative embodiments, there is provided a nanonet described herein wherein the surfactant is a nonionic surfactant.

In illustrative embodiments, there is provided a nanonet described herein wherein the surfactant is an ionic surfactant.

In illustrative embodiments, there is provided a nanonet described herein wherein the surfactant is an anionic surfactant.

In illustrative embodiments, there is provided a nanonet described herein wherein the surfactant has a neutral charge.

In illustrative embodiments, there is provided a nanonet described herein wherein the surfactant is an uncharged surfactant.

In illustrative embodiments, there is provided a nanonet described herein wherein the surfactant is soluble in water.

In illustrative embodiments, there is provided a nanonet described herein wherein the surfactant is insoluble in water.

In illustrative embodiments, there is provided a nanonet described herein wherein the polymer is a long polymer.

In illustrative embodiments, there is provided a nanonet described herein wherein the polymer has a molecular weight of at least 1,500 Da.

In illustrative embodiments, there is provided a nanonet described herein wherein the polymer has a molecular weight of at least 26,000 Da.

In illustrative embodiments, there is provided a nanonet described herein wherein the polymer has a molecular weight of at least 100,000 Da.

In illustrative embodiments, there is provided a nanonet described herein wherein the polymer has a molecular weight of at least 125,000 Da.

In illustrative embodiments, there is provided a nanonet described herein wherein the polymer is an amphipathic polymer.

In illustrative embodiments, there is provided a nanonet described herein wherein the polymer comprises an alkyl chain having at least 8 carbon atoms in length.

In illustrative embodiments, there is provided a nanonet described herein wherein the polymer is a block co-polymer.

In illustrative embodiments, there is provided a nanonet described herein wherein the polymer comprises a ratio of hydrophobic:hydrophilic groups of from about 1:1 to about 4:1.

In illustrative embodiments, there is provided a nanonet described herein wherein the polymer comprises a ratio of hydrophobic:hydrophilic groups of from about 1:1 to about 3:1.

In illustrative embodiments, there is provided a nanonet described herein wherein the polymer comprises a ratio of hydrophobic:hydrophilic groups of from about 2:1 to about 3:1.

In illustrative embodiments, there is provided a nanonet described herein wherein the polymer comprises a ratio of hydrophobic:hydrophilic groups of about 2:1.

In illustrative embodiments, there is provided a nanonet described herein wherein the polymer comprises a ratio of hydrophobic:hydrophilic groups of about 3:1.

In illustrative embodiments, there is provided a nanonet described herein wherein the surfactant is selected from the group consisting of: octylphenol ethoxylates, nonylphenol ethoxylates, PGL1, PGL2. PGL3, PGL4, PGL5, Triton X-45™, Triton X-100™, Triton X-305™, sodium oleate, LDAO, and mixtures thereof.

In illustrative embodiments, there is provided a nanonet described herein wherein the surfactant is a mixture of PGL5 and sodium oleate.

In illustrative embodiments, there is provided a nanonet described herein wherein the surfactant is a mixture of PGL5 and potassium oleate.

In illustrative embodiments, there is provided a nanonet described herein wherein the polymer is selected from the group consisting of: SMA-725™, SMA-2000™, SMA-3000™, SMA-2021™, polymethacrylate, DIBMA, styrene carbamate block co-polymers, and styrene maleimide block co-polymers.

In illustrative embodiments, there is provided a nanonet described herein wherein the polymer is SMA-725™.

In illustrative embodiments, there is provided a nanonet described herein wherein at least a portion of the polymer is hydrolyzed.

In illustrative embodiments, there is provided a nanonet described herein further comprising a sequestered non-water moiety.

In illustrative embodiments, there is provided a nanonet described herein wherein the sequestered non-water moiety is an iron moiety.

In illustrative embodiments, there is provided a method of sequestering a non-water moiety from an aqueous solution, the method comprising: a) adding a surfactant aggregate having an average aggregate diameter to the aqueous solution comprising the non-water moiety; and b) adding a polymer having an average particle diameter which average particle diameter is the same or smaller than the average aggregate diameter to the aqueous solution comprising the non-water moiety, thereby forming a treated aqueous solution, provided that when the surfactant is selected from the group consisting of: Triton X-100™, Triton X-305™, N-dodecyl-beta-D-maltoside (DDM), sodium oleate, sodium cholate, sodium deoxycholate (DOC), beta-octyl glucoside (Beta-OG), lauryl dimethylamine n-oxide (LDAO), then the polymer is not selected from the group consisting of: SMA-2000™ SMA-2021™, and Di-isobutylene-co-maleic acid (DIBMA)

In illustrative embodiments, there is provided a method described herein further comprising adding a precipitation agent to the treated aqueous solution.

In illustrative embodiments, there is provided a method described herein further comprising mixing.

In illustrative embodiments, there is provided a method described herein further comprising removal of solid particles from the treated aqueous solution.

In illustrative embodiments, there is provided a method described herein wherein the removal of solid particles comprises at least one selected from the group consisting of: filtration, centrifugation, gravity separation, flotation, skimming, and electromagnetic attraction.

In illustrative embodiments, there is provided a method described herein wherein the surfactant is selected from the group consisting of: anionic surfactants, nonionic surfactants, sugar-derived surfactants, glycidyl-derived surfactants, fatty acid alcohol-derived surfactants, nonionic surfactants, saccharide polyethyleneoxide combination surfactant, saccharide ester surfactants, sulfonated sugar based surfactants, aldonamide based surfactants, amide sugar based surfactants, amino alcohol surfactants, amino acid based surfactants, polyol surfactants, 1,2 glycol surfactants, and zwitterionic surfactants.

In illustrative embodiments, there is provided a method described herein wherein the surfactant is a nonionic surfactant.

In illustrative embodiments, there is provided a method described herein wherein the surfactant is a anionic surfactant.

In illustrative embodiments, there is provided a method described herein wherein the surfactant has a neutral charge.

In illustrative embodiments, there is provided a method described herein wherein the surfactant is an uncharged surfactant.

In illustrative embodiments, there is provided a method described herein wherein the surfactant is soluble in water.

In illustrative embodiments, there is provided a method described herein wherein the surfactant is insoluble in water.

In illustrative embodiments, there is provided a method described herein wherein the polymer is a long polymer.

In illustrative embodiments, there is provided a method described herein wherein the polymer has a molecular weight of at least 1,500 Da.

In illustrative embodiments, there is provided a method described herein wherein the polymer has a molecular weight of at least 26,000 Da.

In illustrative embodiments, there is provided a method described herein wherein the polymer has a molecular weight of at least 100,000 Da.

In illustrative embodiments, there is provided a method described herein wherein the polymer has a molecular weight of at least 125,000 Da.

In illustrative embodiments, there is provided a method described herein wherein the polymer is an amphipathic polymer.

In illustrative embodiments, there is provided a method described herein wherein the polymer comprises an alkyl chain having at least 8 carbon atoms.

In illustrative embodiments, there is provided a method described herein wherein the polymer is a block co-polymer.

In illustrative embodiments, there is provided a method described herein wherein the polymer comprises a ratio of hydrophobic:hydrophilic groups of from about 1:1 to about 4:1.

In illustrative embodiments, there is provided a method described herein wherein the polymer comprises a ratio of hydrophobic:hydrophilic groups of from about 1:1 to about 3:1.

In illustrative embodiments, there is provided a method described herein wherein the polymer comprises a ratio of hydrophobic:hydrophilic groups of from about 2:1 to about 3:1.

In illustrative embodiments, there is provided a method described herein wherein the polymer comprises a ratio of hydrophobic:hydrophilic groups of about 2:1.

In illustrative embodiments, there is provided a method described herein wherein the polymer comprises a ratio of hydrophobic:hydrophilic groups of about 3:1.

In illustrative embodiments, there is provided a method described herein wherein the surfactant is selected from the group consisting of: octylphenol ethoxylates, nonylphenol ethoxylates, PGL1, PGL2. PGL3, PGL4, PGL5, Triton X-45™, Triton X-100™, Triton X-305™, sodium oleate, LDAO, and mixtures thereof.

In illustrative embodiments, there is provided a method described herein wherein the surfactant is a mixture of PGL5 and sodium oleate.

In illustrative embodiments, there is provided a method described herein wherein the surfactant is a mixture of PGL5 and potassium oleate.

In illustrative embodiments, there is provided a method described herein wherein the polymer is selected from the group consisting of: SMA-725™, SMA-2000™, SMA-3000™, SMA-2021™, polymethacrylate, DIBMA, styrene carbamate block co-polymers, and styrene maleimide block co-polymers.

In illustrative embodiments, there is provided a method described herein wherein the polymer is SMA-725™.

In illustrative embodiments, there is provided a method described herein wherein at least a portion of the polymer is hydrolyzed.

In illustrative embodiments, there is provided a method of sequestering a non-water moiety from an aqueous solution, the method comprising adding a nanonet described herein to the aqueous solution comprising a non-water moiety, thereby forming a treated aqueous solution.

In illustrative embodiments, there is provided a method described herein further comprising adding a precipitation agent to the treated aqueous solution.

In illustrative embodiments, there is provided a method described herein further comprising mixing.

In illustrative embodiments, there is provided a method described herein further comprising removal of solid particles from the treated aqueous solution.

In illustrative embodiments, there is provided a method described herein wherein the removal of solid particles comprises at least one selected from the group consisting of: filtration, centrifugation, gravity separation, flotation, skimming, and electromagnetic attraction.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate aspects of the invention.

Yellow colour indicative of dissolved hydrocarbons and colloidal iron was measured by absorbance at 350 nm. C) Turbidity pre- and post-treatment. Turbidity was measured by absorbance at 540 nm.

Figure 13A:
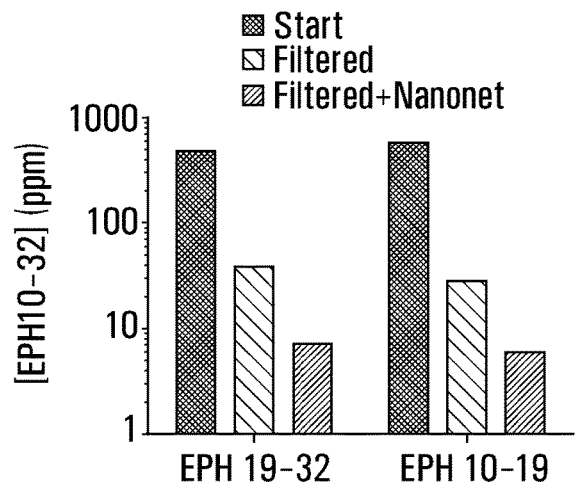
Figure 13B:
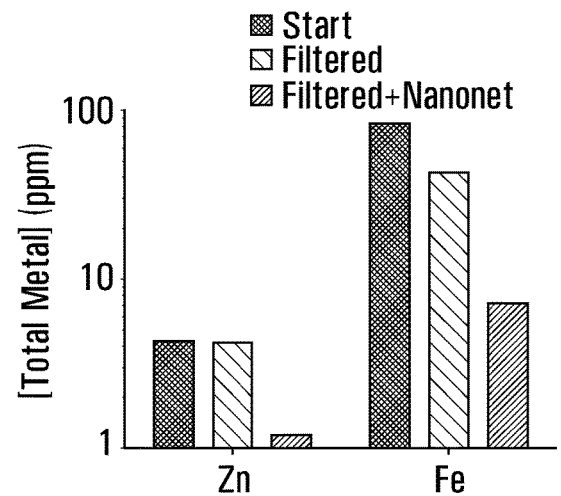
Figure 13C:
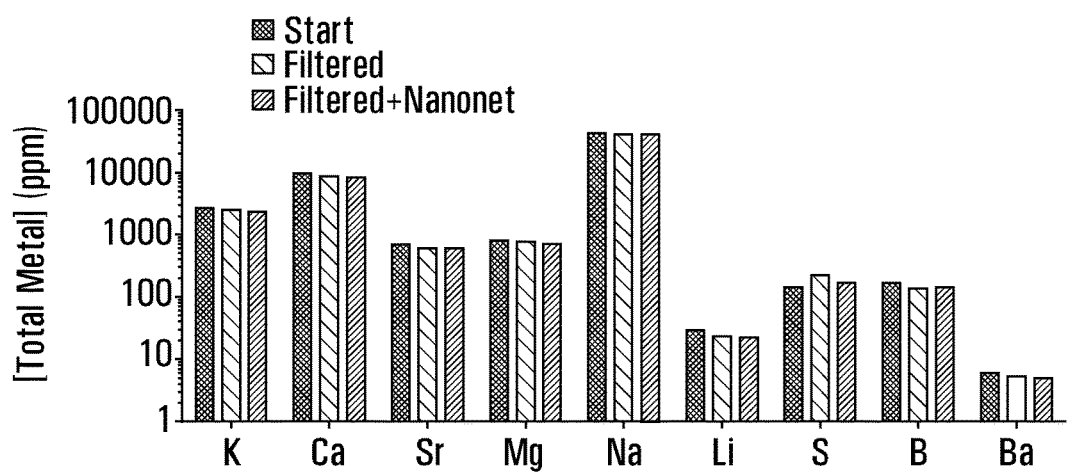

FIG. 13: A) Removal of extractable petroleum hydrocarbons with chain length 10-32 carbons wherein "Start" is before treatment, "Filtered" is treatment without nanonets and filtration, and "Filtered+Nanonets" is treatment with both nanonets and filtration. B) Removal of Zn and Fe from produced water. C) Removal of various metals from produced water.

Figure 14:
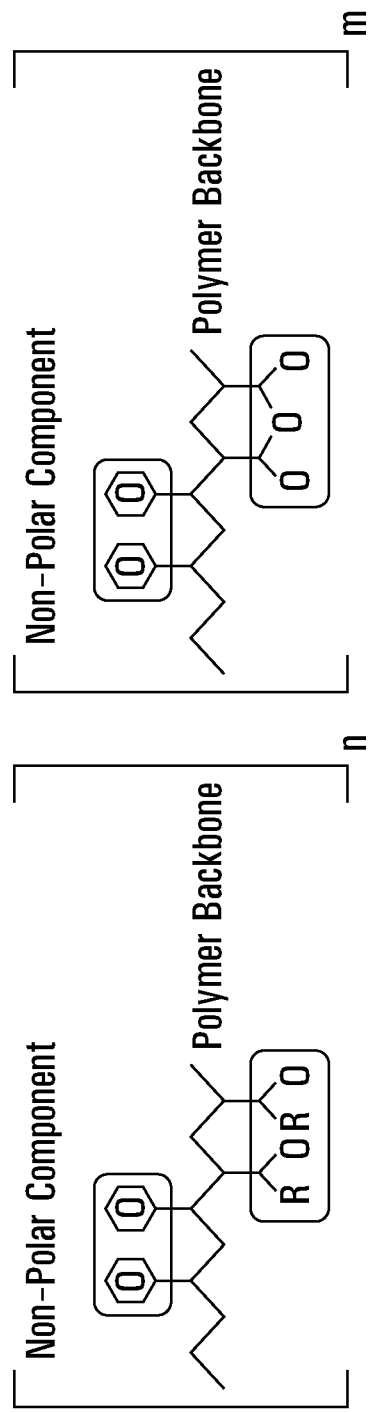

FIG. 14: Illustration of monomeric units of a polymer in hydrated and un-hydrated forms.

Figure 15A:
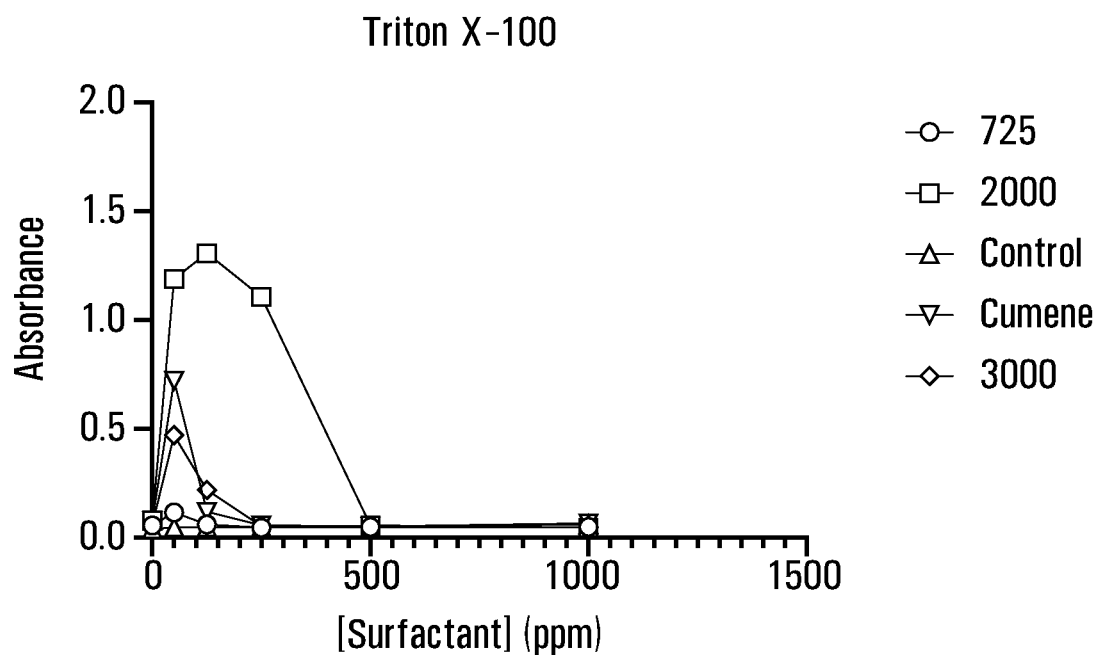
Figure 15B:
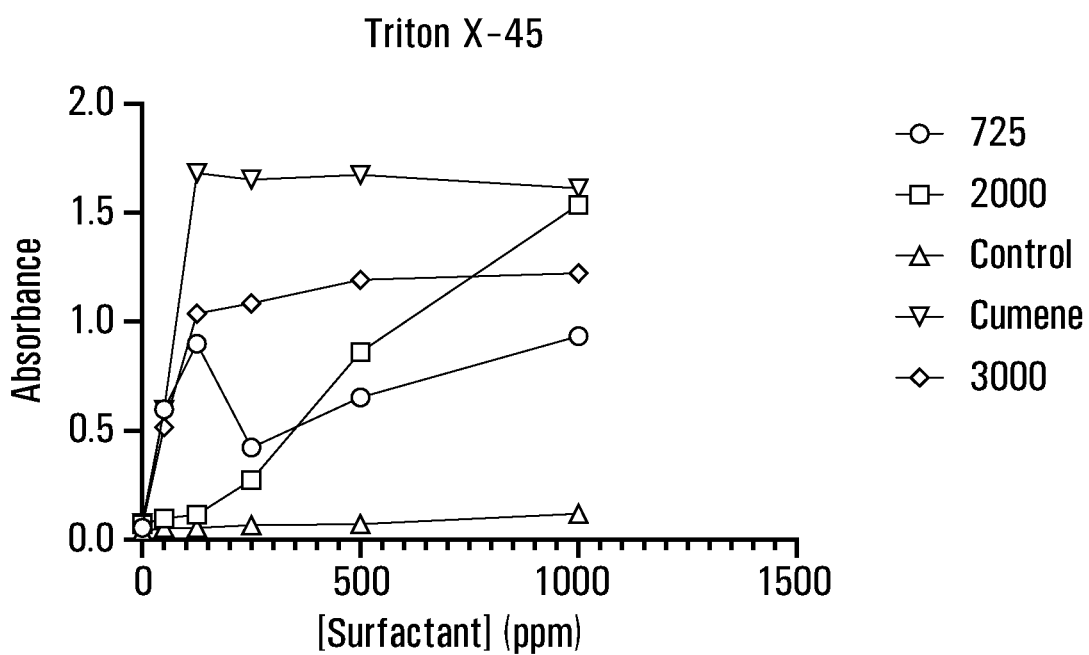

FIG. 15: Nanonet formation with model surfactants a) Triton X-100™ and b) Triton X-45™ and styrene maleic acid block co-polymers.

Figure 16:
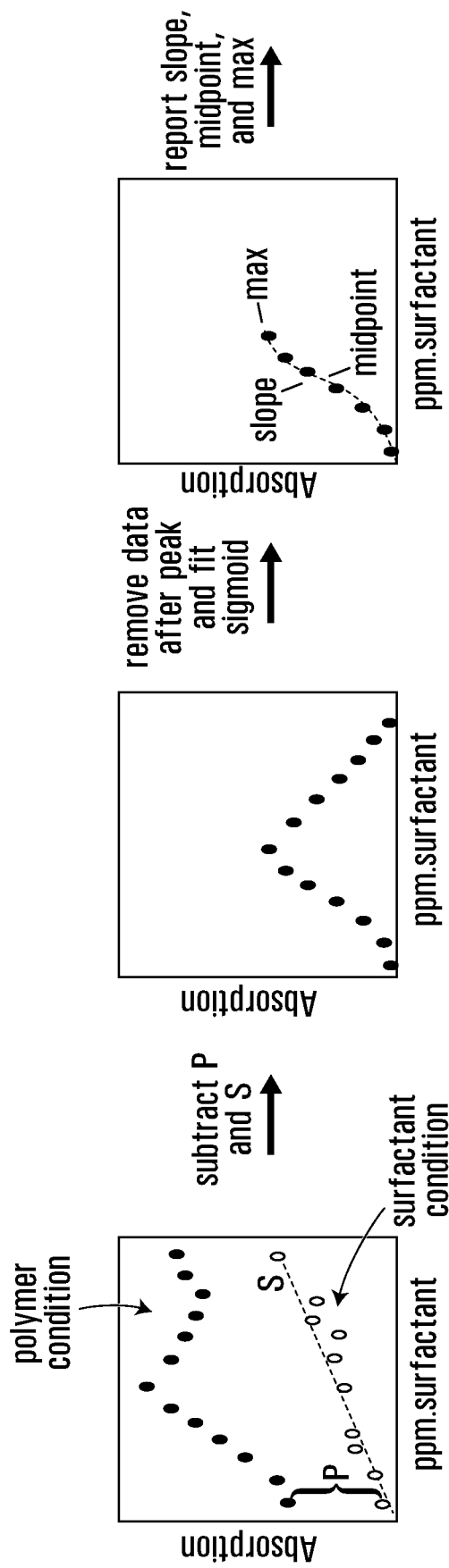
Figure 17A:
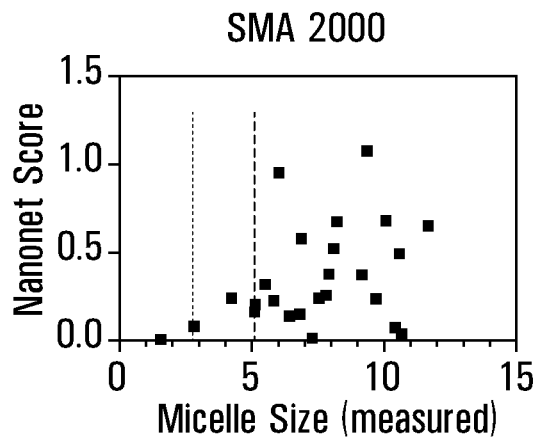
Figure 17B:
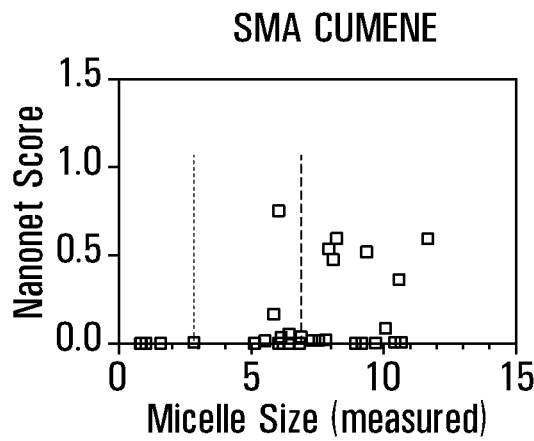
Figure 17C:
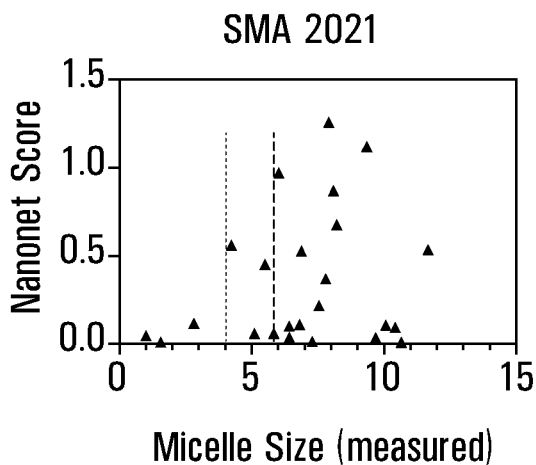
Figure 17D:
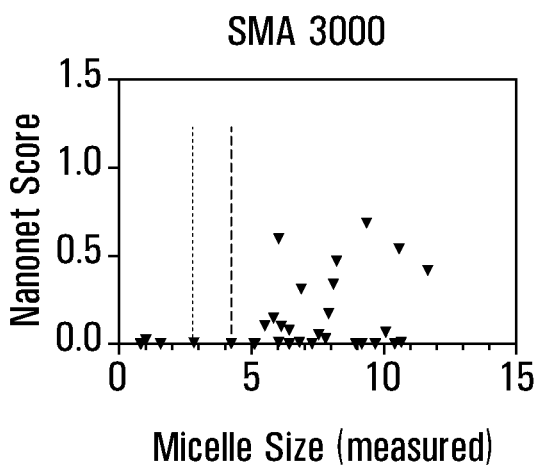
Figure 17E:
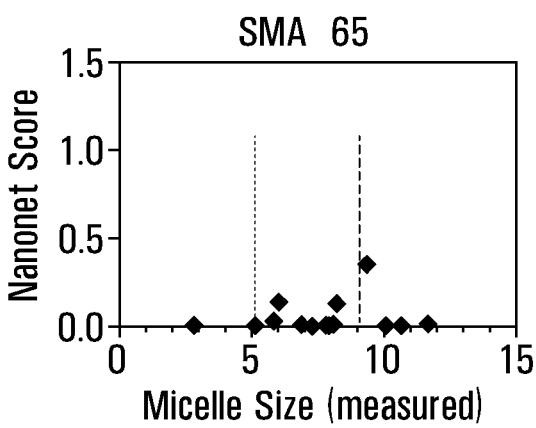
Figure 17F:
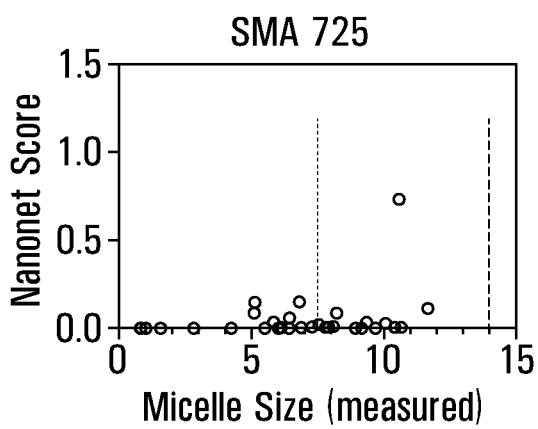

FIG. 16: Evolution of quantitative scoring method for nanonet formation.

FIG. 17: Nanonet score for each SMA polymer combination.

Figure 18:
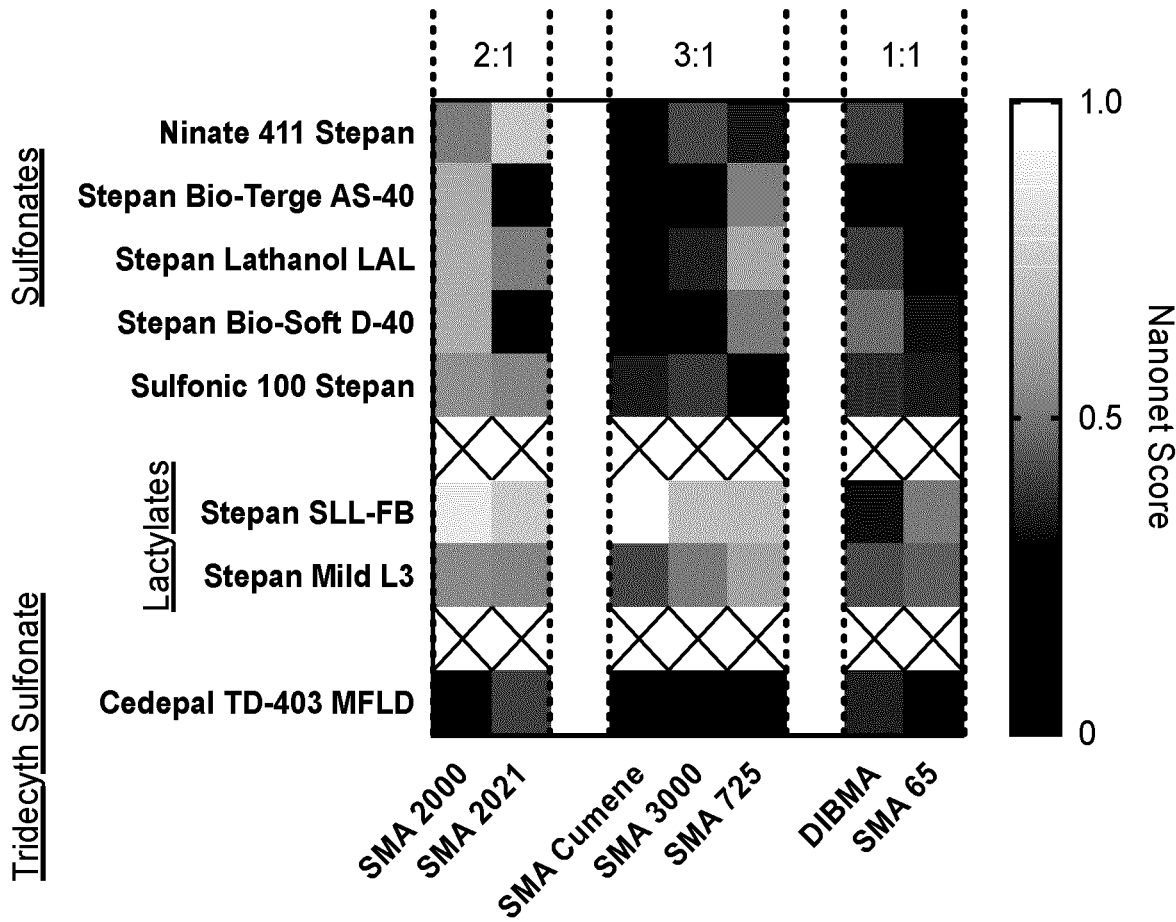

FIG. 18: Nanonet scores for sulfonates, lactylates and trideceth sulfonate with differing block-copolymers.

Figure 19:
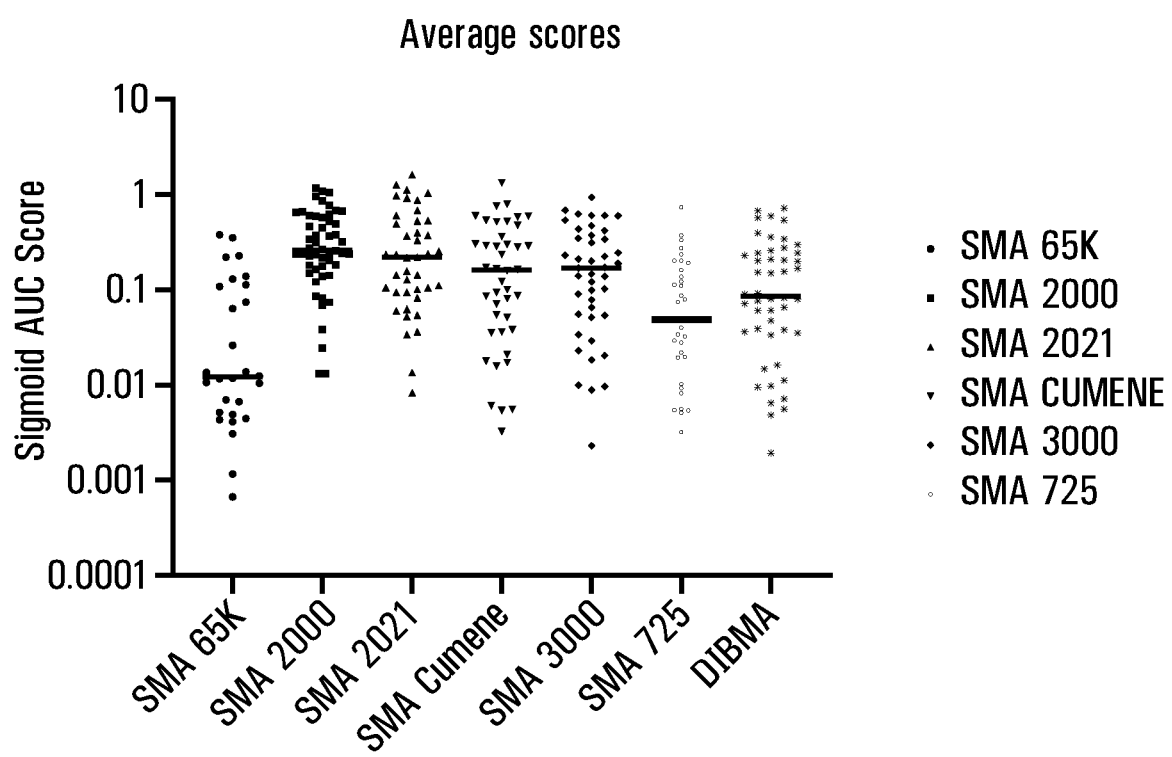

FIG. 19: Nanonet formation scores with SMA polymers with DIBMA.

Figure 20:
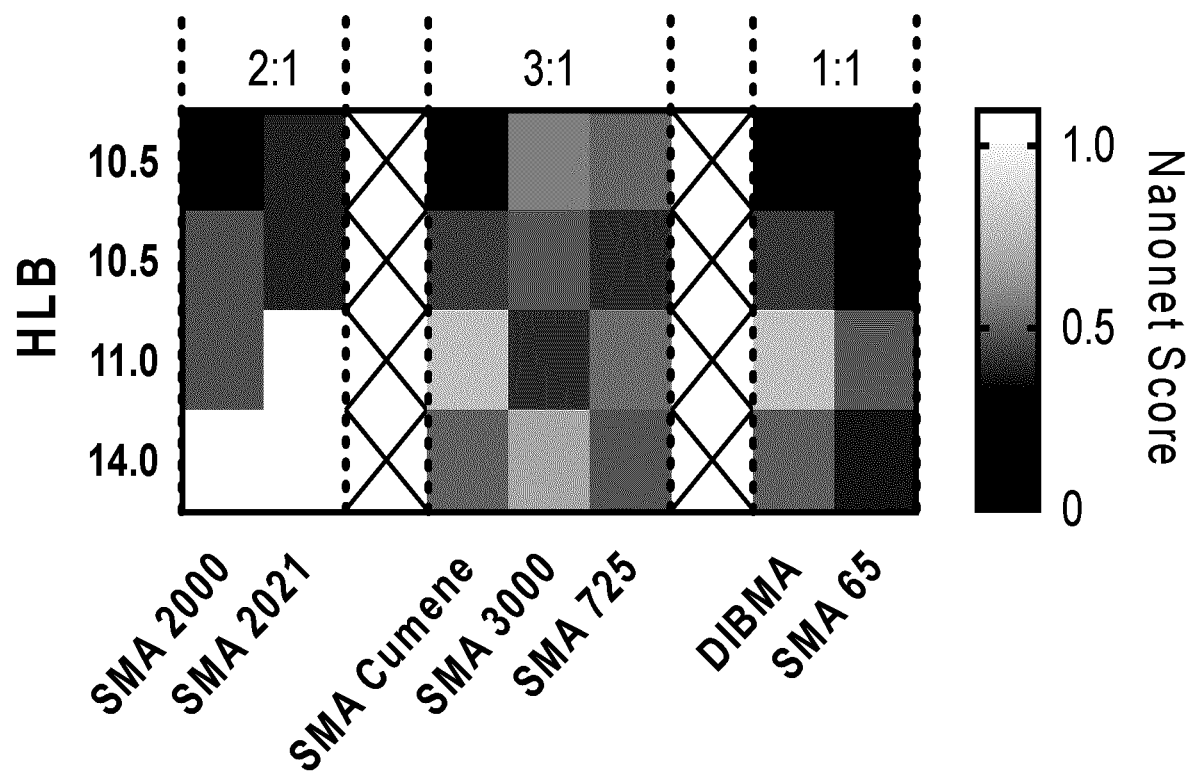

FIG. 20: Nanonet scores with differing block-copolymers over differing HLB values.

Figure 21:
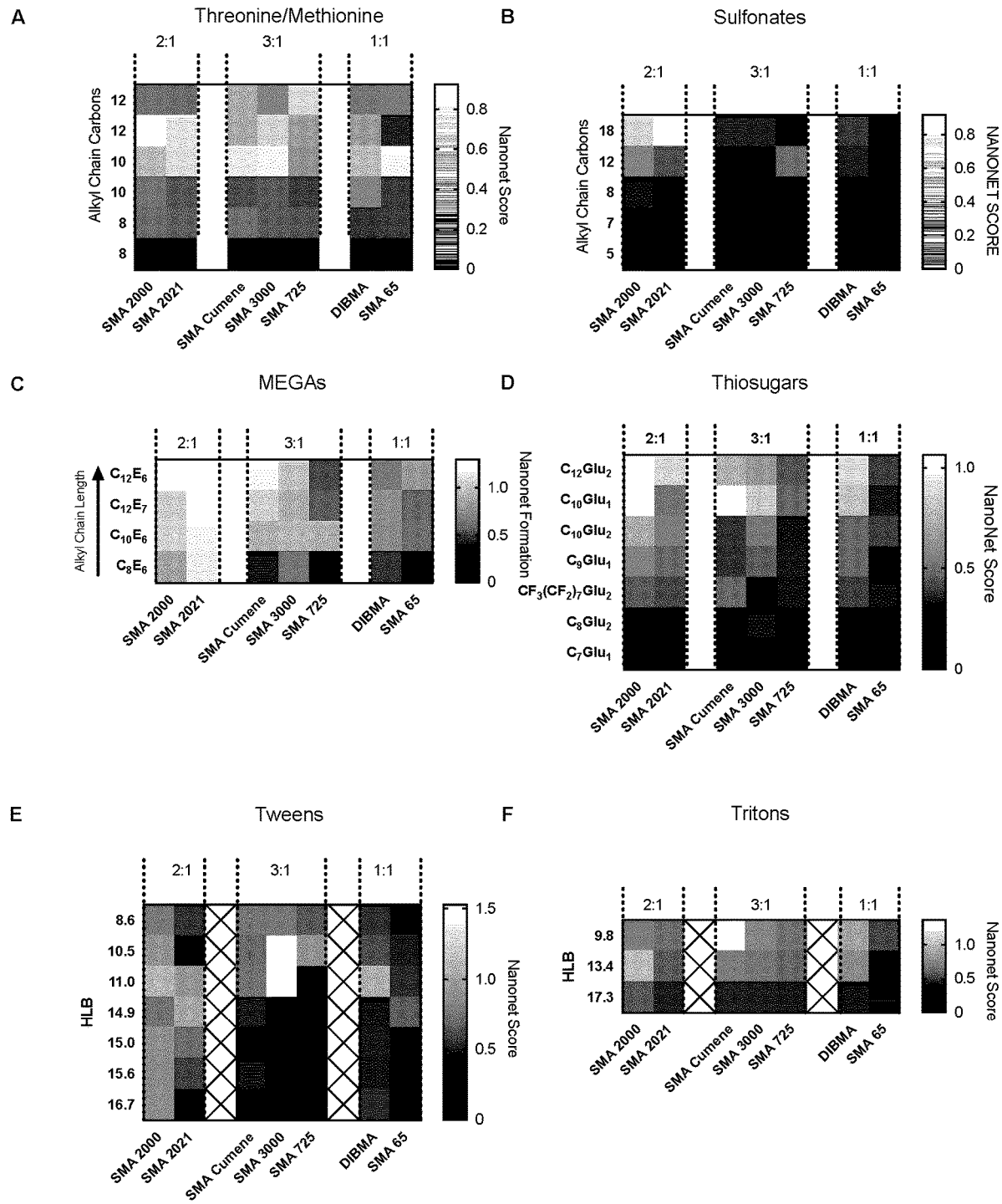

FIG. 21: Effect of alkyl chain and hydrophilic headgroup length on Nanonet formation with varying surfactant head groups. Effect of alkyl chain length on nanonet scores for surfactants with A) amino acid head groups (N-dodecanoyl methionine, N-dodecanoyl threonine, N-decanoyl methionine, N-decanoyl threonine, N-octanoyl methionine, and N-octanoyl threonine in order from top to bottom), B) Sodium Sulfonate head groups (Na-dodecylbenzene sulfonate, Na-dodecane sulfonate, 1-octane sulfonate, p-toluene-1-sulfonate, and Na-pentane sulfonates in order from top to bottom) C) ethylene glycol ether head groups (hexaethylene glycol monododecl ether, heptaethylene glycol monododecyl ether, hexaethylene glycol monodecyl ether, and hexaethylene glycol monooctoyl in order from top to bottom). D) Thioglucosides (n-dodecyl-β-D-thioglucopyranoside, n-dodecyl-β-D-thiomaltopyranoside, n-decyl-β-D-thioglucopyranoside, n-decyl-β-D-thiomaltopyranoside, n-nonyl-β-D-thioglucopyranoside, n-octyl-maltoside, fluorinated, n-octyl-β-D-thiomaltopyranoside, and n-heptyl-β-D-thioglucopyranoside, in order from top to bottom). Effect of hydrophilic head group size (represented by HLB) on nanonet scores for surfactants with E) polyethoxylated sorbitan headgroups (SPAN 20™, TWEEN 65™, TWEEN 85™, TWEEN™ 80, TWEEN 60™, TWEEN 40™, and TWEEN 20™ in order of top to bottom). F) Phenyl polyethylene glycol headgroups (TRITON X-45™, TRITON X100™, and TRITON X-305™).

Figure 22:

FIG. 22: Nanonet library with anionic surfactants employed to screen $Cu^{2+}$ metal ion removal from seawater.

Figure 23:
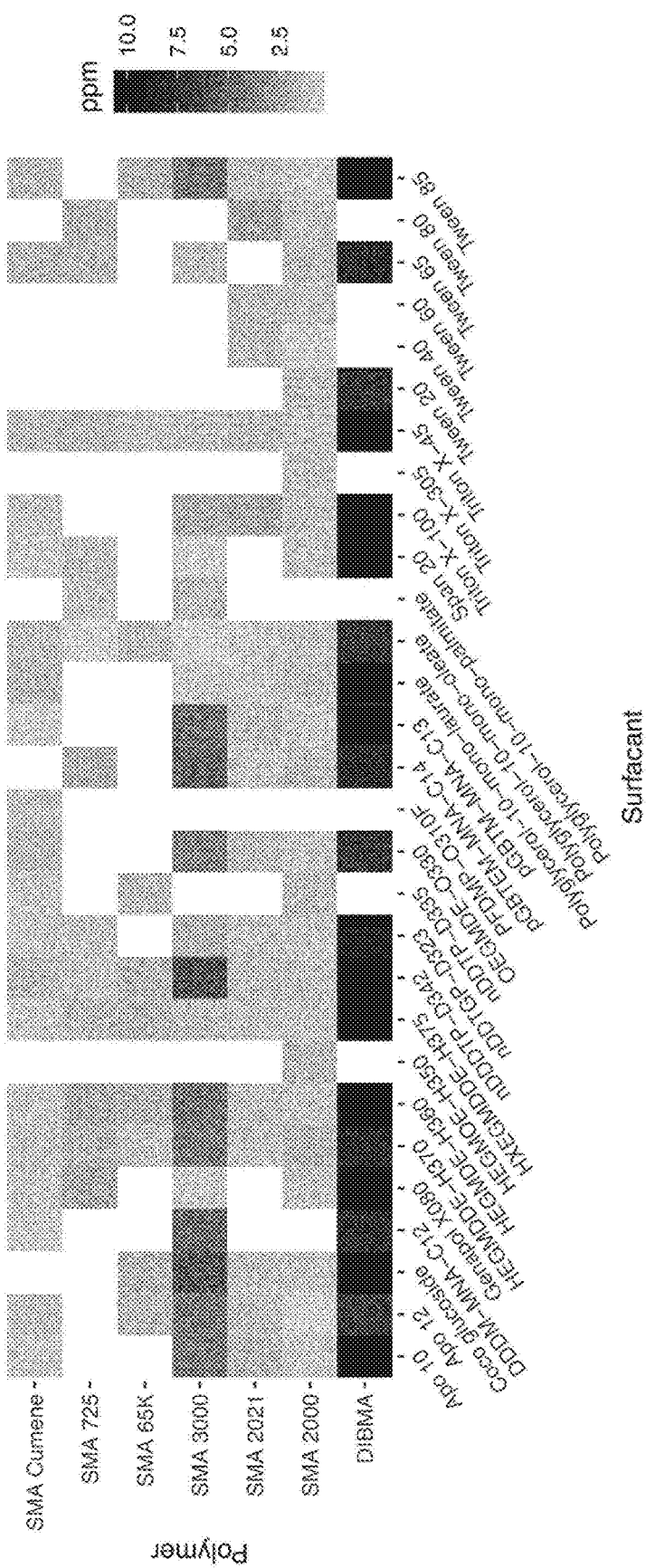

FIG. 23: Nanonet library with non-ionic surfactants used to screen $Cu^{2+}$ metal ion removal from seawater.

Figure 24:

FIG. 24: Nanonet library with anionic surfactants utilized to screen $Zn^{2+}$ metal ion removal from seawater.

Figure 25:
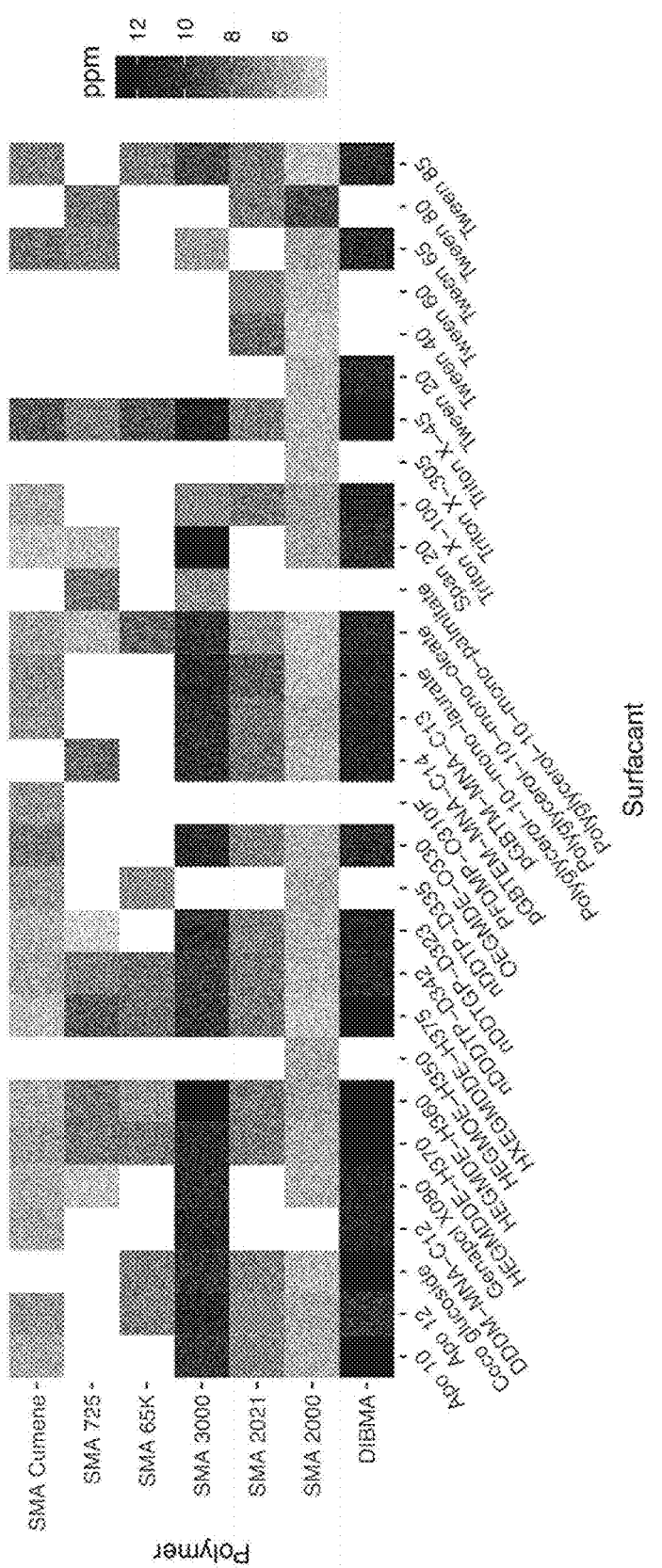

FIG. 25. Nanonet library with non-ionic surfactants applied to screen $Zn^{2+}$ metal ion removal from seawater.

Figure 26:
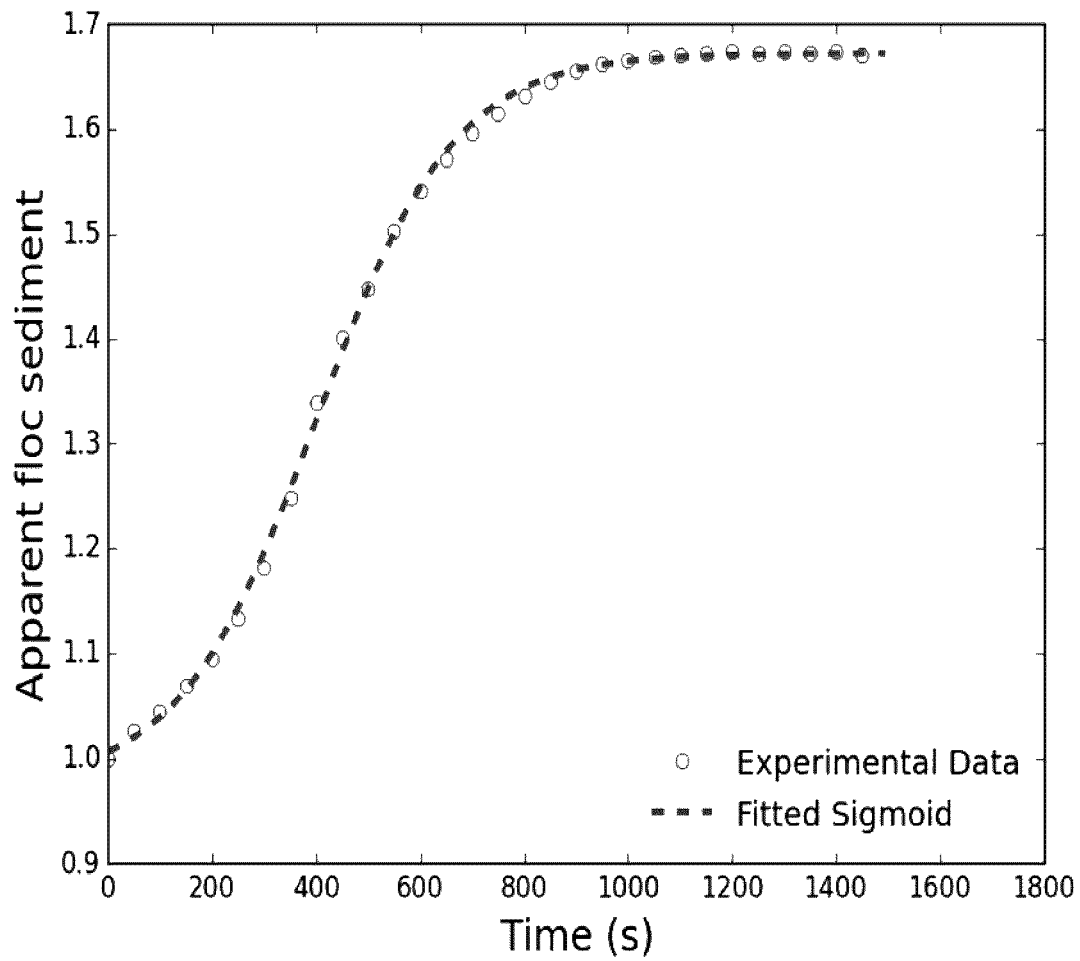

FIG. 26: Example batch settling curve of a SMA-725™ and BIOSOFT D-40 mixture added to a calcium solution. Floc sedimentation is quantified over time and a sigmoid function is used to fit the data.

Figure 27:
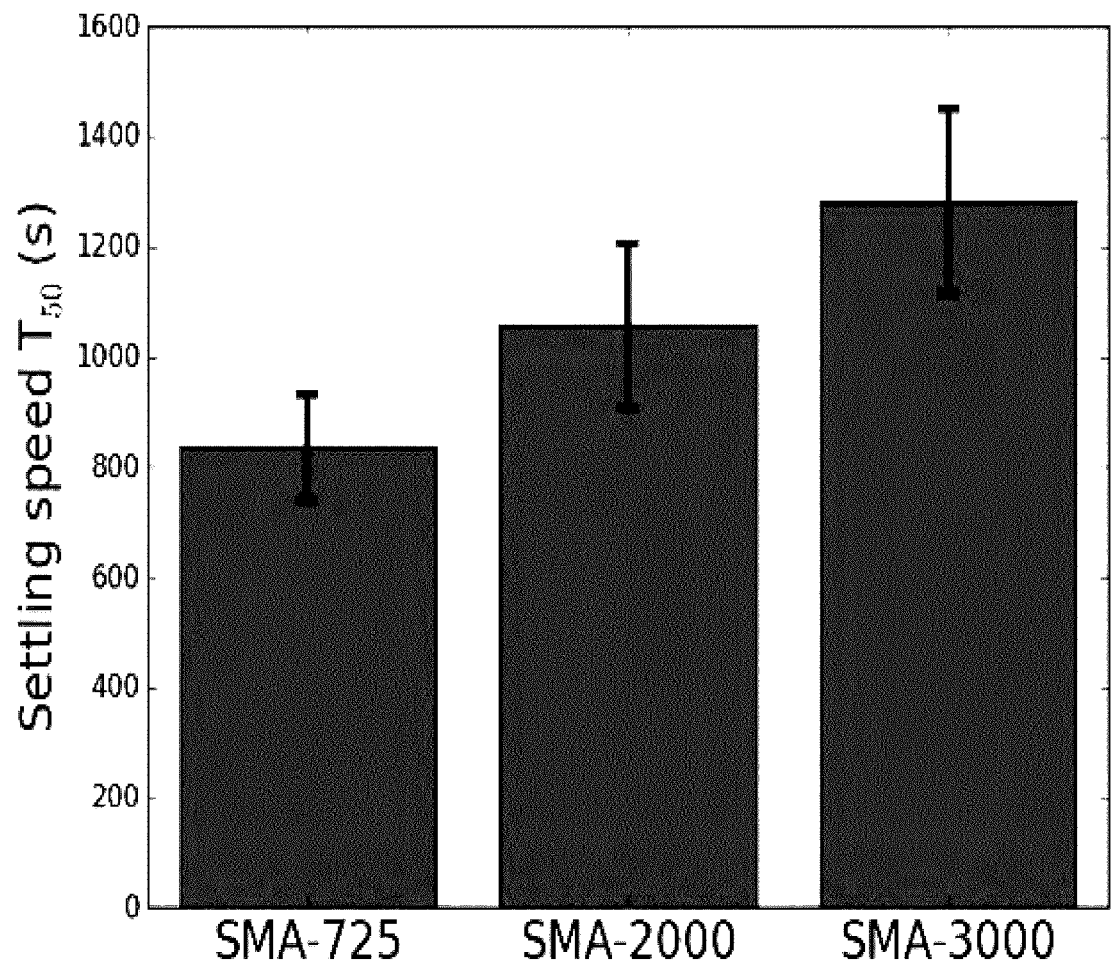

FIG. 27: Bar graph quantifying apparent settling speed ($t_{50}$) for three different polymers. Error bars are shown in black.

Figure 28:
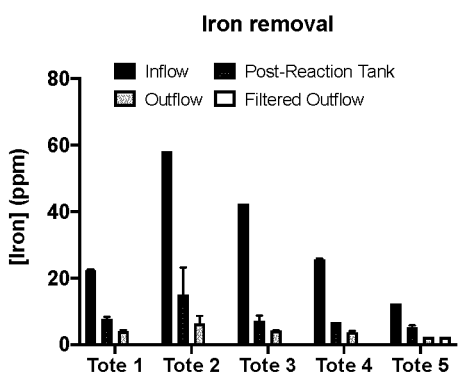
Figure 28:
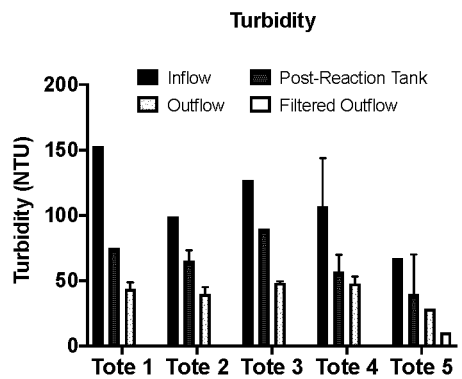
Figure 28:
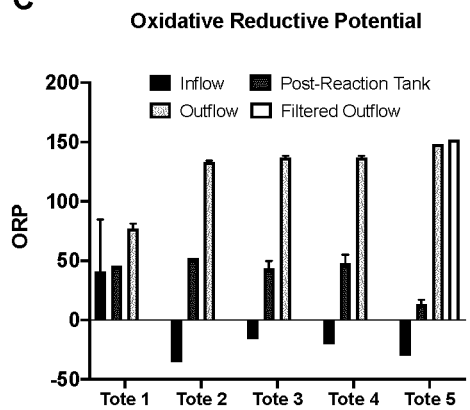
Figure 28:
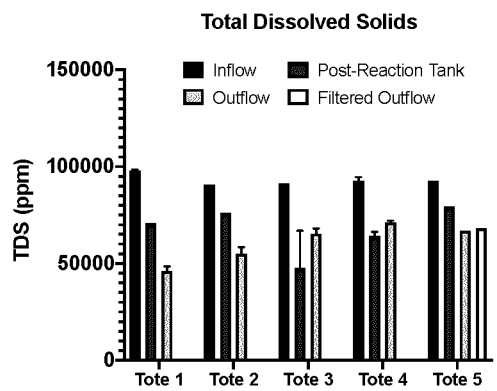
Figure 28:
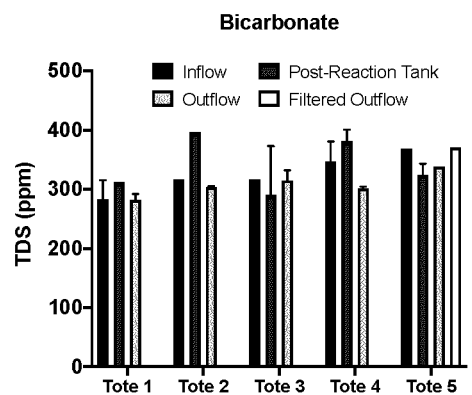

FIG. 28: Selected water parameters from treated and untreated produced water samples. A). Iron levels pre- and post-treatment. B) Turbidity levels pre- and post-treatment C). Oxidative Reductive Potential pre- and post-treatment D). Total dissolved solids pre- and post-treatment E) Bicarbonate levels pre- and post-treatment.

Figure 29:
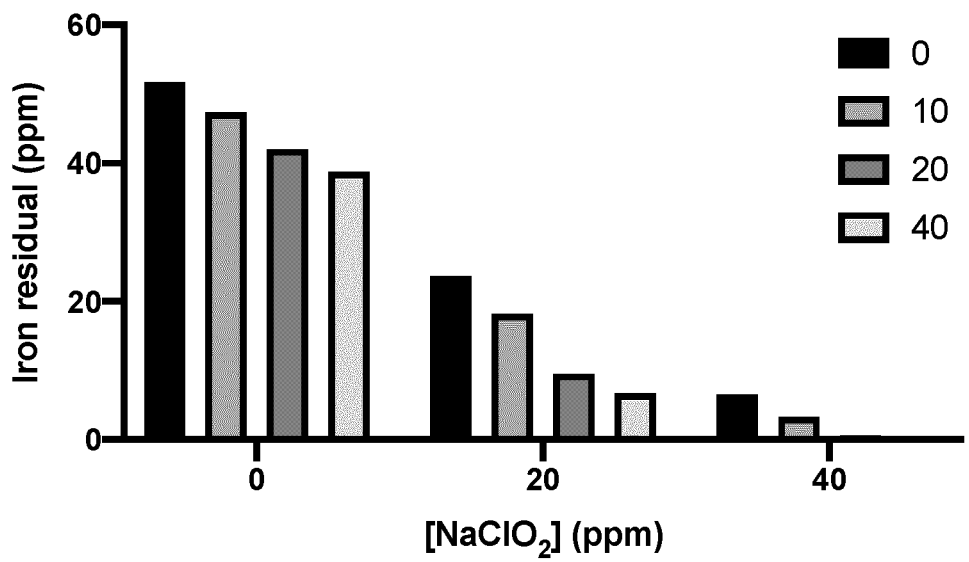
Figure 29:
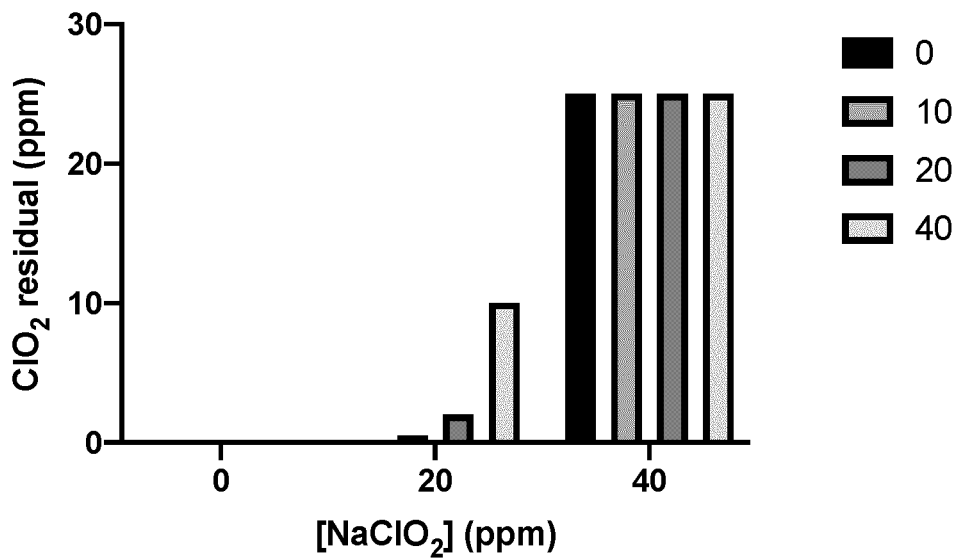

FIG. 29: Bar graphs illustrating (A) iron removal from produced water using various concentration of nanonets and (B) residual $ClO_2$.

DETAILED DESCRIPTION

Nanonets described herein provide for efficient removal of a targeted contaminant by selecting a suitable polymer length and polymer amount based on the surfactant that is most suitable for removal of the targeted contaminant. Virtually any surfactant aggregate may be used in a nanonet provided that a suitable polymer is selected. Neutralization of the polymer provides for precipitation of the nanonets and associated sequestered contaminants. This is advantageous as a solid precipitate comprised of nanonets and associated sequestered contaminants can be easily removed by physical methods of separation. Non-limiting examples of physical separation methods include dissolved air flotation (DAF), settling, filtration, centrifugation, gravity separation, flotation, skimming, electromagnetic attraction or repulsion, microfiltration and nanofiltration. The relationship between polymer size and surfactant aggregate structure allows nanonet formulations to be designed that target select contaminants that fit into common physical separation systems.

Surfactants are typically amphipathic molecules with a hydrophilic head group and a lipophilic/hydrophobic functional group. Depending on the size and charge of the hydrophobic to hydrophilic headgroups, surfactants can be soluble or insoluble in water. This balance is typically called the hydrophilic lipophilic balance (HLB) (Griffin, William C. (1949), "Classification of Surface-Active Agents by 'HLB'", Journal of the Society of Cosmetic Chemists, 1 (5): 311-26), as the head group typically has an affinity for water and the tail group has an affinity for lipids and oils. Surfactants can be insoluble in water, where they are typically utilized to prepare water in oil emulsions and have an HLB value <10, or soluble in water, where they are typically utilized to prepare oil in water emulsions and have an HLB value >10. Soluble surfactants typically form Gibbs monolayers in aqueous solutions, where free surfactant is able to exchange from the bulk water phase to the air water interface In contrast, insoluble surfactants form Langmuir monolayers which are compressible, and do not exchange, or only sparingly, with the bulk water phase (Rogalska, E., et al., (2000). *Formation and properties of Langmuir and Gibbs monolayers: a comparative study using hydrogenated and partially fluorinated amphiphilic derivatives of mannitol*. Chemistry and Physics of Lipids, 105(1), 71-91. doi: 10.1016/s0009-3084(99)00130-, 9). Examples of lipids include phosphatidylcholine, phosphatidylethanolamine, phosphatidylglycerol, and lecithins. Examples of soluble surfactants include Triton X-100™, Sodium dodecyl sulfate, and polyglycerol-10-laurate, which all have an HLB >10. Examples of insoluble surfactants include SPAN 80 ™ or TWEEN 85™.

As used herein the term "nanonet" refers to a particle that is a formed by an association between a polymer and surfactant aggregate. The nanonet self-assembles in an aqueous environment, is stable in aqueous solution, and is comprised of i) a polymer and ii) a surfactant aggregate. Nanonets remain associated at lower concentrations relative to surfactant aggregates in the absence of the polymer. The solution stability of nanonets may be disrupted by the addition of a suitable destabilization material. For example, and without limitation, neutralization of charged carboxylic acid groups by an acid may cause destabilization of a nanonet which comprises a maleic acid component in the polymer. Without being limited by theory, it is believed that nanonets are the result of interactions between the alkyl chains of the surfactants and the alkyl chains of the hydrophobic portions of the polymer. Often, nanonets are colloidal particles comprising amphipathic block co-polymers and surfactants. The amphipathic block co-polymers often comprise a hydrophilic functional group and a hydrophobic functional group. Examples of the hydrophilic functional group include, but are not limited to, a maleic acid, a carboxylic acid and an amide linked ethanol group. Examples of the hydrophobic functional group include, but are not limited to, a styrene, di-isobutyl.

As used herein "nanonet diameter" refers to the size of a nanonet in an aqueous environment as measured by dynamic light scattering. An "average nanonet diameter" refers to the average of the size of a plurality nanonets in an aqueous environment as measured by dynamic light scattering. The term "average nanonet diameter" may be used interchangeably herein with the term "nanonet diameter" or "nanonet size". Examples, without limitation, of how to measure an average nanonet diameter are provided in the Examples section herein.

As used herein, the term "aqueous solution" refers to a liquid environment in which water is a major component. Examples of aqueous solutions include, but are not limited to, waste water, aqueous material recovered from a process, (such as sewage sludge, animal manure, food processing waste), oil and gas wastewater, used fracking fluid, industrial effluent, ground water and the like.

As used herein, the term "precipitation agent" refers to any substance which is cationic and/or generates a cation upon exposure to an aqueous environment. A substance which is cationic is a cation and a substance that generates a cation upon exposure to an aqueous environment is termed herein "a cation generator". Examples, without limitation, of precipitation agents include, an acid, a divalent cation, a trivalent cation, acetic acid, malic acid, citric acid, tartaric acid, fumaric acid, lactic acid, hydrochloric acid, sulfuric acid, phosphoric acid, and mixtures thereof.

As used herein, the term "surfactant" refers to any surface active agent containing a polar portion that thermodynamically prefers to be solvated by a polar solvent, and a non-polar portion that thermodynamically prefers to be solvated by a non-polar solvent. The term "surfactant" is also meant to encompass anionic, cationic, non-ionic and zwitterionic surfactants. Surfactants suitable for use in the present invention form aggregates in aqueous solution. Surfactants that do not form aggregates are not encompassed by the term "surfactant" as used herein.

An "anionic surfactant" is a surfactant with a polar portion that ionizes to form an anion in aqueous solution (the anion residing on the polar portion connected to the non-polar portion). A "cationic surfactant" refers to a surfactant having a cationic polar portion that ionizes to form a cation in aqueous solution (the cation residing on the polar portion connected to the non-polar portion). A "non-ionic" surfactant refers to a surfactant having a polar portion that does not ionize in aqueous solution. A "zwitterionic surfactant" refers to a surfactant that has separate cationic and anionic sites and is uncharged (for example, non-limiting examples of zwitterions include dialkylammonio acetate as the zwitterion form of N,N-dialkylaminium acetic acid, or betaine dialkylsulfonio acetate). (from pg. 224-25, The Vocabulary of Organic Chemistry, Milton Orchin et al., Eds., John Wiley & Sons, 1980). A soap is a salt of an anionic surfactant, typically a fatty acid.

A person of skill in the art familiar with surfactants will appreciate the vast array of suitable surfactants for use in the present invention, see for example and without limitation the following references: Drew Myers, Surfactant Science and Technology, VCH Publishers, Inc. 1988.; Bordes, Romain, and Krister Holmberg. 2015. "Amino Acid-Based Surfactants—Do They Deserve More Attention?" Advances in Colloid and Interface Science 222 (August): 79-91.; Essentials of Glycobiology. 3rd editionVarki A, Cummings R D, Esko J D, et al., editors. Cold Spring Harbor (N.Y.): Cold Spring Harbor Laboratory Press; 2015-2017; Reference for definition: Zhang, X., Song, F., Taxipalati, M., Wei, W., & Feng, F. (2014). Comparative Study of Surface-Active Properties and Antimicrobial Activities of Disaccharide Monoesters. PLoS ONE, 9(12), e114845. doi:10.1371/journal.pone.0114845; R. H. Beck, N. J. Kalff, and H. W. W. Roper, European Patent Application, EP 536939, 1993; V. Au, B. Harichian, A. Hung, and R. Vermeer, U.S. Pat. No. 5,872,111 A, 1999; J. J. Scheibel, D. S. Connor, R. E. Shumate, and L. J. Charles, PCT Int Appl. WO 92 06984, 1992; C. L. Mehltretter, R. L. Mellies, and J. C. Rankin, U.S. Pat. No. 2,670,345, 1954; Z. Wang. United States patent U.S. Pat. No. 7,655,611 B2, 2010; and Sari-Chmayssem N., Pessel F., Guegan J. P., S. Taha, Mawlawi H., and Benvegnu T. Direct and one-pot conversion of polyguluronates and alginates into alkyl-L-guluronamide-based surfactant compositions, Green Chemistry; Novel surfactants and novel emulsifiers made from disaccharides. WO 2006/100091; U.S. Pat. No. 6,184,196 B1. SUCROSE BASED SURFACTANTS AND METHODS THEREOF; WO 94/12511; and Safety Assessment of Alkyl Sultaines as Used in Cosmetics. Christine Burnett. Cosmetic Ingredient Review, Jun. 30, 2017.

Nanonet formation begins with surfactants operable to form an aggregate that have an average aggregate diameter that exceeds a threshold average particle size that may be determined based on the average particle size of the polymer for use in the nanonet composition. The surfactants set forth below may be used in embodiments of nanonets described herein. In some cases, surfactants may be described according to their polar group, and their non-polar group. Common linkages between a polar component and a non-polar component of a surfactant include, but are not limited to, ether, amine, ester, phosphate, thioester and amide linkers.

Anionic Surfactants

Sulfonate polar groups may be attached to a non-polar group to make a surfactant of the general formula: $R-(SO_3M)_z$.

Sulfate polar groups may be attached to a non-polar group to make a surfactant of the general formula: $R-(OSO_3M)_z$.

Carboxylate polar groups may be attached to a non-polar group to make a surfactant of the general formula: $R-(COOM)_z$.

Phosphate polar groups may be attached to a non-polar group to make a surfactant of the general formula: $R-(OPO_3M)_z$.

Phosphonate polar groups may be attached to a non-polar group to make a surfactant of the general formula: $R-(PO_3M)_z$.

Alpha-sulfonated carboxylic acid polar groups may be attached to a non-polar group to make a surfactant of the general formula: $R-(CH(SO_{3M})COOM)_z$. R may be any one or more of lauric, palmitic and stearic acids.

Alpha-sulfonated carboxylic acid ester polar groups may be attached to a non-polar group to make a surfactant of the general formula: $R-(CH(SO_3M)COOR^1)_z$. R may be any one or more of lauric, palmitic and stearic acids. $R^1$ is $C_1$-$C_5$ alkyl linear or branched. Z may be 1, 2, 3 or any combination thereof and the non-R group may reside on the same carbon in R or on different carbons.

Sulfonate ester polar groups may be attached to a non-polar group to make a surfactant of the general formula: $R(COX(CH_2)_nSO_3M)_z$ (n may be in the range of 2 and 8 and and X is O, NH or $N-R^1$.

Arylamide sulfonate ester polar groups may be attached to a non-polar group to make a surfactant of the general formula: $R(COXArSO_3M)_z$.

Xanthate polar groups may be attached to a non-polar group to make a surfactant of the general formula: $R(OCS^-_2 M)_z$.

In any of the above formulae, M may be any monovalent cation including, for example, $Na^+$, $K^+$, $Li^+$.

Nonionic Surfactants

Polyoxyethylene polar groups may be attached to a non-polar group to make a surfactant of the general formula: $R(X(CH_2CH_2O)_nCH_2CH_2OH)_z$ (X is O, S or NH).

Polyoxypropylene polar groups may be attached to a non-polar group to make a surfactant of the general formula: $R(X(CH_2CH(CH_3)O)_nCH_2CH(CH_3)OH)_z$ ((X is O, S or NH).

Bis—Polyoxyethylene amine polar groups may be attached to a non-polar group to make a surfactant of the general formula: $(RX((CH_2CH_2O)_nCH_2CH_2OH)_2$ (X is N)

Bis—Polyoxypropylene amine polar groups may be attached to a non-polar group to make a surfactant of the general formula: $(RX((CH_2CH(CH_3)O)_nCH_2CH(CH_3)OH)_2$ (X is N)

In the chemical formulae represented above, R is a linear or branched chain, saturated, mono-unsaturated or poly-unsaturated, aliphatic cyclic, or aromatic cyclic, or polycyclic, and all possible combinations thereof. In some embodiments, the aromatic or non-aromatic cyclic is alkylated. In some embodiments, R may additionally be comprised of O, N, S, and combinations thereof, and additionally be functionalized with any one or more moieties such as carboxylic acid, carboxylic amide, thio-carboxylic acid and combinations thereof. Generally, R has as few as 8 and as many as 40 carbon atoms. In some embodiments R has as few as 7 or more carbon atoms. In some embodiments, R has from 7 to 40 carbon atoms. In some embodiments, R has from 8 to 40 carbon atoms. In some embodiments, R has from 7 to 20 carbon atoms, or R has from 8 to 20 carbon atoms, or R has from 7 to 20 carbon atoms. In some embodiments, R has from 7 to 18 carbon atoms, or R has from 8 to 18 carbon atoms, or R has from 9 to 18 carbon atoms.

Where a chemical formula above includes the "n" parameter, unless some other value of n is expressed next to a particular chemical formula, n may have the following values: In some embodiments, n may be in the range of 4 and 20, or in the range of 5 and 18, or in the range of 6 and 17, or in the range of 7 and 16, or in the range of 8 and 15.

For a chemical formula above including the "z" parameter, z may be 1, 2, 3 or any combination thereof and the non-R group may reside on the same carbon in R or on different carbons of the R group.

For a chemical formula above including the parameter "Ar" in the chemical formula, Ar may be benzene, p-toluene, or naphthalene.

In some embodiments of a surfactant represented by the above chemical formulae, R may be cholic acid or a derivative thereof. In some embodiments, R may be any one or more of lauric, palmitic and stearic acids. In some embodiments, R may include up to five pendant acetic acid functional groups. In other embodiments, R may be cocoyl. In some embodiments, R may be derived from a fatty acid or fatty acid ester.

Embodiments employing surfactants having one of the nonionic polar groups described above employ combinations of alkyl groups that may optimize surfactant average aggregate size in relation to the polymer average particle size to be employed in the nanonet composition and further considering the contribution of a hetero-atom containing portion of the structures. Sugar, Glycidyl, and Fatty acid alcohol derived Nonionic Surfactants Non-limiting examples of surfactants under this category include: polyethylene glycol derivatives of fatty acids, such as, PEG derivatives of the amines of fatty acids. Examples of specific surfactants under this category include, but are not limited to: PEG-2 cocamine, PEG-3 cocamine, PEG-4 cocamine, PEG-5 cocamine, PEG-8 cocamine, PEG-10 cocamine, PEG-12 cocamine, PEG-15 cocamine, PEG-20 cocamine, PEG-2 hydrogenated tallow amine, PEG-5 hydrogenated tallow amine, PEG-8 hydrogenated tallow amine, PEG-10 hydrogenated tallow amine, PEG-15 hydrogenated tallow amine, PEG-20 hydrogenated tallow amine, PEG-30 hydrogenated tallow amine, PEG-40 hydrogenated tallow amine, PEG-50 hydrogenated tallow amine, PEG-2 lauramine, PEG-2 oleamine, PEG-5 oleamine, PEG-6 oleamine, PEG-10 oleamine, PEG-15 oleamine, PEG-20 oleamine, PEG-25 oleamine, PEG-30 oleamine, PEG-12 palmitamine, PEG-2 rapeseedamine, PEG-2 soyamine, PEG-5 soyamine, PEG-8 soyamine, PEG-10 soyamine, and PEG-15 soyamine.

Sugar Based Functional Groups

Acidic Sugars: Sugars that have had one or more hydroxyl groups substituted with a carboxylic acid. Non-limiting examples of acidic sugars include: Gluconic acid, and ascorbic acid Deoxy Sugars: Sugar that has a hydroxyl group substituted for a hydrogen. Non-limiting examples of deoxy sugars: Rhamnose, Fucose, and Deoxyribose C5-Monosaccharides (Furanoses): 5 carbon backbone saccharides, they will cyclize to form a 5 carbon ring. Non-limiting examples of C5 monosaccharides include: Fructose, ribose, xylose, arabinose, and lyose.

C6-Monosaccharides (Pyranoses): 6 carbon backbone saccharides, they will cyclize to form a 6 carbon ring. Non-limiting examples of C6 monosaccharides include: Glucose, mannose, allose, altrose, tallose, galactose, glucopyranose Aminosugars: A sugar molecule in which a hydroxyl group has been replaced with an amine group. The functional group is most likely connected via an amide bond with the fatty acid, but those skilled in the art can also connect the amino sugar through one of the hydroxyl groups. Non-limiting examples of aminosugars include: Galactosamine, glucosamine, sialic acids, N-acetyl-D-glucosamine, mannosamine Aldonamide: a sugar-based surfactant category. A non-limiting example of an aldonamide based surfactant includes: coco D-gluconamide.

Dissacharides: Disaccharides are sugars or carbohydrates made by linking two monosaccharides. A glycosidic bond can form between any hydroxyl group on the monosaccharides, leading to many different combinations of bonds and stereochemistry, producing disaccharides with unique properties. These dissacharides can be subsequently reacted with a free fatty acid by those with skill in the art to form a disaccharide alkyl ester. Non-limiting examples of Disaccharides include: Sucrose, maltose, lactose, cellobiose, mannobiose, trehalose, lactulose, turanose, xylobiose, melibiose, sophorose, and raffinose Polysaccharides: A chain of more than 2 saccharides, linked together by glycosidic bonds. A non-limiting example of a group of polysaccharides is alkyl polyglucosides (APG).

Sugar Alcohols: Sugars which have had the terminal sugar aldehyde converted into an alcohol. Non-limiting examples of sugar alcohols include: lactitol, sorbitol, isomalt, xylitol, erythritol, and mannitol.

Dehydrated Sugar Alcohols: Sugar alcohols which have been dehydrated to form a cyclized lactone ring. Non limiting examples of dehydrated sugar alcohols include: sorbitan, mannitan, xylitan, anhydroerythritol, furanoside, and furanose.

Methods of Addition of Alkyl Chains and Sugars to Make Sugar Based Surfactants:

Glycosidic bond: Sugars can be attached to alkyl chains through a glycosidic bond. The glycosidic bond can be N, O or S linked, whereby a hydroxyl group on the sugar is replaced and linked to another carbon chain via an amine, ether, or thioether. All of the sugar functional groups mentioned above can be used to form a glycosidic bond with an alkyl chain. Non-limiting examples of sugar derived surfactants include: Cocoyl glucoside (O-linked), octyl-glucamine (N-linked), alkylpolyglucosides, 3-(butyloxy)-2-hydroxypropyl-beta-D-galactopyranoside, 3-(pentyloxy)-2-hydroxypropyl-beta-D-galactopyranoside, 3-(hexyloxy)-2-hydroxypropyl-beta-D-galactopyranoside, 3-(heptyloxy)-2-hydroxypropyl-beta-D-galactopyranoside, 3-(octyloxy)-2-hydroxypropyl-beta-D-galactopyranoside, 3-(nonyloxy)-2-hydroxypropyl-beta-D-galactopyranoside, 3-(decyloxy)-2-hydroxypropyl-beta-D-galactopyranoside, 3-(dodecyloxy)-2-hydroxypropyl-beta-D-galactopyranoside, 3-(tetradecyloxy)-2-hydroxypropyl-beta-D-galactopyranoside, 3-(hexadecyloxy)-2-hydroxypropyl-beta-D-galactopyranoside, 3-(octadecyloxy)-2-hydroxypropyl-beta-D-galactopyranoside, 3-(eicosyloxy)-2-hydroxypropyl-beta-D-galactopyranoside, 3-(docosyloxy)-2-hydroxypropyl-beta-D-galactopyranoside, 3-(tetracosyloxy)-2-hydroxypropyl-beta-D-galactopyranoside, 3-(hexenyloxy)-2-hydroxypropyl-beta-D-galactopyranoside, 3-(decenyloxy)-2-hydroxypropyl-beta-D-galactopyranoside, 3-(dodecenyloxy)-2-hydroxypropyl-beta-D-galactopyranoside, 3-(tetradecenyloxy)-2-hydroxypropyl-beta-D-galactopyranoside, 3-(hexadecenyloxy)-2-hydroxypropyl-beta-D-galactopyranoside, 3-(octadecenyloxy)-2-hydroxypropyl-beta-D-galactopyranoside, 3-(docosenyloxy)-2-hydroxypropyl-beta-D-galactopyranoside, 3-(tetracosenyloxy)-2-hydroxypropyl-beta-D-galactopyranoside, 3-(3-oxa-tridecyloxy)-2-hydroxypropyl-beta-D-galactopyranoside, 3-(fluorododecyloxy)-2-hydroxypropyl-beta-D-galactopyranoside, 3-(butyloxy)-2-hydroxypropyl-beta-D-glucopyranoside, 3-(octyloxy)-2-hydroxypropyl-beta-D-mannopyranoside, 3-(tetradecyloxy)-2-hydroxypropyl-beta-D-lactoside, 3-(octadecyloxy)-2-hydroxypropyl-beta-D-maltoside, 3-(octyloxy)-2-hydroxypropyl-beta-D-galactotrioside, and 3-(dodecyloxy)-2-hydroxypropyl-beta-D-cellotrioside.

Saccharide Polyethyleneoxide Combination Surfactants:

Non-limiting examples of surfactants in this category include: PEG-20 sorbitan cocoate, PEG-40 sorbitan diisostearate, PEG-2 sorbitan isostearate, PEG-5 sorbitan isostearate, PEG-20 sorbitan isostearate, PEG-40 sorbitan lanolate, PEG-75 sorbitan lanolate, PEG-10 sorbitan laurate, PEG-40 sorbitan laurate, PEG-44 sorbitan laurate, PEG-75 sorbitan laurate, PEG-80 sorbitan laurate, PEG-3 sorbitan oleate, PEG-6 sorbitan oleate, PEG-80 sorbitan palmitate, PEG-40 sorbitan perisostearate, PEG-40 sorbitan peroleate, PEG-3 sorbitan stearate, PEG-6 sorbitan stearate, PEG-40 sorbitan stearate, PEG-60 sorbitan stearate, PEG-20 sorbitan tetraoleate, PEG-30 sorbitan tetraoleate, PEG-40 sorbitan tetraoleate, PEG-60 sorbitan tetraoleate, PEG-60 sorbitan tetrastearate, PEG-20 sorbitan triisostearate, PEG-160 sorbitan triisostearate, PEG-18 sorbitan trioleate, Sorbeth-40 hexaoleate (previously PEG-40 sorbitol hexaoleate), Sorbeth-50 hexaoleate (previously PEG-50 sorbitol hexaoleate), Sorbeth-30 tetraoleate laurate (previously PEG-30 sorbitol tetraoleate laurate), and Sorbeth-60 tetrastearate (previously PEG-60 sorbitol tetrastearate).

Saccharide Ester Surfactants:

Sugar functional groups, after condensation with a fatty acid, form saccharide esters. All sugars are assumed to be linked through an ester bond formed from a condensation reaction with a carboxylic acid of a hydrolyzed maleic acid or free fatty acid and an alcohol group of the sugar. There are multiple chemical methods to form sugar fatty acid esters. Esterification can also occur enzymatically, most typically with a range of Lipase. Non-limiting examples of saccharide ester surfactants include: Sorbitan monolaurate, mannitan oleate, glucose pentaacetate, maltitol laurate, raffinose isostearate, raffinose myristate, raffinose oleate, sucrose acetate isobutyrate, sucrose acetate/stearate, sucrose benzoate, sucrose cocoate, sucrose dilaurate, sucrose dipalmitate, sucrose distearate, sucrose hexaerucate, sucrose hexaoleate/hexapalmitate/hexastearate, sucrose hexapalmitate, sucrose laurate, sucrose myristate, sucrose octaacetate, sucrose oleate, sucrose palmitate, sucrose palmitate/stearate or sucrose stearate-palmitate ester, sucrose pentaerucate, sucrose pentahydroxystearate, sucrose polybehenate, sucrose polycottonseedate, sucrose polylaurate, sucrose polylinoleate, sucrose polyoleate, sucrose polysoyate, sucrose polystearate, sucrose stearate, sucrose tetrahydroxystearate, sucrose tetraisostearate, sucrose tetrastearate triacetate, sucrose tribehenate, sucrose trilaurate, sucrose tristearate, trehalose isostearate, sorbitan monolaurate, mannitan oleate, erythitrol laurate, erithitrol myristate, sucrose monolaurate, maltose monolaurate, lactose monolaurate; sucrose monodecanoate, maltose monodecanoate, lactose monodecanoate; and sucrose monooctanoate, maltose monooctanoate, lactose monooctanoate, monostearoyl xyloglucan, and fructose laurate.

Sulfonation of Sugar Based Surfactants:

Sulfonated sugar esters generally give better solubility than sugar esters alone, allowing for increased solubility of long alkyl chain surfactants (stearate).

Amide Sugar Based Surfactants:

This category of surfactants may be characterized by an amide linking the hydrophilic sugar head groups to a lipophilic tail.

Amino Alcohol Surfactants:

This class of surfactant is general of the formula: R—C(=O)—NH—X—OH, where R is generally, a $C_8$ to $C_{40}$ alkyl, and X can be a $C_1$ to $C_{10}$ alkyl chain. In some embodiments, R may be a $C_4$ to $C_{20}$ alkyl, $C_5$ to $C_{18}$ alkyl, $C_6$ to $C_{17}$ alkyl, $C_7$ to $C_{16}$ alkyl, or a $C_8$ to $C_{15}$ alkyl. A non-limiting example of a surfactant: cocamide monoethanolamine, wherein R is a $C_{11}$ alkyl.

Amino Acid Based Surfactants:

Non-limiting examples of this class of surfactants includes: Lauroyl Glutamic Acid, Sodium cocoyl Glycinate, -N-dodecanoylaminomalonic acid, and N-dodecanoylaspartic acid.

Polyol Surfactants:

A molecule with more than two hydroxyl group is a polyol. They are relatively easy to attach to a fatty acid, or other non-polar group comprising a carboxylic acid group by condensation of the carboxylic acid and alcohol into a fatty acid ester. Non-limiting examples of polar polyol groups that may be attached to a desired non-polar group include: Polyglycerol, and pentaerythritol. A non-limiting example of a polyol surfactant is polylgyceryl laurate.

Zwitterionic Polar Groups:

Non-limiting examples of zwitterionic polar groups includes: glycinate, betaine, sultaines (sometimes referred to as sulfobetaines), hydroxysultaine, ethanolamide, ammonioalkyl sulfates (general formula: $R—N^+(CH_2)_2XSO_4^-$. X is an alkyl chain can be between 1 to 6 carbons, most typically 3 carbons), and phospocholines. Non-limiting examples of surfactants in this category include: lysophospholipids, foscholines, cocoamidylpropyl betaine, coco-hydroxysultaine, cocamidopropyl hydroxysultaine, capryl sultaine cetyl/lauryl/myristyl hydroxysultaine, coco-sultaine, erucamidopropyl hydroxysultaine, lauramidopropyl hydroxysultaine, lauryl hydroxysultaine, lauryl sultaine myristamidopropyl hydroxysultaine, myristyl sultaine, oleamidopropyl hydroxysultaine, and tallowamidopropyl hydroxysultaine, and lysophospholipid c.

Surfactants suitable for use in the present invention have an aggregate diameter. As used herein the term "aggregate diameter" refers to the size of an aggregate of the surfactant in aqueous conditions as measured by dynamic light scattering. An "average aggregate diameter" refers to the average of the size of a plurality surfactant aggregates in an aqueous environment as measured by dynamic light scattering. The term "average aggregate diameter" may be used interchangeably herein with the term "aggregate diameter". Examples, without limitation, of how to measure an average aggregate diameter are provided in the Examples section herein.

Surfactant association with non-water moieties is often used to stabilize contaminants in an aqueous solution. Modifying the head and tail regions of a surfactant can substantially alter the morphology of a surfactant aggregate formation, a hydrophobic lipid balance of the molecule, and consequentially the surfactant aggregate's ability to bind and stabilize various contaminants in a solution. For example, modifying the length of the alkyl chain of a surfactant may modify the hydrophobic lipid balance of the surfactant molecule, which may have an effect on aggregate shape, ability to solubilize oil in water, and/or surfactant aggregation number. Surfactants may also be used to increase flotation efficiency of contaminants by increasing their association with microbubbles. However, often, when using surfactants aggregates alone, surfactant aggregate remains in the water after treatment, making the produced water chemically incompatible with many industrial processes, particularly those which may require high surface tension in the water.

As used herein, the term "polymer" refers to a relatively high molecular weight substance which is at least partially soluble in an aqueous environment. Polymers are composed by linking together small molecules, called monomeric units, in sufficient number such that the addition or removal of one or several units does not substantially change the properties of the polymer. A monomeric unit refers to the group of atoms, derived from a monomer, comprising the unit that is repeated in the polymer. (Milton Orchin, et al. in Vocabulary of Organic Chemistry p. 518 (John Wiley & Sons, 1980)). The monomeric units may be linked in a regular repeating or irregular repeating manner.

In some embodiments, the polymer in a nanonet composition may be comprised of two different monomeric units. In some embodiments, the polymer in a nanonet composition may be comprised of three different monomeric units. In some embodiments, the polymer in a nanonet composition may be comprised of a plurality of different monomeric units. In some embodiments, the polymer in a nanonet composition may be comprised of linear chains or of branched chains. In some embodiments, some monomeric units may be relatively more hydrophilic whereas other monomeric units may be relatively more hydrophobic.

In some embodiments, the different monomeric units comprising the polymer are regularly alternating, for example, --A-B-A-B--. In some embodiments, the different monomeric units comprising the polymer may substantially alternate in a different pattern, for example, --A-A-B-A-A-B--. This type of alternation can be thought of as a block. In some embodiments, a larger number of monomeric units comprising the polymer may repeat in a larger sequence before alternating to repetition of another monomeric unit in the polymer. The larger the number of the same repeating monomeric unit the larger the block in a polymer. In some embodiments of a polymer comprising a nanonet composition, a block comprises two monomeric units of a first type, and one monomeric unit of a second type. In other embodiments, a block may comprise two monomeric units of a first type, a monomeric unit of a second type, and a monomeric unit of third type.

In some embodiments, the polymer comprising the nanonet composition has at least one hydrophilic monomeric unit and at least one hydrophobic monomeric unit. The polymer in a nanonet composition may be made from styrene-maleic acid copolymer. The polymer in a nanonet composition may be hydrolyzed styrene-maleic anhydride copolymer. In some embodiments, the polymer may be hydrolyzed di-isobutylene-maleic anhydride copolymer (DIB-co-maleic anhydride). As with SMA, DIB-co-maleic anhydride is not soluble in aqueous solution, but becomes soluble when at least a portion of the maleic anhydride monomeric unit are hydrolyzed to the di-carboxylic acid form. What follows holds for each of SMA and DIB-co-maleic anhydride, and a resulting water-soluble di-carboxylic acid containing form therefrom. It is to be appreciated herein that SMA is often used herein as an abbreviation for styrene-malic acid copolymers and DIBMA is used as an abbreviation for di-isobutylene-maleic anhydride copolymers and that such abbreviations are context specific and theses two abbreviations may refer to both the hydrolyzed and non-hydrolyzed forms of these copolymers and a person of skill in the art will be readily able to identify whether or not the copolymer is in a hydrolyzed form or not. The use of the abbreviates hSMA and hDIBMA always refer to the hydrolyzed form of these copolymers.

SMA is generally insoluble in aqueous solutions. To increase the solubility of SMA, the polymer may be heated in a basic pH solution leading to at least some portion of the maleic anhydride units in the polymer becoming hydrolyzed, thereby forming hSMA. This means that some portion of the repeating maleic anhydride units in hSMA are chemically converted to adjacent CH groups each bearing a pendant carboxylic acid group. Chemically, this dicarboxylic acid repeating unit in hSMA may be expressed as follows: —CH(COOH)—CH(COOH)—, or a salt form thereof wherein one or both of the adjacent carboxylic acid units may be in the protonated acid form, or a salt thereof. In some embodiments, the adjacent carboxylic acid units may be in a salt form with a single divalent or multi-valent cation. For example, divalent and multi-valent cations such as, but not limited to, ammonia ions, calcium ions, magnesium ions, or ferrous or ferric iron ions.

In some embodiments of a nanonet composition, the percentage of hydrolysis of SMA to hSMA (or DIB-co-maleic anhydride to hDIBMA) is an amount effective to substantially solubilize the polymer in aqueous solution under conditions for nanonet formation. In some embodiments, substantially all of the maleic acid units are hydrolyzed to create dicarboxylic acid repeating units in the polymer chain. In some embodiments, not all of the maleic acid units are hydrolyzed.

In some embodiments, at least one hydrophilic monomeric unit is maleic anhydride hydrolyzed to maleic acid or a salt thereof and having the general chemical formula [—CH(COR$^6$)CH(COR$^7$)—]. In some embodiments, a sufficient number of maleic acid monomeric units (by hydrolysis of some maleic anhydride monomeric units) are present for the polymer to dissolve in aqueous solution in a concentration sufficient to form a nanonet composition (see FIG. 14). When all maleic anhydride monomeric units in the polymer are fully hydrolyzed (for example polymer 2000), $R^6$ and $R^7$=OH (carboxylic acid functional group).

In some embodiments, some of the maleic anhydride monomeric units in the polymer may be modified thereby changing any one or more of $R^6$, $R^7$ or both. For example, any one or more of $R^6$, $R^7$, or both may be $OR^1$, $OR^2$, $NHR^1$, $NHR^2$, $NR^1_2$, $NR^2_2$, and $SR^1$. This modification may be accomplished by any one or more substitution, displacement, or condensation reactions known to those skilled in the art, including but not limited to those set out in the Examples section.

$R^6$, $R^7$ or both, $R^1$, $R^2$ or both, may be a pendant group functionalizing the maleic acid monomeric unit in a polymer comprising a nanonet composition. For example, any of the R groups of this paragraph may be any one or more of hydrogen, $C_1$-$C_{40}$, straight or branched chain, saturated, mono-unsaturated or poly-unsaturated, aliphatic cyclic, or aromatic cyclic, polycyclic, a sugar, pyridine, pyrimidine, purine, cyclodextrin, indole, isoindole, glycosides and piperazine. In some embodiments, the aromatic cyclic is alkylated.

In some embodiments the polymer has hydrophobic monomeric units comprising a polymer that include an unsaturated carbon chain having between one and ten additional carbon atoms. For example, styrene, p-methyl styrene, chlorostyrene, 2-chlorostyrene, 4-chlorostyrene, fluorostyrene, bromostyrene, propylene, isobutylene, isoprene, and mixtures thereof.

In other embodiments, the hydrophobic monomeric unit, may be a straight or branched chain, saturated, mono-unsaturated or poly-unsaturated, aliphatic cyclic, polycyclic, aromatic cyclic having at least one aromatic ring. In some embodiments, the aromatic cyclic is alkylated. Generally, the hydrophobic monomeric unit has as few as 3 and as many as 10 carbon atoms.

Polymers suitable for use in the present invention have an average particle diameter. As used herein "particle diameter" refers to the size of a polymer in aqueous conditions as measured by dynamic light scattering. "Theoretical polymer diameter" refers to the theoretical minimum diameter of a compact polymer sphere which may be calculated as described below. An "average particle diameter" refers to the average of the size of a plurality polymers in an aqueous environment as measured by dynamic light scattering. The term "average particle diameter" may be used interchangeably herein with the term "particle diameter". Examples, without limitation, of how to measure an average particle diameter are provided in the Examples section herein.

Polymers may be long polymers or short polymers. As used herein the term "long polymer" refers to a polymer with a molecular weight above 40,000 g/mol, and/or a contour length above 100 nm. As used herein the term "short polymer" refers to a polymer that with a molecular weight below 40,000 Da, and/or a contour length below 100 nm.

In some embodiments, functional groups on polymers suitable for use in nanonets interact with di-valent and tri-valent cations, such as maleic acid. Addition of di-valent and tri-valent cationic metals neutralizes a negative charge of carboxylate group present on the maleic acid, thereby precipitating the polymer. Corresponding association between the maleic acid functionalized block co-polymer with a surfactant aggregate renders the surfactant aggregate sensitive to the cations. Thus, addition of a nanonet into solutions containing high concentrations of di-valent and tri-valent cations will precipitate the entire complex of nanonet and cations. In some instances, suitably high concentrations of monovalent cations may also precipitate the entire complex of nanonets and associated cations. This resulting precipitate is hydrophobic in nature and binds non-water moieties, such as hydrocarbons. As time passes the precipitates begin to flocculate, thereby increasing in size and becoming more amenable to removal from solution by physical means such as settling or floatation. If surfactant and polymer are added sequentially into solutions containing large concentrations of a polymer specific precipitant, the non-water moiety binding and flocculation effect of the surfactant is lost because the polymer immediately precipitates as individual particles, and the surfactant component remains free to dissociate in solution. In cases where a precipitant which acts on the surfactant is present in solution, sequential addition of polymer and detergent will result in separate polymer and surfactant precipitates and the flocculating effect is lost.

Illustrative embodiments of this invention provide a nanonet comprising:
  a) a surfactant aggregate having an average aggregate diameter; and
  b) a polymer having an average particle diameter which average particle diameter is the same or smaller than the average aggregate diameter. The resulting nanonet often has a diameter larger than the average particle diameter.

Other illustrative embodiments of this invention provide a nanonet comprising:
  a) a surfactant aggregate having an average aggregate diameter; and
  b) a polymer having an average particle diameter which average particle diameter is the same or smaller than the average aggregate diameter. The resulting nanonet often has a diameter larger than the average particle diameter. Specifically excluded from these embodiments are nanonets in which both:

1) the surfactant is selected from the group consisting of: Triton X-100™, Triton X-305™, N-dodecyl-beta-D-maltoside (DDM), sodium oleate, sodium cholate, sodium deoxycholate (DOC), beta-octyl glucoside (Beta-OG), and lauryl dimethylamine n-oxide (LDAO); and 2) the polymer is selected from the group consisting of: SMA-2000™, SMA-2021™, and Di-isobutylene-co-maleic acid (DIBMA).

For clarity, embodiments in which the surfactant is selected from Triton X-100™, Triton X-305™, DDM, sodium oleate, sodium cholate, DOC, Beta-OG, and LDAO are included in the present invention provided that the polymer is not exclusively and only one of SMA-2000™, SMA-2021™ or DIBMA. Similarly, embodiments in which the polymer is selected from the group consisting of: SMA-2000™, SMA-2021™ and DIBMA are also included in the present invention provided that the surfactant is not exclusively and only one of Triton X-100™, Triton X-305™, DDM, sodium oleate, sodium cholate, DOC, Beta-OG, or LDAO.

In some other embodiments still, the surfactant is not a phospholipid. In some other embodiments still, the surfactant is not a lipid.

By selecting for a ratio of surfactant average aggregate diameter to polymer average particle diameter in the range of 1:1, nanonet formation can be predicted to occur. Often it is preferable to select a ratio of surfactant average aggregate diameter to polymer average particle diameter in the range of 1:<1. Often it is preferable to select a ratio of surfactant average aggregate diameter to polymer average particle diameter in the range of 1:<1, where <1 is close to 1, but still less than 1. This allows for design of nanonets with varying surfactants and varying polymers that are stable and likely to contain a high number of surfactant molecules. By increasing the capture of surfactant molecules into nanonets, physical parameters that may be important for downstream application of the particles may also be selected for.

When selecting materials for preparation of a nanonet, a surfactant aggregate preferably has an average aggregate diameter larger than an average particle diameter of a polymer. This limits the choice of suitable surfactants that may be incorporated into a nanonet for a given size of polymer; the shorter the polymer, the more varieties of nanonets that may be formed. However, with increasing polymer length, nanonets, comprising a surfactant having an average aggregate diameter size that is larger or the same size when compared to the average particle diameter of the polymer may lead to smaller, more stable nanonets that may display enhanced flocculation efficiency and/or flotation characteristics. Therefore, selecting for longer polymers and selecting suitable surfactants based on the ratio of average aggregate diameter to average particle diameter of the selected polymer provides for stable nanonet formation with advantageous properties.

Figure 1A:
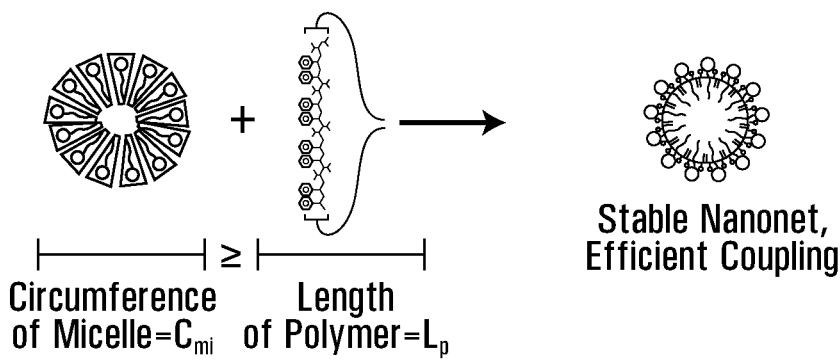
FIG. 1: Structure function relationship between polymer length and surfactant aggregate diameter in nanonet formation. A) Nanonet formation when polymer length and surfactant aggregate size are well matched. B) Nanonet formation does not occur when surfactant aggregate diameter is less than compact polymer particle diameter. C) Nanonet formation when a large surfactant aggregate diameter is broken down into multiple, smaller nanonets. D) Nanonet formation when a large surfactant aggregate is stabilized by multiple polymers, leading to an overall increase in particle size.

In preferred formation conditions, a polymer, when in a compact polymer particle, has an average particle diameter slightly smaller than the size of the surfactant's average aggregate diameter. In aqueous conditions and using a slight excess of polymer, the surfactant and polymer will self-assemble into a nanonets, leading to an increase in precipitated matter in solution (FIG. 1A). An example of this relationship as shown in the Examples below, where SMA-2000™ (4 nm in diameter, 14 nm in length) and Triton X-100 ™ (5.3 nm in diameter, 16.6 nm in circumference) form a nanonet (5.1 nm in diameter, 16 nm in circumference) at a 1:1 wt/wt ratio.

Figure 1B:
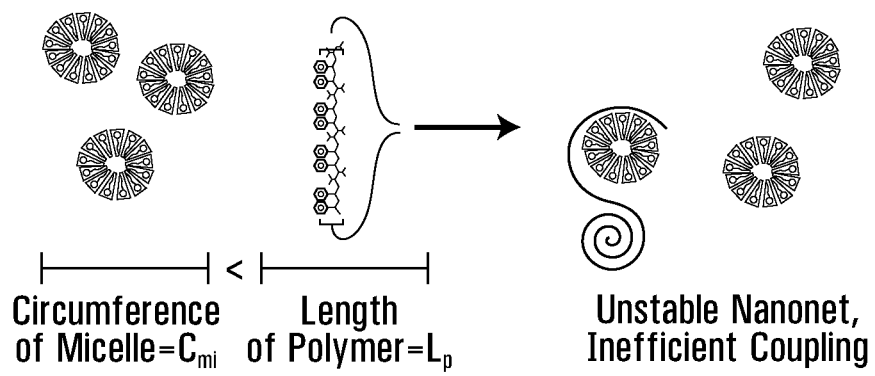
Figure 1C:
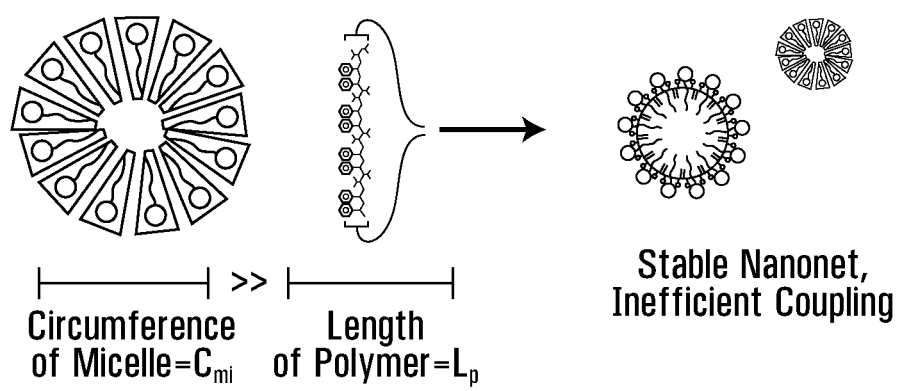
Figure 1D:
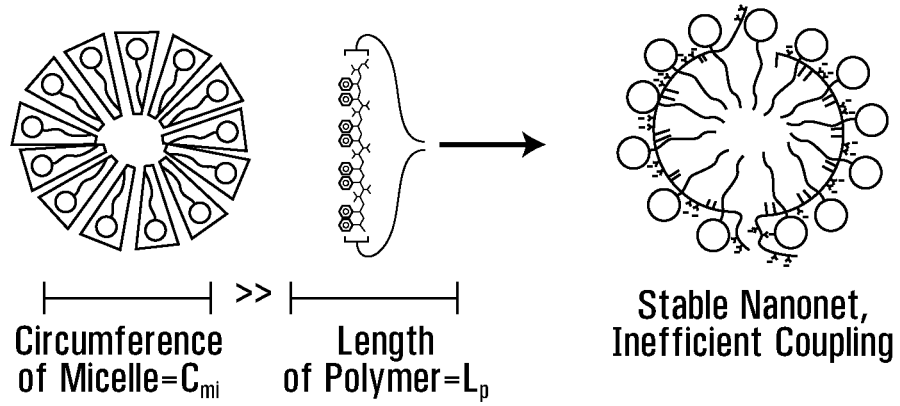

A surfactant aggregate may be too large to be encompassed by a single polymer chain. This may lead to splitting of the original surfactant aggregate into smaller nanonets (FIG. 1C), similar to the solubilization action of SMA in lipid bilayers (Dörr, J. M., Koorengevel, M. C., Schafer, M., Prokofyev, A. V., Scheidelaar, S., van der Cruijsen, E. A. w., Dafforn, T. R., Baldus, M., Killian. J. A. Detergent-free isolation of KcsA in nanodiscs. *PNAS*. December 2014, 111 (52) 18607-18612). This partitioning of surfactant between polymers is exemplified in the Examples below with PGL1, which was solubilized into 25 nm particles in both SMA-2000 ™ and SMA-725 ™ (Table 4). However, multiple polymers may also associate around a large surfactant aggregate, which in some cases may lead to an increase in size of the nanonet when compared to the surfactant average aggregate diameter (FIG. 1D).

Figure 2A:
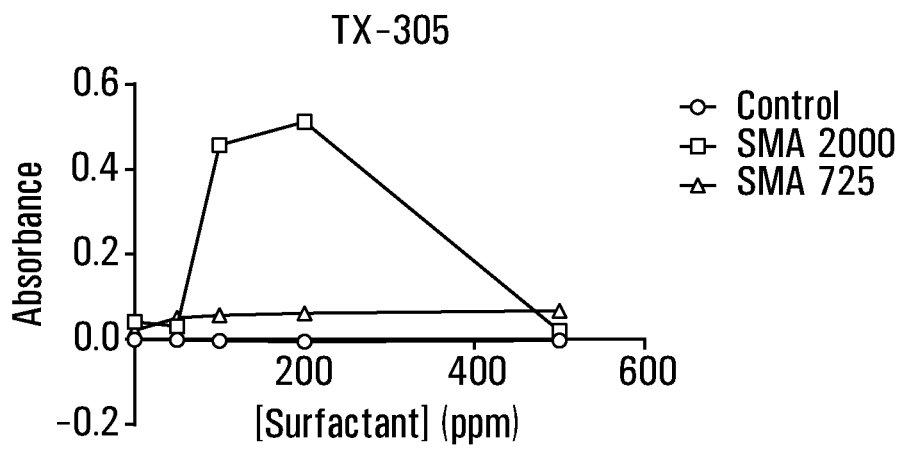
FIG. 2: Co-precipitation of complexed polymer and surfactant due to addition of acid. A) Absorbance of acid precipitated nanonets formed from varying ratios of Triton X-305 ™ surfactant. Absorbance was measured at 540 nm as a proxy for floc scattered light. Nanonets were formed with long chain polymer (SMA-725™, triangles), short chain polymer (SMA-2000™, squares), and compared to a surfactant only control (control, circles). B) As in A, with Triton X-100 ™ as surfactant. C) As in A, with Triton X-45 ™ as surfactant.
Figure 2B:
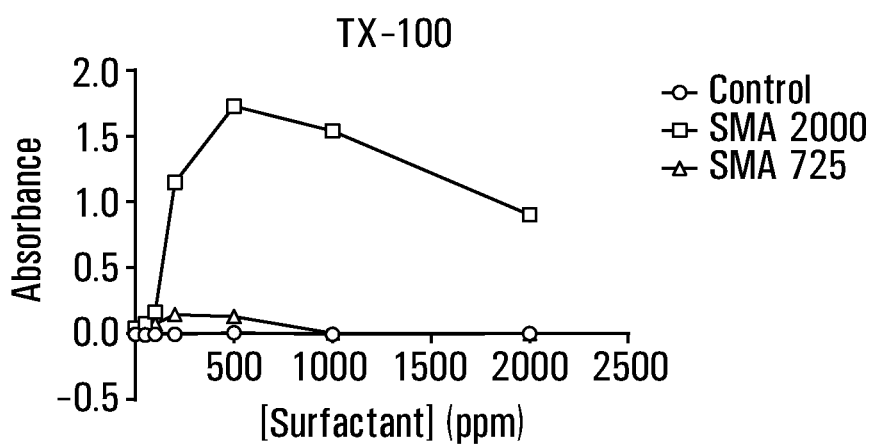

A surfactant aggregate may also be too small for a given length of polymer (FIGS. 2A and 2B, triangles). However, whereas a large surfactant aggregate may form a nanonet with a smaller polymer, a surfactant aggregate that is too small will remain separate and not form a nanonet with a larger polymer. For example, as set out in the Examples below, Triton X-100 ™ and Triton X-305 ™ aggregates are both too small to efficiently form nanonets with the large SMA-725™ polymer, but are able to form nanonets with the smaller SMA-2000 ™ polymer. This may be because of the free-energy landscape which governs amphipathic molecule association. Surfactant aggregates may form due to balancing the entropic cost of a multimolecular assembly with the free energy conserved by shielding of hydrophobic alkyl chains from aqueous solution. This shielding of the hydrophobic groups from water also occurs in SMA polymers, which will form compact particle structures in buffered aqueous solutions. A compact polymer particle represents the smallest diameter conformation that a polymer can adopt. In the case of a small surfactant aggregate and a large polymer, an increase in size of both the surfactant and the polymer caused by their association would therefore be entropically unfavourable and not occur in the absence of another factor (FIG. 1B). Possible factors may be enthalpic contributions such as hydrogen bonding, salt bridging, or electrostatic interactions between the surfactant and polymer.

In some embodiments, it is possible to determine nanonet assembly using the following formula:

Volume of backbone, non-hydrogen atom (C,O,S,N) $\approx 20$ Å$^3$

Volume of aromatic ring=84 Å$^3$

Diameter of surfactant aggregate $(D_{aggregate})=2\times((n\times V_{sur})/\pi/4\times3)^{1/3}$, where V is the calculated volume of a surfactant monomer, and n is the number of surfactant molecules in the surfactant aggregate.

Diameter of a compact polymer micelle $(D_{polymer})=2\times((n_{block}\times V_{block})/\pi/4\times3)^{1/3}$, where V is the calculated volume of the polymer block, and n is the number of blocks in a single polymer chain.

Calculation of SMA-2000 ™ compact polymer diameter:
$Mw_{block}=324$ g/mol; (2 styrene, 1 maleic acid), $Mw_{SMA2000}\approx7500$ g/mol
$n_{block}=Mw_{polymer}/Mw_{block}\approx23$;
$V_{block}=2$ aromatic rings, 8 carbon atoms, 4 oxygen atoms=408 Å$^3$;
$V_{polymer}=n_{block}*V_{block}=23\times408$ Å$^3$=9,384 Å$^3$;
$D_{polymer}=2\times((n_{block}\times V_{block})/\pi/4\times3)^{1/3}=2\times((9,9,384$ Å$^3)/7/4\times3)^{1/3}=26$ Å=2.6 nm Calculation of SMA-2021™ compact polymer diameter: $Mw_{block}$=324 g/mol; (2 styrene, 1 maleic acid,), $Mw_{SMA2021}$≈22,000 g/mol
$n_{block}$=$Mw_{polymer}$/$Mw_{block}$≈68
$V_{block}$=2 aromatic rings, 8 carbon atoms, 4 oxygen atoms=408 Å$^3$;
$V_{polymer}$=$n_{block}$*$V_{block}$=68×408 Å$^3$=27,744 Å$^3$;
$D_{polymer}$=2×(($n_{block}$×$V_{block}$)/π/4×3)$^{1/3}$=2×((27,744 Å$^3$)/π/4×3)$^{1/3}$=37 Å=3.7 nm Calculation of SMA-725 ™ compact polymer diameter: $Mw_{block}$=428 g/mol; (3 styrene, 1 maleic acid), $Mw_{SMA725}$≈130,000 g/mol
$n_{block}$=$Mw_{SMA725}$/$Mw_{block}$≈308
$V_{block}$=3 aromatic rings, 10 carbon atoms, 4 oxygen atoms=532 Å$^3$;
$V_{polymer}$=$n_{block}$*$V_{block}$=308×532 Å$^3$=163,856 Å$^3$;
$D_{polymer}$=2×(($n_{block}$×$V_{block}$)/π/4×3)$^{1/3}$=2×((163,856 Å$^3$)/π/4×3)$^{1/3}$=68 Å 6.8 nm Calculation of SMA-3000 ™ compact polymer diameter: $Mw_{block}$=428 g/mol; (3 styrene, 1 maleic acid), $Mw_{SMA3000}$≈9,000 g/mol $n_{block}$=$Mw_{SMA3000}$/$Mw_{block}$≈21
$V_{block}$=3 aromatic rings, 10 carbon atoms, 4 oxygen atoms=532 Å$^3$;
$V_{polymer}$=$n_{block}$*$V_{block}$=21×532 Å$^3$=11,172 Å$^3$;
$D_{polymer}$=2×(($n_{block}$×$V_{block}$)/π/4×3)$^{1/3}$=2×((11,172 Å$^3$)/π/4×3)$^{1/3}$=28 Å=2.8 nm Calculation of SMA-IBE compact polymer diameter: $Mw_{block}$=220.2 g/mol; (1 styrene, 1 maleic acid), $Mv_{SMA-IBE}$ 65,000 g/mol
$n_{block}$=$Mv_{polymer}$/$Mw_{block}$≈295
$V_{block}$=1 aromatic ring, 6 carbon atoms, 4 oxygen atoms=284 Å$^3$;
$V_{polymer}$=$n_{block}$*$V_{block}$=295×284 Å$^3$=83,780 Å$^3$;
$D_{polymer}$=2×(($n_{block}$×$V_{block}$)/π/4×3)$^{1/3}$=((83,780 Å$^3$)/π/4×3)$^{1/3}$=54 Å=5.4 nm Calculation of SMA-Cumene terminated compact polymer diameter: $Mw_{block}$=428 g/mol; (3 styrene, 1 maleic acid), $Mw_{cumene}$=152 g/mol $Mw_{SMA-Cumene}$ 1500 g/mol
$n_{block}$=$Mw_{SMA-Cumene}$−$Mw_{Cumene}$/$Mw_{block}$≈3.1
$V_{block}$=3 aromatic rings, 10 carbon atoms, 4 oxygen atoms=532 Å$^3$;
$V_{polymer}$=$n_{block}$*$V_{block}$+$V_{Cumene}$=(3.1×532)+144 Å$^3$=1,819 Å$^3$;
$D_{polymer}$=2×(($n_{block}$×$V_{block}$)/π/4×3)$^{1/3}$=2×((1,819 Å$^3$)/π/4×3)$^{1/3}$=15 Å=1.5 nm Calculation of DIBMA compact polymer diameter: $Mw_{block}$=226 g/mol; (18 hydrogen atoms, 12 carbon atoms, 4 oxygen atoms), $Mw_{DIBMA}$≈12,000 g/mol
$n_{block}$=$Mw_{DIBMA}$/$Mw_{block}$≈53
$V_{block}$=12 carbon atoms, 4 oxygen atoms=320 Å$^3$;
$V_{polymer}$=$n_{block}$*$V_{block}$=53×320 Å$^3$=16,960 Å$^3$;
$D_{polymer}$=2×(($n_{block}$×$V_{block}$)/π/4×3)$^{1/3}$=2×((16,960 Å$^3$)/π/4×3)$^{1/3}$=32 Å=3.2 nm Calculation of Ethanol derived SMA-2000 ™ compact polymer diameter:
$Mw_{block}$=367 g/mol; (22 carbon atoms, 4 oxygen atoms, 1 nitrogen atom, 25 hydrogen atoms), $Mw_{Ethanol\ derived\ SMA2000}$≈8495 g/mol
$n_{block}$=$Mw_{polymer}$/$Mw_{block}$≈23;
$V_{block}$=2 aromatic rings, 10 carbon atoms, 4 oxygen atoms, 1 nitrogen atom=468 Å$^3$;
$V_{polymer}$=$n_{block}$*$V_{block}$=23×468 Å$^3$=10,764 Å$^3$;
$D_{polymer}$=2×(($n_{block}$×$V_{block}$)/π/4×3)$^{1/3}$=2×((10,764 Å$^3$)/π/4×3)$^{1/3}$=27 Å=2.7 nm Calculation of Triton x-100™ surfactant aggregate diameter:
$(D_{aggregate})$=2×((n×$V_{sur}$))/π/4×3)$^{1/3}$
$N_{surfactant}$=100-155, $V_{surfactant}$=10 oxygen atoms, 29 carbon atoms, 1 aromatic ring=864 Å$^3$
$(D_{aggregate})$=2×((100×864 Å$^3$))/π/4×3)$^{1/3}$=21 Å$^3$=52 Å=5.2 nm.

For Tx-100, $D_{aggregate}$>$D_{SMA2000}$, Nanonet formation is predicted. $D_{aggregate}$<$D_{SMA725™}$, Nanonet formation is incompatible with SMA725™. $D_{aggregate}$>$D_{SMA2021}$ Nanonet formation is predicted.

Calculation of Triton x-305™ surfactant aggregate diameter:
$(D_{aggregate})$=2×((n×$V_{sur}$))/π/4×3)$^{1/3}$
$N_{surfactant}$=30, $V_{surfactant}$=30 oxygen atoms, 69 carbon atoms, 1 aromatic ring=3,684 Å$^3$
$(D_{aggregate})$=2×((30×3,684 Å$^3$))/π/4×3)$^{1/3}$=59.5 Å 6 nm.
For Triton x-305™, $D_{aggregate}$>$D_{SMA2000}$; Nanonet formation is predicted with SMA-2000™. $D_{aggregate}$<$D_{SMA725}$; Nanonet formation is incompatible with SMA-725™. $D_{aggregate}$>$D_{SMA2021}$ Nanonet formation is predicted.

TABLE 1

Diameters of Selected Polymers and Surfactants.

| | MW | Estimated Diameter | Measured Diameter |
|---|---|---|---|
| SMA 2000 ™ | 7,500 Da | 2.6 nm* | 4 nm |
| SMA 2021 ™ | 22,000 Da | 3.7 nm* | N/A |
| SMA 725 ™ | 130,000 Da | 6.8 nm* | 10 nm |
| Triton X-100 ™ | 650 Da | 5.4 nm | 5 nm |
| Triton X-305 ™ | 1500 Da | 6 nm | 9 nm |
| Triton X-45 ™ | 400 Da | N/A | 91 nm |

*Assuming fully compacted polymer in generally spherical shape.

In some illustrative embodiments of the present invention, the surfactant is selected from the group consisting of: PGL1, PGL2. PGL3, PGL4, PGL5, Triton X45™, Triton X-100™, Triton X-305™, sodium oleate, potassium oleate, LDAO, polyoxyethylene sorbitan monolaurate, polyoxyethylene sorbitan monooleate, polyoxyethylene sorbitan myristate, polyoxyethylene sorbitan stearate, polyoxyethylene sorbitan palmitate, lauramidopropyl betaine, cocoyl glycinate, glucose laurate monoester, sucrose laurate, sucrose monooleate, sucrose palmitate, glyceryl monolaurate, fructose laurate, potassium oleate, oleic acid, palmitic acid, linoleic acid, and mixtures thereof. In some embodiments, the surfactant is a mixture of PGL5 and sodium oleate. In some embodiments, the surfactant is a mixture of PGL5 and potassium oleate.

In illustrative embodiments of the present invention, the polymer is a block co-polymer. In some embodiments, the polymer has a ratio of hydrophobic:hydrophilic groups of from about 1:1 to about 4:1, from about 1:1 to about 3:1, from about 2:1 to about 3:1, or about 2:1. In some embodiments, the polymer is selected from the group consisting of: SMA-725™, SMA 3000™, SMA-2000™, and SMA-2021™. In some embodiments, the polymer is SMA-725™.

Nanonets according the present invention may be made by mixing, in aqueous environment, a polymer and a surfactant. It is often advantageous to add enough surfactant such that the concentration of surfactant is at the concentrated micelle concentration (CMC). Nanonets may be prepared in a more clear and/or sterile environment and then added to an aqueous solution for treatment later, or may be provided as a separate parts in a kit for mixing later. The parts of the kit may be mixed in a clean and/or sterile environment or they may be mixed in situ for preparation of the nanonets directly in the aqueous solution to be treated.

In illustrative embodiments, there is provided a method of treating produced water using nanonets described herein. An example of such a method is injecting a solution of nanonets into a liquid flow. The manner of injection may be through any method known to a person of skill in the art, and is often through an eductor, such as a Venturi eductor. The nanonet solution may be actively pumped into the eductor, or naturally drawn into the fluid flow by the venturi effect if a suitable pressure drop is present. The nanonet solution may be injected into the fluid flow alone, or concurrently with a gas or other water chemicals. The nanonet solution may also be injected through an injection coil followed by a static mixer. In such a case it may be necessary to first dilute the nanonet solution to facilitate mixing in a pipe.

EXAMPLES

The following examples are illustrative of some of the embodiments of the invention described herein. These examples do not limit the spirit or scope of the invention in any way.

In the following Examples 1-14, the following methods reagents and materials were used.

Reagents and Materials:

Unless otherwise stated, all chemicals were purchased from Sigma-Aldrich™ Canada. Polyglycerol-10-palmitate (PGL5), Polyglycerol-10-oleate (PGL1), Polyglycerol-10-stearate (PGL3), Polyglycerol-10-laurate 1 (PGL2) and 2 (PGL4) were purchased from Shandong Binzhou New Material Technology Co.™, Ltd. Styrene maleic anhydride block co-polymer was purchased from Cray Valley™ (SMA-2000™), or Jiaxing Huawen Chemical Co.™, Ltd (SMA-725™).

Preparation of Concentrated Polymer Stock Solutions of SMA-725™ and SMA-2000™

For preparation of styrene maleic acid co-polymers, SMA-725™ was first ground to a fine powder, while SMA-2000 ™ was purchased in powder form. 5% (wt/vol) of pre-hydrolyzed SMA-725™ and SMA-2000 ™ were subsequently incubated in 500 mM potassium hydroxide at 80° C. with stirring for 5 hours or until the solution had cleared. Solutions were passed through a 10 μm filter to remove non-hydrolyzed particles, then precipitated by dropwise addition of 12M HCl with stirring until pH 2. Precipitated polymer was filtered (10 μm), washed 3× with 100 mL of dilute HCl (50 mM), 3× with 100 mL of ultrapure water, then left to dry at room temperature for 72 hours. The concentrated polymer stock solution was then prepared by resuspending 200 mg of the dry polymer in ultrapure water and adjusting the pH of the suspension to 7 by dropwise addition of sodium hydroxide. The resulting clear polymer solution was then adjusted to a final volume of 10 mL and final concentration of 2% (wt/vol). All polymer stock solutions were prepared according to this procedure and diluted accordingly in distilled water before use.

Polymer stock solutions prepared according to the procedure immediately above were used in the examples set forth in the following sections; even if a polymer is referred to only by its name or trade name.

Preparation of Stock Surfactant Solutions.

Stock Triton X-100™, Triton X-305™, and Triton X-45™ solutions were prepared by mixing 300 mg of surfactant into a final volume of 30 mL of ultrapure water. Stock solutions of PGL1, PGL3, or PGL5, respectively, were prepared by weighing out 1 g, 500 mg, or 330 mg, respectively. The weighed amount of the selected surfactant was resuspended in 10 mL of ultrapure water and mixed with a handheld homogenizer until emulsified to produce each respective PGL surfactant stock solution. For all other surfactant stock solutions, 300 mg of surfactant was dissolved into 30 mL of ultrapure water to form 1% stock solutions.

Nanonet Formation Assays:

Concentrated polymer (stock solution of 0.5% wt/vol) and surfactant (stock solution of 1% wt/vol) were mixed in a microcentrifuge tube. The amount of each stock solution employed, depended upon the desired surfactant to polymer ratio in the examples that follow. The combined concentrated stock solutions in the microcentrifuge tube were then diluted to a final volume of 1 mL in ultrapure water. The tubes were mixed by hand inversion 3 times, left to sit for 5 minutes, and then 1 drop (approximately 10 uL) of 12M hydrochloric acid was introduced to stimulate nanonet precipitation. Tubes were mixed 3 times by inversion, left to sit at room temperature for 5 minutes. To detect the formation of nanonets, the absorbance of the tube contents was measured at 540 nm.

Size Measurement with Dynamic Light Scattering (DLS):

Polymer particle size, surfactant aggregate size, and nanonet size measurements were measured using dynamic light scattering (Zetasizer Nano ZS™). In brief, 0.5% wt/vol solutions of surfactants were prepared in Buffer A (20 mM Tris-HCl {Tris(hydroxymethyl)aminomethane}, pH 7). Surfactants were mixed at a 1:1 ratio (wt/wt) with the indicated polymer and allowed to sit 5 minutes at room temperature. Additionally, polymer only and surfactant only samples, respectively, were mixed with an equivalent volume of Buffer A and incubated for an equivalent time period. After 5 minutes, large aggregates and dust were removed from the solutions by 0.2 μM filter, followed immediately by measuring size by dynamic light scattering (absorbance at 540 nm). During sizing, samples were diluted dropwise in Buffer A to obtain an optimum polydispersity index (<0.5) for measurements. Number values were taken as a measure of the diameter for surfactant aggregate, nanonet and polymer particle diameters.

Flocculation Speed Experiments:

1% sodium oleate nanonets were formed by addition of 1:1 (wt:wt) of the indicated SMA polymer and sodium oleate. Sodium oleate nanonet solutions were then diluted to 0.02% by weight/volume in 1 mL of ultrapure water and allowed to sit for 5 minutes at room temperature (21° C.) in a polystyrene cuvette. Nanonets were subsequently destabilized by acidification (1 drop 12M HCl), and the absorbance measured at 540 nm. Settling of the precipitated sodium oleate nanonet floc was tracked over time. As a control, the settling behavior of acidified sodium oleate aggregates were also tracked over time.

Example 1

Size Characterization of Non-Ionic Surfactant Aggregates

A comparison of nanonet formation with one relatively smaller polymer (SMA-2000™), and one relatively larger polymer (SMA-725™) SMA polymer, using the same surfactant series was undertaken. Each of these polymers are styrene maleic acid block co-polymers. The molecular weight averages for SMA-2000 ™ and SMA-725™ are 6,000 Da and 130,000 Da, respectively.

To examine the relationship between polymer particle size and surfactant aggregate size in nanonet formation, surfactants from each of the Triton™ X series and polyglyceryl-10-alkyl (PG) series of surfactants were tested. First, the surfactant average aggregate diameter was measured by dynamic light scattering (Table 2). For the Triton™ X series of surfactants, the higher the hydrophobic lipid balance (HLB) of the surfactant, the smaller the average aggregate diameter ($D_{TX-45} > D_{TX-305} \approx D_{TX-100}$). This may be due to the increase in the hydrophilic head-group component of the surfactant, which may lead to increased curvature of the surfactant aggregate, and thus a smaller measured diameter of the aggregate. For the PG series of surfactants, the measured aggregate diameters did not fit this trend, possibly due to varying lengths and degrees of saturation in the surfactants' alkyl chains, which may alter monomer packing and possibly aggregate structure.

TABLE 2

Dynamic Light Scattering Characterization of Surfactant Average Aggregates and Activated SMA Polymers.

| Additive Surfactant | Poly Dispersity Index (PDI) | Average Aggregate Diameter (nm) | Hydrophobic Lipid Balance | Alkyl Chain Carbons |
|---|---|---|---|---|
| 0.5% Triton X-305 ™ | 0.162 | 9.913 | 17.3 | 12 |
| 0.5% Triton X-45 ™ | 0.467 | 90.7 | 9.8 | 12 |
| 0.5% Triton X-100 ™ | 0.246 | 5.327 | 13.5 | 12 |
| 0.5% PGL1 | 0.356 | 46.05 | 10.5 | 18 |
| 0.5% PGL 2 | 0.169 | 96.66 | 12 | 12 |
| 0.5% PGL 3 | 0.541 | 304.9 | 11 | 16 |
| 0.5% PGL 4 | 0.109 | 69.98 | 14 | 12 |
| 0.5% PGL 5 | 1 | 557 | 10.5 | 18 |
| 0.5% Sodium Oleate | NA | 392 | 18 | 18 |

| Polymer | PDI | Average Particle Diameter (nm) | Contour Length |
|---|---|---|---|
| 0.5% SMA-2000 ™ | 0.945 | 4.305 | 14 nm |
| 0.5% SMA-725 ™ | 0.418 | 10.73 | 349 nm |

Example 2

Self-Assembly of Nanonets May be Driven by Factors Including Polymer Average Particle Diameter, Surfactant Average Aggregate Diameter, and the Ratio (Wt/Wt) of Polymer to Surfactant in Solution Here, the analysis of nanonet formation began by seeking to determine whether any given combination of surfactant and polymer led to the co-precipitation of surfactant and polymer in a complex upon acidification of the solution (FIG. 2). Each of the PG and Triton™ series of surfactants are generally stable in acidic solution. It is noted, however, that the PG surfactant series can slowly degrade in very acidic conditions. Upon combining solutions of a given SMA polymer and surfactant from the PG or Triton™ series, and even as polymer particles and surfactant aggregates interact, an overall negative charge prevails. That charge can be neutralized by protonation (via addition of a proton source, e.g. acid). Upon such neutralization, a voluminous precipitate immediately forms and begins to flocculate and settle out of solution. The formation of this precipitate can be measured by changes in the absorbance of the solution at 540 nm, a measure of solution turbidity. The rate and amount of formation of turbidity in any given solution is taken as a measurement of nanonet formation.

Figure 2C:
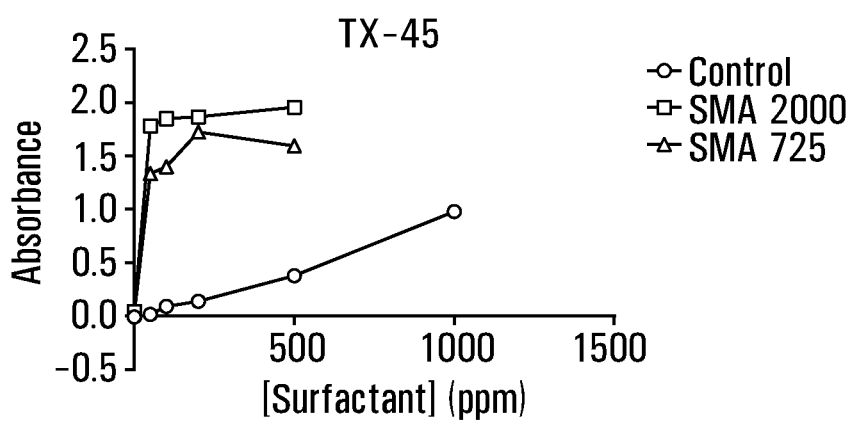

Triton X-100™, Triton X-305™, and Triton X-45 ™ showed co-precipitation of surfactant and polymer upon addition of surfactant (FIGS. 2A, 2B, and 2C, squares). Once above the 1:1 ratio (wt/wt) of surfactant to polymer, addition of excess surfactant did not significantly increase precipitation. This suggested that once the polymer is saturated, addition of excess surfactant is not incorporated into the nanonet composition.

In the case of Triton X-305™, excess surfactant (500 ppm) led to re-solubilization of the nanonet precipitate (FIG. 2A, squares). A similar trend was observed with Triton X-100™, but much higher concentrations (>500 ppm) were necessary to cause solubilization of the nanonet precipitate (FIG. 2B, squares). In the case of Triton X-45™, the surfactant at high concentrations is turbid, preventing differentiation between nanonet precipitation and basal surfactant aggregates, thus re-solubilization was not detected.

At the ratio of 1:1 wt:wt, the SMA-2000 ™ polymer was able to form nanonets and co-precipitate with any of the Triton™ series surfactants (FIGS. 2A, 2B, and 2C, squares). To next test the effect of polymer length on nanonet formation, the experiments were repeated with the higher molecular weight polymer SMA-725™. In contrast to SMA-2000™, SMA-725 ™ was only able to form nanonets with the relatively larger surfactant aggregates formed by Triton X-45™ (FIGS. 2A, 2B, and 2C, triangles).

These experiments were repeated using the same two SMA polymers but with the PG series of surfactants. In nearly all cases, the PG series of surfactants were able to co-precipitate with both polymers, indicating the formation of nanonets. These results are consistent with the large aggregate diameters of the PG surfactants recorded by dynamic light scattering (Table 2). The smallest surfactant aggregate diameter recorded was 46 nm for polyglyceryol-10-monoleate (PGL1), nearly 4 times greater than the measured average particle diameter of the polymer only particle formed by SMA-725™ (10.7 nm, Table 2).

Example 3

Relationship of Polymer Average Particle Size to Surfactant Average Aggregate Diameter is a Significant Factor that Drives Nanonet Formation To understand why polymer average particle size may matter for nanonet formation, the average particle diameters of the polymer particles in a buffered solution were measured by dynamic light scattering (Table 2). Although each polymer is an extended chain having a contour length (nm) in basic conditions, the extended chain conformation does not necessarily exist under other solution conditions. For example, in buffered solution at neutral pH, the polymers will often adopt a compact particulate structure having a measurable and calculable average particle diameter.

For example, consider SMA-2000™ in dynamic light scattering measurements. Although SMA-2000 ™ has a contour length of 14 nm, the polymer formed a compact particle having an average particle diameter of (Table 2). For SMA-725 ™ the polymer formed a particle having an average particle diameter of ≈10 nm despite a contour length of nearly 350 nm (Table 2).

Additionally, and also from our dynamic light scattering results, it was observed that both the Triton X-100 ™ and Triton X-305 ™ formed surfactant aggregates having average aggregate diameters below 10 nm (Table 2). By contrast, Triton X-45 ™ formed an aggregate having an average aggregate diameter of 90 nm (Table 2). Despite all three surfactants forming nanonets with SMA-2000™, only Triton X-45 ™ formed a nanonet with SMA-725 ™ (FIG. 2C, triangles).

From these results, if a surfactant has an average aggregate diameter that is larger than the average particle diameter of a polymer, that polymer surfactant combination will form a nanonet. Consequently, as each PG series surfactant formed an aggregate having an average aggregate diameter over at least 40 nm, both SMA-725 ™ and SMA-2000 ™ were able to interact and form nanonets (Table 3).

Example 4

Effect of Polymer Length on Nanonet Size

To measure the size of the nanonets, we utilized dynamic light scattering. Nanonets generally had nanonet diameters smaller than the average aggregate diameter of the surfactant (Table 4). This suggests that the polymer was able to compact or partially dissociate surfactant aggregates. However, in some cases the addition of the polymers resulted in nanonets that had nanonet diameters with no change in size, or even a larger nanonet diameter when compared to the average aggregate diameter of the surfactant aggregate alone, notably in the cases of PGL 2 and Triton X-45 ™ (Table 4). Interestingly, these two polymers often formed different sized nanonets with the same surfactants. Surfactants with small alkyl chains (PGL4 and PGL 2, $N_{CH2}$=12) formed nanonets with SMA-2000 ™ which were 2 to 4-fold smaller than those formed by SMA-725™(Table 4). However, and surprisingly, the longer contour length SMA-725™ polymer generally formed nanonets with smaller nanonet diameters than those formed by SMA-2000 ™ when surfactants with long alkyl chains were employed (Alkyl chain carbons >12) (Table 2). This smaller nanonet size may be due to the decreased free energy requirements of a single long polymer (SMA-725™) stabilizing a surfactant aggregate compared to the higher entropic contributions of multiple smaller polymers (SMA-2000™) stabilizing the same surfactant aggregate.

TABLE 3

Nanonet Formation with PGL Series Surfactant and SMA-725 ™ and SMA-2000 ™

| Surfactant | Ratio Surfactant to Polymer (wt/wt) | Control (Absorbance at 540 nm) | SMA-725 ™ (Absorbance at 540 nm) | SMA-2000 ™ (Absorbance at 540 nm) |
|---|---|---|---|---|
| PGL1 | 0 | 0.001 | 0.107 | 0.162 |
| PGL1 | 0.5 | 0.022 | 0.192 | 0.272 |
| PGL1 | 1 | 0.035 | 0.322 | 0.475 |
| PGL1 | 1.5 | 0.053 | 0.453 | 0.981 |
| PGL1 | 2 | 0.101 | 1.06 | 1.793 |
| PGL1 | 5 | 0.195 | 2.333 | 2.245 |
| PGL2 | 0 | NA | 0.11 | 0.14 |
| PGL2 | 0.5 | NA | 0.124 | 0.272 |
| PGL2 | 1 | NA | 0.141 | 0.22 |
| PGL2 | 1.5 | NA | 0.14 | 0.223 |
| PGL2 | 2 | NA | 0.184 | 0.253 |
| PGL2 | 5 | 0.12 | 0.269 | 0.529 |
| PGL2 | 10 | 0.562 | 2.063 | 2.249 |
| PGL2 | 20 | 0.143 | 1.296 | 2.261 |
| Triton X-305 ™ | 0 | 0 | 0.021 | 0.042 |
| Triton X-305 ™ | 0.5 | −0.001 | 0.051 | 0.031 |
| Triton X-305 ™ | 1 | −0.003 | 0.057 | 0.457 |
| Triton X-305 ™ | 2 | −0.005 | 0.062 | 0.512 |
| Triton X-305 ™ | 5 | −0.002 | 0.068 | 0.02 |
| Triton X-100 ™ | 0 | −0.006 | 0.024 | 0.042 |
| Triton X-100 ™ | 0.5 | −0.009 | 0.047 | 0.075 |
| Triton X-100 ™ | 1 | −0.006 | 0.073 | 0.163 |
| Triton X-100 ™ | 2 | −0.006 | 0.144 | 1.149 |
| Triton X-100 ™ | 5 | 0.008 | 0.131 | 1.728 |
| Triton X-100 ™ | 10 | −0.006 | 0.003 | 1.54 |
| Triton X-100 ™ | 20 | 0 | 0 | 0.903 |
| Triton X-45 ™ | 0 | −0.01 | 0.022 | 0.043 |
| Triton X-45 ™ | 0.5 | 0.017 | 1.333 | 1.781 |
| Triton X-45 ™ | 1 | 0.091 | 1.398 | 1.848 |
| Triton X-45 ™ | 2 | 0.139 | 1.724 | 1.866 |
| Triton X-45 ™ | 5 | 0.378 | 1.594 | NA |
| Triton X-45 ™ | 10 | 0.978 | NA | NA |

TABLE 4

Dynamic Light Scattering Measurements of Various Polymer Surfactant Mixtures

| Polymer | Surfactant | Poly Dispersity Index (PDI) | Nanonet Diameter (nm) | Size Change Relative to Surfactant Aggregate* | Alkyl Chain Carbons |
|---|---|---|---|---|---|
| SMA-2000 ™ | PGL1 | 0.471 | 23.54 | −49% | 18 |
| SMA-725 ™ | PGL 1 | 0.379 | 24.49 | −48% | 18 |
| SMA-2000 ™ | PGL 2 | 0.269 | 95.38 | 1% | 12 |
| SMA-725 ™ | PGL 2 | 0.188 | 178.4 | 85% | 12 |
| SMA-2000 ™ | PGL 3 | 0.339 | 116.2 | −62% | 16 |
| SMA-725 ™ | PGL 3 | 0.511 | 24.32 | −92% | 16 |
| SMA-2000 ™ | PGL 4 | 0.52 | 8.074 | −89% | 12 |
| SMA-725 ™ | PGL 4 | 0.225 | 44.81 | −36% | 12 |
| SMA-2000 ™ | PGL 5 | 0.45 | 544.6 | 1% | 18 |
| SMA-725 ™ | PGL 5 | 0.49 | 366.4 | −35% | 18 |
| SMA-2000 ™ | TX-100 ™ | 0.51 | 5.123 | −4% | 12 |
| SMA-725 ™ | TX-100 ™ | ND | ND | NA | 12 |
| SMA-2000 ™ | TX-305 ™ | 0.392 | 3.543 | −62% | 12 |
| SMA-725 ™ | TX-305 ™ | ND | ND | NA | 12 |
| SMA-2000 ™ | TX-45 ™ | 0.342 | 220.3 | 144% | 12 |
| SMA-725 ™ | TX-45 ™ | 0.357 | 101.5 | 12% | 12 |
| SMA-2000 ™ | Na-Oleate | 0.426 | 53.24 | −75% | 18 |
| SMA-725 ™ | Na-Oleate | 0.445 | 34.43 | −91% | 18 |

Example 5

Figure 3A:
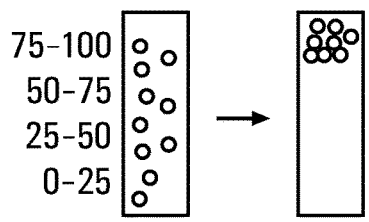
FIG. 3: SMA-725™ enhances flocculation speed of nanonets. A) Distribution assay schematic. Precipitated nanonets flocculate and float with time, the total floc mass consolidates to the indicated volume of the tube (Top, top-middle, bottom-middle, and bottom: 100-75%, 75-50%, 50-25%, and 0-25%, respectively) B) Distribution of precipitated sodium oleate over time. C) Distribution of precipitated sodium oleate/SMA-725™ nanonets over time. D) Distribution of precipitated sodium oleate/SMA-2000™ nanonets over time. E) Solution clearing of precipitated sodium oleate (triangles pointing to the top of the page), sodium oleate and SMA-725™ added sequentially (triangles pointing to the bottom of the page), sodium oleate/SMA-725™ nanonets (circles), and sodium oleate SMA-2000™ nanonets (squares). Solution clearing was measured by absorbance at 540 nm.
Figure 3B:
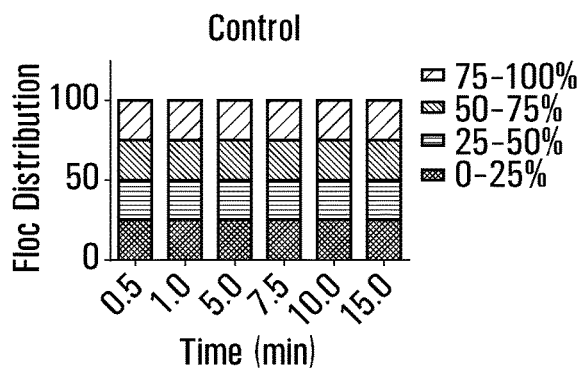
Figure 3C:
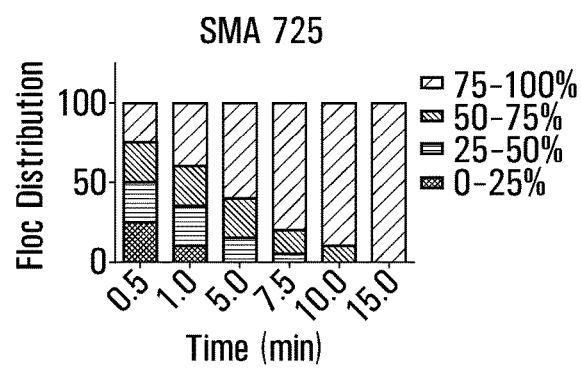
Figure 3D:
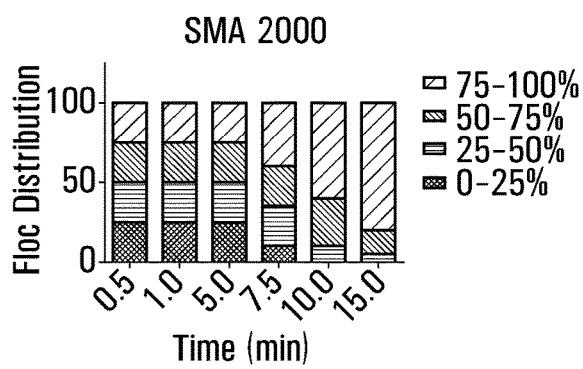
Figure 3E:
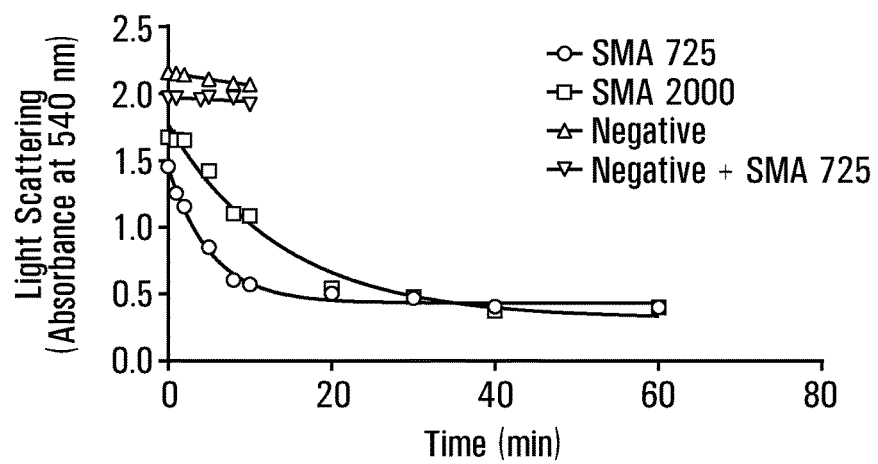

This example compares polymer average particle diameter sizes to the stability of a nanonet from that polymer when the surfactant average aggregate diameter is held constant. Flocculation efficiencies (for example, rate of formation) of sodium oleate nanonets formed by SMA-2000™ and SMA-725™ were compared (FIG. 3A). Sodium oleate forms a large surfactant aggregate having an average aggregate diameter of 392 nm (Table 2), and is therefore compatible with both SMA-2000™ and SMA-725™ for nanonet formation, sodium oleate has a long alkyl chain ($N_{CH2}$=18). Free sodium oleate in solution will precipitate, but little flocculation or settling occurs (FIG. 3B). However, in SMA-725™ containing nanonets, upon destabilization by pH shift (FIG. 3C), the interaction between the interacting polymer and sodium oleate precipitate and rapidly aggregate. This aggregation occurs rapidly, signaling nanonet destabilization (FIG. 3C). In contrast, the short chain polymer SMA-2000™ forms sodium oleate based nanonets which do not flocculate very well. This is apparent due to the comparatively slower settling of the precipitated SMA-2000™ sodium oleate based nanonets (FIG. 3D). Flocculation of destabilized nanonets was measured quantitatively by observing solution clearing after polymer destabilization (FIG. 3E). The quantitative measurements of rate and quality of flocculation, respectively, supported the qualitative observations that sodium oleate nanonets formed by a longer polymer display faster aggregation kinetics, and are therefore easier to physically remove when being used for wastewater treatment (FIG. 3E).

Example 6

Addition of Nanonets for Capture of Oil and Suspended Solids from Produced Water In this example, flowback water samples and produced water samples were employed with nanonets. The water samples used were from typical Bakken Formation oil production activities. The water samples were measured for hydrocarbon content before and after exposure to nanonets. Nanonets comprising SMA-2000 ™ and Triton X-100™, were added to flowback water samples as well as to produced water samples. The solids in the resulting mixtures were then removed by filtration. Thereafter, the hydrocarbon content of each filtrate recovered from the treated water samples was again measured. The results are set out in Table 5 below.

TABLE 5

Hydrocarbon Content of Flowback and Produced Water from Bakken Formation Pre and Post Nanonet Treatment. (250 ppm nanonets, 10 micron filtration, ppb = parts per billion)

| | Flowback Water (ppb) PRE-NANONET ADDITION | POST-PRECIPITATE REMOVAL | Produced Water (ppb) PRE-NANONET ADDITION | POST-PRECIPITATE REMOVAL |
|---|---|---|---|---|
| Extractable Petroleum Hydrocarbons (C10-C19) | 378,000 | 11,500 | 9,410 | 1,180 |
| Extractable Petroleum Hydrocarbons (C19-C32) | 276,000 | 11,000 | 8,640 | 1,450 |
| Aggregate Hydrocarbons *(6-10) | 1,020,000 | 1,430 | 4,44 | ND |

Example 7

Optimization of Nanonets for Selective Iron Remediation from Produced Water (Nanonets as a Platform for Selective Contaminant Removal Several different surfactants were screened to identify a suitable surfactant with which to prepare an iron selective nanonet. In addition a lipid SMA particle (Lecithin) was assayed. In a screening procedure the iron selective nanonet is identified that can selectively capture iron from water produced by unconventional oil and gas operations. Once, the surfactant is identified, the nanonet formulation may be further refined to be easily removed by dissolved air flotation and/or filtration.

Each of sodium oleate, CAPB™, (COCAMIDOPROPYL BETAINE), PGL1, PGL2, PGL3, PGL4, PGLW, and cocoyl glycinate, were formed into nanonets using the polymer SMA-2000 ™ with a 5:1 wt/wt ratio (surfactant:polymer). A lipid-SMA formulation (Lecithin and SMA-2000™) was also assayed. The nanonets were added to solutions comprising dissolved iron at three different concentrations of divalent cations (4000 ppm, 400 ppm and 40 ppm). A first control with no nanonet added to it and a second control with KOH added to it were also tested. Two separate experiments were conducted. In the first, the solutions with nanonets or SMA-lecithin added were left overnight, then filtered. In the second, the solutions with nanonets and SMA-lecithin added were left for 10 minutes, then filtered. The controls were also filtered after the requisite elapsed time.

Figure 4:
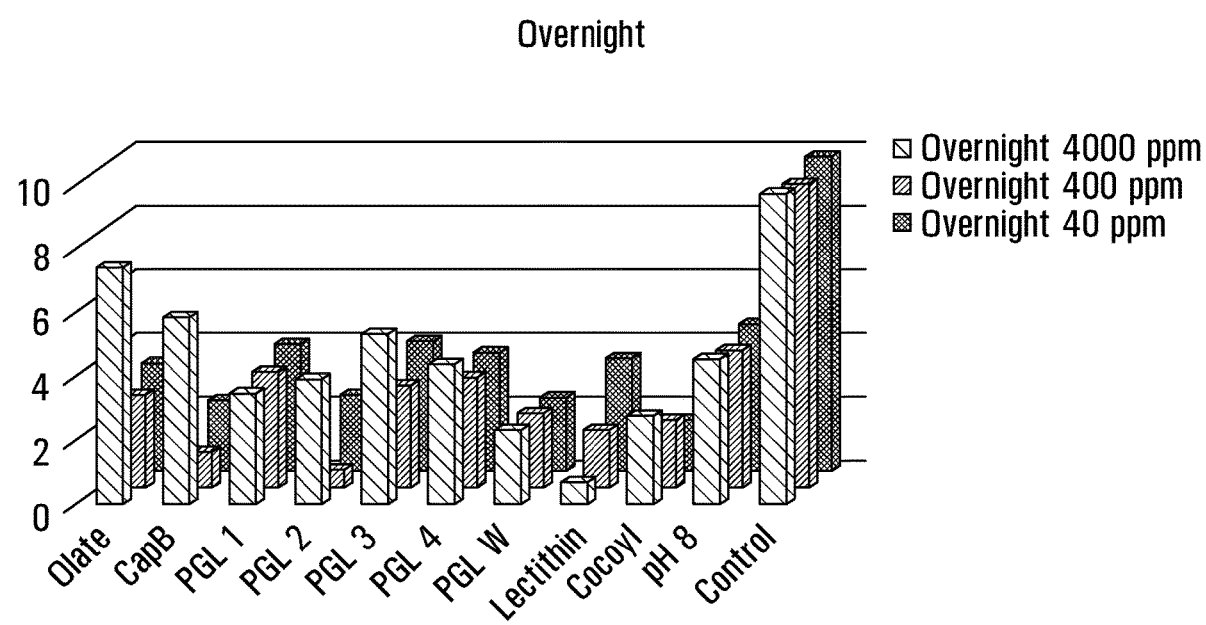
FIG. 4: Dissolved Iron removal for nanonets in varying concentrations of divalent cations. SMA-2000 ™ nanonets formed with the indicated surfactant at a 5:1 ratio (surfactant:polymer) were incubated with iron solutions overnight, then filtered and iron contents quantified. As a control, iron solutions were filtered after shifting solution pH or without treatment.
Figure 5:
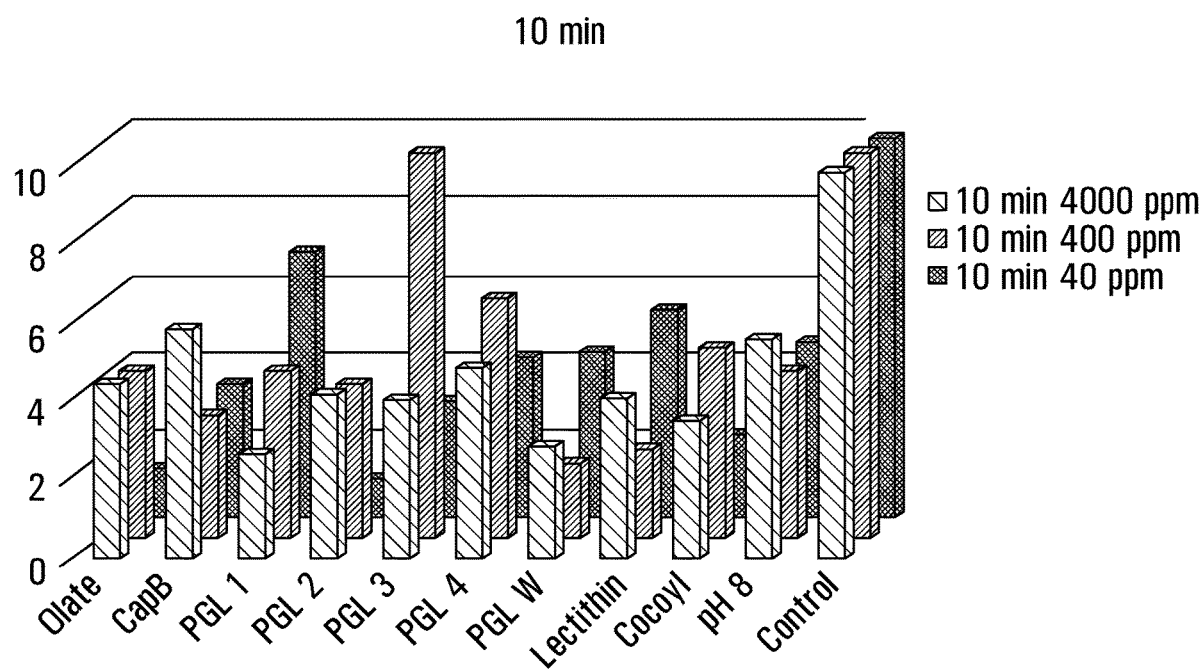
FIG. 5: Dissolved Iron removal for nanonets in varying concentrations of divalent cations. SMA-2000 ™ nanonets formed with the indicated surfactant at a 5:1 ratio (surfactant:polymer) were incubated with iron solutions for 10 minutes, then filtered and iron contents quantified. As a control, iron solutions were filtered after shifting solution pH or without treatment.
Figure 6B:
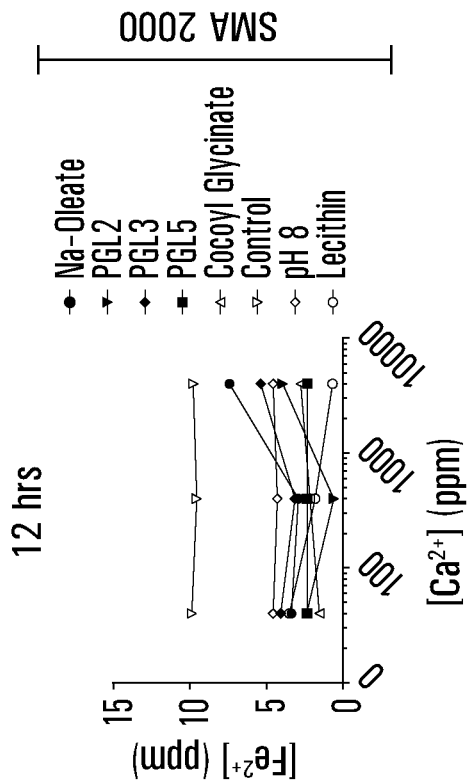
FIG. 6: Iron removal efficiencies with SMA-2000 ™ and SMA-725™ nanonets in varying buffer concentrations.
Figure 6D:
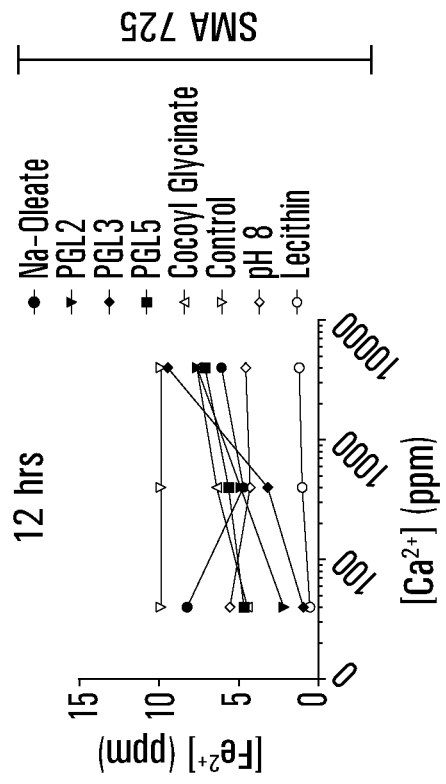
Figure 6A:
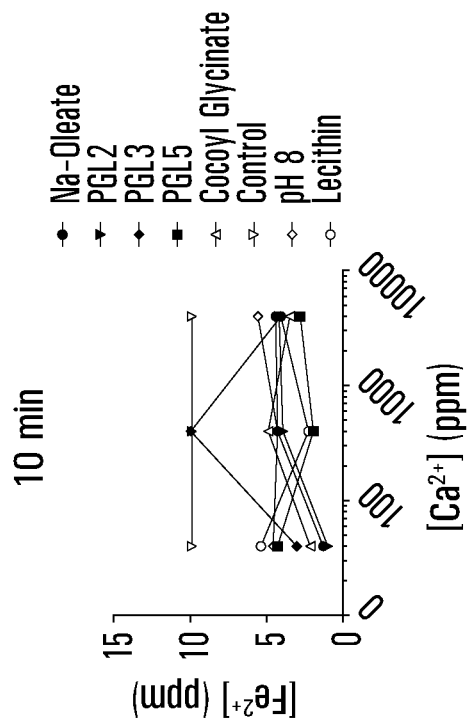
Figure 6C:
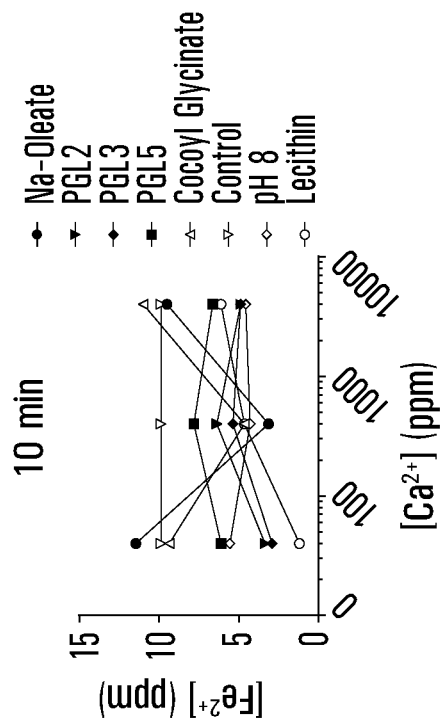

Sodium oleate, and polyglyceryl-10 monostearate (PGL5) displayed good targeting properties for capture of iron into SMA-2000 ™ based nanonets. PGL5 (PGLW) shows most consistent removal across the range of calcium concentrations. Conversely, the results when taken as a whole across all of the surfactants tested tend to display relatively better removal at 400 ppm calcium and relatively worse at 4000 ppm. The PGL series of surfactants appear to be generally insensitive to calcium concentration. Surfactants with high binding affinity for iron (e.g. cocoyl glycinate) appear to be more negatively affected by calcium ion concentration. The results are graphically displayed in FIGS. 4 and 5.

Example 8

Fourteen (14) different nanonets were prepared. Each nanonet comprised either SMA-2000 ™ or SMA-725 ™ and one of the following surfactants: sodium oleate, PGL2, PGL3, cocoyl glycinate. A SMA-lecithin formulation was also tested. Each of the nanonets was then added to various solutions comprising varying concentrations of $Fe^{2+}$ and $Ca^{2+}$ ions. In a first experiment, the treated solutions were left for 10 minutes. In a second experiment, the treated solutions were left for 12 hours. The results indicate that SMA-2000 ™ nanonets appear relatively better at removing iron than SMA-725 ™ nanonets. Increasing concentrations of divalent cations such as calcium appear to generally decrease the iron binding capacity of nanonets. A control without nanonets and treated with only KOH was also tested. The results are graphically depicted in FIG. 6.

Example 9

Figure 7B:
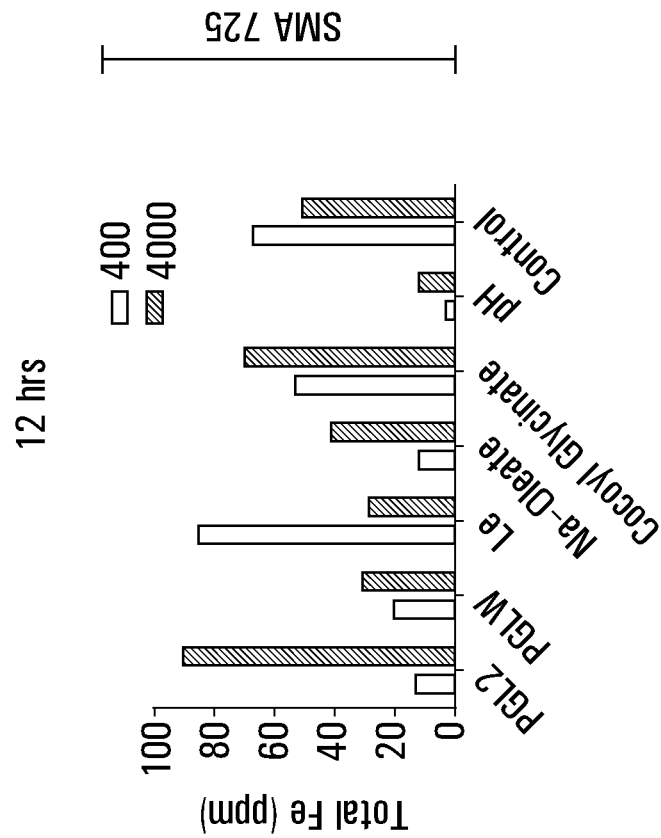
FIG. 7: Removal of iron from 100 ppm iron solutions (75:25 $Fe^{3+}:Fe^{2+}$) in SMA-725 ™ nanonets
Figure 7A:
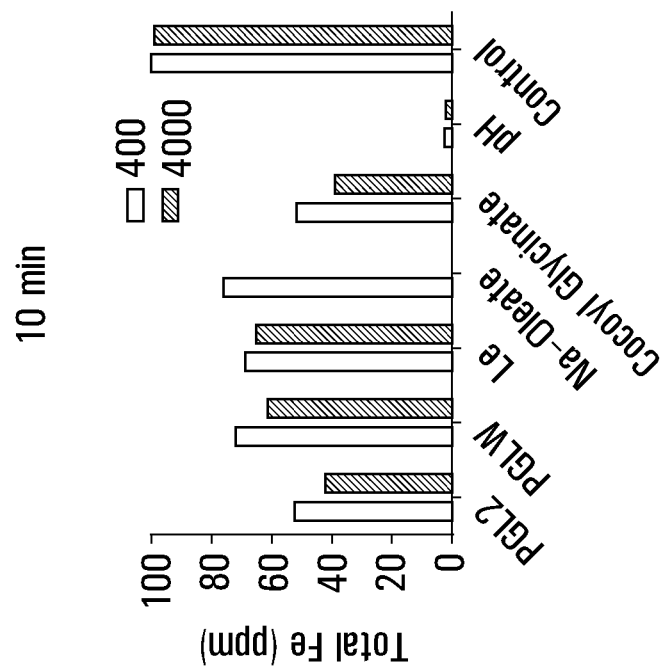

Four (4) nanonets were prepared using SMA-725 ™ as the polymer and using one of the following surfactants: PGL2, PGLW, sodium oleate, and cocoyl glycinate. A SMA-Lecithin control was also tested. Solutions comprising iron ions in a ratio of 75:25 $Fe^{3+}$: $Fe^{2+}$, were prepared at a concentration of 100 ppm. One of each of the four nanonets and the SMA-lethicin formulation was then added to a separate iron solution and left to sit for either 10 minutes or 12 hours. A control without nanonets and treated with only KOH was also tested. The results, graphically depicted in FIG. 7 generally show that increasing the residence time of iron solution treated with nanonets generally increases the amount of iron removed.

Example 10

Figure 8:
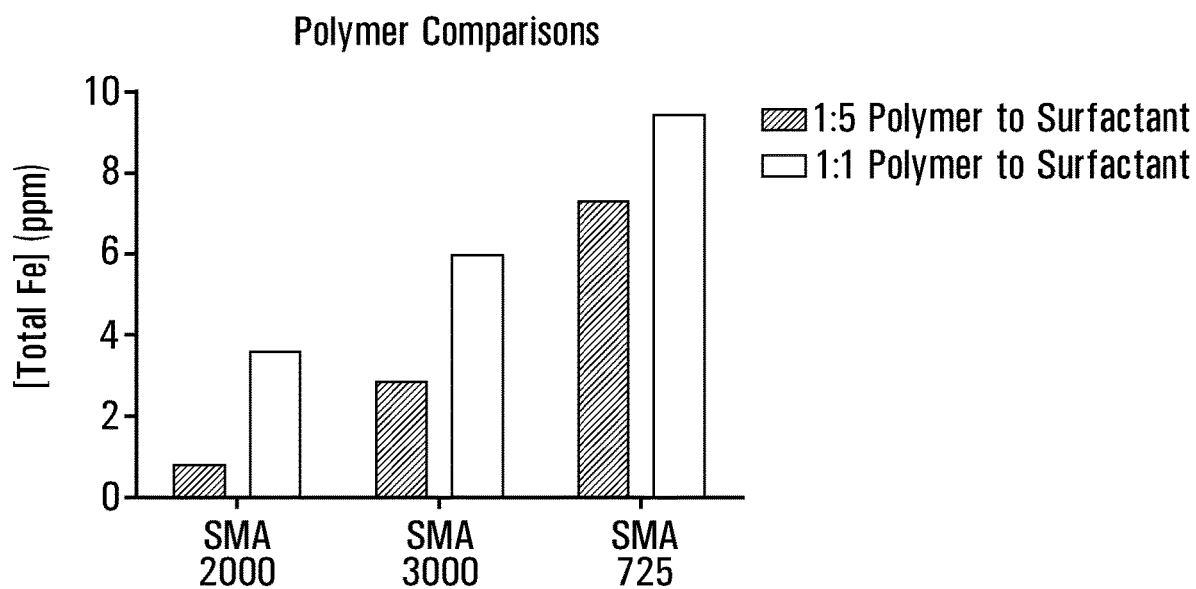
FIG. 8: Graph showing the effect polymer and surfactant:polymer ratio on iron removal in sodium oleate nanonets.

Six different nanonets were prepared using sodium oleate as the surfactant and three different polymers. Each polymer was used to prepare two nanonets, the first of which comprised a ratio of 1:5 wt/wt polymer:surfactant and the second comprised a ratio of 1:1 wt/wt. The results are graphically depicted in FIG. 8. The figure shows generally that increasing the surfactant concentration within a nanonet increases iron removal. This suggests that iron removal is dependent, at least in part, upon surfactant concentration within the nanonet and not solely dependent on pH of a nanonet mixture.

Example 11

Figure 9:
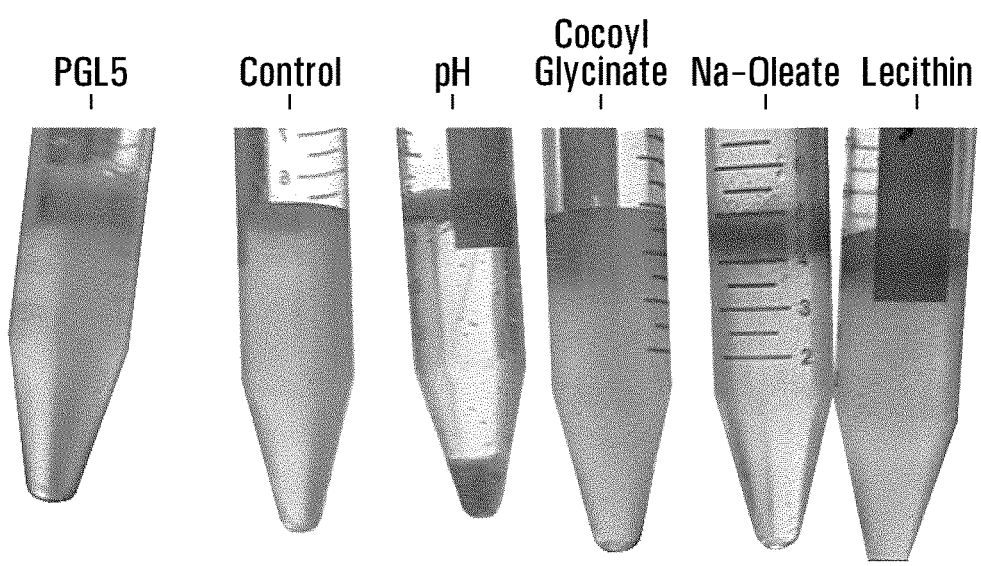
FIG. 9: Effect of various nanonets treatment on produced water samples (500 ppm oil, >100,000 TDS, >1,000 ppm divalent cations).
Figure 10:
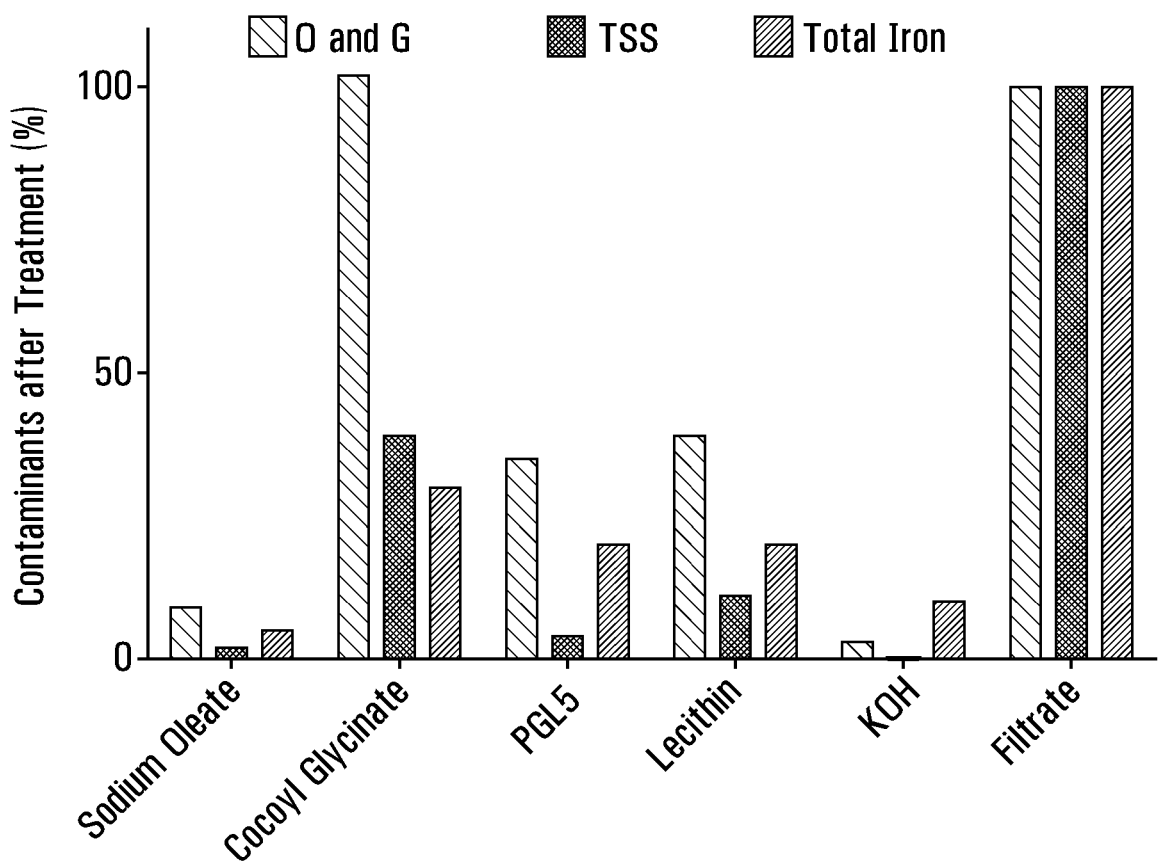
FIG. 10: Post filtration quantification of treated produced water. Oil and gas (0 and G), total suspended solids (TSS), and total iron were quantified after filtration of the samples in FIG. 9.

Nanonets comprising SMA-725 ™ and one of the following surfactants: PGL5, cocoyl glycinate, or sodium oleate and a SMA lecithin-formulation were prepared and each added to a separate sample of produced water. The produced water comprised 500 ppm oil, >100,000 ppm, total dissolved solids (TDS), and >10,000 ppm divalent cations. A first control with no nanonet and a second control without nanonets and treated with only KOH were also tested. The results are shown in FIGS. 9 and 10. Generally, the results indicate that sodium oleate based nanonets provide a relatively better combination of oil removal and iron removal in real produced water samples.

Example 12

Figure 11A:
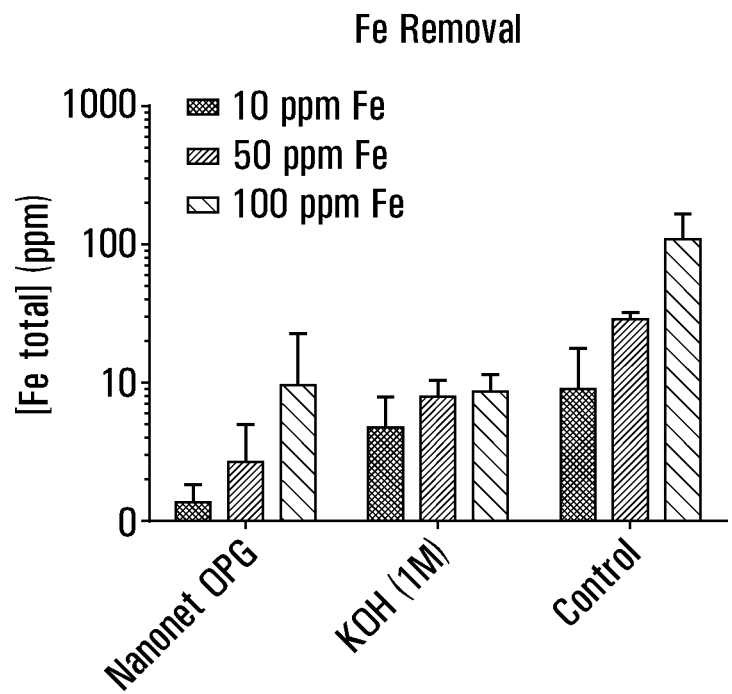
FIG. 11: Contaminant removal from produced water with nanonets OPGW (SMA-725™, 75% sodium oleate, 25% polyglyceryl-10 monostearate, 1:1 wt ratio polymer:surfactant; 10 min residence time, after filtration). A) Iron removal B) Colour removal and C) Turbidity removal.
Figure 11B:
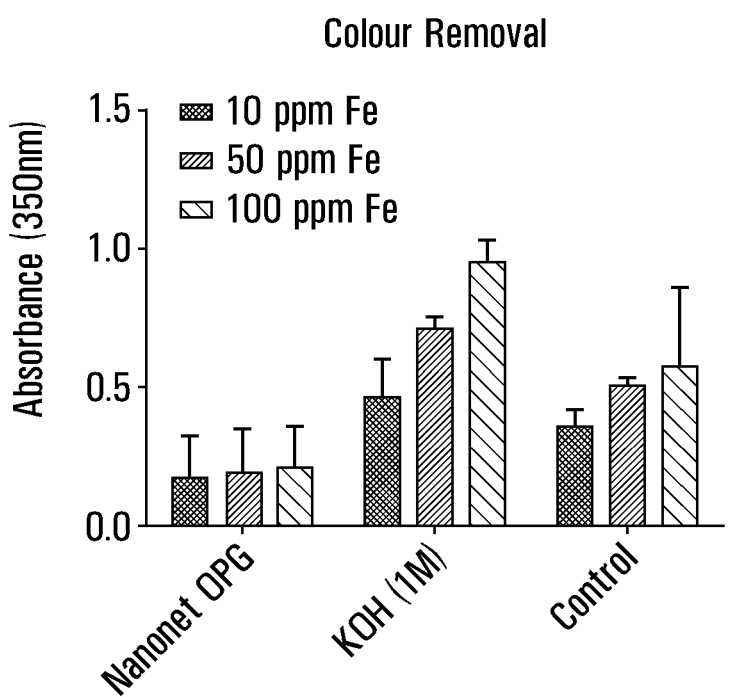
Figure 11C:
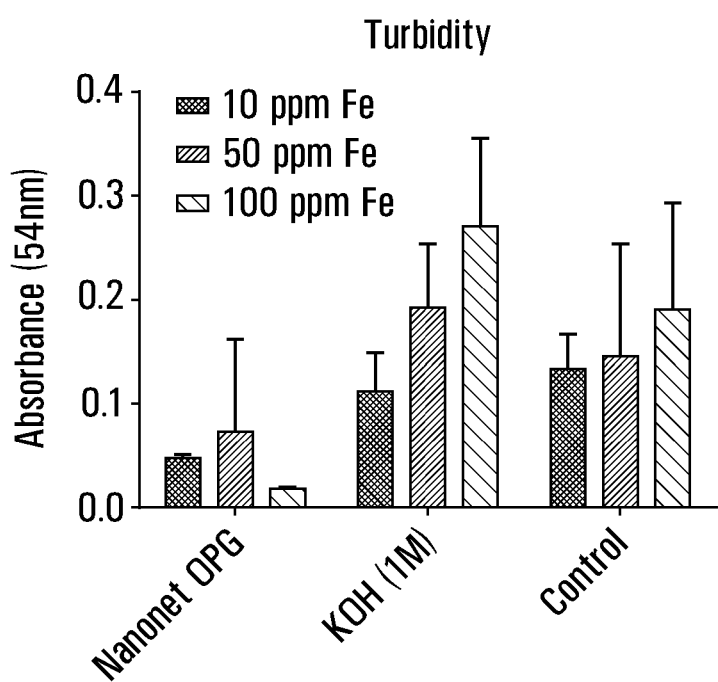

Sodium Oleate Nanonets can be Tuned by Small Addition of Polyglyceryl 10 Monostearate to Enhance Flotation (Nanonet OPGW An OPGW nanonet comprised of SMA-725™, 75% sodium oleate, 25% polyglyceryl-10 monostearate, 1:1 wt ratio polymer:surfactant was prepared. The nanonets were then added to produced water samples having varying levels of elevated divalent cations (10 ppm iron, 50 ppm iron, and 100 ppm iron) and left for 10 min. The samples were then filtered and the iron content (FIG. 11A), colour (FIG. 11B) and the turbidity (FIG. 11C) of the filtrate from the treated water samples were tested. A first control with no nanonet added and a second control without nanonets and treated with only KOH were also tested. The results generally indicate that the OPGW nanonet provides rapid removal of both iron and oil and gas from produced water samples and in the presence of elevated divalent cations.

Example 13

Figure 12A:
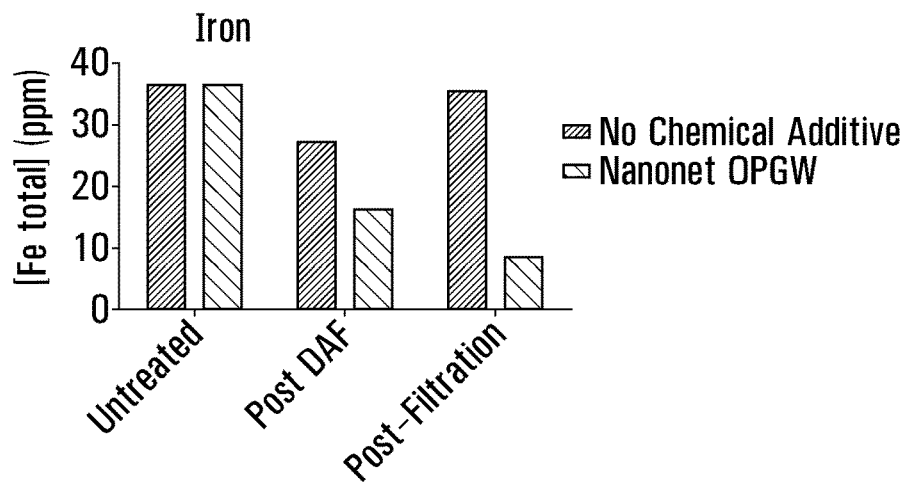
FIG. 12: Contaminant removal of produced water with nanonet OPGW after dissolved air flotation, followed by filtration. A) Total iron concentration pre- and post-treatment. Total iron concentration was determined by the Ferrozine method. B) Water colour pre- and post-treatment.
Figure 12B:
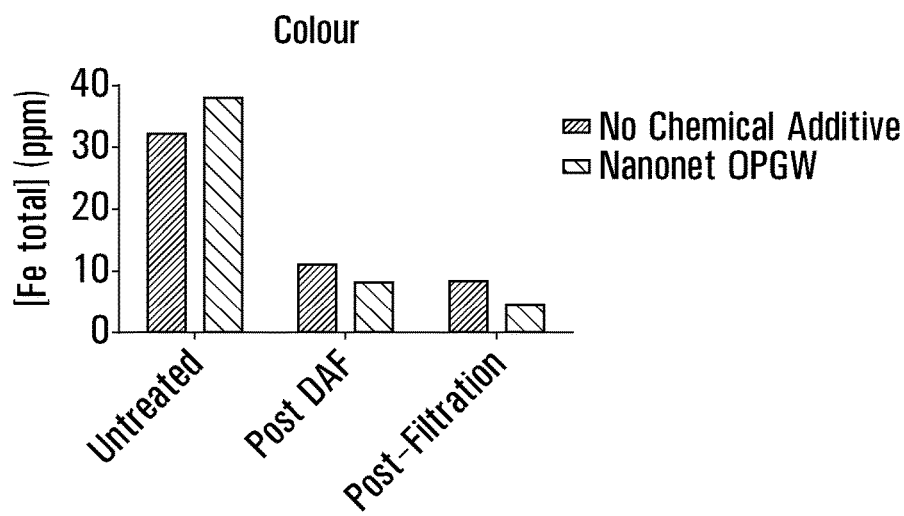
Figure 12C:
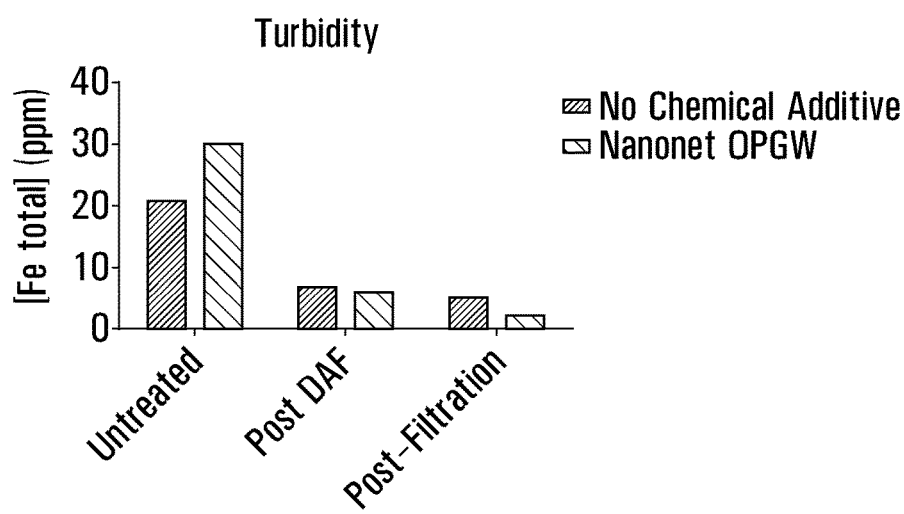

OPGW Nanonets Enhance Dissolved Air Floatation (DAF) Based Removal of Both Iron and Hydrocarbons from Produced Water The OPGW nanonet was prepared as set out above and added to produced water samples that were then treated by dissolved air flotation (DAF), followed by filtration. Prior to the addition of nanonets and again after filtration, the samples were tested for iron content, colour and turbidity. A control with no nanonet added was also tested. Total iron concentration of the filtrate from treated water samples was determined by the Ferrozine method. A yellow colour is indicative of dissolved hydrocarbons and colloidal iron was measured by absorbance at 350 nm. Turbidity was measured by absorbance at 540 nm. The results are set out graphically in FIG. 12.

Example 14

Treatment of Produced Water With OPGW Nanonets (SMA-725™, 75% sodium oleate, 25% Polyglyceryl-10 Monostearate, 1:1 wt ratio polymer:surfactant), a first control with untreated produced water, and a second control without nanonets and only filtration were tested for metal concentration and for extractable petroleum hydrocarbons. All samples were vigorously mixed with addition of air for 10 minutes. The results are set out in FIG. 13.

In the following Examples 15-21, the following methods reagents and materials were used.

Reagents and Materials Examples 15-21

Poly(styrene-co-maleic anhydride) polymer was purchased from Jiaxing Huawen Chemical Co.™, Ltd (SMA-725™, Lot no. S190405A01), or Cray Valley™ (SMA-2021™, Lot no. 204222A; SMA-2000™, Lot no. PS16072901; and SMA-3000™, Lot no. PS16111302). The polymers SMA-725™ and SMA-2021™ were ground to a fine powder before use. Poly(diisobutylene-alt-maleic acid) (DIBMA™, Lot no. 4217473) was purchased from Anatrace, while the polymers poly(styrene-co-maleic anhydride), cumene terminated (SMA-cumene terminated, Lot no. 08728HN) and poly(styrene-co-maleic anhydride), partial isobutyl ester (SMA-IBE, Lot no. 09918JN) were purchased from Sigma Aldrich.

Non-ionic surfactants 4-(1,1,3,3-tetramethylbutyl)phenyl-polyethylene glycol Triton™ X-100, Lot no. SLBX5574; Triton™ X-305 (70% in $H_2O$), Lot no. SLBX0207; Triton™ X-45, Lot no. SLBX0207; CAS no. 9002-93-1), sorbitan laurate (Span 20™; CAS no. 1338-39-2, Lot no. MKCF5665), polyethylene glycol sorbitan monolaurate (Tween 20™; CAS no. 9005-64-5, Lot no. SLBW9887) polyethylene glycol sorbitan monopalmitate (Tween 40™; CAS no. 9005-66-7, Lot no. MKBV6853V), polyethylene glycol sorbitan monostearate (Tween 60™; CAS no. 9005-67-8, Lot no. MKBX0810V), polyoxyethylenesorbitan tristearate (Tween 65™; CAS no. 9005-71-1, Lot no. MKCG4378), polyethylene glycol sorbitan monooleate (Tween 80™; CAS no. 9005-65-6, Lot no. BCBV5152), and polyethylene glycol sorbitan trioleate (Tween 85™; CAS no. 9005-70-3, Lot no. MKCG2988), (Z)-9-octadecenoic acid sodium salt (Sodium Oleate™; CAS no. 143-19-1, Lot no. SZBG1110V), p-toluenesulfinic acid sodium salt hydrate (sodium p-toluenesulfinate Hydrate™; CAS no. 207801-20-5, Lot no. MKCD1005), 1-octanesulfonic acid sodium salt monohydrate (sodium 1-octanesulfonate Monohydrate™; CAS no. 207596-29-0, Lot no. BCBW1986), 9,10-dihydro-9,10-dioxo-2-anthracenesulfonic acid sodium salt monohydrate (Anthraquionone-2-sulfonic acid sodium salt Monohydrate™; CAS no. 153277-35-1, Lot no. MKCD1028), o-ethylxanthic acid potassium salt (Potassium ethyl Xanthogenate™; CAS no. 140-89-6, Lot no. 44706), dodecylbenzenesulfonic acid sodium salt (Sodium dodecylbenzene Sulfonate™, CAS no. 25155-30-0, Lot no. STBH2778), and 1,2-Hexanediol (CAS no. 6920-22-5, Lot no. STBH6345) were purchased from Sigma Aldrich.

Poly(oxy-1,2-ethanediol)-alpha-isotridecyl-omega-hydroxy phosphate (Lakeland PAE 136™, CAS no. 73038-25-2, Lot no. W475) was purchased from Lakeland Labs, Ltd. (Z)-9-Octadecenoic acid (oleic Acid™, CAS no. 112-80-0, Lot no. SJ1-111) was purchased from Vantage. Polyethylene glycol monoalkyl ether (Genapol X-080™, CAS no. 9043-30-5) was purchased from Fluka, while lauramidopropyl betaine (TC-LAB 35™, CAS no. 86438-78-0) and potassium cocoyl glycinate (Amin GCK 30H™, CAS no. 301341-58-2) were purchased from Tinci. Sodium-1-dodecanesulfonate (dodecane-1-sulfonic acid sodium Salt™, CAS no. 2386-53-0, Lot no. K49293246 806) was purchased from Merck KGaA. Alkylpolyglucoside (coco Glucoside™, CAS no. 141464-42-8, Lot no. 16072-A52) was purchased from New Directions. Decaglyceryl monostearate (polyglycerol-10-Stearate™, CAS no. 79777-30-3), decaglyceryl monolaurate (polyglycerol-10-Laurate™, CAS no. 34406-66-1), (polyglycerol-10-Palmitate™), and triglyceryl monooleate (polyglycerol-10-Oleate™, CAS no. 11094-60-3) were obtained from Shandong Binzhou GIN&ING New Material Technology Co., Ltd. Sodium ($C_{10-16}$) benzenesulfonate (Bio Soft D-40™, CAS no. 68081-81-2, Lot no. 8252764), sodium ($C_{14-16}$) olefin sulfonate (Bio Terge AS-40™, CAS no. 68439-57-6, Lot no. 8242348), sodium lauryl sulfoacetate (Lathanol LAL Powder™, CAS no. 1847-58-1, Lot no. 8170061), sodium lauroyl lactylate (Stepan SLL FB™, CAS no. 13557-75-0, Lot no. 8086194), lauryl lactyl lactate (Stepan Mild L3™, CAS no. 910661-93-7, Lot no. 8080185), alkylbenzenesulfonic acid ($C_{11-13}$) (Stepan Sulfonic 100™, CAS no. 68608-88-8, Lot no. TK-265), sodium tridecyl ether sulfate (Cedepal TD-403 MFLD™, CAS no. 25446-78-0, Lot no. 7606923), disodium cocoamphodipropionate (Amphosol 2CSF™, CAS no. 68604-71-7, Lot no. S77072810), and isopropylamine alkylbenzenesulfonic acid ($C_{9-17}$ Br) (Ninate 411™, CAS no. 68649-00-3, Lot no. 8082275) were purchased from Stepan Company. VDISTILL DV53™ Distilled Soy Fatty Acid (CAS no. 68308-53-2, Lot no. 829608) and VDISTILL DV 63™ Distilled Canola Fatty Acid (Lot no. 833603) were purchased from Vantage. n-Decyl-β-D-thiomaltoside (n-decyl-β-D-Thiomaltopyranoside™, CAS no. 148565-56-4, Lot no. 4216901), 1H, 1H, 2H-perfluorooctyl-β-D-maltopyranoside (octyl maltoside, Fluorinated™ CAS no. 118680-70-9, Lot no. 4217259), n-dodecyl-β-D-thiomaltoside (n-dodecyl-β-D-Thiomaltopyranoside™, CAS no. 148565-58-6, Lot no. 4216186), 1,2,5,6-tetradecyl-β-D-glucopyranoside-3,4-O-di-dodecyl-D-mannitol (perGlu-bis-dodecyl Mannitol™, Lot no. 4217252, 1,2,5,6-tetradecyl-β-D-glucopyranoside-3,4-O-di-tridecyl-d-mannitol (perGlu-bistridecyl Mannitol™, Lot no. 4217317), 1,2,5,6-tetradecyl-β-D-glucopyranoside-3,4-O-Di-tetradecyl-d-mannitol (pergGlu-bistetradecyl Mannitol™, Lot no. 4217150), 3,6,9,12,15,18,21,24-octaoxahexatriacontan-1-ol (octaethylene glycol monododecyl Ether™, CAS no. 3055-98-9, Lot no. 4217388), n-decyl-β-D-thioglucoside (n-decyl-β-D-Thioglucopyranoside™, CAS no. 98854-16-1, Lot no. 127098), n-nonyl-β-D-thioglucoside (n-nonyl-β-D-Thioglucopyranoside™, CAS no. 98854-15-0, Lot no. 4216868), hexaethylene glycol monodecyl ether (decyl hexaethylene glycol Ether™, CAS no. 5168-89-0, Lot no. 4157194), n-heptyl-β-D-thioglucoside (n-heptyl-β-D-Thioglucopyranoside™, CAS no. 85618-20-8, Lot no. 4216927), n-octyl-β-D-thiomaltoside (n-octyl-β-D-Thiomaltopyranoside™, CAS no. 148616-91-5, Lot no. 4216064), decyl hexaethylene glycol ether (hexaethylene glycol monooctyl Ether™, CAS no. 4440-54-4, Lot no. 4216205), hexaethylene glycol monododecyl ether (dodecyl hexaethylene glycol ether, CAS no. 3055-96-7, Lot no. 4215962), and dodecyl heptaethylene glycol ether (heptaethylene glycol monododecyl Ether™, CAS no. 3055-97-8, Lot no. 4216865) were purchased from Anatrace.

N-octanoyl-L-methionine (CAS no. 35440-75-6), n-decanoyl-L-methionine (CAS no. 51570-51-5), n-dodecanoyl-L-methionine (CAS no. 35440-74-5), n-octanoyl-L-threonine (CAS no. 91694-75-6), n-decanoyl-L-threonine (CAS no. 30664-76-7), n-dodecanoyl-L-threonine (CAS no. 14379-57-8), and n-dodecanoyl-L-histidine (CAS no. 55258-11-2) were synthesized by GreenCentre Canada.

The subsequent Anatrace surfactants may be abbreviated as following: n-decyl-β-D-thiomaltopyranoside as nDDTP-D335, octyl maltoside, fluorinated as PFDMP-0310F, n-dodecyl-β-D-thiomaltopyranoside as nDDDTP-D342, perGlubisdodecyl mannitol as DDDM-MNA-C12, perGlubistridecyl mannitol as pGBTM-MNA-C13, pergGlu-bistetradecyl mannitol as pGBTEM-MNA-C14, octaethylene glycol monododecyl ether as OEGMDE-0330, n-decyl-β-D-thioglucopyranoside as nDDTGP-D323, n-nonyl-β-D-thioglucopyranoside as nNDTP-N335, hexaethylene glycol monooctyl ether as HEGMOE-H350, n-heptyl-β-D-thioglucopyranoside as nHDTP-H301, n-octyl-β-D-thiomaltopyranoside as nODTTP-0320, hexaethylene glycol monodecyl ether as HEGMDE-H360, heptaethylene glycol monododecyl ether as HEGMDDE-H370, hexaethylene glycol monododecyl ether as HXEGMDDE-H375.

Hydrolysis of Polymers:

SMA-725™ (Jiaxing Huawen Chemical Co.™) and SMA-2021™ (Cray Valley™) were first ground to a fine powder, while SMA-2000™ (Cray Valley™), SMA-3000™ (Cray Valley™), DIBMA (Anatrace™), SMA-cumene terminated (Sigma Aldrich™), and SMA-IBE (Sigma Aldrich™) were purchased in powder form.

In a 3-neck round-bottom flask connected with a condenser was added a 500 mM potassium hydroxide (KOH) solution in deionized water and heated to 50° C. To the warm KOH solution was added 5% (wt/vol) SMA-X™ (X=SMA-725™, SMA-2000™, SMA-3000™, SMA-2021™, cumene terminated, IBE) and the reaction mixture was heated to reflux at 100° C. for 3 h. During reflux, the polymer dissolved completely and for the reaction with SMA-725 ™ and SMA-2021™ a clear yellow solution was obtained. The reaction mixture was cooled down to ambient temperature and subsequently filtered to remove non-hydrolyzed particles. The filtrate was precipitated by dropwise addition of 12 M HCl with stirring until a pH of ≤2 was achieved. The precipitate was filtered using a 10 μm filter, washed 3× with 100 mL of dilute 50 mM HCl solution and 3× with 100 mL of deionized water. The isolated colorless polymer was dried at ambient temperature for 2 hours and lyophilized over night for ca. 12 hours.

Preparation of Derivatized SMA-2000™

Scheme 1. Reaction of SMA-2000™ with ethanolamine.

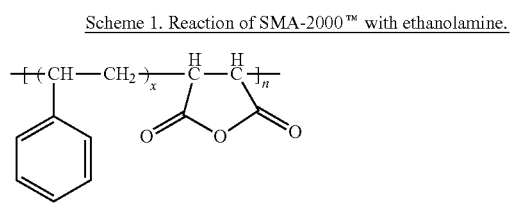

-continued

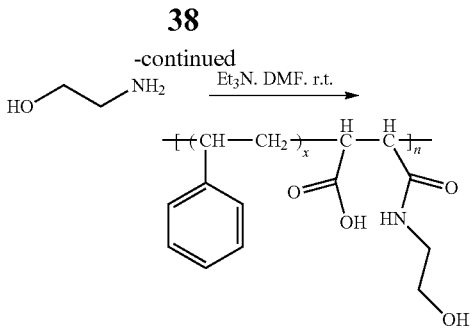

In a reaction vessel with a magnetic stir bar, 0.200 g SMA-2000™ powder was dissolved in 10 mL dimethylformamide to give a clear yellow solution. To this reaction mixture was added 20 μL triethylamine and 99 μL ethanolamine. A colour change from yellow to colourless solution was observed. The reaction mixture was stirred for 24 h at ambient temperature. Upon addition of 51 mL acidic aqueous solution a colorless suspension was obtained and the supernatant was decanted. To the colorless precipitate was added 2 mL tetrahydrofuran and the precipitate dissolved overnight and was let to evaporate over two days. Yield: 0.234 g. FTIR (ATR, cm$^{-1}$): 3380, 3027, 2930, 2887, 1769, 1717, 1653, 1596, 1492, 1452, 1387, 1176, 1061, 1033, 916, 760, 699.

Infra-Red Spectroscopy

Fourier-transform infrared spectroscopy was performed on commercially available poly(styrene-co-maleic anhydride) polymers and poly(styrene-co-maleic acid) polymers using an Agilent Technologies Cary 630 spectrometer. Equipped with a diamond ATR (attenuated total reflectance). Spectra were recorded in the range of 400-4000 cm$^{-1}$ with an average of 4 scans and a resolution of 1 cm$^{-1}$. The C=O maleic anhydride vibration stretching modes were observed at 1775 cm$^{-1}$ and 1855 cm$^{-1}$, while the C=O maleic acid stretching mode was detected at 1705 cm$^{-1}$ (see Killian et al. *Chemistry and Physics of Lipids* (2019), 218, 85-90).

Preparation of 2% Polymer Stock Solution:

200 mg of anhydrous polymer was suspended in deionized water and the pH adjusted to 7-8 by dropwise addition of 500 mM potassium hydroxide solution. Polymer solutions were sonicated to obtain a homogenous solution and adjusted to a final volume of 10 mL. The polymer solutions were filtered using a 0.22 Nylon filter.

Preparation of 1% Surfactant Stock Solution:

150 mg of surfactant was dissolved into 15 mL of deionized water to form separate 1% stock solutions of each surfactant. The following surfactants N-octanoyl-L-methionine, N-dodecanoyl-L-methionine, N-decanoyl-L-threonine, N-dodecanoyl-L-threonine, and N-dodecanoyl-L-histidine were dissolved in deionized water and the pH was adjusted to 8 to ensure complete dissolution of surfactants. The surfactant solutions were filtered using a 0.22 μm Nylon filter.

The chemical structure of model surfactant Triton™ X series is as follows in Formula (i):

Formula (i)

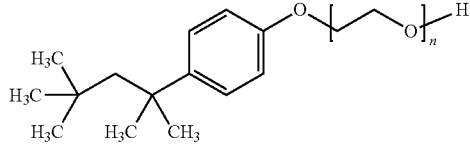

Triton™ X-100 with n=9-10; Triton™ X-305 with n=30; Triton™ X-45 with n=5.

Particle Sizing on DLS:

Particle sizing with intensity values were measured by dynamic light scattering on a Malvern Model ZEN1600 NanoSizer-S™ instrument (Malvern Instruments Inc, Westborough, MA, USA) at 25° C. with a 173° scattering angle. Number intensity values for hydrolyzed polymer and surfactant samples were obtained using a Malvern Zetasizer Nano ZS™ at 25° C. with a 173° scattering angle.

Surfactant solutions and hydrolyzed polymer solutions were prepared in 20 mM Tris-HCl {Tris(hydroxymethyl) aminomethane} pH=7 buffer solution at ambient temperature and diluted in Tris-HCl buffer in concentrations ranging from 1% to 0.1%. The samples were filtered using a 0.22 μM Nylon or 0.45 μM Nylon filter, followed immediately by sizing in disposable cuvettes. Solutions were diluted to obtain an optimum dispersity index (<0.5) for surfactant aggregate diameter and polymer particle diameter measurements. Surfactant nDDTGP-D323 was prepared in 20 mM TRIS pH 7 and methanol (1:1 ratio). In one instance, intensity values were taken as surfactant aggregate or polymer particle diameter. In another instance, number values were taken as surfactant aggregate or polymer particle diameter.

TABLE 6

Dynamic Light Scattering Characterization using Intensity Values of Anionic Surfactant Aggregates

| Surfactant | Alkyl Chain Length | Head Group | Concentration | Aggregate Diameter [nm] (Intensity Mean d) | Poly Dispersity Index (PDI) |
|---|---|---|---|---|---|
| Sodium 1-Octane Sulfonate | 8 | Sulfonate | 10% | 1.562 | 0.367 |
| Amin GCK 30H | 18, 8 | Acyl glycinate | 2% | 7.286 | 0.3 |
| Anthraquinone-2-sulfonic mono hydrate, sodium | 0 | Sulfonate | 1% | 1.008 | 0.343 |
| Stepan Bio Soft D-40 ™ | 0 | Sulfonate | 1% | 5.13 | 0.322 |
| Stepan Bio Terge AS-40 ™ | 14 | Sulfonate | 0.50% | 6.434 | 0.181 |
| Cedepal TD-403 MFLD ™ | 13 | Ether sulfate | 0.50% | 6.421 | 0.235 |
| Dodecane-1-sulfonic acid | 12 | Sulfonate | 0.50% | 5.108 | 0.227 |
| Lakeland PAE 136 | 13 | Phosphate ester | 0.25% | 7.924 | 0.161 |
| Lathanol LAL ™ | 12 | Sulfoacetate | 1% | 6.814 | 0.151 |
| n-Decanoyl-L-Methionine | 10 | Amino acid | 1% | 85.47 | 0.172 |
| n-Decanoyl-L-Threonine | 10 | Amino acid | 0.50% | 90.68 | 0.213 |
| n-Dodecanoyl-L-Methionine | 12 | Amino Acid | 1% | 2.32 | 0.138 |
| n-Dodecanoyl-L-Histidine | 12 | Amino acid | 1% | 99.96 | 0.249 |
| n-Dodecanoyl-L-Threonine | 12 | Amino acid | 0.50% | 99.77 | 0.203 |
| n-Octanoyl-L-Methionine | 8 | Amino Acid | 1% | 116.6 | 0.239 |
| n-Octanoyl-L-Threonine | 8 | Amino acid | 1% | 119 | 0.372 |
| Sodium Dodecylbenzene Sulfonate | 12 | Sulfonate | 2% | 4.235 | 0.53 |
| Ninate 411 ™ | 12 | Sulfonate | 0.50% | 216.2 | 0.288 |
| p-Toluene Sulfonic Acid | 1 | Sulfonate | 10% | 0.8236 | 0.32 |
| Potassium Ethyl Xanthogenate | 2 | Xanthogenate | 10% | 190.7 | 0.281 |
| Sodium-1-Pentasulfonate | 5 | Sulfonate | 0.25 | 0.8036 | 0.573 |
| Stepan Mild L3 ™ | 12 | Lactylate | 1% | 372.9 | 0.067 |
| Stepan SLL FB ™ | 12 | Lactylate | 0.10% | 136.3 | 0.144 |
| Stepan Sulfonic Acid ™ | 2 | Sulfonate | 2% | 2.821 | 0.186 |

TABLE 7

Dynamic Light Scattering Characterization using Intensity Values of Non-ionic Surfactant Aggregates

| Surfactant | Alkyl Chain Length | Head Group | HLB | Concentration | CMC [mM] | Aggregate Diameter [nm] | Poly Dispersity Index (PDI) |
|---|---|---|---|---|---|---|---|
| Apo 10 | 10 | Phosphine oxide | NA | 0.50% | NA | 5.835 | 0.259 |
| Apo 12 | 12 | Phosphine oxide | NA | 0.50% | NA | 82.41 | 0.272 |
| Coco Gglucoside | 18 | Glucopyranoside | 13.1 | 2% | NA | 27.32 | 0.154 |
| Fluoro Octyl Maltoside O310F | 8 | Maltoside-sugar | NA | 0.50% | NA | 23.83 | 0.172 |
| Genapol X-080 | 13 | Poly ethylene glycol | 12 | 0.10% | 0.06-0.15 | 10.58 | 0.147 |
| HEGMDDE H370 | 12 | Ethylene glycol | NA | 1% | 0.069 | 8.218 | 0.14 |
| HEGMDE H360 | 10 | Ethylene glycol | NA | 0.50% | 0.9 | 6.033 | 0.158 |
| HEGMOE H350 | 8 | Ethylene glycol | NA | 2% | 10 | 5.505 | 0.25 |
| HXEGMDDE H375 | 12 | Ethylene glycol | NA | 1% | NA | 9.351 | 0.079 |
| MNA C12 | 12 | Glucopyranoside | NA | 0.50% | 0.004 | 6.122 | 0.068 |
| MNA C13 | 13 | Glucopyranoside | NA | 0.50% | 0.002 | 6.423 | 0.046 |
| MNA C14 | 14 | Mannitol | NA | 0.50% | 0.001 | 7.548 | 0.217 |
| nDDTP D342 | 12 | Thiomaltopyranoside | NA | 0.50% | 0.05 | 11.67 | 0.131 |
| nDDTGP D323 | 10 | Thioglucopyranoside | NA | 1% | 0.9 | 262.2 | 0.176 |
| nDDTP D335 | 10 | Thiomaltopyranoside | NA | 0.50% | 0.9 | 6.881 | 0.078 |
| nHDTP H301 | 7 | Thioglucopyranoside | NA | 3% | 29 | 8.935 | 0.011 |
| nNDTP N335 | 9 | Thioglucopyranoside | NA | 0.50% | 2.9 | 137 | 0.357 |
| nODTTP O320 | 8 | Thiomaltopyranoside | NA | 2% | 8.5 | 6.022 | 0.324 |
| OEGMDE O330 | 12 | Etheylene glycol | NA | 0.50% | 0.09 | 8.099 | 0.165 |
| Polyglycerol-10-Laurate | 12 | Polyglycerol fatty acid ester | 12 | 1% | NA | 114.8 | 0.226 |
| Polyglycerol-10-Oleate | 18 | Polyglycerol fatty acid ester | 10.5 | 0.50% | NA | 358 | 0.254 |
| Polyglycerol-10-Palmitate | 16 | Polyglycerol fatty acid ester | 10.5 | 0.50% | NA | 111.8 | 0.226 |
| Polyglycerol-10-Stearate | 18 | Polyglycerol fatty acid ester | 11 | 0.50% | NA | 112.3 | 0.172 |
| Span 20 ™ | 12 | Sorbitan | 8.6 | 0.10% | NA | 1061 | 0.472 |
| Triton X-100 ™ | 8 | Ethylene glycol | 13.4 | 0.50% | 0.24 | 10.07 | 0.089 |
| Triton X-305 ™ | 8 | Ethylene glycol | 17.3 | 0.50% | 0.65 | 10.66 | 0.181 |
| Triton X-45 ™ | 8 | Ethylene glycol | 9.8 | 0.10% | 0.1 | 156.3 | 0.325 |
| Tween 20 ™ | 12 | Polysorbate | 16.7 | 0.50% | 0.05 | 9.173 | 0.072 |
| Tween 40 ™ | 16 | Polysorbate | 15.6 | 0.50% | NA | 9.691 | 0.079 |
| Tween 60 ™ | 18 | Polysorbate | 14.9 | 0.10% | 0.022 | 134.2 | 0.637 |
| Tween 65 ™ | 18 | Polysorbate | 10.5 | 0.50% | NA | 114.5 | 0.286 |
| Tween 80 ™ | 18 | Polysorbate | 15 | 0.50% | 0.012 | 10.42 | 0.026 |
| Tween 85 ™ | 16 | Polysorbate | 11 | 0.50% | NA | 189.8 | 0.252 |

TABLE 8

Dynamic Light Scattering Characterization using Intensity and Number Values of Hydrolyzed Polymer Aggregates

| Polymer | Calculated Aggregate Diameter [nm] | Concentration | Measured Aggregate Diameter [nm] (Intensity Mean d) | Poly Dispersity Index (PDI) | Concentration | Aggregate Diameter [nm] (Number Mean d) | Poly Dispersity Index (PDI) |
|---|---|---|---|---|---|---|---|
| SMA-2000 ™ | 2.6 | 0.10% | 5.242 | 0.113 | 0.10% | 4.633 | 0.292 |
| SMA-2021 ™ | 3.7 | 0.25% | 6.627 | 0.274 | 0.10% | 8.383 | 0.169 |
| SMA-3000 ™ | 2.8 | 0.25% | 3.713 | 0.213 | 0.01% | 4.68 | 0.355 |
| SMA-725 ™ | 6.8 | 0.10% | 15.03 | 0.219 | 0.10% | 10.16 | 0.283 |
| SMA-cumene terminated | 1.5 | 0.10% | 7.123 | 0.164 | 0.50% | 3.325 | 0.297 |
| SMA-IBE | 5.4 | 0.25% | 9.759 | 0.209 | 0.01% | 4.256 | 0.869 |
| DIBMA | 3.2 | 0.50% | 76.74* | 0.135 | 0.10% | 5.704 | 0.271 |

*DIBMA sample in 20 mM Tris pH = 14. DIBMA molecular weight 10,000-12,000 g/mol.

TABLE 9

Dynamic Light Scattering Characterization of Nanonet Aggregates with Nonionic Surfactants

| Surfactant | Surfactant Aggregate Diameter [nm] (Intensity Mean d) | Polymer | Polymer Aggregate Diamter [nm] | Calculated Polymer Aggregate Diameter [nm] | Nanonet Aggregate Diameter [nm] | Concentration | Poly Dispersity Index (PDI) |
|---|---|---|---|---|---|---|---|
| Apo 10 | 5.835 | DIBMA | 92.7 | 3.2 | 69.11 | 0.005 | 0.178 |
| Apo 12 | 82.41 | DIBMA | 92.7 | 3.2 | 57.88 | 0.005 | 0.446 |
| Coco Glucoside | 27.32 | DIBMA | 92.7 | 3.2 | 84.87 | 0.005 | 0.245 |
| Genapol X080 | 10.58 | DIBMA | 92.7 | 3.2 | 91.23 | 0.005 | 0.252 |
| HEGMDDE H370 | 8.218 | DIBMA | 92.7 | 3.2 | 29.05 | 0.005 | 0.528 |
| HEGMDE H360 | 6.033 | DIBMA | 92.7 | 3.2 | 110.2 | 0.005 | 0.351 |
| HXEGMDDE H375 | 9.351 | DIBMA | 92.7 | 3.2 | 62.11 | 0.005 | 0.268 |
| DDDM-MNA-C12 | 6.122 | DIBMA | 92.7 | 3.2 | 84.44 | 0.005 | 0.407 |
| pGBTM-MNA-C13 | 6.423 | DIBMA | 92.7 | 3.2 | 126.4 | 0.005 | 0.578 |
| pGBTEM-MNA-C14 | 7.548 | DIBMA | 92.7 | 3.2 | 89.21 | 0.005 | 0.597 |
| nDDDTP D342 | 11.67 | DIBMA | 92.7 | 3.2 | 96.78 | 0.005 | 0.305 |
| nDDTGP D323 | 262.2 | DIBMA | 92.7 | 3.2 | 93.11 | 0.005 | 0.234 |
| OEGMDE O330 | 8.099 | DIBMA | 92.7 | 3.2 | 79.04 | 0.005 | 0.175 |
| Polyglycerol-10-mono-laurate | 114.8 | DIBMA | 92.7 | 3.2 | 81.35 | 0.005 | 0.246 |
| Polyglycerol-10-mono-oleate | 358 | DIBMA | 92.7 | 3.2 | 287.3 | 0.005 | 0.279 |
| Span 20 ™ | 1061 | DIBMA | 92.7 | 3.2 | 117.3 | 0.005 | 0.149 |
| Triton X-100 ™ | 10.07 | DIBMA | 92.7 | 3.2 | 120.9 | 0.005 | 0.334 |
| Triton X-45 ™ | 156.3 | DIBMA | 92.7 | 3.2 | 84.06 | 0.005 | 0.311 |
| Tween 20 ™ | 9.173 | DIBMA | 92.7 | 3.2 | 87.81 | 0.005 | 0.278 |
| Tween 65 ™ | 114.5 | DIBMA | 92.7 | 3.2 | 89.57 | 0.005 | 0.229 |
| Tween 85 ™ | 189.8 | DIBMA | 92.7 | 3.2 | 155.7 | 0.005 | 0.246 |
| Apo 10 | 5.835 | SMA-2000 ™ | 5.242 | 2.6 | 4.889 | 0.005 | 0.188 |
| Apo 12 | 82.41 | SMA-2000 ™ | 5.242 | 2.6 | 4.387 | 0.005 | 0.421 |
| Coco Glucoside | 27.32 | SMA-2000 ™ | 5.242 | 2.6 | 7.668 | 0.0025 | 0.467 |
| Genapol X080 | 10.58 | SMA-2000 ™ | 5.242 | 2.6 | 107.6 | 0.005 | 0.165 |
| HEGMDDE H370 | 8.218 | SMA-2000 ™ | 5.242 | 2.6 | 4.938 | 0.005 | 0.419 |
| HEGMDE H360 | 6.033 | SMA-2000 ™ | 5.242 | 2.6 | 3.87 | 0.0025 | 0.147 |
| HEGMOE H350 | 5.505 | SMA-2000 ™ | 5.242 | 2.6 | 92.13 | 0.005 | 0.146 |
| HXEGMDDE H375 | 9.351 | SMA-2000 ™ | 5.242 | 2.6 | 179 | 0.0025 | 0.26 |
| pGBTM-MNA-C13 | 6.423 | SMA-2000 ™ | 5.242 | 2.6 | 6.47 | 0.00125 | 0.221 |
| pGBTEM-MNA-C14 | 7.548 | SMA-2000 ™ | 5.242 | 2.6 | 6.38 | 0.005 | 0.404 |
| nDDDTP D342 | 11.67 | SMA-2000 ™ | 5.242 | 2.6 | 113.3 | 0.0025 | 0.211 |
| nDDTGP D323 | 262.2 | SMA-2000 ™ | 5.242 | 2.6 | 143.3 | 0.005 | 0.264 |
| nDDTP D335 | 6.881 | SMA-2000 ™ | 5.242 | 2.6 | 168.3 | 0.005 | 0.249 |
| OEGMDE O330 | 8.099 | SMA-2000 ™ | 5.242 | 2.6 | 121.9 | 0.0025 | 0.236 |
| Polyglycerol-10-mono-laurate | 114.8 | SMA-2000 ™ | 5.242 | 2.6 | 101.2 | 0.005 | 0.3 |
| Polyglycerol-10-mono-oleate | 358 | SMA-2000 ™ | 5.242 | 2.6 | 123.1 | 0.005 | 0.172 |
| Span 20 ™ | 1061 | SMA-2000 ™ | 5.242 | 2.6 | 97.93 | 0.005 | 0.293 |

TABLE 9-continued

Dynamic Light Scattering Characterization of Nanonet Aggregates with Nonionic Surfactants

| Surfactant | Surfactant Aggregate Diameter [nm] (Intensity Mean d) | Polymer | Polymer Aggregate Diamter [nm] | Calculated Polymer Aggregate Diameter [nm] | Nanonet Aggregate Diameter [nm] | Concentration | Poly Dispersity Index (PDI) |
|---|---|---|---|---|---|---|---|
| Triton X-100 ™ | 10.07 | SMA-2000 ™ | 5.242 | 2.6 | 139.7 | 0.00125 | 0.188 |
| Triton X-305 ™ | 10.66 | SMA-2000 ™ | 5.242 | 2.6 | 121.7 | 0.0025 | 0.468 |
| Triton X-45 ™ | 156.3 | SMA-2000 ™ | 5.242 | 2.6 | 90.85 | 0.0025 | 0.201 |
| Tween 20 ™ | 9.173 | SMA-2000 ™ | 5.242 | 2.6 | 97.91 | 0.0025 | 0.389 |
| Tween 40 ™ | 9.691 | SMA-2000 ™ | 5.242 | 2.6 | 133 | 0.0025 | 0.605 |
| Tween 60 ™ | 134.2 | SMA-2000 ™ | 5.242 | 2.6 | 6.555 | 0.00125 | 0.173 |
| Tween 65 ™ | 114.5 | SMA-2000 ™ | 5.242 | 2.6 | 164 | 0.0025 | 0.25 |
| Tween 80 ™ | 10.42 | SMA-2000 ™ | 5.242 | 2.6 | 130 | 0.0025 | 0.416 |
| Tween 85 ™ | 189.8 | SMA-2000 ™ | 5.242 | 2.6 | 9.903 | 0.00125 | 0.4 |
| Apo 10 | 5.835 | SMA-2021 ™ | 6.627 | 3.7 | 8.087 | 0.005 | 0.142 |
| Apo 12 | 82.41 | SMA-2021 ™ | 6.627 | 3.7 | 11.56 | 0.005 | 0.166 |
| Coco Glucoside | 27.32 | SMA-2021 ™ | 6.627 | 3.7 | 13.26 | 0.005 | 0.323 |
| HEGMDDE H370 | 8.218 | SMA-2021 ™ | 6.627 | 3.7 | 10.53 | 0.005 | 0.298 |
| HEGMDE H360 | 6.033 | SMA-2021 ™ | 6.627 | 3.7 | 8.217 | 0.0025 | 0.514 |
| HXEGMDDE H375 | 9.351 | SMA-2021 ™ | 6.627 | 3.7 | 6.601 | 0.005 | 0.309 |
| pGBTM-MNA-C13 | 6.423 | SMA-2021 ™ | 6.627 | 3.7 | 8.065 | 0.005 | 0.104 |
| pGBTEM-MNA-C14 | 7.548 | SMA-2021 ™ | 6.627 | 3.7 | 7.101 | 0.005 | 0.16 |
| nDDTGP D323 | 262.2 | SMA-2021 ™ | 6.627 | 3.7 | 8.654 | 0.0025 | 0.248 |
| nDDDTP D342 | 11.67 | SMA-2021 ™ | 6.627 | 3.7 | 8.19 | 0.0025 | 0.278 |
| OEGMDE O330 | 8.099 | SMA-2021 ™ | 6.627 | 3.7 | 5.706 | 0.005 | 0.27 |
| Polyglycerol-10-mono-laurate | 114.8 | SMA-2021 ™ | 6.627 | 3.7 | 22.34 | 0.005 | 0.238 |
| Polyglycerol-10-mono-oleate | 358 | SMA-2021 ™ | 6.627 | 3.7 | 120.7 | 0.005 | 0.276 |
| Triton X-100 ™ | 10.07 | SMA-2021 ™ | 6.627 | 3.7 | 5.144 | 0.005 | 0.152 |
| Triton X-45 ™ | 156.3 | SMA-2021 ™ | 6.627 | 3.7 | 6.222 | 0.005 | 0.093 |
| Tween 40 ™ | 9.691 | SMA-2021 ™ | 6.627 | 3.7 | 9.262 | 0.005 | 0.337 |
| Tween 60 ™ | 134.2 | SMA-2021 ™ | 6.627 | 3.7 | 8.687 | 0.00125 | 0.317 |
| Tween 80 ™ | 10.42 | SMA-2021 ™ | 6.627 | 3.7 | 10.39 | 0.005 | 0.441 |
| Tween 85 ™ | 189.8 | SMA-2021 ™ | 6.627 | 3.7 | 121.4 | 0.005 | 0.304 |
| Apo 10 | 5.835 | SMA-3000 ™ | 3.713 | 2.8 | 163.1 | 0.005 | 0.252 |
| Apo 12 | 82.41 | SMA-3000 ™ | 3.713 | 2.8 | 221 | 0.005 | 0.293 |
| Coco Glucoside | 27.32 | SMA-3000 ™ | 3.713 | 2.8 | 16.23 | 0.005 | 0.199 |
| Genapol X080 | 10.58 | SMA-3000 ™ | 3.713 | 2.8 | 53.86 | 0.005 | 0.429 |
| HEGMDDE H370 | 8.218 | SMA-3000 ™ | 3.713 | 2.8 | 43.06 | 0.005 | 0.137 |
| HEGMDE H360 | 6.033 | SMA-3000 ™ | 3.713 | 2.8 | 79.51 | 0.005 | 0.457 |
| HXEGMDDE H375 | 9.351 | SMA-3000 ™ | 3.713 | 2.8 | 79.11 | 0.005 | 0.498 |
| DDDM-MNA-C12 | 6.122 | SMA-3000 ™ | 3.713 | 2.8 | 6.911 | 0.005 | 0.151 |
| pGBTM-MNA-C13 | 6.423 | SMA-3000 ™ | 3.713 | 2.8 | 7.306 | 0.005 | 0.212 |
| pGBTEM-MNA-C14 | 7.548 | SMA-3000 ™ | 3.713 | 2.8 | 7.266 | 0.005 | 0.085 |
| nDDDTP D342 | 11.67 | SMA-3000 ™ | 3.713 | 2.8 | 10.04 | 0.005 | 0.241 |
| nDDTGP D323 | 262.2 | SMA-3000 ™ | 3.713 | 2.8 | 201.3 | 0.005 | 0.466 |
| OEGMDE O330 | 8.099 | SMA-3000 ™ | 3.713 | 2.8 | 27 | 0.005 | 0.404 |
| Polyglycerol-10-mono-laurate | 114.8 | SMA-3000 ™ | 3.713 | 2.8 | 20.32 | 0.005 | 0.131 |

TABLE 9-continued

Dynamic Light Scattering Characterization of Nanonet Aggregates with Nonionic Surfactants

| Surfactant | Surfactant Aggregate Diameter [nm] (Intensity Mean d) | Polymer | Polymer Aggregate Diamter [nm] | Calculated Polymer Aggregate Diameter [nm] | Nanonet Aggregate Diameter [nm] | Concentration | Poly Dispersity Index (PDI) |
|---|---|---|---|---|---|---|---|
| Polyglycerol-10-mono-oleate | 358 | SMA-3000 ™ | 3.713 | 2.8 | 218.7 | 0.005 | 0.263 |
| Polyglycerol-10-mono-palmitate | 111.8 | SMA-3000 ™ | 3.713 | 2.8 | 165.4 | 0.0005 | 0.391 |
| Span 20 ™ | 1061 | SMA-3000 ™ | 3.713 | 2.8 | 102.8 | 0.005 | 0.175 |
| Triton X-100 ™ | 10.07 | SMA-3000 ™ | 3.713 | 2.8 | 181.2 | 0.005 | 0.295 |
| Triton X-45 ™ | 156.3 | SMA-3000 ™ | 3.713 | 2.8 | 249 | 0.005 | 0.318 |
| Tween 60 ™ | 114.5 | SMA-3000 ™ | 3.713 | 2.8 | 356.4 | 0.005 | 0.806 |
| Tween 85 ™ | 189.8 | SMA-3000 ™ | 3.713 | 2.8 | 167.8 | 0.005 | 0.422 |
| Apo 12 | 82.41 | SMA-IBE | 9.759 | 5.4 | 11 | 0.005 | 0.31 |
| Coco Glucoside | 27.32 | SMA-IBE | 9.759 | 5.4 | 9.499 | 0.0025 | 0.236 |
| HEGMDDE H370 | 8.218 | SMA-IBE | 9.759 | 5.4 | 8.579 | 0.0025 | 0.189 |
| HEGMDE H360 | 6.033 | SMA-IBE | 9.759 | 5.4 | 11.05 | 0.005 | 0.288 |
| HXEGMDDE H375 | 9.351 | SMA-IBE | 9.759 | 5.4 | 12.07 | 0.005 | 0.278 |
| nDDDTP D342 | 11.67 | SMA-IBE | 9.759 | 5.4 | 13.19 | 0.005 | 0.326 |
| nDDTP D335 | 6.881 | SMA-IBE | 9.759 | 5.4 | 13.2 | 0.005 | 0.311 |
| Polyglycerol-10-mono-oleate | 358 | SMA-IBE | 9.759 | 5.4 | 95.55 | 0.005 | 0.52 |
| Triton X-45 ™ | 156.3 | SMA-IBE | 9.759 | 5.4 | 6.882 | 0.005 | 0.292 |
| Tween 85 ™ | 189.8 | SMA-IBE | 9.759 | 5.4 | 82.56 | 0.00125 | 0.201 |
| Genapol X080 | 10.58 | SMA-725 ™ | 15.03 | 6.8 | 19.55 | 0.005 | 0.319 |
| nDDDTP D342 | 11.67 | SMA-725 ™ | 15.03 | 6.8 | 9.736 | 0.005 | 0.301 |
| nDDTGP D323 | 262.2 | SMA-725 ™ | 15.03 | 6.8 | 12.29 | 0.005 | 0.336 |
| Polyglycerol-10-mono-oleate | 358 | SMA-725 ™ | 15.03 | 6.8 | 240.5 | 0.005 | 0.451 |
| Span 20 ™ | 1061 | SMA-725 ™ | 15.03 | 6.8 | 98.31 | 0.005 | 0.561 |
| HEGMDDE H370 | 8.218 | SMA-725 ™ | 15.03 | 6.8 | 14.64 | 0.0025 | 0.231 |
| HEGMDE H360 | 6.033 | SMA-725 ™ | 15.03 | 6.8 | 11.75 | 0.0025 | 0.111 |
| HXEGMDDE H375 | 9.351 | SMA-725 ™ | 15.03 | 6.8 | 11.44 | 0.005 | 0.437 |
| pGBTEM-MNA-C14 | 7.548 | SMA-725 ™ | 15.03 | 6.8 | 55.4 | 0.005 | 0.429 |
| Polyglycerol-10-mono-palmitate | 111.8 | SMA-725 ™ | 15.03 | 6.8 | 14.62 | 0.0025 | 0.234 |
| Triton X-100 ™ | 10.07 | SMA-725 ™ | 15.03 | 6.8 | 10.5 | 0.005 | 0.475 |
| Triton X-45 ™ | 156.3 | SMA-725 ™ | 15.03 | 6.8 | 14.02 | 0.0025 | 0.328 |
| Tween 65 ™ | 114.5 | SMA-725 ™ | 15.03 | 6.8 | 14.71 | 0.0025 | 0.233 |
| Tween 80 ™ | 10.42 | SMA-725 ™ | 15.03 | 6.8 | 9.102 | 0.005 | 0.608 |
| Apo 10 | 5.835 | SMA-Cumene terminated | 7.123 | 1.5 | 4.232 | 0.005 | 0.14 |
| Apo 12 | 82.41 | SMA-Cumene terminated | 7.123 | 1.5 | 4.923 | 0.005 | 0.266 |
| PFDMP O310F | 23.83 | SMA-Cumene terminated | 7.123 | 1.5 | 4.484 | 0.005 | 0.228 |
| Genapol X080 | 10.58 | SMA-Cumene terminated | 7.123 | 1.5 | 5.366 | 0.005 | 0.25 |
| HEGMDDE H370 | 8.218 | SMA-Cumene terminated | 7.123 | 1.5 | 4.557 | 0.005 | 0.069 |

TABLE 9-continued

Dynamic Light Scattering Characterization of Nanonet Aggregates with Nonionic Surfactants

| Surfactant | Surfactant Aggregate Diameter [nm] (Intensity Mean d) | Polymer | Polymer Aggregate Diamter [nm] | Calculated Polymer Aggregate Diameter [nm] | Nanonet Aggregate Diameter [nm] | Concentration | Poly Dispersity Index (PDI) |
|---|---|---|---|---|---|---|---|
| HEGMDE H360 | 6.033 | SMA-Cumene terminated | 7.123 | 1.5 | 4.55 | 0.005 | 0.398 |
| HXEGMDDE H375 | 9.351 | SMA-Cumene terminated | 7.123 | 1.5 | 5.153 | 0.005 | 0.118 |
| DDDM-MNA-C12 | 6.122 | SMA-Cumene terminated | 7.123 | 1.5 | 4.801 | 0.005 | 0.238 |
| pGBTM-MNA-C13 | 6.423 | SMA-Cumene terminated | 7.123 | 1.5 | 4.561 | 0.005 | 0.237 |
| nDDDTP D342 | 11.67 | SMA-Cumene terminated | 7.123 | 1.5 | 4.652 | 0.005 | 0.224 |
| nDDTGP D323 | 262.2 | SMA-Cumene terminated | 7.123 | 1.5 | 4.424 | 0.005 | 0.221 |
| nDDTP D335 | 6.881 | SMA-Cumene terminated | 7.123 | 1.5 | 4.659 | 0.005 | 0.248 |
| OEGMDE O330 | 8.099 | SMA-Cumene terminated | 7.123 | 1.5 | 4.706 | 0.005 | 0.232 |
| Polyglycerol-10-mono-laurate | 114.8 | SMA-Cumene terminated | 7.123 | 1.5 | 4.869 | 0.005 | 0.248 |
| Polyglycerol-10-mono-oleate | 358 | SMA-Cumene terminated | 7.123 | 1.5 | 127.9 | 0.005 | 0.305 |
| Span 20 ™ | 1061 | SMA-Cumene terminated | 7.123 | 1.5 | 91.93 | 0.005 | 0.292 |
| Triton X-100 ™ | 10.07 | SMA-Cumene terminated | 7.123 | 1.5 | 4.643 | 0.005 | 0.228 |
| Triton X-45 ™ | 156.3 | SMA-Cumene terminated | 7.123 | 1.5 | 5.305 | 0.005 | 0.103 |
| Tween 65 ™ | 114.5 | SMA-Cumene terminated | 7.123 | 1.5 | 4.677 | 0.005 | 0.276 |
| Tween 85 ™ | 189.8 | SMA-Cumene terminated | 7.123 | 1.5 | 8.387 | 0.005 | 0.349 |

TABLE 10

Dynamic Light Scattering Characterization of Nanonet Aggregates with Anionic Surfactants

| Surfactant | Surfactant Aggregate Diameter [nm] (Intensity Mean d) | Polymer | Polymer Aggregate Diamter [nm] | Calculated Polymer Aggregate Diameter [nm] | Nanonet Aggregate Diameter [nm] | Concentration | Poly Dispersity Index (PDI) |
|---|---|---|---|---|---|---|---|
| Stepan Bio-Soft D-40 ™ | 5.13 | DIBMA | 92.7 | 3.2 | 70.62 | 0.005 | 0.5 |
| Lakeland PAE136 | 7.924 | DIBMA | 92.7 | 3.2 | 93.72 | 0.005 | 0.197 |
| Stepan Lathanol LAL ™ | 6.814 | DIBMA | 92.7 | 3.2 | 83.64 | 0.005 | 0.32 |
| n-Decanoyl-L-Threonine | 90.68 | DIBMA | 92.7 | 3.2 | 92.49 | 0.005 | 0.283 |
| n-Dodecanoyl-L-Threonine | 99.77 | DIBMA | 92.7 | 3.2 | 98.7 | 0.005 | 0.259 |

TABLE 10-continued

Dynamic Light Scattering Characterization of Nanonet Aggregates with Anionic Surfactants

| Surfactant | Surfactant Aggregate Diameter [nm] (Intensity Mean d) | Polymer | Polymer Aggregate Diamter [nm] | Calculated Polymer Aggregate Diameter [nm] | Nanonet Aggregate Diameter [nm] | Concentration | Poly Dispersity Index (PDI) |
|---|---|---|---|---|---|---|---|
| n-Decanoyl-L-Methionine | 85.47 | DIBMA | 92.7 | 3.2 | 95.33 | 0.005 | 0.246 |
| n-Dodecanoyl-L-Methionine | 2.312 | DIBMA | 92.7 | 3.2 | 104.2 | 0.005 | 0.34 |
| Stepan Ninate 411 ™ | 216.2 | DIBMA | 92.7 | 3.2 | 163.6 | 0.005 | 0.196 |
| n-Octanoyl-L-Methionine | 116.6 | DIBMA | 92.7 | 3.2 | 95 | 0.005 | 0.3 |
| Stepan Mild L3 ™ | 372.9 | DIBMA | 92.7 | 3.2 | 92.22 | 0.005 | 0.185 |
| Stepan Bio-Terge AS-40 ™ | 6.434 | SMA 2000 ™ | 5.242 | 2.6 | 132.7 | 0.0025 | 0.452 |
| Stepan Bio-Soft D-40 ™ | 5.13 | SMA 2000 ™ | 5.242 | 2.6 | 132.5 | 0.0025 | 0.354 |
| Dodecane-1-sulfonic acid sodium salt | 5.108 | SMA 2000 ™ | 5.242 | 2.6 | 8.054 | 0.000625 | 0.454 |
| Lakeland PAE 136 | 7.924 | SMA 2000 ™ | 5.242 | 2.6 | 143 | 0.0025 | 0.203 |
| Stepan Lathanol LAL ™ | 6.814 | SMA 2000 ™ | 5.242 | 2.6 | 6.541 | 0.005 | 0.153 |
| n-Decanoyl-L-Methionine | 85.47 | SMA 2000 ™ | 5.242 | 2.6 | 82.64 | 0.00125 | 0.399 |
| n-Dodecanoyl-L-Methionine | 2.312 | SMA 2000 ™ | 5.242 | 2.6 | 5.89 | 0.0025 | 0.203 |
| n-Decanoyl-L-Threonine | 90.68 | SMA 2000 ™ | 5.242 | 2.6 | 152.4 | 0.00125 | 0.347 |
| n-Dodecanoyl-L-Histidine | 99.96 | SMA 2000 ™ | 5.242 | 2.6 | 94.7 | 0.005 | 0.288 |
| Stepan Mild L3 ™ | 372.9 | SMA 2000 ™ | 5.242 | 2.6 | 58.51 | 0.0025 | 0.494 |
| n-Dodecanoyl-L-Threonine | 99.77 | SMA 2000 ™ | 5.242 | 2.6 | 124.6 | 0.005 | 0.302 |
| Sodium dodecylbenzene sulfonate | 4.235 | SMA 2000 ™ | 5.242 | 2.6 | 2.775 | 0.005 | 0.458 |
| Stepan Ninate 411 ™ | 216.2 | SMA 2000 ™ | 5.242 | 2.6 | 131.4 | 0.0025 | 0.435 |
| Stepan SLL-FB ™ | 136.3 | SMA 2000 ™ | 5.242 | 2.6 | 147.7 | 0.0025 | 0.312 |
| Stepan Sulfonic acid ™ | 2.821 | SMA 2000 ™ | 5.242 | 2.6 | 5.508 | 0.0025 | 0.416 |
| Sodium dodecane-1-sulfonic acid salt | 5.108 | SMA 2021 ™ | 6.627 | 3.7 | 8.378 | 0.0025 | 0.361 |
| Lakeland PAE 136 ™ | 7.924 | SMA 2021 ™ | 6.627 | 3.7 | 6.351 | 0.0025 | 0.235 |
| Stepan Lathanol LAL ™ | 6.814 | SMA 2021 ™ | 6.627 | 3.7 | 4.209 | 0.005 | 0.393 |
| n-Decanoyl-L-Methionine | 85.47 | SMA 2021 ™ | 6.627 | 3.7 | 8.205 | 0.0025 | 0.341 |
| Cedepal TD-403 MFLD ™ | 6.421 | SMA 2021 ™ | 6.627 | 3.7 | 7.653 | 0.0025 | 0.311 |
| Stepan Mild L3 ™ | 372.9 | SMA 2021 ™ | 6.627 | 3.7 | 4.174 | 0.0025 | 0.42 |
| n-Dodecanoyl-L-Methionine | 2.312 | SMA 2021 ™ | 6.627 | 3.7 | 7.181 | 0.0025 | 0.406 |
| n-Decanoyl-L-Methionine | 85.47 | SMA 3000 ™ | 3.713 | 2.8 | 173.2 | 0.005 | 0.179 |
| n-Dodecanoyl-L-Methionine | 2.312 | SMA 3000 ™ | 3.713 | 2.8 | 185.3 | 0.005 | 0.24 |
| n-Decanoyl-L-Threonine | 90.68 | SMA 2021 ™ | 6.627 | 3.7 | 129.3 | 0.0025 | 0.41 |
| n-Dodecanoyl-L-Threonine | 99.77 | SMA 2021 ™ | 6.627 | 3.7 | 8.825 | 0.005 | 0.332 |
| Sodium dodecylbenzene sulfonate | 4.235 | SMA 2021 ™ | 6.627 | 3.7 | 6.732 | 0.005 | 0.147 |
| Stepan Ninate 411 ™ | 216.2 | SMA 2021 ™ | 6.627 | 3.7 | 27.73 | 0.005 | 0.397 |

TABLE 10-continued

Dynamic Light Scattering Characterization of Nanonet Aggregates with Anionic Surfactants

| Surfactant | Surfactant Aggregate Diameter [nm] (Intensity Mean d) | Polymer | Polymer Aggregate Diamter [nm] | Calculated Polymer Aggregate Diameter [nm] | Nanonet Aggregate Diameter [nm] | Concentration | Poly Dispersity Index (PDI) |
|---|---|---|---|---|---|---|---|
| Stepan SLL-FB ™ | 136.3 | SMA 2021 ™ | 6.627 | 3.7 | 8.91 | 0.005 | 0.151 |
| Stepan Sulfonic acid ™ | 2.821 | SMA 2021 ™ | 6.627 | 3.7 | 7.86 | 0.005 | 0.153 |
| Lakeland PAE 136 | 7.924 | SMA 3000T ™ | 3.713 | 2.8 | 127.7 | 0.005 | 0.153 |
| n-Dodecanoyl-L-Threonine | 99.77 | SMA 3000T ™ | 3.713 | 2.8 | 126.3 | 0.005 | 0.155 |
| Stepan Ninate | 216.2 | SMA 3000T ™ | 3.713 | 2.8 | 104.6 | 0.005 | 0.269 |
| Stepan Mild L3 ™ | 372.9 | SMA 3000T ™ | 3.713 | 2.8 | 139.1 | 0.005 | 0.233 |
| Stepan SLL-FB ™ | 136.3 | SMA 3000T ™ | 3.713 | 2.8 | 7.09 | 0.005 | 0.24 |
| Stepan Sulfonic acid ™ | 2.821 | SMA 3000T ™ | 3.713 | 2.8 | 178.8 | 0.005 | 0.381 |
| n-Decanoyl-L-Methionine | 85.47 | SMA IBE | 9.759 | 5.4 | 14.43 | 0.005 | 0.29 |
| n-Dodecanoyl-L-Methionine | 2.312 | SMA IBE | 9.759 | 5.4 | 13.37 | 0.005 | 0.323 |
| Stepan Mild L3 ™ | 372.9 | SMA IBE | 9.759 | 5.4 | 13.98 | 0.005 | 0.29 |
| Stepan SLL-FB ™ | 136.3 | SMA IBE | 9.759 | 5.4 | 13.59 | 0.005 | 0.3 |
| Amin GCK30H | 7.286 | SMA 725 ™ | 15.03 | 6.8 | 126.6 | 0.00125 | 0.65 |
| Stepan Bio-Terge AS-40 ™ | 6.434 | SMA 725 ™ | 15.03 | 6.8 | 131.1 | 0.00125 | 0.689 |
| n-Dodecanoyl-L-Histidine | 99.96 | SMA 725 ™ | 15.03 | 6.8 | 92.95 | 0.00125 | 0.555 |
| Stepan Lathanol LAL ™ | 6.814 | SMA 725 ™ | 15.03 | 6.8 | 122.7 | 0.0025 | 0.647 |
| n-Decanoyl-L-Methionine | 85.47 | SMA 725 ™ | 15.03 | 6.8 | 107.2 | 0.0025 | 0.538 |
| n-Dodecanoyl-L-Methionine | 2.312 | SMA 725 ™ | 15.03 | 6.8 | 124.3 | 0.005 | 0.692 |
| Sodium dodecane-1-sulfonic acid salt | 5.108 | SMA 725 ™ | 15.03 | 6.8 | 126 | 0.005 | 0.682 |
| Lakeland PAE 136 | 7.924 | SMA 725 ™ | 15.03 | 6.8 | 132.1 | 0.0025 | 0.658 |
| n-Dodecanoyl-L-Threonine | 99.77 | SMA 725 ™ | 15.03 | 6.8 | 126.1 | 0.005 | 0.687 |
| Stepan Mild L3 ™ | 372.9 | SMA 725 ™ | 15.03 | 6.8 | 102.9 | 0.0025 | 0.601 |
| Stepan SLL-FB ™ | 136.3 | SMA 725 ™ | 15.03 | 6.8 | 99.11 | 0.0025 | 0.577 |
| Lakeland PAE 136 | 7.924 | SMA Cumene terminated | 7.123 | 1.5 | 4.65 | 0.005 | 0.232 |
| n-Dodecanoyl-L-Threonine | 99.77 | SMA Cumene terminated | 7.123 | 1.5 | 4.464 | 0.005 | 0.235 |
| Stepan Mild L3 ™ | 372.9 | SMA Cumene terminated | 7.123 | 1.5 | 4.621 | 0.005 | 0.236 |
| Stepan SLL-FB ™ | 136.3 | SMA Cumene terminated | 7.123 | 1.5 | 4.551 | 0.005 | 0.229 |
| n-Decanoyl-L-Methionine | 85.47 | SMA Cumene terminated | 7.123 | 1.5 | 3.699 | 0.005 | 0.288 |
| n-Dodecanoyl-L-Methionine | 2.312 | SMA Cumene terminated | 7.123 | 1.5 | 3.903 | 0.005 | 0.122 |
| n-Dodecanoyl-L-Histidine | 99.96 | SMA Cumene terminated | 7.123 | 1.5 | 83.07 | 0.0025 | 0.403 |

Gel Permeation Chromatography (GPC)

The polymer molecular weight distribution analysis of commercially available poly(styrene-co-maleic anhydride) polymers were determined by gel permeation chromatography (GPC) on a Viscotek GPCmax VE-2001 using a conventional calibration of polystyrene standards at 2 mg/mL using tetrahydrofuran (THF) as eluent at 1 mL/min. Before injection, the samples were filtered using a 0.22 μm Nylon filter. The measurements were carried out by GreenCentre Canada.

TABLE 11

Molecular Weight Distribution Data (Mn, Mw, Mz, Mp, Đ) of Different Polymer Samples

|  | SMA-725 ™ | SMA-2000 ™ | SMA-2021 ™ | SMA-3000 ™ | SMA-Cumene terminated |
|---|---|---|---|---|---|
| Mn (Daltons) | 48,216 | 3,268 | 10,029 | 4,667 | 3,983 |
| $M_w$ (Daltons) | 97,987 | 5,793 | 23,727 | 8,767 | 7,708 |
| $M_z$ (Daltons) | 170,089 | 9,020 | 84,311 | 14,042 | 12,598 |
| $M_p$ (Daltons) | 81,853 | 4,839 | 17,096 | 7,648 | 6,486 |
| Đ (Mw/Mn) | 2.032 | 1.773 | 2.366 | 1.879 | 1.935 |

Nanonet Formation Experiment—Method #1

To each well of a 96 well plate was added 200 ppm of 2% polymer stock solution followed by addition of a 1% surfactant stock solution selected from one of the following six concentrations (1000 ppm, 500 ppm, 250 ppm, 125 ppm, 50 ppm, and 0 ppm). The polymer and surfactant mixture were diluted in deionized water to a final volume of 200 μL in each well. To the mixture was added 10 μL of 12M hydrochloric acid (HCl) as precipitation agent. Nanonet formation was observed based on degree of turbidity of the mixture in each well. The degree of turbidity (an indicator of nanonet formation) was determined by absorbance measurements at 540 nm on a Molecular Devices-SPECTRAmax M2. Each surfactant and polymer combination was run in triplicate.

Nanonet Formation Efficiency—Method #2

Method #2 describes the nanonet complexation efficiency of Triton™ X-containing surfactants (Triton™ X-100, Triton™ X-305, and Triton™ X-45) with SMA-containing polymers (SMA-725™, SMA-2000™, SMA-2021™, SMA-3000™). The purpose was to identify the surfactant loading capacity of the polymer and to study the effect of the length of polymer. For the range of surfactant concentrations employed, a two-fold ratio of the Nanonet formation factor (Nt) for each selected surfactant and selected polymer was used. A total of six concentrations were selected. The Nanonet formation factor (Nt) were calculated by method #4 and are highlighted below. For each titration, the polymer concentration was 400 ppm (20 μL).

Nanonet Titration:

Titration of surfactant and polymer at given concentrations (see below) was performed using 1.5 mL centrifuge tubes, followed by dilution in deionized water to a final volume of 1.0 mL. The resulting nanonet was obtained by the addition of 10 μL 12M HCl. The titration was performed in triplicate. In addition, a surfactant control in deionized water and a separate control containing a mixture of surfactant and HCl were prepared. A portion (ca. 200 μL) of the prepared nanonet, surfactant control, and surfactant control with HCl were transferred into a 96-well plate and the absorption was measured at 540 nm. The remaining solution of the prepared nanonets, surfactant control with and without acid were sedimented using a Sigma™ 4-16 centrifuge at 2300 rpm (816 rcf) for 10 min. The supernatant (ca. 200 μL) was transferred into a 96-well UV plate and the absorption was measured at 280 nm. An average of the absorption values was recorded.

These are the following surfactant and polymer concentrations employed: SMA-2000™ (400 ppm, 20 μL), Triton™ X-100 (1000, 500, 250, 100, 64.8, 0 ppm); SMA-725™ (400 ppm, 20 μL), Triton™ X-100 (1000, 500, 295.16, 250, 100, 0 ppm); SMA-3000™ (400 ppm, 20 μL), Triton™ X-100 (1000, 500, 250, 100, 13.4, 0 ppm); SMA-2021™ (400 ppm, 20 μL), Triton™ X-100 (1000, 500, 250, 91.22, 0 ppm).

SMA-2000™ (400 ppm, 20 μL), Triton™ X-305 (1000, 500, 250, 231.58, 100, 0 ppm); SMA-725™ (400 ppm, 20 μL), Triton™ X-305 (1000, 500, 473.76, 250, 100, 0 ppm); SMA-3000™ (400 ppm, 20 μL), Triton™ X-305 (1000, 500, 447.88, 250, 100, 0 ppm); SMA-2021™ (400 ppm, 20 μL), Triton™ X-305 (1000, 500, 436.88, 250, 100, 0 ppm).

SMA-2000™ (400 ppm, 20 μL), Triton™ X-45 (1000, 616.18, 500, 250, 100, 0 ppm); SMA-725™ (400 ppm, 20 μL), Triton™ X-45 (1000, 500, 250, 100, 92.92, 0 ppm); SMA-3000™ (400 ppm, 20 μL), Triton™ X-45 (1000, 500, 250, 99.7, 0 ppm); SMA-2021™ (400 ppm, 20 μL), Triton™ X-305 (1000, 500, 250, 158.4, 100, 0 ppm).

$Zn^{2+}$ and $Cu^{2+}$ Metal Ion Removal from Seawater-Method #3

Surfactant and hydrolyzed polymer solutions in deionized water were mixed into 96-well plates to give a total of 1 mL 0.5% nanonet library stock solutions. 199 different nanonets were prepared. Each well of a 96-well plate contained a unique 1 mL nanonet solution.

Colorimetric Determination of Zinc and Copper Concentrations Using Zincon:

As proof of principle of the optimized nanonet library, seawater was spiked with 10 ppm of Zinc or Copper and treated with nanonets. The treatment procedure was as follows. To prepare the metal spiked seawater solutions, a volume of 175 μL of the 100 nM $Zn^{2+}$ solution (28,765 ppm $Zn^{2+}$) or 315 μL of the 100 nM $Cu^{2+}$ solution was added to 500 mL seawater, yielding a 10.07 ppm $Zn^{2+}$ and 10.03 ppm $Cu^{2+}$ solution, respectively. A volume of 960 μL of this sample was then treated with 40 μL of each optimized nanonet library solution (Table 9 and Table 10). As a positive control for metal removal, separate 960 uL aliquots of the metal spiked seawater samples were treated with 40 μL of 1% NaOH solution to precipitate the Zn or Cu as hydroxides. To ensure metal stability in the seawater, additional 960 uL aliquots of the metal spiked seawater solutions were also mixed with 40 uL distilled water. The solutions were individually mixed and each centrifuged (1,000×g) for approximately 5 minutes to sediment precipitated nanonets. Five μL of the supernatant was analyzed applying the method for $Zn^{2+}$ and $Cu^{2+}$ metal ion removal.

Preparation of Calibration Curves for Method #3
Preparation of Calibration Standards For dissolved $Zn^{2+}$ metal ion, the calibration standards were prepared in 0.10, 0.26, 0.52, 1.03, 1.75, 2.52 ppm concentrations, and for dissolved $Cu^{2+}$, the calibration standards were prepared in 0.10, 0.25, 0.5, 1.0, 1.74, 2.49 ppm concentrations.

Preparation of Calibration Curves for Dissolved $Zn^{2+}$ and $Cu^{2+}$

Into one set of 1.5 mL conical centrifuge tubes, 25 μL aliquots of the $Zn^{2+}$ calibration standard solutions were added. Into another set of 1.5 mL conical centrifuge tubes, 25 μL aliquots of the $Cu^{2+}$ calibration standard solutions were added. To both sets of tubes, 950 μL of boric acid buffer pH 9 were added and the tubes were mixed followed by the addition of 25 μL of 1.6 M Zincon solution (75% dye content). The solutions were mixed and allowed to sit for 5 minutes. Aliquots of 200 μL of the samples were transferred into 96-well flat bottom plates suitable for visible spectrophotometry and the samples were measured at 615 nm. Separate calibration curves were constructed for $Zn^{2+}$ and $Cu^{2+}$.

Preparation of Calibration Curves for Iron Removal

The following procedure is based upon M. J. Verschoor, L. A. Molot, *Limnol. Oceanogr-Meth.*, (2013), 11, 113-125. A Comparison of Three Colorimetric Methods of Ferrous and Total Reactive Iron Measurement in Freshwaters. (doi: 10.4319/lom.2013.11.113). The procedure therein was modified and adapted to quantify total and dissolved iron in water samples. Solutions of 20,000 ppm $Fe^{2+}$, 10% ascorbic acid and 2.5 mg/mL ferrozine were prepared in water. The 20,000 ppm $Fe^{2+}$ solution was diluted to appropriate concentrations to prepare the calibration standards. Both $Fe^{2+}$ and $Fe^{3+}$ were quantitated using the calibration curve prepared for $Fe^{2+}$ in the range of 0.1-2.0 ppm in deionized water.

Preparation of Calibration Standards

The calibration standards were prepared in 0.10, 0.25, 0.50, 1.0 and 2.50 ppm concentrations by serial dilutions of the 20,000 ppm $Fe^{2+}$ stock solution with deionized water.

Preparation of Calibration Curve

Into 1.5 mL conical centrifuge tubes were added 1 mL of the $Fe^{2+}$ calibration standards and 100 μL of 10% ascorbic acid. The solutions were mixed and allowed to sit for 10 minutes. Twenty-five μL of the 2.5 mg/mL ferrozine solution was added and the samples were allowed to sit for 10 min. Aliquots of 200 μL of the samples were transferred to into 96-well flat bottom plates suitable for visible spectrophotometry and analyzed at 562 nm.

The same procedure was applied to measuring total iron and dissolved iron concentrations.

Residual $Zn^{2+}$ and $Cu^{2+}$ concentrations were analyzed by through colorimetric determination by complexation with Zincon. The Zincon method is adapted from a procedure described in (E. Sabel, J. M. Neureuther, S. Siemann. *Anal. Biochem.*, (2010), 397, 2, 218-226, (doi: 10.1016/j.ab.2009.10.037). A Spectrophotometric Method for the Determination of Zinc, Copper, and Cobalt ions in metalloproteins using Zincon Crystal). The procedure disclosed therein was modified and adapted to quantify dissolved $Zn^{2+}$ and $Cu^{2+}$ metal ions in water samples Theoretical Calculations—Method #4:

The coprecipitation of 7 hydrolyzed polymers and 58 surfactants with varying concentrations resulted in nanonets with various degree of turbidity. The turbidity was measured and the rise in absorption values was modelled as surfactant was added to polymer. First baseline absorption values ap and as were calculated, which were estimated as linear functions of concentration for a given polymer or surfactant when measured alone. Then baseline-corrected absorption values (A') were calculated by subtracting ap and as from raw absorption values A, i.e. A'=A−as−ap.

For each combination of polymer and surfactant, a curve A'(S, P0) was constructed, where S is a varying concentration of surfactant and P0 is a fixed concentration of polymer. The peak of this curve was identified and a sigmoid was fit to the pre-peak section of the curve (R, optim function). The estimated sigmoid coefficient allowed quantification of the peak height, transition midpoint, and transition rate.

For a given combination of one surfactant and one polymer, nanonet formation was defined as any sigmoid fit with height greater than 0.2. Further, any sigmoids with midpoint past 500 ppm were removed, as the titration ended at 1000 ppm and the sigmoid curve required at least 3 data points to be a valid curve. Visual inspection confirmed that the sigmoid fits of A' were a useful method to detect nanonet formation. In total, optimized nanonets occurring between 199 out of 434 possible surfactant and polymer combinations (62*7) were detected.

Synthesis of Surfactants

Nuclear magnetic resonance (NMR) spectra were performed in the GreenCentre Canada facilities. $^1H$ and $^{13}C\{^1H\}$ NMR spectra were recorded on a Varian™ 400 MHz spectrometer at room temperature. Chemical shifts are reported in part per million (ppm) using tetra-methyl silane (TMS) as standard [$^1H$ (CDCl$_3$: 7.26 ppm; DMSO-d$_6$: 2.50 ppm] and $^{13}C$ [CDCl$_3$: 77.16 ppm; DMSO-d$_6$: 39.52 ppm]. Multiplicity of chemical shifts reported as follows: s=singlet, d=doublet, dd=doublet of doublets, t=triplet, m=multiplet, and br=broad. NMR spectra were processed using MestReNova software. Fourier Transform Infrared Spectroscopy (FTIR) spectra were recorded on an Agilent Cary 630 FTIR Spectrometer equipped with a diamond ATR (attenuated total reflectance) and a ZnSe window with a spectral range of 650-4000-cm$^{-1}$. The synthetic route of N-Dodecanoyl-L-Methionine is referenced in (3) G. Bonacucina et al. Colloids and Surfaces A: Physicochem. Eng. Aspects, 2016, 492, 38-46. Chemical-Physical Properties and Cytotoxicity of N-Decanoyl Amino Acid-Based Surfactants: Effect of Polar Heads.

Synthesis of N-Dodecanoyl-L-Methionine

To a 100 mL round-bottom flask with a magnetic stir bar, were added methionine (1.50 g, 10 mmol), H$_2$O (20 mL), and Na$_2$CO$_3$ (1.57 g, 15 mmol). THF (10 mL) was added and the mixture turned cloudy. n-Dodecanoyl chloride (3.0 mL, 13 mmol) was added dropwise and the mixture was stirred at room temperature for 4 h. After the stated time, THF was evaporated under reduced pressure and the reaction mixture was acidified until pH 2.0 (with 2 N HCl). A precipitate was formed and filtered using a Buchner funnel, with #2 filter paper and washed with water (3×10 mL), and acetone (about 5-10 mL). The solid was dried in a vacuum oven at 40° C., overnight. The solid was recrystallized from hexanes. Then, the precipitate was filtered and washed with hexanes (3×10 mL), to afford pure product, as a white solid (1.786 g, 54% yield). $^1H$ NMR (400 MHz, CDCl$_3$) δ 6.83 (d, J=7.6 Hz, 1H, NHCO), 4.57 (dd, J=12.4, 4.8 Hz, 1H), 2.54 (t, J=7.6 Hz, 2H), 2.23 (t, J=7.6 Hz, 2H), 2.19-2.13 (m, 1H), 2.09 (s, 3H), 2.04-1.95 (m, 1H), 1.63-1.56 (m, 2H), 1.31-1.25 (m, 15H), 0.87 (t, J=6.8 Hz, 3H). $^{13}C$ NMR (100 MHz, CDCl$_3$) δ 175.7 (COOH), 174.7 (CONN), 52.3 (HC—NH), 36.6 (O=C—CH$_2$), 32.0 (O=C—CH$_2$—CH$_2$), 31.2 (CH$_2$), 30.3 (CH$_2$), 29.8 (CH$_2$), 29.7 (CH$_2$), 29.7 (CH$_2$), 29.5 (CH$_2$), 29.5 (CH$_2$), 29.4 (CH$_2$), 25.8 (CH$_2$), 22.8 (CH$_2$), 15.6 (SCH$_2$), 14.3 (CH$_3$); FT-IR (ATR, cm$^{-1}$): 3303, 2938, 2916, 2849, 1702, 1706, 1646, 1535, 1419, 1226, 685.

Synthesis of N-Decanoyl-L-Methionine

To a 100 ml round-bottom flask with a magnetic stir bar, were added methionine (1.50 g, 10 mmol), $H_2O$ (20 mL) and $Na_2CO_3$ (1.6 g, 15 mmol). Upon addition of THF (10 mL) to the reaction mixture a cloudy solution formed, n-Decanoyl chloride (2.7 mL, 13 mmol) was added dropwise and the mixture was stirred at room temperature for 4 h. The solvent THF was evaporated under reduced pressure and the reaction mixture was acidified until pH 2.0 (with 2 N HCl). At pH 3-4, some precipitate was observed at pH 2 an oil on top of reaction mixture was formed. The reaction mixture was extracted with hexanes (30 mL), and EtOAc (ethyl acetate) (2×20 mL). The organic phases were combined and the solvent was removed under reduced pressure. An oil was isolated and stored in the fridge until a solid was obtained. The solid was recrystallized in hexanes, filtered and washed with hexanes (3×10 mL), to afford a pure colourless solid (2.516 g, 83% yield). $^1$H NMR (400 MHz, $CDCl_3$) δ 10.18 (br, 1H), 6.55 (d, J=7.6 Hz, 1H, NHCO), 4.71 (dd, J=12.8, 5.6 Hz, 1H), 2.55 (t, J=7.4 Hz, 2H), 2.36 2.17 (m, 3H), 2.10 (s, 3H), 2.08-1.99 (m, 1H), 1.68-1.58 (m, 2H), 1.28-1.25 (m, 12H), 0.87 (t, J=6.8 Hz, 3H). $^{13}$C NMR (100 MHz, $CDCl_3$) δ 175.1 (COOH), 174.7 (CONN), 51.9 (HC—NH), 36.6 (O═C—$CH_2$), 32.0 (O═C—$CH_2$—$CH_2$), 31.2 ($CH_2$), 30.1 ($CH_2$), 29.6 ($CH_2$), 29.4 ($CH_2$), 29.4 ($CH_2$), 29.3 ($CH_2$), 29.3 ($CH_2$), 25.8 ($CH_2$), 22.8 ($CH_2$), 15.5 ($SCH_2$), 14.2 ($CH_3$); FT-IR (ATR, $cm^{-1}$): 3314, 2916, 2849, 1706, 1650, 1535, 1441, 1419, 1255, 1229, 920, 685.

Synthesis of N-Octanoyl-L-Methionine

To a 100 ml round-bottom flask with a magnetic stir bar, were added methionine (1.50 g, 10 mmol), $H_2O$ (20 mL), and $Na_2CO_3$ (1.6 g, 15 mmol). Upon addition of THF (10 mL) to the reaction mixture a cloudy solution formed. n-Octanoyl chloride (2.2 mL, 13 mmol) was added dropwise and the mixture was stirred at ambient temperature for 4 h. The solvent THF was evaporated under reduced pressure on a Schlenk line and the reaction mixture was acidified until pH 2.0 (with 2 N HCl). An oil on top of reaction mixture was formed. The reaction mixture was extracted with EtOAc (3×20 mL). The organic phases were combined and the solvent was removed under reduced pressure. An oil was obtained and stored inside the fridge to solidify. The solid was recrystallized in hexanes, filtered, and washed with hexanes (3×10 mL), to afford a pure colourless solid (1.194 g, 43% yield). $^1$H NMR (400 MHz, $CDCl_3$) δ 10.54 (br, 1H), 6.58 (d, J=7.6 Hz, 1H, NHCO), 4.70 (dd, J=12.6, 5.0 Hz, 1H), 2.54 (t, J=7.4 Hz, 2H), 2.25 (t, J=7.6 Hz, 2H), 2.21-2.17 (m, 1H), 2.09 (s, 3H), 2.08-2.00 (m, 1H), 1.63-1.60 (m, 2H), 1.28-1.25 (m, 8H), 0.86 (t, J=6.6 Hz, 3H). $^{13}$C NMR (100 MHz, $CDCl_3$) δ 175.0 (COOH), 174.7 (CONN), 51.9 (HC—NH), 36.5 (O═C—$CH_2$), 31.8 (O═C—$CH_2$—$CH_2$), 31.2 ($CH_2$), 30.1 ($CH_2$), 29.2 ($CH_2$), 29.1 ($CH_2$), 25.7 ($CH_2$), 22.7 ($CH_2$), 15.5 ($SCH_2$), 14.2 ($CH_3$); FTIR (ATR, $cm^{-1}$): 3329, 2942, 2919, 2856, 1698, 1612, 1549, 1445, 1248, 1225, 1188, 1128, 957.

Synthesis of N-Dodecanoyl-L-Histidine

To a 100 mL round-bottom flask with a magnetic stir bar, histidine (1.55 g, 10 mmol), $H_2O$ (20 mL), and $Na_2CO_3$ (1.38 g, 13 mmol) were added followed by the addition of THF (10 mL). The reaction mixture was cooled down to 0° C. Upon which the mixture turned cloudy. N-dodecanoyl chloride (2.5 mL, 11 mmol) was added dropwise and the mixture was stirred at ambient temperature overnight. Before complete addition of acyl chloride, the solution became cloudy and viscous (gel-like). After 4 h of reaction, the solvent THF was evaporated under reduced pressure and the reaction mixture was acidified until pH 2.0 (with 2 N HCl). The precipitate was filtered and washed with acetone (3×5 mL) and $CHCl_3$ (3×5 mL). The $^1$H NMR spectrum of the crude product showed residual dodecanoic acid, and the crude was recrystallization in 95% EtOH. The solids were filtered and washed with 95% EtOH. The colourless solid obtained was contaminated with about 12% dodecanoic acid (1.197 g, about 35% yield). $^1$H NMR (400 MHz, DMSO-$d_6$): δ 8.01 (d, J=7.6 Hz, 1H, NHCO), 7.54 (s, 1H, N═CHN), 6.78 (s, 1H, NCH═), 4.41-4.35 (m, 1H, NCHCOOH), 2.94-2.77 (m, 2H, $CH_2$), 2.05 (t, J=7.4 Hz, 2H, $COCH_2$), 1.41-1.38 (m, 2H), 1.27-1.20 (m, 16H, $CH_2$), 0.85 (t, J=6.8 Hz, 3H, $CH_3$). $^{13}$C NMR (100 MHz, DMSO-$d_6$): δ 173.3 (COOH), 172.1 (CONN), 134.7 (NC═N), 52.1 (HC—NH), 35.2 (O═C—$CH_2$), 31.4 (O═C—$CH_2$—$CH_2$), 29.1 ($CH_2$), 29.1 ($CH_2$), 29.0 ($CH_2$), 28.9 ($CH_2$), 28.8 ($CH_2$), 28.6 ($CH_2$), 25.2 ($CH_2$), 22.1 ($CH_2$), 14.0 ($CH_3$); FTIR (ATR, $cm^{-1}$): 3329, 3146, 2945, 2919, 2852, 1639, 1546, 1397, 1184, 983, 834, 685.

Synthesis of N-Dodecanoyl-L-Threonine

To a 100 mL round-bottom flask with a magnetic stir bar, were added threonine (1.20 g, 10 mmol), $H_2O$ (20 mL), and $Na_2CO_3$ (1.60 g, 15 mmol) Then, THF (10 mL) was added and the mixture turned cloudy. n-dodecanoyl chloride (3.0 mL, 13 mmol) was added dropwise and the mixture was stirred at ambient temperature for 4 h. The solvent THF was evaporated under reduced pressure and the reaction mixture was acidified until pH 2.0 (with 2 N HCl). The colourless precipitate was filtered and washed with deionized water (3×10 mL) and dried in a vacuum oven at 40° C. for 3 days. The colourless solid (1.10 g, 36%) was purified by recrystallization from hexanes. $^1$H NMR (400 MHz, DMSO-$d_6$): δ 7.75 (d, J=8.8 Hz, 1H, NHCO), 4.20 (dd, J=8.8, 3.2 Hz, 1H, CH—NH), 4.13-4.07 (m, 1H, CH—OH), 2.26-2.11 (m, 2H, O═C—$CH_2$), 1.49-1.46 (m, 2H, $CH_2$), 1.23 (m, 15H, $CH_2$), 1.04 (d, J=6.4 Hz, 3H, CHOH—$CH_3$), 0.85 (t, J=6.8 Hz, 3H, $CH_3$); $^{13}$C NMR (100 MHz, DMSO-$d_6$): δ 172.7 (COOH), 172.4 (CONN), 66.5 (HC—OH), 57.4 (HC—NH), 35.1 (O═C—$CH_2$), 32.0 (O═C—$CH_2$—$CH_2$), 29.1 ($CH_2$), 29.0 ($CH_2$), 28.9 ($CH_2$), 28.8 ($CH_2$), 28.7 ($CH_2$), 25.4 ($CH_2$), 22.5 ($CH_2$), 20.5 (HOHC—$CH_3$), 14.1 ($CH_3$); FTIR (ATR, $cm^{-1}$): 3426, 3362, 3314, 2942, 2919, 2852, 1709, 1612, 1605, 1538, 1463, 1385, 1382, 1207, 1151, 1088, 871, 674.

Synthesis of N-Decanoyl-L-Threonine

To a 100 ml round-bottom flask with a magnetic stir bar, were added threonine (1.20 g, 10 mmol), $H_2O$ (20 mL) and NaOH (0.6 g, 15 mmol). Then, THF (10 mL) was added. followed by the dropwise addition of n-decanoyl chloride (2.7 mL, 13 mmol) and the mixture was stirred at ambient temperature overnight. A suspension was obtained and the solvent THF was evaporated under reduced pressure and the reaction mixture was acidified until pH 2 (with 2 N HCl). No precipitate was observed. The reaction mixture was extracted with EtOAc (3×20 mL). The organic phases were combined and the solvent removed under reduced pressure. An oil was obtained and purified using a short plug of silica, eluted with Hex/EtOAc 6:4 to remove decanoic acid, and then with EtOAc, to remove the product, a colourless solid (1.326 g, 49% yield). $^1$H NMR (400 MHz, $CDCl_3$): δ 7.00 (d, J=8.8 Hz, 1H, NHCO), 4.54 (d, J=6.4 Hz, 1H, CH—NH), 4.43-4.41 (m, 1H, CH—OH), 2.29 (t, J=7.6 Hz, 2H, O═C—$CH_2$), 1.64-1.60 (m, 2H, $CH_2$), 1.28-1.25 (m, 15H, $CH_2$), 1.20 (d, J=6.4 Hz, 3H, CHOH—$CH_3$), 0.87 (t, J=6.6 Hz, 3H, $CH_3$); $^{13}$C NMR (100 MHz, $CDCl_3$): δ 175.5 (COOH), 174.3 (CONN), 67.7 (HC—OH), 57.8 (HC—NH), 36.5 (O═C—$CH_2$), 32.0 (O═C—$CH_2$—$CH_2$), 32.0 ($CH_2$), 29.7 ($CH_2$), 29.7 ($CH_2$), 29.6 ($CH_2$), 29.5 ($CH_2$), 29.4 ($CH_2$), 29.4 ($CH_2$), 25.9 ($CH_2$), 22.8 ($CH_2$), 19.6 (HOHC—$CH_3$), 14.2 (CH$_3$); FTIR (ATR, cm$^{-1}$): 3426, 3363, 3314, 2938, 2919, 2852, 1709, 1616, 1605, 1538, 1419, 1382, 1277, 1270, 1199, 1151, 1087, 875, 675.

Synthesis of N-Octanoyl-L-Threonine

To a 100 ml round-bottom flask with a magnetic stir bar were added threonine (1.20 g, 10 mmol), H$_2$O (20 mL), and Na$_2$CO$_3$ (1.60 g, 15 mmol. Then, THF (10 mL) was added followed by the dropwise addition of n-octanoyl chloride (2.2 mL, 13 mmol). The reaction mixture was stirred at ambient temperature for 4 h. After the stated time, THF was evaporated under reduced pressure and the reaction mixture was acidified until pH 2.0 (with 2 N HCl). No precipitate was observed. The reaction mixture was extracted with 3×EtOAc (20 mL each). The organic phases were combined and the solvent removed under reduced pressure to afford an oil. The oil was purified using a short plug of silica, eluted with Hex/EtOAc 6:4 to remove decanoic acid, and then with EtOAc to remove the product. (1.039 g, 42% yield). $^1$H NMR (400 MHz, CDCl$_3$): δ 7.01 (d, J=8.4 Hz, 1H, NHCO), 4.54 (dd, J=8.4, 2.4 Hz, 1H, CH—NH), 4.42-4.40 (m, 1H, CH—OH), 2.29 (t, J=7.6 Hz, 2H, O=C—CH$_2$), 1.63-1.60 (m, 2H, CH$_2$), 1.30-1.25 (m, 10H, CH$_2$), 1.19 (d, J=6.0 Hz, 3H, CHOH—CH$_3$), 0.86 (t, J=6.8 Hz, 3H, CH$_3$); $^{13}$C NMR (100 MHz, CDCl$_3$): δ 176.3 (COOH), 173.7 (CONN), 67.7 (HC—OH), 57.5 (HC—NH), 36.4 (O=C—CH$_2$), 32.5 (O=C—CH$_2$—CH$_2$), 29.1 (CH$_2$), 25.8 (CH$_2$), 22.7 (CH$_2$), 19.4 (HOHC—CH$_3$), 14.0 (CH$_3$); FTIR (ATR, cm$^{-1}$): 3303, 2942, 2927, 2856, 1724, 1631, 1534, 1419, 1415, 1382, 1210, 1117, 1084, 1080, 857, 674.

Example 15

Nanonet Formation

To rapidly screen for the formation of nanonets using any particular surfactant and polymer combination, a titration based approach was utilized. Increasing amounts of surfactant were added to a fixed amount of polymer. Subsequent destabilization of the polymer by addition of concentrated hydrochloric acid lead to precipitation of both surfactant and polymer, indicating nanonet formation. The amount of nanonet formation was measured by an increase in absorbance at 540 nm relative to polymer only and surfactant only controls. This method can be utilized as a rapid, automated approach to screening polymer-surfactant interactions for the purposes of observing the onset of nanonet formation in any given combination of polymer(s) and surfactants(s) (see Reagents and Materials Examples 15-21, method #1).

Formation of Nanonets with the Triton™ Series of Surfactants and Validation of a Screening Method To test nanonet formation with multiple different surfactants and polymers, a screening method was designed utilizing co-precipitation of surfactant and polymer as a measure of nanonet formation. To test the screening method, nanonet formation was first measured between model surfactants, selected from the Triton™ series, with styrene maleic acid block co-polymers of varying length and block composition (FIG. 15). The Triton™ series of surfactants correspond to amphipathic molecules with a hydrophobic alkyl chain of 14 carbons, and a hydrophilic head group composed of repeating oxyethylene groups (see Formula (i) above). By increasing the number of repeating oxyethylene groups, the HLB value of the surfactant increases and surfactant aggregate size of the resulting surfactant decreases. This trend allows for creation of surfactants with similar chemistry but radically different physical wetting, foaming, and aggregation properties (Stubicar and Petres, Micelle Formation by Tritons in Aqueous Solutions, (1981), Croatia Chemica Acta, 54 (3) 255-266)

Utilizing the SMA polymers and the Triton™ series of surfactants, the screening method for the onset of nanonet formation may be validated. What follows below is a comparison of nanonet formation using relatively smaller, and relatively larger, SMA polymer particle sizes in combination with relatively smaller and relatively larger surfactant aggregate sizes within the Triton™ series of surfactants. Thus, many possible combinations of relative size could be observed. The Triton™ surfactants employed were as follows (along with measured surfactant aggregate sizes): (Triton X-45™: 156 nm), and a small micelle forming surfactant (Triton X-100™: 10 nm). Polymer particle sizes are detailed below along with results.

A clear increase in absorbance indicative of nanonet formation was observed with Triton X-100 ™ and SMA-2000 ™ (D$_{calculated}$: 2.6 nm, D$_{observed}$: 5.2 nm) and SMA-3000 ™ (D$_{calculated}$: 2.8 nm, D$_{observed}$: 3.7 nm) (FIG. 15). Conversely, the relatively larger SMA-725 ™ (D$_{calculated}$: 6.8 nm, D$_{observed}$: 10-15 nm) showed little increase in absorbance with Triton X-100™. All three polymers showed strong increase in absorbance with the larger surfactant aggregate formed by Triton X-45™. To confirm that this increase in absorbance corresponded to nanonet formation (and not mere precipitation of a given component), The precipitate was removed from solution by centrifugation. Residual surfactant left in the solution was measured by UV absorbance of the Triton™ surfactants for SMA 2000 and SMA 725 (Table 21). The results demonstrated that the increase in formed precipitate was proportional to a corresponding decrease in surfactant concentration in the supernatant. This result validates co-precipitation as a valid screening method for measuring nanonet formation(see Reagents and Materials Examples 15-21, method #2). The results obtained from the screening method, support the proposition that nanonet formation is influenced by a size mismatch between a minimal polymer particle size and surfactant aggregate size. For example, this proposition may be stated as follows: (D$_{polymer}$<D$_{surfactant\ aggregate}$=nanonet), and may be visualized through the relatively simple rapid, automated screening method detailed above. Illustrated results are set out in FIG. 15.

Example 16

Conversion of the Nanonet Screening Method to a High Throughput Method and Measurement of Nanonet Formation To better measure nanonet formation between various surfactants and numerous polymers, a relatively more automated and quantitative scoring method for detecting nanonet formation was developed. Consider first the simple screening method described above and validated. In that validation, nanonet formation was assumed to occur between a single block co-polymer and a single surfactant aggregate. What follows is the description of a computer-assisted model developed to predict, standardize, and score the formation of nanonets.

A binding curve of an X-Y plot of absorbance at 540 nm versus surfactant concentration was fit with a sigmoidal function after correction for surfactant only artifacts (FIG. 16). From the sigmoid fit, a nanonet formation factor (Nf) was determined. Nf, is taken from the sigmoid fit as the half maximal value of the sigmoid. Nf may also be referred to as the midway point, half-maximal concentration, or critical aggregation concentration. Sigmoid fitting also provided values for the absolute height of the sigmoid, and the slope of the sigmoid curve.

Sigmoid curves with a steeper slope may result from rapid association of all available surfactant with the polymer. This has been described as a hallmark of relatively high cooperativity of polymer surfactant binding. (Goddard E. D. Polymer/Surfactant Interaction-Its relevance to Detergent Systems. JAOCS. Vol 71, 1994). Similarly, sigmoid curves with a relatively higher maximum absorbance may be indicative of association of more of the available surfactant with the polymer, and may also indicate more efficient nanonet formation. From these two sigmoid curve parameters (slope and maximum absorbance), the area under the sigmoid curve was used as a score for nanonet formation (FIG. 17). The nanonet formation factor (Nf) is taken to be the point at which half of the available polymer was became associated with surfactant.

To summarize, in this automated method, nanonet formation was construed to begin based upon a sigmoid fit of parameters taken from absorbance versus surfactant concentration plots. A nanonet score was calculated using the area under the sigmoid curve (AUC). If no sigmoid was detected, Nanonet formation was determined to have not occurred.

Each polymer and surfactant combination were scored independently. The resulting AUC values were scaled between 0 and 1. The resulting score, so scaled, may be indicative of nanonet formation. The scaled score captures two aspects. First, it captures the height of the absorption profile, which may indicate relatively greater quantities of nanonets formed. Second, it captures the surfactant concentration range (for a fixed polymer concentration) over which nanonets are formed. Illustrated results are set out in FIG. 17.

Example 17

Nanonet Formation Occurs with Both Anionic and Non-Ionic Surfactants

In this section, a study of the influence of the chemical structure of the surfactant headgroup on nanonet formation was undertaken. Nanonet formation with surfactants containing various non-ionic and ionic headgroups was examined. Headgroups were classified by the functional chemical group forming the primary interactions with water in solution, the number of repeating functional groups, and linkage to the hydrophobic alkyl chain. Except for combinations shown below (Table 13 and 14), the formation of nanonets was detected with all other surfactants tested (Tables 12 A-D).

TABLE 12A

Positively Scoring Nanonets

| Surfactant | Polymer | Height | Midway (ppm) | Slope coefficient | Average error (all data) |
|---|---|---|---|---|---|
| 1,2-Hexanediol | DIBMA | 0.1 | 901.088435 | 55.485365 | 0.08909591 |
| Amphosol 2CSF ™ | DIBMA | 0.77027187 | 595.08416 | 92.7298755 | 0.01197528 |
| Apo 10 | DIBMA | 0.84774592 | 438.416181 | 95.641022 | 0.02734266 |
| Apo 12 | DIBMA | 1.02744699 | 84.1216144 | 20.6225583 | 0.05375417 |
| Stepan Bio Soft D-40 ™ | DIBMA | 0.50324237 | 154.38828 | 15.7339089 | 0.23726898 |
| Cedepal TD-403 MFLD ™ | DIBMA | 0.16418752 | 155.336851 | 21.5040037 | 0.1078598 |
| Coco Glucoside | DIBMA | 0.54794297 | 117.587414 | 11.5384967 | 0.07657559 |
| Dodecane-1-sulfonic acid | DIBMA | 0.1 | 113.103271 | 22.0604016 | 0.06354805 |
| PFDMP-O310F | DIBMA | 0.62275273 | 653.987409 | 69.6324963 | 0.02728391 |
| Genapol X080 | DIBMA | 0.71496667 | 20.9693868 | 1 | 0.52045649 |
| HEGMDDE H370 | DIBMA | 0.77233692 | 22.9310378 | 6.94012383 | 0.31281476 |
| HEGMDE H360 | DIBMA | 0.73495559 | 15.6419746 | 1 | 0.22670991 |
| HEGMOE H350 | DIBMA | 0.21723333 | 31.5858482 | 1.67734031 | 0.14408076 |
| HXEGMDDE H375 | DIBMA | 0.61635555 | 48.9368401 | 1 | 0.16375448 |
| Lakeland PAE 136 ™ | DIBMA | 0.61441111 | 45.4594876 | 2.03653556 | 0.31629426 |
| Stepan Lathanol LAL ™ | DIBMA | 0.26535556 | 50.1592844 | 1 | 0.17633476 |
| MNA C12 | DIBMA | 0.35946774 | 96.4098691 | 21.0225132 | 0.21215451 |
| MNA C13 | DIBMA | 0.44239109 | 127.190065 | 19.3785602 | 0.21842851 |
| MNA C14 | DIBMA | 0.37788666 | 107.360025 | 27.9020346 | 0.22240426 |
| n-Decanoyl-L-Methionine | DIBMA | 0.72673333 | 22.5959793 | 1 | 0.42891738 |
| n-Decanoyl-L-Threonine | DIBMA | 0.72474944 | 326.332201 | 21.5716367 | 0.15178313 |
| n-Dodecanoyl-L-Histidine | DIBMA | 0.26962716 | 112.97279 | 55.8505974 | 0.14662091 |
| n-Dodecanoyl-L-Methionine | DIBMA | 0.41636667 | 19.6303579 | 1.00005512 | 0.31618239 |
| n-Dodecanoyl-L-Threonine | DIBMA | 0.68847777 | 122.622926 | 1 | 0.13991125 |
| n-Octanoyl-L-Methionine | DIBMA | 0.30027282 | 480.892315 | 122.694584 | 0.10060373 |
| Sodium dodecylbenzene sulfonate | DIBMA | 0.17219996 | 53.1225689 | 4.99559612 | 0.14861309 |
| nDDTP D342 | DIBMA | 1.08387992 | 143.724993 | 28.3862408 | 0.32460789 |
| nDDTGP D323 | DIBMA | 1.00681667 | 162.687526 | 1 | 0.81488173 |
| nDDTP D335 | DIBMA | 1.02878536 | 658.069895 | 111.181966 | 0.04566893 |
| Ninate 411 ™ | DIBMA | 0.30978354 | 155.42648 | 25.6747016 | 0.16191695 |
| nNDTP N335 | DIBMA | 0.86906633 | 565.917927 | 17.1427281 | 0.02297988 |
| OEGMDE O330 | DIBMA | 0.6817 | 12.4022252 | 1 | 0.40518747 |
| Poly-10-laurate | DIBMA | 0.42863333 | 56.1286226 | 3.54827919 | 0.25251619 |
| Poly-10-oleate | DIBMA | 0.8523417 | 42.6516533 | 3.03531455 | 0.09171199 |
| Poly-10-stearate | DIBMA | 0.51043339 | 503.701113 | 4.14415278 | 0.03461897 |
| Span 20 ™ | DIBMA | 0.24467942 | 43.3092107 | 6.61452179 | 0.08822107 |
| Stepan Mild L3 ™ | DIBMA | 0.35162074 | 130.031097 | 66.1989563 | 0.10881984 |
| Stepan SLL FB ™ | DIBMA | 0.14626668 | 559.237685 | 19.3401413 | 0.02347724 |
| Stepan sulfonic acid ™ | DIBMA | 0.19633275 | 47.7084451 | 5.07352302 | 0.19511718 |
| TC Lab 35 | DIBMA | 0.71271471 | 334.20971 | 69.445712 | 0.04069248 |
| Triton X-100 ™ | DIBMA | 0.84218245 | 88.2041539 | 37.3457156 | 0.3181006 |

TABLE 12A-continued

Positively Scoring Nanonets

| Surfactant | Polymer | Height | Midway (ppm) | Slope coefficient | Average error (all data) |
|---|---|---|---|---|---|
| Triton X-305 ™ | DIBMA | 0.1 | 91.8020987 | 72.9726761 | 0.06771337 |
| Triton X-45 ™ | DIBMA | 0.97430833 | 44.3902689 | 2.65271092 | 0.21510792 |
| Tween 20 ™ | DIBMA | 0.2062 | 59.4954843 | 2.56038525 | 0.16107583 |
| Tween 40 ™ | DIBMA | 0.1 | 8.45029038 | 1 | 0.10140582 |
| Tween 60 ™ | DIBMA | 0.12510002 | 35.0104779 | 1 | 0.11411969 |
| tween 65 ™ | DIBMA | 0.39536667 | 27.3521657 | 1 | 0.20251538 |
| Tween 80 ™ | DIBMA | 0.1 | 42.5149373 | 4.84881196 | 0.10169357 |
| Tween 85 ™ | DIBMA | 1.1473 | 50.0724917 | 1 | 0.7354596 |
| 1-Octane sulfonate | SMA 2000 ™ | 0.1 | 534.878493 | 583.851199 | 0.02086525 |
| Amin GCK 30H | SMA 2000 ™ | 0.12479326 | 36.4305728 | 13.0012012 | 0.09493266 |
| Amphosol 2CSF ™ | SMA 2000 ™ | 0.89738859 | 526.085102 | 85.0942317 | 0.12821088 |
| Apo 10 | SMA 2000 ™ | 0.66099518 | 235.351463 | 49.4562223 | 0.04355634 |
| Apo 12 | SMA 2000 ™ | 0.83502697 | 43.9420198 | 3.6786668 | 0.11565243 |
| Stepan Bio Soft D-40 ™ | SMA 2000 ™ | 0.79162791 | 137.979405 | 85.4989689 | 0.4041504 |
| Stepan Bio Terge AS-40 ™ | SMA 2000 ™ | 0.92848624 | 253.779429 | 165.263877 | 0.46161255 |
| Coco Glucoside | SMA 2000 ™ | 1.26892037 | 332.677184 | 125.515767 | 0.38850904 |
| Dodecane-1-sulfonic acid | SMA 2000 ™ | 0.56516733 | 160.502073 | 24.1015342 | 0.28669766 |
| PFDMP-O310F | SMA 2000 ™ | 1.01532665 | 680.265245 | 38.2248183 | 0.01984661 |
| Genapol X080 | SMA 2000 ™ | 1.0753076 | 11.7682243 | 3.36750959 | 0.77029655 |
| HEGMDDE H370 | SMA 2000 ™ | 1.09769487 | 21.7341727 | 3.09134026 | 0.50035298 |
| HEGMDE H360 | SMA 2000 ™ | 1.12000001 | 14.0557595 | 1 | 0.10236606 |
| HEGMOEH350 | SMA 2000 ™ | 0.91326667 | 29.6281823 | 1.50144269 | 0.5367388 |
| HXEGMDDE H375 | SMA 2000 ™ | 1.28238258 | 11.1512028 | 1.64726731 | 0.48667566 |
| Lakeland PAE 136 ™ | SMA 2000 ™ | 0.66803889 | 5.39012428 | 1 | 0.37215477 |
| Stepan Lathanol LAL ™ | SMA 2000 ™ | 0.74126316 | 91.8029172 | 14.1917398 | 0.48785472 |
| MNA C13 | SMA 2000 ™ | 0.6319667 | 128.761567 | 3.711762 | 0.37348738 |
| MNA C14 | SMA 2000 ™ | 0.99491667 | 392.376055 | 1 | 0.46130594 |
| n-Decanoyl-L-Methionine | SMA 2000 ™ | 0.73880069 | 49.794164 | 4.61655421 | 0.43712689 |
| n-Decanoyl-L-Threonine | SMA 2000 ™ | 0.73130093 | 456.577364 | 38.4224003 | 0.03601437 |
| n-Dodecanoyl-L-Histidine | SMA 2000 ™ | 1.61427321 | 374.522858 | 139.368208 | 0.50129881 |
| n-Dodecanoyl-L-Methionine | SMA 2000 ™ | 0.4084 | 57.0809993 | 2.23986642 | 0.1950195 |
| n-Dodecanoyl-L-Threonine | SMA 2000 ™ | 0.9988012 | 75.5389069 | 22.2511234 | 0.30337225 |
| n-Octanoyl-L-Methionine | SMA 2000 ™ | 0.8677396 | 595.722748 | 128.683455 | 0.1129965 |
| Sodium dodecylbenzene sulfonate | SMA 2000 ™ | 0.82733333 | 58.4154015 | 3.15064529 | 0.52388549 |
| nDDDTP D342 | SMA 2000 ™ | 1.1908412 | 133.315281 | 28.3191444 | 0.66418528 |
| nDDTGP D323 | SMA 2000 ™ | 1.10939784 | 41.8240721 | 9.60983666 | 0.97587682 |
| nDDTP D335 | SMA 2000 ™ | 1.20761612 | 378.515512 | 44.2671138 | 0.01731967 |
| Ninate 411 ™ | SMA 2000 ™ | 0.56074691 | 124.95851 | 7.4506132 | 0.28406656 |
| nNDTP N335 | SMA 2000 ™ | 1.22379909 | 556.256227 | 16.7117816 | 0.01241129 |
| OEGMDE 0330 | SMA 2000 ™ | 1.09319861 | 14.89518 | 1.89476483 | 0.65447037 |
| Poly-10-laurate | SMA 2000 ™ | 1.20588317 | 86.2204713 | 42.8109052 | 0.59840684 |
| Poly-10-oleate | SMA 2000 ™ | 0.52048013 | 333.405039 | 40.5367025 | 0.43078348 |
| Poly-10-stearate | SMA 2000 ™ | 1.07071039 | 682.310738 | 67.9169494 | 0.02250116 |
| Span 20 ™ | SMA 2000 ™ | 0.88136828 | 210.360538 | 40.0411291 | 0.23162918 |
| Stepan Mild L3 ™ | SMA 2000 ™ | 0.75077124 | 258.170262 | 149.886645 | 0.14475193 |
| Stepan SLL FB ™ | SMA 2000 ™ | 0.97317757 | 77.8264966 | 32.5773193 | 0.6772525 |
| Stepan sulfonic acid ™ | SMA 2000 ™ | 0.58338839 | 30.4316496 | 13.1990135 | 0.4432083 |
| TC Lab 35 | SMA 2000 ™ | 0.97102218 | 165.127063 | 35.7111399 | 0.41573918 |
| Triton X-100 ™ | SMA 2000 ™ | 1.090175 | 30.9867367 | 1 | 0.72468072 |
| Triton X-305 ™ | SMA 2000 ™ | 0.42093514 | 52.7835175 | 15.5976649 | 0.30439504 |
| Triton X-45 ™ | SMA 2000 ™ | 0.95685104 | 309.862067 | 45.4754577 | 0.36300713 |
| Tween 20 ™ | SMA 2000 ™ | 0.91024998 | 34.984391 | 10.9797071 | 0.57074161 |
| Tween 40 ™ | SMA 2000 ™ | 0.85543611 | 3.17731708 | 1 | 0.68636157 |
| Tween 60 ™ | SMA 2000 ™ | 0.9335923 | 39.2492665 | 10.5156914 | 0.73452283 |
| Tween 65 ™ | SMA 2000 ™ | 1.00891099 | 88.268573 | 44.9631639 | 0.50517267 |
| Tween 80 ™ | SMA 2000 ™ | 0.6415 | 5.33232732 | 1.15717371 | 0.55961401 |
| Tween 85 ™ | SMA 2000 ™ | 1.16957282 | 27.4118067 | 6.90087914 | 0.77074868 |
| VDISTILL DV53 ™ | SMA 2000 ™ | 0.13904954 | 71.4810149 | 11.2021876 | 0.10627094 |
| VDISTILL DV63 ™ | SMA 2000 ™ | 0.15760566 | 123.096414 | 4.36983785 | 0.08516374 |
| Sodium-1 octane sulfonate | SMA 2021 ™ | 0.1 | 935.389666 | 161.242254 | 0.00725711 |
| Amin GCK 30H | SMA 2021 ™ | 0.16113336 | 127.913092 | 1 | 0.16408753 |
| Amphosol 2CSF ™ | SMA 2021 ™ | 1.13313179 | 699.363304 | 130.974204 | 0.04151624 |
| Anthraquinone-2-sulfonic acid | SMA 2021 ™ | 0.1 | 144.475114 | 4.22812193 | 0.08545977 |
| Apo 10 | SMA 2021 ™ | 0.40881668 | 424.402176 | 82.9898363 | 0.02397257 |
| Apo 12 | SMA 2021 ™ | 0.43479445 | 45.8318637 | 9.10508678 | 0.04698531 |
| Cedepal TD-403 MFLD ™ | SMA 2021 ™ | 0.37948356 | 202.197224 | 355.854349 | 0.19519247 |
| Coco Glucoside | SMA 2021 ™ | 0.98464268 | 195.488268 | 98.3074408 | 0.54331317 |
| Dodecane-1-sulfonic acid | SMA 2021 ™ | 0.31287633 | 231.295941 | 87.00054 | 0.18335223 |
| PFDMP-O310F | SMA 2021 ™ | 0.4981352 | 512.350393 | 14.1993402 | 0.06167963 |
| Genapol X080 | SMA 2021 ™ | 2 | 575.161187 | 228.267432 | 0.61372737 |
| HEGMDDE H370 | SMA 2021 ™ | 1.3322001 | 28.222288 | 1 | 0.72265722 |
| HEGMDE H360 | SMA 2021 ™ | 1.23872227 | 15.2556935 | 1 | 0.34880255 |
| HEGMOE H350 | SMA 2021 ™ | 1.26373384 | 48.4702544 | 1 | 0.83467596 |
| HXEGMDDE H375 | SMA 2021 ™ | 1.28879888 | 19.5782657 | 2.56428128 | 0.23248461 |

TABLE 12A-continued

Positively Scoring Nanonets

| Surfactant | Polymer | Height | Midway (ppm) | Slope coefficient | Average error (all data) |
|---|---|---|---|---|---|
| Lakeland PAE 136 ™ | SMA 2021 ™ | 1.4386872 | 85.0790029 | 63.634503 | 0.73781132 |
| Stepan Lathanol LAL ™ | SMA 2021 ™ | 0.57771661 | 141.186295 | 51.5380326 | 0.30928375 |
| MNA C13 | SMA 2021 ™ | 0.2409385 | 134.849306 | 46.1029803 | 0.17162141 |
| MNA C14 | SMA 2021 ™ | 0.78835514 | 283.952241 | 73.5407791 | 0.37225011 |
| n-Decanoyl-L-Methionine | SMA 2021 ™ | 0.891 | 88.0421719 | 1 | 0.49088847 |
| n-Decanoyl-L-Threonine | SMA 2021 ™ | 0.4390166 | 392.356052 | 40.0057236 | 0.05193664 |
| n-Dodecanoyl-L-Methionine | SMA 2021 ™ | 0.41149996 | 123.17186 | 1.25778314 | 0.25692248 |
| n-Dodecanoyl-L-Threonine | SMA 2021 ™ | 0.86790988 | 50.8818456 | 4.26347048 | 0.29433431 |
| n-Octanoyl-L-Methionine | SMA 2021 ™ | 0.60579899 | 516.821604 | 12.9652078 | 0.17133589 |
| Sodium dodecylbenzene sulfonate | SMA 2021 ™ | 1.09185243 | 161.669071 | 19.5260699 | 0.26996932 |
| nDDDTP D342 | SMA 2021 ™ | 1.20839103 | 245.77649 | 55.2888738 | 0.6628966 |
| nDDTGP D323 | SMA 2021 ™ | 0.67210572 | 271.14231 | 245.389902 | 0.42141363 |
| nDDTP D335 | SMA 2021 ™ | 1.2873531 | 603.00528 | 115.949197 | 0.0447591 |
| Ninate 411 ™ | SMA 2021 ™ | 0.9306941 | 171.064771 | 20.4236571 | 0.29365403 |
| nNDTP N335 | SMA 2021 ™ | 0.86373574 | 547.727127 | 15.5023812 | 0.03540623 |
| OEGMDE O330 | SMA 2021 ™ | 1.32343889 | 21.8346265 | 2.90574343 | 0.62121758 |
| Poly-10-laurate | SMA 2021 ™ | 1.28228728 | 155.971849 | 34.137995 | 0.52399 |
| Poly-10-oleate | SMA 2021 ™ | 1.18861032 | 83.4270066 | 13.4234048 | 0.8530148 |
| Poly-10-palmitate | SMA 2021 ™ | 0.35150268 | 543.456395 | 119.620995 | 0.10326259 |
| Poly-10-stearate | SMA 2021 ™ | 0.3782 | 568.843671 | 1 | 0.01032824 |
| Span 20 ™ | SMA 2021 ™ | 0.35694164 | 0 | 560.882957 | 0.27224066 |
| Stepan Mild L3 ™ | SMA 2021 ™ | 0.69871255 | 244.417729 | 105.835039 | 0.53848898 |
| Stepan SLL FB ™ | SMA 2021 ™ | 0.92909918 | 164.645031 | 36.1794065 | 0.66869796 |
| Stepan sulfonic acid ™ | SMA 2021 ™ | 0.55220886 | 55.2137116 | 37.4305648 | 0.34163289 |
| TC Lab 35 | SMA 2021 ™ | 0.96554937 | 389.055194 | 51.5484316 | 0.16979021 |
| Triton X-100 ™ | SMA 2021 ™ | 0.42769999 | 33.9152557 | 5.81523546 | 0.32101287 |
| Triton X-305 ™ | SMA 2021 ™ | 0.14214001 | 59.2815788 | 24.7028952 | 0.10990348 |
| Triton X-45 ™ | SMA 2021 ™ | 0.58975329 | 76.5263381 | 39.5915588 | 0.33915197 |
| Tween 40 ™ | SMA 2021 ™ | 0.36146692 | 118.71608 | 85.3871419 | 0.24266693 |
| Tween 60 ™ | SMA 2021 ™ | 0.67845333 | 127.223016 | 1 | 0.44119457 |
| Tween 80 ™ | SMA 2021 ™ | 1.21108659 | 128.01887 | 38.4517763 | 0.78075637 |
| Tween 85 ™ | SMA 2021 ™ | 0.99793553 | 44.3368596 | 37.5045817 | 0.60323297 |
| Amphosol 2CSF ™ | SMA 3000 ™ | 0.2431068 | 387.142003 | 84.7206518 | 0.05874185 |
| Anthraquinone-2-sulfonic acid | SMA 3000 ™ | 0.1 | 267.220564 | 203.433114 | 0.01958907 |
| Apo 10 | SMA 3000 ™ | 0.59850259 | 345.652245 | 63.7069632 | 0.0446669 |
| Apo 12 | SMA 3000 ™ | 0.64 | 22.0604935 | 1 | 0.45617241 |
| Coco Glucoside | SMA 3000 ™ | 1.5392872 | 392.820112 | 89.9918433 | 0.5250622 |
| PFDMP-O310F | SMA 3000 ™ | 0.35033333 | 978.524449 | 1 | 0.05425814 |
| Genapol X080 | SMA 3000 ™ | 1.42288709 | 38.7011311 | 33.5395704 | 1.04843213 |
| HEGMDDE H370 | SMA 3000 ™ | 0.95577965 | 23.3898301 | 4.16284629 | 0.38737013 |
| HEGMDE H360 | SMA 3000 ™ | 0.99145558 | 14.9430288 | 1 | 0.27724382 |
| HEGMOE H350 | SMA 3000 ™ | 0.58346666 | 30.226552 | 1.32455222 | 0.38455735 |
| HXEGMDDE H375 | SMA 3000 ™ | 1.03194568 | 6.42321656 | 1 | 0.40506607 |
| Lakeland PAE 136 ™ | SMA 3000 ™ | 0.65675001 | 13.8265829 | 2.05437227 | 0.53884736 |
| Stepan Lathanol LAL ™ | SMA 3000 ™ | 0.15055264 | 72.3648955 | 32.957779 | 0.11609036 |
| MNA C12 | SMA 3000 ™ | 0.44480852 | 213.732813 | 67.2106088 | 0.14180333 |
| MNA C13 | SMA 3000 ™ | 0.37384604 | 137.945378 | 24.257433 | 0.15204811 |
| MNA C14 | SMA 3000 ™ | 0.34348388 | 148.758063 | 27.4801783 | 0.19699695 |
| n-Decanoyl-L-Methionine | SMA 3000 ™ | 0.40006551 | 45.0739894 | 3.13635836 | 0.3975135 |
| n-Decanoyl-L-Threonine | SMA 3000 ™ | 0.66326463 | 577.018149 | 101.155496 | 0.03172253 |
| n-Dodecanoyl-L-Histidine | SMA 3000 ™ | 0.17466666 | 50.2447083 | 1.55294276 | 0.09766373 |
| n-Dodecanoyl-L-Methionine | SMA 3000 ™ | 0.52365556 | 90.1723376 | 1 | 0.2635066 |
| n-Dodecanoyl-L-Threonine | SMA 3000 ™ | 0.91735595 | 145.757221 | 20.6970266 | 0.27636447 |
| n-Octanoyl-L-Methionine | SMA 3000 ™ | 0.70518455 | 603.060198 | 78.2084217 | 0.28379335 |
| Sodium dodecylbenzene sulfonate | SMA 3000 ™ | 0.1 | 98.6810362 | 46.037207 | 0.13681818 |
| nDDDTP D342 | SMA 3000 ™ | 0.94715999 | 291.719517 | 77.3415987 | 0.31719493 |
| nDDTGP D323 | SMA 3000 ™ | 0.90149358 | 42.8290789 | 7.39689134 | 0.73194673 |
| nDDTP D335 | SMA 3000 ™ | 1.03777981 | 540.1365 | 67.2903046 | 0.03244535 |
| Ninate 411 ™ | SMA 3000 ™ | 0.32081235 | 107.423919 | 52.4429783 | 0.16493285 |
| nNDTP N335 | SMA 3000 ™ | 1.01744385 | 674.951314 | 56.9789227 | 0.01531551 |
| nODTTP O320 | SMA 3000 ™ | 0.1 | 471.641835 | 112.970763 | 0.0610347 |
| OEGMDE O330 | SMA 3000 ™ | 1.01130002 | 13.7605991 | 1 | 0.64921569 |
| Poly-10-laurate | SMA 3000 ™ | 0.73904923 | 43.3998996 | 11.3077173 | 0.49205051 |
| Poly-10-oleate | SMA 3000 ™ | 0.37827778 | 461.91294 | 1 | 0.34235745 |
| Poly-10-palmitate | SMA 3000 ™ | 0.56899066 | 42.8717573 | 11.3588766 | 0.49671037 |
| Poly-10-stearate | SMA 3000 ™ | 0.87370102 | 573.481425 | 18.2860756 | 0.00817572 |
| Span 20 ™ | SMA 3000 ™ | 0.88478417 | 223.911109 | 59.231853 | 0.16455893 |
| Stepan Mild L3 ™ | SMA 3000 ™ | 0.64376341 | 248.456385 | 60.6747749 | 0.08284202 |
| Stepan SLL FB ™ | SMA 3000 ™ | 0.78988212 | 71.5162006 | 26.1873518 | 0.68163018 |
| Stepan sulfonic acid ™ | SMA 3000 ™ | 0.24164413 | 28.317891 | 13.237126 | 0.22898645 |
| TC Lab 35 | SMA 3000 ™ | 0.22991524 | 346.941575 | 125.389064 | 0.09589022 |
| Triton X-100 ™ | SMA 3000 ™ | 0.6009527 | 3.28892177 | 1 | 0.48131015 |
| Triton X-305 ™ | SMA 3000 ™ | 0.14412718 | 70.8706163 | 31.6534128 | 0.11452151 |
| Triton X-45 ™ | SMA 3000 ™ | 0.77245801 | 48.4308877 | 9.94655414 | 0.42715311 |

TABLE 12A-continued

Positively Scoring Nanonets

| Surfactant | Polymer | Height | Midway (ppm) | Slope coefficient | Average error (all data) |
|---|---|---|---|---|---|
| Tween 65 ™ | SMA 3000 ™ | 2 | 132.474221 | 243.533814 | 0.73905917 |
| Tween 85 ™ | SMA 3000 ™ | 2 | 210.604204 | 168.795922 | 0.76177281 |
| Amin GCK 30H | SMA-IBE | 0.13840166 | 55.1971085 | 12.9955696 | 0.08879885 |
| Amphosol 2CSF ™ | SMA-IBE | 0.1 | 595.782092 | 359.850059 | 0.02127168 |
| Apo 10 | SMA-IBE | 0.27167398 | 522.590715 | 179.741526 | 0.03888101 |
| Apo 12 | SMA-IBE | 0.55703334 | 49.9902832 | 1.00232534 | 0.2472827 |
| Stepan Bio Soft D-40 ™ | SMA-IBE | 0.1 | 331.505939 | 57.327707 | 0.05184201 |
| Coco Glucoside | SMA-IBE | 0.21820058 | 43.4533724 | 5.83931635 | 0.09625545 |
| Fluoro octyl maltoside O310F | SMA-IBE | 0.1 | 479.469366 | 123.671052 | 0.04984429 |
| HEGMDDE H370 | SMA-IBE | 0.51316586 | 109.786116 | 17.767388 | 0.07687877 |
| HEGMDE H360 | SMA-IBE | 0.70257438 | 271.535997 | 21.286082 | 0.14827892 |
| HXEGMDDE H375 | SMA-IBE | 0.83539321 | 17.972628 | 4.13175952 | 0.26012348 |
| Lakeland PAE 136 ™ | SMA-IBE | 0.14100002 | 54.8904151 | 2.98756606 | 0.15685401 |
| MNA C14 | SMA-IBE | 0.43062183 | 603.240819 | 256.721295 | 0.09519527 |
| n-Decanoyl-L-Methionine | SMA-IBE | 0.91999334 | 50.0123255 | 3.27012462 | 0.52108808 |
| n-Decanoyl-L-Threonine | SMA-IBE | 0.51336231 | 658.954775 | 70.475536 | 0.01496219 |
| n-Dodecanoyl-L-Histidine | SMA-IBE | 0.11277886 | 114.538291 | 57.6895038 | 0.08483761 |
| n-Dodecanoyl-L-Methionine | SMA-IBE | 0.47576667 | 92.4348088 | 1 | 0.27032538 |
| n-Dodecanoyl-L-Threonine | SMA-IBE | 0.14354495 | 318.504378 | 155.735051 | 0.0714816 |
| n-Octanoyl-L-Methionine | SMA-IBE | 0.62686283 | 716.038034 | 111.041836 | 0.07385598 |
| nDDDTP D342 | SMA-IBE | 0.22859992 | 54.0350613 | 2.33743662 | 0.10447126 |
| nDDTGP D323 | SMA-IBE | 0.14623362 | 499.220019 | 10.1196651 | 0.22788446 |
| nDDTP D335 | SMA-IBE | 0.27080924 | 212.359061 | 65.2471625 | 0.09548108 |
| OEGMDE O330 | SMA-IBE | 0.11736715 | 54.4395671 | 6.07004333 | 0.07830438 |
| Poly-10-laurate | SMA-IBE | 0.11284842 | 75.6808608 | 17.7297431 | 0.03695515 |
| Poly-10-oleate | SMA-IBE | 0.39399999 | 49.7886456 | 1.03559627 | 0.15117336 |
| Span 20 ™ | SMA-IBE | 0.11276668 | 504.450638 | 4.56821982 | 0.09276794 |
| Stepan Mild L3 ™ | SMA-IBE | 0.42979985 | 123.215334 | 2.75949469 | 0.23430997 |
| Stepan SLL FB ™ | SMA-IBE | 0.50575003 | 49.8392414 | 1.00617269 | 0.10171128 |
| Stepan sulfonic acid ™ | SMA-IBE | 0.12123375 | 56.4878144 | 5.84092656 | 0.12913625 |
| Triton X-305 ™ | SMA-IBE | 0.1 | 369.852806 | 310.374151 | 0.05229663 |
| Triton X-45 ™ | SMA-IBE | 0.3194 | 31.9394658 | 1 | 0.34639209 |
| Tween 60 ™ | SMA-IBE | 0.12768971 | 790.283457 | 281.753355 | 0.04439502 |
| Tween 65 ™ | SMA-IBE | 0.17028942 | 244.053429 | 7.32272882 | 0.06460263 |
| Tween 85 ™ | SMA-IBE | 0.2088 | 25.346497 | 1 | 0.21842755 |
| 1,2-Hexanediol | SMA 725 ™ | 0.16665356 | 78.0526029 | 29.96572 | 0.0786097 |
| Amin GCK 30H | SMA 725 ™ | 0.21016623 | 380.083452 | 165.338014 | 0.19224575 |
| Amphosol 2CSF ™ | SMA 725 ™ | 0.1 | 398.10186 | 164.474318 | 0.04635902 |
| Apo 10 | SMA 725 ™ | 0.34625609 | 595.290306 | 129.398525 | 0.0322409 |
| Apo 12 | SMA 725 ™ | 0.16243333 | 5.17360531 | 1.36617645 | 0.1467061 |
| Stepan Bio Soft D-40 ™ | SMA 725 ™ | 1.18217395 | 628.407481 | 244.949233 | 0.40729597 |
| Stepan Bio Terge AS-40 ™ | SMA 725 ™ | 0.81420252 | 373.201656 | 182.869165 | 0.39245615 |
| Dodecane-1-sulfonic acid | SMA 725 ™ | 0.37391949 | 61.5385496 | 11.5744684 | 0.49054484 |
| PFDMP-O310F | SMA 725 ™ | 0.12143325 | 497.138141 | 16.0950889 | 0.03517421 |
| Genapol X080 | SMA 725 ™ | 2 | 437.146479 | 188.834499 | 0.81568587 |
| HEGMDDE H370 | SMA 725 ™ | 0.40963279 | 21.1965285 | 2.60828794 | 0.3036369 |
| HEGMDE H360 | SMA 725 ™ | 0.94983345 | 16.0164725 | 1 | 0.49167483 |
| HXEGMDDE H375 | SMA 725 ™ | 0.31032122 | 6.42321847 | 1 | 0.2859297 |
| Lakeland PAE 136 ™ | SMA 725 ™ | 0.40092 | 6.7971917 | 2.13221812 | 0.45672292 |
| Stepan Lathanol LAL ™ | SMA 725 ™ | 1.19795721 | 457.059606 | 133.528247 | 0.50554515 |
| MNA C12 | SMA 725 ™ | 0.1142333 | 55.1225816 | 2.58801463 | 0.09770116 |
| MNA C14 | SMA 725 ™ | 0.23660233 | 150.054301 | 22.1077259 | 0.16548523 |
| n-Decanoyl-L-Methionine | SMA 725 ™ | 0.58480067 | 47.3254363 | 2.68989215 | 0.3245131 |
| n-Decanoyl-L-Threonine | SMA 725 ™ | 0.58337096 | 689.059826 | 63.3478749 | 0.01010457 |
| n-Dodecanoyl-L-Histidine | SMA 725 ™ | 0.21162515 | 265.115704 | 107.553749 | 0.08328081 |
| n-Dodecanoyl-L-Methionine | SMA 725 ™ | 0.88116667 | 91.8738612 | 1 | 0.52147673 |
| n-Dodecanoyl-L-Threonine | SMA 725 ™ | 0.70376668 | 127.100453 | 1.95061246 | 0.18621891 |
| n-Octanoyl-L-Methionine | SMA 725 ™ | 0.67963151 | 629.742403 | 171.134141 | 0.1470039 |
| nDDDTP D342 | SMA 725 ™ | 0.56658422 | 468.144931 | 104.513987 | 0.16931911 |
| nDDTGP D323 | SMA 725 ™ | 0.52058349 | 295.081064 | 126.495496 | 0.50181278 |
| nDDTP D335 | SMA 725 ™ | 0.1 | 398.778329 | 175.312356 | 0.05487862 |
| Ninate 411 ™ | SMA 725 ™ | 0.10989205 | 80.3623182 | 34.3296293 | 0.08815548 |
| nNDTP N335 | SMA 725 ™ | 0.24651841 | 699.874309 | 111.827067 | 0.02225363 |
| OEGMDE O330 | SMA 725 ™ | 0.19725853 | 6.4233049 | 1 | 0.17818649 |
| Poly-10-laurate | SMA 725 ™ | 1.22644872 | 727.140102 | 150.984716 | 0.37399647 |
| Poly10-oleate | SMA 725 ™ | 0.80395887 | 415.317226 | 163.718284 | 0.32417095 |
| Poly-10-palmitate | SMA 725 ™ | 0.55378333 | 220.557022 | 1 | 0.34232087 |
| Poly-10-stearate | SMA 725 ™ | 0.60420715 | 666.142483 | 37.0384979 | 0.01112445 |
| Span 20 ™ | SMA 725 ™ | 0.62848573 | 283.912697 | 107.582548 | 0.07211668 |
| Stepan Mild L3 ™ | SMA 725 ™ | 0.70260988 | 92.7403599 | 23.4580717 | 0.14619491 |
| Stepan SLL FB ™ | SMA 725 ™ | 0.79445623 | 88.9172839 | 27.0557157 | 0.55123733 |
| Triton X-100 ™ | SMA 725 ™ | 0.51049104 | 47.0513106 | 16.1200228 | 0.38193929 |
| Triton X-305 ™ | SMA 725 ™ | 0.1225251 | 34.2615725 | 24.79289 | 0.12988317 |
| Triton X-45 ™ | SMA 725 ™ | 0.59014722 | 42.8041791 | 9.32698688 | 0.34259304 |

TABLE 12A-continued

Positively Scoring Nanonets

| Surfactant | Polymer | Height | Midway (ppm) | Slope coefficient | Average error (all data) |
|---|---|---|---|---|---|
| Tween 65 ™ | SMA 725 ™ | 0.97100901 | 58.7517888 | 4.05623277 | 0.72301593 |
| Tween 80 ™ | SMA 725 ™ | 0.47732613 | 15.04405 | 6.27578768 | 0.39298946 |
| VDISTILL DV53 ™ | SMA 725 ™ | 0.39229689 | 87.5663909 | 28.213039 | 0.23295534 |
| Amin GCK 30H | SMA Cumene | 0.16903289 | 56.1552878 | 40.0446791 | 0.17652471 |
| Amphosol 2CSF ™ | SMA Cumene | 0.18654925 | 530.682194 | 105.573694 | 0.06440189 |
| Apo 10 | SMA Cumene | 0.58177855 | 411.551568 | 114.32331 | 0.16331519 |
| Apo 12 | SMA Cumene | 1.0038667 | 51.5463032 | 1 | 0.68938642 |
| Coco Glucoside | SMA Cumene | 0.73385895 | 629.210189 | 118.220275 | 0.06106245 |
| PFDMP-O310F | SMA Cumene | 0.42783337 | 132.346965 | 1.94842086 | 0.32052902 |
| Genapol X080 | SMA Cumene | 1.07026667 | 27.4976239 | 1 | 0.81008762 |
| HEGMDDE H370 | SMA Cumene | 1.23098434 | 113.823501 | 15.9102869 | 0.69184844 |
| HEGMDE H360 | SMA Cumene | 1.11430738 | 153.280331 | 26.3897685 | 0.0453947 |
| HEGMOE H350 | SMA Cumene | 0.15213026 | 374.958386 | 184.294742 | 0.0348972 |
| HXEGMDDE H375 | SMA Cumene | 1.24640003 | 14.0977381 | 1 | 0.78171728 |
| Lakeland PAE 136 ™ | SMA Cumene | 0.99696666 | 50.2713157 | 1.66259192 | 0.57835253 |
| MNA C12 | SMA Cumene | 0.23067437 | 98.3880237 | 33.0449879 | 0.15126198 |
| MNA C13 | SMA Cumene | 0.22119994 | 49.6118337 | 1 | 0.13610065 |
| MNA C14 | SMA Cumene | 0.16250006 | 26.9122469 | 16.5961981 | 0.1679783 |
| n-Decanoyl-L-Methionine | SMA Cumene | 0.92770667 | 90.2420667 | 1 | 0.49123986 |
| n-Decanoyl-L-Threonine | SMA Cumene | 0.65673647 | 648.371055 | 79.4597391 | 0.01326363 |
| n-Dodecanoyl-L-Histidine | SMA Cumene | 0.21763416 | 45.1571325 | 9.392309 | 0.15028436 |
| n-Dodecanoyl-L-Methionine | SMA Cumene | 0.7225 | 94.3490016 | 1 | 0.3879571 |
| n-Dodecanoyl-L-Threonine | SMA Cumene | 0.6923 | 63.335923 | 3.13250227 | 0.25086018 |
| n-Octanoyl-L-Methionine | SMA Cumene | 1.15366359 | 677.077237 | 73.1710311 | 0.03997618 |
| Sodium dodecylbenzene sulfonate | SMA Cumene | 0.1 | 33.2633392 | 9.9021511 | 0.17315999 |
| nDDDTP D342 | SMA Cumene | 1.07132204 | 278.516346 | 50.4682219 | 0.1172323 |
| nDDTGP D323 | SMA Cumene | 1.16926667 | 99.7568612 | 1.00000009 | 0.39835953 |
| nDDTP D335 | SMA Cumene | 0.23069617 | 258.761008 | 43.8357899 | 0.102913 |
| nNDTP N335 | SMA Cumene | 1.0257 | 843.880546 | 1 | 0.25040799 |
| OEGMDE O330 | SMA Cumene | 1.20103346 | 15.8664634 | 1 | 0.73328604 |
| Poly-10-laurate | SMA Cumene | 0.4544219 | 73.626828 | 13.3065884 | 0.32536092 |
| Poly-10-oleate | SMA Cumene | 0.85908063 | 56.01628 | 22.6214454 | 0.44477444 |
| Poly-10-stearate | SMA Cumene | 0.779727 | 660.645528 | 38.4206269 | 0.00859737 |
| Span 20 ™ | SMA Cumene | 0.75731112 | 129.430534 | 3.84638646 | 0.37532063 |
| Stepan Mild L3 ™ | SMA Cumene | 0.40778623 | 310.08723 | 51.3347099 | 0.15323633 |
| Stepan SLL FB ™ | SMA Cumene | 1.05814906 | 53.2020865 | 2.27103635 | 0.87997254 |
| Stepan sulfonic acid ™ | SMA Cumene | 0.12353299 | 23.2191036 | 6.38311742 | 0.16510284 |
| TC Lab 35 | SMA Cumene | 0.31656598 | 308.812572 | 62.0939333 | 0.15751957 |
| Triton X-100 ™ | SMA Cumene | 0.66506667 | 4.67141262 | 1 | 0.56561508 |
| Triton X-305 ™ | SMA Cumene | 0.15114334 | 55.3408846 | 43.0219002 | 0.12379949 |
| Triton X-45 ™ | SMA Cumene | 1.44670135 | 54.6973778 | 5.58346883 | 0.76893364 |
| Tween 40 ™ | SMA Cumene | 0.1 | 40.2306461 | 5.76851145 | 0.11282389 |
| Tween 65 ™ | SMA Cumene | 0.57494502 | 22.7324121 | 11.1524571 | 0.40483246 |
| Tween 80 ™ | SMA Cumene | 0.13393333 | 26.8482731 | 1 | 0.12413461 |
| Tween 85 ™ | SMA Cumene | 0.65256667 | 26.3387849 | 1 | 0.4528309 |

TABLE 12B

Positively Scoring Nanonets

| Surfactant | Polymer | Sigmoid AUC (nanonet score) | Score polymer specific | Alkyl chain length | Alkyl chain branched | Number of alkyl chains |
|---|---|---|---|---|---|---|
| 1,2-Hexanediol | DIBMA | 0.01079653 | 0.15517241 | C6 | NA | 1 |
| Amphosol 2CSF ™ | DIBMA | 0.31306068 | 0.51724138 | C18 | NA | 2 |
| Apo 10 | DIBMA | 0.47591154 | 0.70689655 | C10 | NA | 1 |
| Apo 12 | DIBMA | 0.94118313 | 0.98275862 | C12 | NA | 1 |
| Stepan Bio Soft D-40 ™ | DIBMA | 0.42579884 | 0.67241379 | NA-benzene C6 ring | NA | 0 |
| Cedepal TD-403 MFLD ™ | DIBMA | 0.13876273 | 0.27586207 | C13 | NA | 1 |
| Coco Glucoside | DIBMA | 0.48378552 | 0.72413793 | C18 | NA | 1 |
| Dodecane-1-sulfonic acid | DIBMA | 0.08872691 | 0.18965517 | C12 | NA | 1 |
| PFDMP-O310F | DIBMA | 0.21608623 | 0.39655172 | C8 | NA | 1 |
| Genapol X080 | DIBMA | 0.70033174 | 0.82758621 | C13 | Y | 1 |
| HEGMDDE H370 | DIBMA | 0.75483262 | 0.87931034 | C12 | NA | 1 |
| HEGMDE H360 | DIBMA | 0.72382691 | 0.86206897 | C10 | NA | 1 |
| HEGMOEH350 | DIBMA | 0.21048045 | 0.36206897 | C8 | NA | 1 |
| HXEGMDDE H375 | DIBMA | 0.58650124 | 0.75862069 | C12 | NA | 1 |
| Lakeland PAE 136 ™ | DIBMA | 0.5867875 | 0.77586207 | C13 | NA | 1 |
| Lathanol LAL ™ | DIBMA | 0.25217819 | 0.44827586 | C12 | NA | 1 |

TABLE 12B-continued

Positively Scoring Nanonets

| Surfactant | Polymer | Sigmoid AUC (nanonet score) | Score polymer specific | Alkyl chain length | Alkyl chain branched | Number of alkyl chains |
|---|---|---|---|---|---|---|
| MNA C12 | DIBMA | 0.3249164 | 0.53448276 | C12 | NA | 2 |
| MNA C13 | DIBMA | 0.38633275 | 0.62068966 | C13 | NA | 2 |
| MNA C14 | DIBMA | 0.33728709 | 0.55172414 | C14 | NA | 2 |
| n-Decanoyl-L-Methionine | DIBMA | 0.71067545 | 0.84482759 | C10 | NA | 1 |
| n-Decanoyl-L-Threonine | DIBMA | 0.48860273 | 0.74137931 | C10 | NA | 1 |
| n-Dodecanoy-L-Histidine | DIBMA | 0.23744623 | 0.43103448 | C12 | NA | 1 |
| n-Dodecanoyl-L-Methionine | DIBMA | 0.40840142 | 0.65517241 | C12 | NA | 1 |
| n-Dodecanoyl-L-Threonine | DIBMA | 0.60439885 | 0.79310345 | C12 | NA | 1 |
| n-Octanoyl-L-Methionine | DIBMA | 0.1558324 | 0.29310345 | C8 | NA | 1 |
| Sodium dodecylbenzene sulfonate | DIBMA | 0.16313833 | 0.31034483 | C12 | NA | 1 |
| nDDDTP D342 | DIBMA | 0.92845061 | 0.94827586 | C12 | NA | 1 |
| nDDTGP D323 | DIBMA | 0.84352356 | 0.93103448 | C10 | NA | 1 |
| nDDTP D335 | DIBMA | 0.35712153 | 0.56896552 | C10 | NA | 1 |
| Ninate 411 ™ | DIBMA | 0.26177156 | 0.48275862 | C12 | NA | 1 |
| nNDDTP N335 | DIBMA | 0.37768065 | 0.5862069 | C9 | NA | 1 |
| OEGMDE O330 | DIBMA | 0.67358625 | 0.81034483 | C12 | NA | 1 |
| Poly-10-laurate | DIBMA | 0.40478905 | 0.63793103 | C12 | NA | 1 |
| Poly-10-oleate | DIBMA | 0.81641409 | 0.9137931 | C18 | NA | 1 |
| Poly-10-stearate | DIBMA | 0.25358274 | 0.46551724 | C18 | NA | 1 |
| Span 20 ™ | DIBMA | 0.23420274 | 0.4137931 | C12 | NA | 1 |
| Stepan Mild L3 ™ | DIBMA | 0.30304127 | 0.5 | C12 | NA | 1 |
| Stepan SLL FB ™ | DIBMA | 0.06454197 | 0.17241379 | C12 | NA | 1 |
| Stepan sulfonic acid ™ | DIBMA | 0.18706412 | 0.32758621 | C12 | Y | 1 |
| TC Lab 35 | DIBMA | 0.4744805 | 0.68965517 | C12 | NA | 1 |
| Triton X-100 ™ | DIBMA | 0.76552289 | 0.89655172 | C8 | Y | 1 |
| Triton X-305 ™ | DIBMA | 0.08905549 | 0.20689655 | C8 | Y | 1 |
| Triton X-45 ™ | DIBMA | 0.93154568 | 0.96551724 | C8 | Y | 1 |
| Tween 20 ™ | DIBMA | 0.19403513 | 0.34482759 | C12 | NA | 1 |
| Tween 40 ™ | DIBMA | 0.09920496 | 0.24137931 | C16 | NA | 1 |
| Tween 60 ™ | DIBMA | 0.12078276 | 0.25862069 | C18 | NA | 1 |
| tween 65 ™ | DIBMA | 0.38475022 | 0.60344828 | C18 | NA | 3 |
| Tween 80 ™ | DIBMA | 0.09579844 | 0.22413793 | C18 | NA | 1 |
| Tween 85 ™ | DIBMA | 1.09042548 | 1 | C16 | NA | 3 |
| 1-Octane sulfonate | SMA 2000 ™ | 0.04864068 | 0.11864407 | C8 | NA | 1 |
| Amin GCK 30H | SMA 2000 ™ | 0.12021731 | 0.15254237 | C18, C8 | NA | 1, 1 |
| Amphosol 2CSF ™ | SMA 2000 ™ | 0.4258668 | 0.33898305 | C18 | NA | 2 |
| Apo 10 | SMA 2000 ™ | 0.50548314 | 0.38983051 | C10 | NA | 1 |
| Apo 12 | SMA 2000 ™ | 0.7987517 | 0.66101695 | C12 | NA | 1 |
| Stepan Bio Soft D-40 ™ | SMA 2000 ™ | 0.67057294 | 0.55932203 | NA-benzene C6 ring | NA | 0 |
| Stepan Bio Terge AS-40 ™ | SMA 2000 ™ | 0.66514278 | 0.54237288 | C14 | NA | 1 |
| Coco Glucoside | SMA 2000 ™ | 0.83736484 | 0.69491525 | C18 | NA | 1 |
| Dodecane-1-sulfonic acid | SMA 2000 ™ | 0.47472229 | 0.3559322 | C12 | NA | 1 |
| PFDMP-O310F | SMA 2000 ™ | 0.3251518 | 0.22033898 | C8 | NA | 1 |
| Genapol X080 | SMA 2000 ™ | 1.06309757 | 0.88135593 | C13 | Y | 1 |
| HEGMDDE H370 | SMA 2000 ™ | 1.07438368 | 0.91525424 | C12 | NA | 1 |
| HEGMDE H360 | SMA 2000 ™ | 1.10481756 | 0.96610169 | C10 | NA | 1 |
| HEGMOE H350 | SMA 2000 ™ | 0.88666487 | 0.74576271 | C8 | NA | 1 |
| HXEGMDDE H375 | SMA 2000 ™ | 1.2687219 | 1 | C12 | NA | 1 |
| Lakeland PAE 136 ™ | SMA 2000 ™ | 0.66477033 | 0.52542373 | C13 | NA | 1 |
| Stepan Lathanol LAL ™ | SMA 2000 ™ | 0.67356793 | 0.57627119 | C12 | NA | 1 |
| MNA C13 | SMA 2000 ™ | 0.55090966 | 0.44067797 | C13 | NA | 2 |
| MNA C14 | SMA 2000 ™ | 0.60503265 | 0.47457627 | C14 | NA | 2 |
| n-Decanoyl-L-Methionine | SMA 2000 ™ | 0.70238207 | 0.61016949 | C10 | NA | 1 |
| n-Decanoyl-L-Threonine | SMA 2000 ™ | 0.39777096 | 0.30508475 | C10 | NA | 1 |
| n-Dodecanoyl-L-Histidine | SMA 2000 ™ | 0.99824148 | 0.83050847 | C12 | NA | 1 |
| n-Dodecanoyl-L-Methionine | SMA 2000 ™ | 0.38529232 | 0.28813559 | C12 | NA | 1 |
| n-Dodecanoyl-L-Threonine | SMA 2000 ™ | 0.92313503 | 0.81355932 | C12 | NA | 1 |
| n-Octanoyl-L-Methionine | SMA 2000 ™ | 0.35486668 | 0.27118644 | C8 | NA | 1 |
| Sodium dodecylbenzene sulfonate | SMA 2000 ™ | 0.77941799 | 0.6440678 | C12 | NA | 1 |
| nDDDTP D342 | SMA 2000 ™ | 1.03238155 | 0.84745763 | C12 | NA | 1 |
| nDDTGP D323 | SMA 2000 ™ | 1.06342351 | 0.89830508 | C10 | NA | 1 |
| nDDTP D335 | SMA 2000 ™ | 0.75110832 | 0.62711864 | C10 | NA | 1 |
| Ninate 411 ™ | SMA 2000 ™ | 0.49095719 | 0.37288136 | C12 | NA | 1 |
| nNDTP N335 | SMA 2000 ™ | 0.54366513 | 0.42372881 | C9 | NA | 1 |
| OEGMDE O330 | SMA 2000 ™ | 1.07746121 | 0.93220339 | C12 | NA | 1 |
| Poly-10-laurate | SMA 2000 ™ | 1.09611792 | 0.94915254 | C12 | NA | 1 |
| Poly-10-oleate | SMA 2000 ™ | 0.34720409 | 0.25423729 | C18 | NA | 1 |
| Poly-10-stearate | SMA 2000 ™ | 0.34135375 | 0.23728814 | C18 | NA | 1 |
| Span 20 ™ | SMA 2000 ™ | 0.6962221 | 0.59322034 | C12 | NA | 1 |
| Stepan Mild L3 ™ | SMA 2000 ™ | 0.53967414 | 0.40677966 | C12 | NA | 1 |
| Stepan SLL FB ™ | SMA 2000 ™ | 0.89518363 | 0.76271186 | C12 | NA | 1 |
| Stepan sulfonic acid ™ | SMA 2000 ™ | 0.56522096 | 0.45762712 | C12 | Y | 1 |
| TC Lab 35 | SMA 2000 ™ | 0.8108317 | 0.6779661 | C12 | NA | 1 |

TABLE 12B-continued

Positively Scoring Nanonets

| Surfactant | Polymer | Sigmoid AUC (nanonet score) | Score polymer specific | Alkyl chain length | Alkyl chain branched | Number of alkyl chains |
|---|---|---|---|---|---|---|
| Triton X-100 ™ | SMA 2000 ™ | 1.05693912 | 0.86440678 | C8 | Y | 1 |
| Triton X-305 ™ | SMA 2000 ™ | 0.39871505 | 0.3220339 | C8 | Y | 1 |
| Triton X-45 ™ | SMA 2000 ™ | 0.66079039 | 0.50847458 | C8 | Y | 1 |
| Tween 20 ™ | SMA 2000 ™ | 0.87847365 | 0.72881356 | C12 | NA | 1 |
| Tween 40 ™ | SMA 2000 ™ | 0.85312531 | 0.71186441 | C16 | NA | 1 |
| Tween 60 ™ | SMA 2000 ™ | 0.89719482 | 0.77966102 | C18 | NA | 1 |
| Tween 65 ™ | SMA 2000 ™ | 0.91446164 | 0.79661017 | C18 | NA | 3 |
| Tween 80 ™ | SMA 2000 ™ | 0.63839541 | 0.49152542 | C18 | NA | 1 |
| Tween 85 ™ | SMA 2000 ™ | 1.13795748 | 0.98305085 | C16 | NA | 3 |
| VDISTILL DV53 ™ | SMA 2000 ™ | 0.12917714 | 0.16949153 | C18, C18 | NA | 11 |
| VDISTILL DV63 ™ | SMA 2000 ™ | 0.13828377 | 0.18644068 | C18, C18 | NA | 11 |
| Sodium-1-octane sulfonate | SMA 2021 ™ | 0.01470987 | 0.16814159 | C8 | NA | 1 |
| Amin GCK 30H | SMA 2021 ™ | 0.14060286 | 0.22123894 | C18, C8 | NA | 1, 1 |
| Amphosol 2CSF ™ | SMA 2021 ™ | 0.35471071 | 0.45132743 | C18 | NA | 2 |
| Anthraquinone-2-sulfonic acid | SMA 2021 ™ | 0.08560249 | 0.18584071 | NA aromatic | NA | 0 |
| Apo 10 | SMA 2021 ™ | 0.23534902 | 0.2920354 | C10 | NA | 1 |
| Apo 12 | SMA 2021 ™ | 0.41506008 | 0.52212389 | C12 | NA | 1 |
| Cedepal TD-403 MFLD ™ | SMA 2021 ™ | 0.25601338 | 0.36283186 | C13 | NA | 1 |
| Coco Glucoside | SMA 2021 ™ | 0.78031574 | 0.73451327 | C18 | NA | 1 |
| Dodecane-1-sulfonic acid | SMA 2021 ™ | 0.23883696 | 0.30973451 | C12 | NA | 1 |
| PFDMP O310F | SMA 2021 ™ | 0.2431645 | 0.32743363 | C8 | NA | 1 |
| Genapol X080 | SMA 2021 ™ | 0.88125934 | 0.78761062 | C13 | Y | 1 |
| HEGMDDE H370 | SMA 2021 ™ | 1.29526847 | 0.98230088 | C12 | NA | 1 |
| HEGMDE H360 | SMA 2021 ™ | 1.22044406 | 0.92920354 | C10 | NA | 1 |
| HEGMOE H350 | SMA 2021 ™ | 1.20311221 | 0.91150442 | C8 | NA | 1 |
| HXEGMDDE H375 | SMA 2021 ™ | 1.26420953 | 0.94690265 | C12 | NA | 1 |
| Lakeland PAE 136 ™ | SMA 2021 ™ | 1.29580436 | 1 | C13 | NA | 1 |
| Stepan Lathanol LAL ™ | SMA 2021 ™ | 0.49459328 | 0.55752212 | C12 | NA | 1 |
| MNA C13 | SMA 2021 ™ | 0.20799401 | 0.27433628 | C13 | NA | 2 |
| MNA C14 | SMA 2021 ™ | 0.56369824 | 0.6460177 | C14 | NA | 2 |
| n-Decanoyl-L-Methionine | SMA 2021 ™ | 0.81299992 | 0.75221239 | C10 | NA | 1 |
| n-Decanoyl-L-Threonine | SMA 2021 ™ | 0.26698434 | 0.38053097 | C10 | NA | 1 |
| n-Dodecanoyl-L-Methionine | SMA 2021 ™ | 0.36102049 | 0.46902655 | C12 | NA | 1 |
| n-Dodecanoyl-L-Threonine | SMA 2021 ™ | 0.82418296 | 0.7699115 | C12 | NA | 1 |
| n-Octanoyl-L-Methionine | SMA 2021 ™ | 0.29301188 | 0.39823009 | C8 | NA | 1 |
| Sodium dodecylbenzene sulfonate | SMA 2021 ™ | 0.91587432 | 0.82300885 | C12 | NA | 1 |
| nDDDTP D342 | SMA 2021 ™ | 0.91122883 | 0.80530973 | C12 | NA | 1 |
| nDDTGP D323 | SMA 2021 ™ | 0.45133615 | 0.53982301 | C10 | NA | 1 |
| nDDTP D335 | SMA 2021 ™ | 0.51566509 | 0.57522124 | C10 | NA | 1 |
| Ninate 411 ™ | SMA 2021 ™ | 0.7719462 | 0.69911504 | C12 | NA | 1 |
| nNDTP N335 | SMA 2021 ™ | 0.39107611 | 0.48672566 | C9 | NA | 1 |
| OEGMDE O330 | SMA 2021 ™ | 1.29520205 | 0.96460177 | C12 | NA | 1 |
| Poly-10-laurate | SMA 2021 ™ | 1.08248266 | 0.87610619 | C12 | NA | 1 |
| Poly-10-oleate | SMA 2021 ™ | 1.09001173 | 0.89380531 | C18 | NA | 1 |
| Poly-10-palmitate | SMA 2021 ™ | 0.16112024 | 0.23893805 | C16 | NA | 1 |
| Poly-10-stearate | SMA 2021 ™ | 0.16325242 | 0.25663717 | C18 | NA | 1 |
| Span 20 ™ | SMA 2021 ™ | 0.24952947 | 0.34513274 | C12 | NA | 1 |
| Stepan Mild L3 ™ | SMA 2021 ™ | 0.52137185 | 0.61061947 | C12 | NA | 1 |
| Stepan SLL FB ™ | SMA 2021 ™ | 0.77624393 | 0.71681416 | C12 | NA | 1 |
| Stepan sulfonic acid ™ | SMA 2021 ™ | 0.51778871 | 0.59292035 | C12 | Y | 1 |
| TC Lab 35 | SMA 2021 ™ | 0.59035451 | 0.66371681 | C12 | NA | 1 |
| Triton X-100 ™ | SMA 2021 ™ | 0.41340161 | 0.50442478 | C8 | Y | 1 |
| Triton X-305 ™ | SMA 2021 ™ | 0.13348571 | 0.20353982 | C8 | Y | 1 |
| Triton X-45 ™ | SMA 2021 ™ | 0.54179759 | 0.62831858 | C8 | Y | 1 |
| Tween 40 ™ | SMA 2021 ™ | 0.31191032 | 0.4159292 | C16 | NA | 1 |
| Tween 60 ™ | SMA 2021 ™ | 0.59247768 | 0.68141593 | C18 | NA | 1 |
| Tween 80 ™ | SMA 2021 ™ | 1.05503229 | 0.85840708 | C18 | NA | 1 |
| Tween 85 ™ | SMA 2021 ™ | 0.94429643 | 0.84070796 | C16 | NA | 3 |
| Amphosol 2CSF ™ | SMA 3000 ™ | 0.1489152 | 0.34545455 | C18 | NA | 2 |
| Anthraquinone-2-sulfonic acid | SMA 3000 ™ | 0.06904032 | 0.25454545 | NA aromatic | NA | 0 |
| Apo 10 | SMA 3000 ™ | 0.39176322 | 0.58181818 | C10 | NA | 1 |
| Apo 12 | SMA 3000 ™ | 0.62620128 | 0.70909091 | C12 | NA | 1 |
| Coco Glucoside | SMA 3000 ™ | 0.93381513 | 0.87272727 | C18 | NA | 1 |
| PFDMP O310F | SMA 3000 ™ | 0.00769877 | 0.2 | C8 | NA | 1 |
| Genapol X080 | SMA 3000 ™ | 1.35561809 | 0.96363636 | C13 | Y | 1 |
| HEGMDDE H370 | SMA 3000 ™ | 0.93388926 | 0.89090909 | C12 | NA | 1 |
| HEGMDE H360 | SMA 3000 ™ | 0.97713596 | 0.90909091 | C10 | NA | 1 |
| HEGMOE H350 | SMA 3000 ™ | 0.56612221 | 0.67272727 | C8 | NA | 1 |
| HXEGMDDE H375 | SMA 3000 ™ | 1.02583227 | 0.94545455 | C12 | NA | 1 |
| Lakeland PAE 136 ™ | SMA 3000 ™ | 0.64799652 | 0.72727273 | C13 | NA | 1 |
| Stepan Lathanol LAL ™ | SMA 3000 ™ | 0.13921714 | 0.30909091 | C12 | NA | 1 |
| MNA C12 | SMA 3000 ™ | 0.34875182 | 0.52727273 | C12 | NA | 2 |
| MNA C13 | SMA 3000 ™ | 0.32243256 | 0.49090909 | C13 | NA | 2 |
| MNA C14 | SMA 3000 ™ | 0.2925184 | 0.47272727 | C14 | NA | 2 |

TABLE 12B-continued

Positively Scoring Nanonets

| Surfactant | Polymer | Sigmoid AUC (nanonet score) | Score polymer specific | Alkyl chain length | Alkyl chain branched | Number of alkyl chains |
|---|---|---|---|---|---|---|
| n-Decanoyl-L-Methionine | SMA 3000 ™ | 0.382233 | 0.56363636 | C10 | NA | 1 |
| n-Decanoyl-L-Threonine | SMA 3000 ™ | 0.28167062 | 0.43636364 | C10 | NA | 1 |
| n-Dodecanoyl-L-Histidine | SMA 3000 ™ | 0.16597792 | 0.36363636 | C12 | NA | 1 |
| n-Dodecanoyl-L-Methionine | SMA 3000 ™ | 0.47669814 | 0.6 | C12 | NA | 1 |
| n-Dodecanoyl-L-Threonine | SMA 3000 ™ | 0.78408718 | 0.83636364 | C12 | NA | 1 |
| n-Octanoyl-L-Methionine | SMA 3000 ™ | 0.28058523 | 0.41818182 | C8 | NA | 1 |
| Sodium dodecylbenzene sulfonate | SMA 3000 ™ | 0.08967674 | 0.27272727 | C12 | NA | 1 |
| nDDDTP D342 | SMA 3000 ™ | 0.66968033 | 0.74545455 | C12 | NA | 1 |
| nDDTGP D323 | SMA 3000 ™ | 0.86331518 | 0.85454545 | C10 | NA | 1 |
| nDDTP D335 | SMA 3000 ™ | 0.47780789 | 0.61818182 | C10 | NA | 1 |
| Ninate 411 ™ | SMA 3000 ™ | 0.28448763 | 0.45454545 | C12 | NA | 1 |
| nNDTP N335 | SMA 3000 ™ | 0.33141816 | 0.50909091 | C9 | NA | 1 |
| nODTTP O320 | SMA 3000 ™ | 0.05281838 | 0.23636364 | C8 | NA | 1 |
| OEGMDE O330 | SMA 3000 ™ | 0.99788957 | 0.92727273 | C12 | NA | 1 |
| Poly-10-laurate | SMA 3000 ™ | 0.70717371 | 0.78181818 | C12 | NA | 1 |
| Poly-10-oleate | SMA 3000 ™ | 0.20373552 | 0.38181818 | C18 | NA | 1 |
| Poly-10-palmitate | SMA 3000 ™ | 0.54474114 | 0.65454545 | C16 | NA | 1 |
| Poly-10-stearate | SMA 3000 ™ | 0.37308656 | 0.54545455 | C18 | NA | 1 |
| Span 20 ™ | SMA 3000 ™ | 0.68594116 | 0.76363636 | C12 | NA | 1 |
| Stepan Mild L3 ™ | SMA 3000 ™ | 0.48349829 | 0.63636364 | C12 | NA | 1 |
| Stepan SLL FB ™ | SMA 3000 ™ | 0.73250601 | 0.8 | C12 | NA | 1 |
| Stepan sulfonic acid ™ | SMA 3000 ™ | 0.23457864 | 0.4 | C12 | Y | 1 |
| TC Lab 35 | SMA 3000 ™ | 0.14866913 | 0.32727273 | C12 | NA | 1 |
| Triton X-100 ™ | SMA 3000 ™ | 0.59926377 | 0.69090909 | C8 | Y | 1 |
| Triton X-305 ™ | SMA 3000 ™ | 0.13352979 | 0.29090909 | C8 | Y | 1 |
| Triton X-45 ™ | SMA 3000 ™ | 0.73537752 | 0.81818182 | C8 | Y | 1 |
| Tween 65 ™ | SMA 3000 ™ | 1.5270864 | 1 | C18 | NA | 3 |
| Tween 85 ™ | SMA 3000 ™ | 1.49791049 | 0.98181818 | C16 | NA | 3 |
| Amin GCK 30H | SMA-IBE | 0.13080691 | 0.63636364 | C18, C8 | NA | 1, 1 |
| Amphosol 2CSF ™ | SMA-IBE | 0.04431075 | 0.37373737 | C18 | NA | 2 |
| Apo 10 | SMA-IBE | 0.13055103 | 0.61616162 | C10 | NA | 1 |
| Apo 12 | SMA-IBE | 0.5294656 | 0.95959596 | C12 | NA | 1 |
| Stepan Bio Soft D-40 ™ | SMA-IBE | 0.06688198 | 0.45454545 | NA-benzene C6 ring | NA | 0 |
| Coco Glucoside | SMA-IBE | 0.20882744 | 0.75757576 | C18 | NA | 1 |
| Fluoro octyl maltoside O310F | SMA-IBE | 0.05203224 | 0.39393939 | C8 | NA | 1 |
| HEGMDDE H370 | SMA-IBE | 0.45706561 | 0.8989899 | C12 | NA | 1 |
| HEGMDE H360 | SMA-IBE | 0.51215139 | 0.93939394 | C10 | NA | 1 |
| HXEGMDDE H375 | SMA-IBE | 0.82075754 | 0.97979798 | C12 | NA | 1 |
| Lakeland PAE 136 ™ | SMA-IBE | 0.13333097 | 0.65656566 | C13 | NA | 1 |
| MNA C14 | SMA-IBE | 0.18234299 | 0.6969697 | C14 | NA | 2 |
| n-Decanoyl-L-Methionine | SMA-IBE | 0.8743853 | 1 | C10 | NA | 1 |
| n-Decanoyl-L-Threonine | SMA-IBE | 0.17561649 | 0.67676768 | C10 | NA | 1 |
| n-Dodecanoyl-L-Histidine | SMA-IBE | 0.09908736 | 0.51515152 | C12 | NA | 1 |
| n-Dodecanoyl-L-Methionine | SMA-IBE | 0.43202715 | 0.87878788 | C12 | NA | 1 |
| n-Dodecanoyl-L-Threonine | SMA-IBE | 0.09546425 | 0.49494949 | C12 | NA | 1 |
| n-Octanoyl-L-Methionine | SMA-IBE | 0.18338342 | 0.71717172 | C8 | NA | 1 |
| nDDDTP D342 | SMA-IBE | 0.21636181 | 0.7979798 | C12 | NA | 1 |
| nDDTGP D323 | SMA-IBE | 0.07330399 | 0.47474747 | C10 | NA | 1 |
| nDDTP D335 | SMA-IBE | 0.21277188 | 0.77777778 | C10 | NA | 1 |
| OEGMDE O330 | SMA-IBE | 0.11103633 | 0.55555556 | C12 | NA | 1 |
| Poly-10-laurate | SMA-IBE | 0.10433733 | 0.53535354 | C12 | NA | 1 |
| Poly-10-oleate | SMA-IBE | 0.37458027 | 0.83838384 | C18 | NA | 1 |
| Span 20 ™ | SMA-IBE | 0.05593784 | 0.41414141 | C12 | NA | 1 |
| Stepan Mild L3 ™ | SMA-IBE | 0.37705681 | 0.85858586 | C12 | NA | 1 |
| Stepan SLL FB ™ | SMA-IBE | 0.48079671 | 0.91919192 | C12 | NA | 1 |
| Stepan sulfonic acid ™ | SMA-IBE | 0.1144461 | 0.57575758 | C12 | Y | 1 |
| Triton X-305 ™ | SMA-IBE | 0.05866763 | 0.43434343 | C8 | Y | 1 |
| Triton X-45 ™ | SMA-IBE | 0.30935824 | 0.81818182 | C8 | Y | 1 |
| Tween 60 ™ | SMA-IBE | 0.03869585 | 0.35353535 | C18 | NA | 1 |
| Tween 65 ™ | SMA-IBE | 0.12881485 | 0.5959596 | C18 | NA | 3 |
| Tween 85 ™ | SMA-IBE | 0.20361205 | 0.73737374 | C16 | NA | 3 |
| 1,2-Hexanediol | SMA 725 ™ | 0.15337869 | 0.40740741 | C6 | NA | 1 |
| Amin GCK 30H | SMA 725 ™ | 0.12788222 | 0.37037037 | C18, C8 | NA | 1, 1 |
| Amphosol 2CSF ™ | SMA 725 ™ | 0.0592602 | 0.24074074 | C18 | NA | 2 |
| Apo 10 | SMA 725 ™ | 0.14177449 | 0.38888889 | C10 | NA | 1 |
| Apo 12 | SMA 725 ™ | 0.1616708 | 0.44444444 | C12 | NA | 1 |
| Stepan Bio Soft D-40 ™ | SMA 725 ™ | 0.47579589 | 0.77777778 | NA-benzene C6 ring | NA | 0 |
| Stepan Bio Terge AS-40 ™ | SMA 725 ™ | 0.49735177 | 0.81481481 | C14 | NA | 1 |
| Dodecane-1-sulfonic acid | SMA 725 ™ | 0.35107569 | 0.59259259 | C12 | NA | 1 |
| PFDMP-O310F | SMA 725 ™ | 0.06112487 | 0.25925926 | C8 | NA | 1 |
| Genapol X080 | SMA 725 ™ | 1.10987513 | 1 | C13 | Y | 1 |
| HEGMDDE H370 | SMA 725 ™ | 0.40115456 | 0.68518519 | C12 | NA | 1 |

TABLE 12B-continued

Positively Scoring Nanonets

| Surfactant | Polymer | Sigmoid AUC (nanonet score) | Score polymer specific | Alkyl chain length | Alkyl chain branched | Number of alkyl chains |
|---|---|---|---|---|---|---|
| HEGMDE H360 | SMA 725 ™ | 0.93509538 | 0.98148148 | C10 | NA | 1 |
| HXEGMDDE H375 | SMA 725 ™ | 0.30848282 | 0.57407407 | C12 | NA | 1 |
| Lakeland PAE 136 ™ | SMA 725 ™ | 0.39836812 | 0.66666667 | C13 | NA | 1 |
| Stepan Lathanol LAL ™ | SMA 725 ™ | 0.64861222 | 0.90740741 | C12 | NA | 1 |
| MNA C12 | SMA 725 ™ | 0.10799358 | 0.33333333 | C12 | NA | 2 |
| MNA C14 | SMA 725 ™ | 0.20121167 | 0.5 | C14 | NA | 2 |
| n-Decanoyl-L-Methionine | SMA 725 ™ | 0.55741713 | 0.83333333 | C10 | NA | 1 |
| n-Decanoyl-L-Threonine | SMA 725 ™ | 0.1819542 | 0.46296296 | C10 | NA | 1 |
| n-Dodecanoyl-L-Histidine | SMA 725 ™ | 0.15380139 | 0.42592593 | C12 | NA | 1 |
| n-Dodecanoyl-L-Methionine | SMA 725 ™ | 0.80065107 | 0.94444444 | C12 | NA | 1 |
| n-Dodecanoyl-L-Threonine | SMA 725 ™ | 0.6146695 | 0.87037037 | C12 | NA | 1 |
| n-Octanoyl-L-Methionine | SMA 725 ™ | 0.26170605 | 0.53703704 | C8 | NA | 1 |
| nDDDTP D342 | SMA 725 ™ | 0.30132153 | 0.55555556 | C12 | NA | 1 |
| nDDTGP D323 | SMA 725 ™ | 0.36140299 | 0.62962963 | C10 | NA | 1 |
| nDDTP D335 | SMA 725 ™ | 0.05901839 | 0.22222222 | C10 | NA | 1 |
| Ninate 411 ™ | SMA 725 ™ | 0.10077397 | 0.31481481 | C12 | NA | 1 |
| nNDTP N335 | SMA 725 ™ | 0.07587077 | 0.27777778 | C9 | NA | 1 |
| OEGMDE O330 | SMA 725 ™ | 0.19608992 | 0.48148148 | C12 | NA | 1 |
| Poly-10-laurate | SMA 725 ™ | 0.36182575 | 0.64814815 | C12 | NA | 1 |
| Poly10-oleate | SMA 725 ™ | 0.46410887 | 0.74074074 | C18 | NA | 1 |
| Poly-10-palmitate | SMA 725 ™ | 0.43191942 | 0.7037037 | C16 | NA | 1 |
| Poly-10-stearate | SMA 725 ™ | 0.20202389 | 0.51851852 | C18 | NA | 1 |
| Span 20 ™ | SMA 725 ™ | 0.44580726 | 0.72222222 | C12 | NA | 1 |
| Stepan Mild L3 ™ | SMA 725 ™ | 0.6374942 | 0.88888889 | C12 | NA | 1 |
| Stepan SLL FB ™ | SMA 725 ™ | 0.72343785 | 0.92592593 | C12 | NA | 1 |
| Triton X-100 ™ | SMA 725 ™ | 0.48630719 | 0.7962963 | C8 | Y | 1 |
| Triton X-305 ™ | SMA 725 ™ | 0.11772017 | 0.35185185 | C8 | Y | 1 |
| Triton X-45 ™ | SMA 725 ™ | 0.5651288 | 0.85185185 | C8 | Y | 1 |
| Tween 65 ™ | SMA 725 ™ | 0.914446 | 0.96296296 | C18 | NA | 3 |
| Tween 80 ™ | SMA 725 ™ | 0.47014245 | 0.75925926 | C18 | NA | 1 |
| VDISTILL DV53 ™ | SMA 725 ™ | 0.35766349 | 0.61111111 | C18, C18 | NA | 11 |
| Amin GCK 30H | SMA Cumene | 0.15815902 | 0.37037037 | C18, C8 | NA | 1, 1 |
| Amphosol 2CSF ™ | SMA Cumene | 0.08774462 | 0.22222222 | C18 | NA | 2 |
| Apo 10 | SMA Cumene | 0.34123615 | 0.59259259 | C10 | NA | 1 |
| Apo 12 | SMA Cumene | 0.95262301 | 0.87037037 | C12 | NA | 1 |
| Coco Glucoside | SMA Cumene | 0.27572738 | 0.55555556 | C18 | NA | 1 |
| PFDMP O310F | SMA Cumene | 0.37142484 | 0.61111111 | C8 | NA | 1 |
| Genapol X080 | SMA Cumene | 1.04137201 | 0.90740741 | C13 | Y | 1 |
| HEGMDDE H370 | SMA Cumene | 1.09147006 | 0.94444444 | C12 | NA | 1 |
| HEGMDE H360 | SMA Cumene | 0.94397663 | 0.83333333 | C10 | NA | 1 |
| HEGMOE H350 | SMA Cumene | 0.09265332 | 0.24074074 | C8 | NA | 1 |
| HXEGMDDE H375 | SMA Cumene | 1.22945181 | 0.98148148 | C12 | NA | 1 |
| Lakeland PAE 136 ™ | SMA Cumene | 0.94734632 | 0.85185185 | C13 | NA | 1 |
| MNA C12 | SMA Cumene | 0.20772105 | 0.42592593 | C12 | NA | 2 |
| MNA C13 | SMA Cumene | 0.21033641 | 0.46296296 | C13 | NA | 2 |
| MNA C14 | SMA Cumene | 0.1577351 | 0.35185185 | C14 | NA | 2 |
| n-Decanoyl-L-Methionine | SMA Cumene | 0.84450697 | 0.81481481 | C10 | NA | 1 |
| n-Decanoyl-L-Threonine | SMA Cumene | 0.23185822 | 0.51851852 | C10 | NA | 1 |
| n-Dodecanoyl-L-Histidine | SMA Cumene | 0.20789949 | 0.44444444 | C12 | NA | 1 |
| n-Dodecanoyl-L-Methionine | SMA Cumene | 0.6546941 | 0.72222222 | C12 | NA | 1 |
| n-Dodecanoyl-L-Threonine | SMA Cumene | 0.64879869 | 0.7037037 | C12 | NA | 1 |
| n-Octanoyl-L-Methionine | SMA Cumene | 0.37412274 | 0.62962963 | C8 | NA | 1 |
| Sodium dodecylbenzene sulfonate | SMA Cumene | 0.09669148 | 0.27777778 | C12 | NA | 1 |
| nDDDTP D342 | SMA Cumene | 0.77326272 | 0.77777778 | C12 | NA | 1 |
| nDDTGP D323 | SMA Cumene | 1.05320893 | 0.92592593 | C10 | NA | 1 |
| nDDTP D335 | SMA Cumene | 0.17108907 | 0.40740741 | C10 | NA | 1 |
| nNDTP N335 | SMA Cumene | 0.16064457 | 0.38888889 | C9 | NA | 1 |
| OEGMDE O330 | SMA Cumene | 1.18257782 | 0.96296296 | C12 | NA | 1 |
| Poly-10-laurate | SMA Cumene | 0.42116849 | 0.64814815 | C12 | NA | 1 |
| Poly-10-oleate | SMA Cumene | 0.80985223 | 0.7962963 | C18 | NA | 1 |
| Poly-10-stearate | SMA Cumene | 0.26499822 | 0.53703704 | C18 | NA | 1 |
| Span 20 ™ | SMA Cumene | 0.65967059 | 0.74074074 | C12 | NA | 1 |
| Stepan Mild L3 ™ | SMA Cumene | 0.28149156 | 0.57407407 | C12 | NA | 1 |
| Stepan SLL FB ™ | SMA Cumene | 1.0023824 | 0.88888889 | C12 | NA | 1 |
| Stepan sulfonic acid ™ | SMA Cumene | 0.12070749 | 0.2962963 | C12 | Y | 1 |
| TC Lab 35 | SMA Cumene | 0.21883052 | 0.48148148 | C12 | NA | 1 |
| Triton X-100 ™ | SMA Cumene | 0.66228879 | 0.75925926 | C8 | Y | 1 |
| Triton X-305 ™ | SMA Cumene | 0.14128455 | 0.33333333 | C8 | Y | 1 |
| Triton X-45 ™ | SMA Cumene | 1.36829352 | 1 | C8 | Y | 1 |
| Tween 40 ™ | SMA Cumene | 0.09602644 | 0.25925926 | C16 | NA | 1 |
| Tween 65 ™ | SMA Cumene | 0.56141023 | 0.66666667 | C18 | NA | 3 |
| Tween 80 ™ | SMA Cumene | 0.13040442 | 0.31481481 | C18 | NA | 1 |
| Tween 85 ™ | SMA Cumene | 0.63570514 | 0.68518519 | C16 | NA | 3 |

TABLE 12C

| | | | | | | |
|---|---|---|---|---|---|---|
| | | | Positively Scoring Nanonets | | | |
| Surfactant | Polymer | Surfactant class | Score | Linear head group | Branched head group | DB |
| 1,2-Hexanediol | DIBMA | Anionic | −1 | Y | N | 0 |
| Amphosol 2CSF ™ | DIBMA | Amphoteric | 1 | N | Y | 0 |
| Apo 10 | DIBMA | Non-ionic | 0 | Y | N | 0 |
| Apo 12 | DIBMA | Non-ionic | 0 | Y | N | 0 |
| Stepan Bio Soft D-40 ™ | DIBMA | Anionic | −1 | Y | Y | 0 |
| Cedepal TD-403 MFLD ™ | DIBMA | Anionic | −1 | Y | N | 0 |
| Coco Glucoside | DIBMA | Non-ionic | 0 | N C6 ring | Y | 0 |
| Dodecane-1-sulfonic acid | DIBMA | Anionic | −1 | Y | N | 0 |
| PFDMP O310F | DIBMA | Non-ionic | 0 | N | Y | 0 |
| Genapol X080 | DIBMA | Non-ionic | 0 | Y | N | 0 |
| HEGMDDE H370 | DIBMA | Non-ionic | 0 | Y | N | 0 |
| HEGMDE H360 | DIBMA | Non-ionic | 0 | Y | N | 0 |
| HEGMOEH350 | DIBMA | Non-ionic | 0 | Y | N | 0 |
| HXEGMDDE H375 | DIBMA | Non-ionic | 0 | Y | N | 0 |
| Lakeland PAE 136 ™ | DIBMA | Anionic | −1 | Y | N | 0 |
| Stepan Lathanol LAL ™ | DIBMA | Anionic | −1 | Y | N | 0 |
| MNA C12 | DIBMA | Non-ionic | 0 | N | Y | 0 |
| MNA C13 | DIBMA | Non-ionic | 0 | N | Y | 0 |
| MNA C14 | DIBMA | Non-ionic | 0 | N | Y | 0 |
| n-Decanoyl-L-Methionine | DIBMA | Anionic | −1 | N | Y | 0 |
| n-Decanoyl-L-Threonine | DIBMA | Anionic | −1 | N | Y | 0 |
| n-Dodecanoy-L-Histidine | DIBMA | Anionic | −1 | N | Y | 0 |
| n-Dodecanoyl-L-Methionine | DIBMA | Anionic | −1 | N | Y | 0 |
| n-Dodecanoyl-L-Threonine | DIBMA | Anionic | −1 | N | Y | 0 |
| n-Octanoyl-L-Methionine | DIBMA | Anionic | −1 | N | Y | 0 |
| Sodium dodecylbenzene sulfonate | DIBMA | Anionic | −1 | N | Y | 0 |
| nDDDTP D342 | DIBMA | Non-ionic | 0 | N | Y | 0 |
| nDDTGP D323 | DIBMA | Non-ionic | 0 | N | Y | 0 |
| nDDTP D335 | DIBMA | Non-ionic | 0 | N | Y | 0 |
| Ninate 411 ™ | DIBMA | Anionic | −1 | N | Y | 0 |
| nndtp n335 | DIBMA | Non-ionic | 0 | N | N | 0 |
| oegmde o330 | DIBMA | Non-ionic | 0 | Y | N | 0 |
| Poly-10-laurate | DIBMA | Non-ionic | 0 | N | Y | 0 |
| Poly-10-oleate | DIBMA | Non-ionic | 0 | N | Y | 1 |
| Poly-10-stearate | DIBMA | Non-ionic | 0 | N | Y | 0 |
| Span 20 ™ | DIBMA | Non-ionic | 0 | N | Y | 0 |
| Stepan Mild L3 ™ | DIBMA | Anionic | −1 | Y | N | 0 |
| Stepan SLL FB ™ | DIBMA | Anionic | −1 | N | Y | 0 |
| Stepan sulfonic acid ™ | DIBMA | Anionic | −1 | Y | N | 0 |
| TC Lab 35 | DIBMA | Amphoteric | 1 | N | Y | 0 |
| Triton X-100 ™ | DIBMA | Non-ionic | 0 | N | Y | 0 |
| Triton X-305 ™ | DIBMA | Non-ionic | 0 | N | Y | 0 |
| Triton X-45 ™ | DIBMA | Non-ionic | 0 | N | Y | 0 |
| Tween 20 ™ | DIBMA | Non-ionic | 0 | N | Y (4) | 0 |
| Tween 40 ™ | DIBMA | Non-ionic | 0 | N | Y(4) | 0 |
| Tween 60 ™ | DIBMA | Non-ionic | 0 | N | Y(4) | 0 |
| tween 65 ™ | DIBMA | Non-ionic | 0 | N | Y(4) | 0 |
| Tween 80 ™ | DIBMA | Non-ionic | 0 | N | Y (4) | 1 |
| Tween 85 ™ | DIBMA | Non-ionic | 0 | N | Y (4) | 0 |
| 1-Octane sulfonate | SMA 2000 ™ | Anionic | −1 | Y | N | 0 |
| Amin GCK 30H | SMA 2000 ™ | Anionic | −1 | Y | N | 1 |
| Amphosol 2CSF ™ | SMA 2000 ™ | amphoteric | 1 | N | Y | 0 |
| Apo 10 | SMA 2000 ™ | Non-ionic | 0 | Y | N | 0 |
| Apo 12 | SMA 2000 ™ | Non-ionic | 0 | Y | N | 0 |
| Stepan Bio Soft D-40 ™ | SMA 2000 ™ | Anionic | −1 | Y | Y | 0 |
| Stepan Bio Terge AS-40 ™ | SMA 2000 ™ | Anionic | −1 | Y | N | 1 |
| Coco Glucoside | SMA 2000 ™ | Non-ionic | 0 | N C6 ring | Y | 0 |
| Dodecane-1-sulfonic acid | SMA 2000 ™ | Anionic | −1 | Y | N | 0 |
| PFDMP O310F | SMA 2000 ™ | Non-ionic | 0 | N | Y | 0 |
| Genapol X080 | SMA 2000 ™ | Non-ionic | 0 | Y | N | 0 |
| HEGMDDE H370 | SMA 2000 ™ | Non-ionic | 0 | Y | N | 0 |
| HEGMDE H360 | SMA 2000 ™ | Non-ionic | 0 | Y | N | 0 |
| HEGMOEH350 | SMA 2000 ™ | Non-ionic | 0 | Y | N | 0 |
| HXEGMDDE H375 | SMA 2000 ™ | Non-ionic | 0 | Y | N | 0 |
| Lakeland PAE 136 ™ | SMA 2000 ™ | Anionic | −1 | Y | N | 0 |
| Stepan Lathanol LAL ™ | SMA 2000 ™ | Anionic | −1 | Y | N | 0 |
| MNA C13 | SMA 2000 ™ | Non-ionic | 0 | N | Y | 0 |
| MNA C14 | SMA 2000 ™ | Non-ionic | 0 | N | Y | 0 |
| n-Decanoyl-L-Methionine | SMA 2000 ™ | Anionic | −1 | N | Y | 0 |
| n-Decanoyl-L-Threonine | SMA 2000 ™ | Anionic | −1 | N | Y | 0 |
| n-Dodecanoyl-L-Histidine | SMA 2000 ™ | Anionic | −1 | N | Y | 0 |
| n-Dodecanoyl-L-Methionine | SMA 2000 ™ | Anionic | −1 | N | Y | 0 |
| n-Dodecanoyl-L-Threonine | SMA 2000 ™ | Anionic | −1 | N | Y | 0 |
| n-Octanoyl-L-Methionine | SMA 2000 ™ | Anionic | −1 | N | Y | 0 |
| Sodium dodecylbenzene sulfonate | SMA 2000 ™ | Anionic | −1 | N | Y | 0 |

TABLE 12C-continued

Positively Scoring Nanonets

| Surfactant | Polymer | Surfactant class | Score | Linear head group | Branched head group | DB |
|---|---|---|---|---|---|---|
| nDDDTP D342 | SMA 2000 ™ | Non-ionic | 0 | N | Y | 0 |
| nDDTGP D323 | SMA 2000 ™ | Non-ionic | 0 | N | Y | 0 |
| nDDTP D335 | SMA 2000 ™ | Non-ionic | 0 | N | Y | 0 |
| Ninate 411 ™ | SMA 2000 ™ | Anionic | −1 | N | Y | 0 |
| nNDTP N335 | SMA 2000 ™ | Non-ionic | 0 | N | N | 0 |
| OEGMDE O330 | SMA 2000 ™ | Non-ionic | 0 | Y | N | 0 |
| Poly-10-laurate | SMA 2000 ™ | Non-ionic | 0 | N | Y | 0 |
| Poly-10-oleate | SMA 2000 ™ | Non-ionic | 0 | N | Y | 1 |
| Poly-10-stearate | SMA 2000 ™ | Non-ionic | 0 | N | Y | 0 |
| Span 20 ™ | SMA 2000 ™ | Non-ionic | 0 | N | N | 0 |
| Stepan Mild L3 ™ | SMA 2000 ™ | Anionic | −1 | Y | N | 0 |
| Stepan SLL FB ™ | SMA 2000 ™ | Anionic | −1 | Y | N | 0 |
| Stepan sulfonic acid ™ | SMA 2000 ™ | Anionic | −1 | Y | N | 0 |
| TC Lab 35 | SMA 2000 ™ | Amphoteric | 1 | N | Y | 0 |
| Triton X-100 ™ | SMA 2000 ™ | Non-ionic | 0 | N | Y | 0 |
| Triton X-305 ™ | SMA 2000 ™ | Non-ionic | 0 | N | Y | 0 |
| Triton X-45 ™ | SMA 2000 ™ | Non-ionic | 0 | N | Y | 0 |
| Tween 20 ™ | SMA 2000 ™ | Non-ionic | 0 | N | Y (4) | 0 |
| Tween 40 ™ | SMA 2000 ™ | Non-ionic | 0 | N | Y(4) | 0 |
| Tween 60 ™ | SMA 2000 ™ | Non-ionic | 0 | N | Y(4) | 0 |
| Tween 65 ™ | SMA 2000 ™ | Non-ionic | 0 | N | Y(4) | 0 |
| Tween 80 ™ | SMA 2000 ™ | Non-ionic | 0 | N | Y (4) | 1 |
| Tween 85 ™ | SMA 2000 ™ | Non-ionic | 0 | N | Y (4) | 0 |
| VDISTILL DV53 ™ | SMA 2000 ™ | Non-ionic | 0 | Y | N | 1, 3 |
| VDISTILL DV63 ™ | SMA 2000 ™ | Non-ionic | 0 | Y | N | 1, 3 |
| 1 octane sulfonate | SMA 2021 ™ | Anionic | −1 | Y | N | 0 |
| Amin GCK 30H | SMA 2021 ™ | Anionic | −1 | Y | N | 1 |
| Amphosol 2CSF ™ | SMA 2021 ™ | amphoteric | 1 | Y | Y | 0 |
| Anthraquinone-2-sulfonic acid | SMA 2021 ™ | Anionic | −1 | Y | Y | 0 |
| Apo 10 | SMA 2021 ™ | Non-ionic | 0 | Y | N | 0 |
| Apo 12 | SMA 2021 ™ | Non-ionic | 0 | Y | N | 0 |
| Cedepal TD-403 MFLD ™ | SMA 2021 ™ | Anionic | −1 | Y | N | 0 |
| Coco Glucoside | SMA 2021 ™ | Non-ionic | 0 | N C6 ring | Y | 0 |
| Dodecane-1-sulfonic acid | SMA 2021 ™ | Anionic | −1 | Y | N | 0 |
| PFDMP O310F | SMA 2021 ™ | Non-ionic | 0 | N | Y | 0 |
| Genapol X080 | SMA 2021 ™ | Non-ionic | 0 | Y | N | 0 |
| HEGMDDE H370 | SMA 2021 ™ | Non-ionic | 0 | Y | N | 0 |
| HEGMDE H360 | SMA 2021 ™ | Non-ionic | 0 | Y | N | 0 |
| HEGMOE H350 | SMA 2021 ™ | Non-ionic | 0 | Y | N | 0 |
| HXEGMDDE H375 | SMA 2021 ™ | Non-ionic | 0 | Y | N | 0 |
| Lakeland PAE 136 ™ | SMA 2021 ™ | Anionic | −1 | Y | N | 0 |
| Stepan Lathanol LAL ™ | SMA 2021 ™ | Anionic | −1 | Y | N | 0 |
| MNA C13 | SMA 2021 ™ | Non-ionic | 0 | N | Y | 0 |
| MNA C14 | SMA 2021 ™ | Non-ionic | 0 | N | Y | 0 |
| n-Decanoyl-L-Methionine | SMA 2021 ™ | Anionic | −1 | N | Y | 0 |
| n-Decanoyl-L-Threonine | SMA 2021 ™ | Anionic | −1 | N | Y | 0 |
| n-Dodecanoyl-L-Methionine | SMA 2021 ™ | Anionic | −1 | N | Y | 0 |
| n-Dodecanoyl-L-Threonine | SMA 2021 ™ | Anionic | −1 | N | Y | 0 |
| n-Octanoyl-L-Methionine | SMA 2021 ™ | Anionic | −1 | N | Y | 0 |
| Sodium dodecylbenzene sulfonate | SMA 2021 ™ | Anionic | −1 | N | Y | 0 |
| nDDDTP D342 | SMA 2021 ™ | Non-ionic | 0 | N | Y | 0 |
| nDDTGP D323 | SMA 2021 ™ | Non-ionic | 0 | N | Y | 0 |
| nDDTP D335 | SMA 2021 ™ | Non-ionic | 0 | N | Y | 0 |
| Ninate 411 ™ | SMA 2021 ™ | Anionic | −1 | N | Y | 0 |
| nNDTP N335 | SMA 2021 ™ | Non-ionic | 0 | N | N | 0 |
| OEGMDE O330 | SMA 2021 ™ | Non-ionic | 0 | Y | N | 0 |
| Poly-10-laurate | SMA 2021 ™ | Non-ionic | 0 | N | Y | 0 |
| Poly-10-oleate | SMA 2021 ™ | Non-ionic | 0 | N | Y | 1 |
| Poly-10-palmitate | SMA 2021 ™ | Non-ionic | 0 | N | Y | 0 |
| Poly-10-stearate | SMA 2021 ™ | Non-ionic | 0 | N | Y | 0 |
| Span 20 ™ | SMA 2021 ™ | Non-ionic | 0 | N | N | 0 |
| Stepan Mild L3 ™ | SMA 2021 ™ | Anionic | −1 | Y | N | 0 |
| Stepan SLL FB ™ | SMA 2021 ™ | Anionic | −1 | N | Y | 0 |
| Stepan sulfonic acid ™ | SMA 2021 ™ | Anionic | −1 | Y | N | 0 |
| TC Lab 35 | SMA 2021 ™ | Amphoteric | 1 | N | Y | 0 |
| Triton X-100 ™ | SMA 2021 ™ | Non-ionic | 0 | N | Y | 0 |
| Triton X-305 ™ | SMA 2021 ™ | Non-ionic | 0 | N | Y | 0 |
| Triton X-45 ™ | SMA 2021 ™ | Non-ionic | 0 | N | Y | 0 |
| Tween 40 ™ | SMA 2021 ™ | Non-ionic | 0 | N | Y(4) | 0 |
| Tween 60 ™ | SMA 2021 ™ | Non-ionic | 0 | N | Y(4) | 0 |
| Tween 80 ™ | SMA 2021 ™ | Non-ionic | 0 | N | Y (4) | 1 |
| Tween 85 ™ | SMA 2021 ™ | Non-ionic | 0 | N | Y (4) | 0 |
| Amphosol 2CSF ™ | SMA 3000 ™ | amphoteric | 1 | N | Y | 0 |
| Anthraquinone-2-sulfonic acid | SMA 3000 ™ | Anionic | −1 | Y | Y | 0 |
| Apo 10 | SMA 3000 ™ | Non-ionic | 0 | Y | N | 0 |

TABLE 12C-continued

Positively Scoring Nanonets

| Surfactant | Polymer | Surfactant class | Score | Linear head group | Branched head group | DB |
|---|---|---|---|---|---|---|
| Apo 12 | SMA 3000 ™ | Non-ionic | 0 | Y | N | 0 |
| Coco Glucoside | SMA 3000 ™ | Non-ionic | 0 | N C6 ring | Y | 0 |
| PFDMP O310F | SMA 3000 ™ | Non-ionic | 0 | N | Y | 0 |
| Genapol X080 | SMA 3000 ™ | Non-ionic | 0 | Y | N | 0 |
| HEGMDDE H370 | SMA 3000 ™ | Non-ionic | 0 | Y | N | 0 |
| HEGMDE H360 | SMA 3000 ™ | Non-ionic | 0 | Y | N | 0 |
| HEGMOE H350 | SMA 3000 ™ | Non-ionic | 0 | Y | N | 0 |
| HXEGMDDE H375 | SMA 3000 ™ | Non-ionic | 0 | Y | N | 0 |
| Lakeland PAE 136 ™ | SMA 3000 ™ | Anionic | −1 | Y | N | 0 |
| Stepan Lathanol LAL ™ | SMA 3000 ™ | Anionic | −1 | Y | N | 0 |
| MNA C12 | SMA 3000 ™ | Non-ionic | 0 | N | Y | 0 |
| MNA C13 | SMA 3000 ™ | Non-ionic | 0 | N | Y | 0 |
| MNA C14 | SMA 3000 ™ | Non-ionic | 0 | N | Y | 0 |
| n-Decanoyl-L-Methionine | SMA 3000 ™ | Anionic | −1 | N | Y | 0 |
| n-Decanoyl-L-Threonine | SMA 3000 ™ | Anionic | −1 | N | Y | 0 |
| n-Dodecanoyl-L-Histidine | SMA 3000 ™ | Anionic | −1 | N | Y | 0 |
| n-Dodecanoyl-L-Methionine | SMA 3000 ™ | Anionic | −1 | N | Y | 0 |
| n-Dodecanoyl-L-Threonine | SMA 3000 ™ | Anionic | −1 | N | Y | 0 |
| n-Octanoyl-L-Methionine | SMA 3000 ™ | Anionic | −1 | N | Y | 0 |
| Sodium dodecylbenzene sulfonate | SMA 3000 ™ | Anionic | −1 | N | Y | 0 |
| nDDDTP D342 | SMA 3000 ™ | Non-ionic | 0 | N | Y | 0 |
| nDDTGP D323 | SMA 3000 ™ | Non-ionic | 0 | N | Y | 0 |
| nDDTP D335 | SMA 3000 ™ | Non-ionic | 0 | N | Y | 0 |
| Ninate 411 ™ | SMA 3000 ™ | Anionic | −1 | N | Y | 0 |
| nNDTP N335 | SMA 3000 ™ | Non-ionic | 0 | N | N | 0 |
| nODTTP O320 | SMA 3000 ™ | Non-ionic | 0 | N | Y | 0 |
| OEGMDE O330 | SMA 3000 ™ | Non-ionic | 0 | Y | N | 0 |
| Poly-10-laurate | SMA 3000 ™ | Non-ionic | 0 | N | Y | 0 |
| Poly-10-oleate | SMA 3000 ™ | Non-ionic | 0 | N | Y | 1 |
| Poly-10-palmitate | SMA 3000 ™ | Non-ionic | 0 | N | Y | 0 |
| Poly-10-stearate | SMA 3000 ™ | Non-ionic | 0 | N | Y | 0 |
| Span 20 ™ | SMA 3000 ™ | Non-ionic | 0 | N | N | 0 |
| Stepan Mild L3 ™ | SMA 3000 ™ | Anionic | −1 | Y | N | 0 |
| Stepan SLL FB ™ | SMA 3000 ™ | Anionic | −1 | N | Y | 0 |
| Stepan sulfonic acid ™ | SMA 3000 ™ | Anionic | −1 | Y | N | 0 |
| TC Lab 35 | SMA 3000 ™ | Amphoteric | 1 | N | Y | 0 |
| Triton X-100 ™ | SMA 3000 ™ | Non-ionic | 0 | N | Y | 0 |
| Triton X-305 ™ | SMA 3000 ™ | Non-ionic | 0 | N | Y | 0 |
| Triton X-45 ™ | SMA 3000 ™ | Non-ionic | 0 | N | Y | 0 |
| Tween 65 ™ | SMA 3000 ™ | Non-ionic | 0 | N | Y(4) | 0 |
| Tween 85 ™ | SMA 3000 ™ | Non-ionic | 0 | N | Y (4) | 0 |
| Amin GCK 30H | SMA-IBE | Anionic | −1 | Y | N | 1 |
| Amphosol 2CSF ™ | SMA-IBE | amphoteric | 1 | N | Y | 0 |
| Apo 10 | SMA-IBE | Non-ionic | 0 | Y | N | 0 |
| Apo 12 | SMA-IBE | Non-ionic | 0 | Y | N | 0 |
| Stepan Bio Soft D-40 ™ | SMA-IBE | Anionic | −1 | Y | Y | 0 |
| Coco Glucoside | SMA-IBE | Non-ionic | 0 | N C6 ring | Y | 0 |
| Fluoro octyl maltoside O310F | SMA-IBE | Non-ionic | 0 | N | Y | 0 |
| HEGMDDE H370 | SMA-IBE | Non-ionic | 0 | Y | N | 0 |
| HEGMDE H360 | SMA-IBE | Non-ionic | 0 | Y | N | 0 |
| HXEGMDDE H375 | SMA-IBE | Non-ionic | 0 | Y | N | 0 |
| Lakeland PAE 136 ™ | SMA-IBE | Anionic | −1 | Y | N | 0 |
| MNA C14 | SMA-IBE | Non-ionic | 0 | N | Y | 0 |
| n-Decanoyl-L-Methionine | SMA-IBE | Anionic | −1 | N | Y | 0 |
| n-Decanoyl-L-Threonine | SMA-IBE | Anionic | −1 | N | Y | 0 |
| n-Dodecanoyl-L-Histidine | SMA-IBE | Anionic | −1 | N | Y | 0 |
| n-Dodecanoyl-L-Methionine | SMA-IBE | Anionic | −1 | N | Y | 0 |
| n-Dodecanoyl-L-Threonine | SMA-IBE | Anionic | −1 | N | Y | 0 |
| n-Octanoyl-L-Methionine | SMA-IBE | Anionic | −1 | N | Y | 0 |
| nDDDTP D342 | SMA-IBE | Non-ionic | 0 | N | Y | 0 |
| nDDTGP D323 | SMA-IBE | Non-ionic | 0 | N | Y | 0 |
| nDDTP D335 | SMA-IBE | Non-ionic | 0 | N | Y | 0 |
| OEGMDE O330 | SMA-IBE | Non-ionic | 0 | Y | N | 0 |
| Poly-10-laurate | SMA-IBE | Non-ionic | 0 | N | Y | 0 |
| Poly-10-oleate | SMA-IBE | Non-ionic | 0 | N | Y | 1 |
| Span 20 ™ | SMA-IBE | Non-ionic | 0 | N | N | 0 |
| Stepan Mild L3 ™ | SMA-IBE | Anionic | −1 | Y | N | 0 |
| Stepan SLL FB ™ | SMA-IBE | Anionic | −1 | N | Y | 0 |
| Stepan sulfonic acid ™ | SMA-IBE | Anionic | −1 | Y | N | 0 |
| Triton X-305 ™ | SMA-IBE | Non-ionic | 0 | N | Y | 0 |
| Triton X-45 ™ | SMA-IBE | Non-ionic | 0 | N | Y | 0 |
| Tween 60 ™ | SMA-IBE | Non-ionic | 0 | N | Y(4) | 0 |
| Tween 65 ™ | SMA-IBE | Non-ionic | 0 | N | Y(4) | 0 |
| Tween 85 ™ | SMA-IBE | Non-ionic | 0 | N | Y (4) | 0 |
| 1,2-Hexanediol | SMA 725 ™ | Anionic | −1 | Y | N | 0 |

TABLE 12C-continued

| | | | | | | |
|---|---|---|---|---|---|---|
| | | | Positively Scoring Nanonets | | | |
| Surfactant | Polymer | Surfactant class | Score | Linear head group | Branched head group | DB |
| Amin GCK 30H | SMA 725 ™ | Anionic | −1 | Y | N | 1 |
| Amphosol 2CSF ™ | SMA 725 ™ | amphoteric | 1 | N | Y | 0 |
| Apo 10 | SMA 725 ™ | Non-ionic | 0 | Y | N | 0 |
| Apo 12 | SMA 725 ™ | Non-ionic | 0 | Y | N | 0 |
| Stepan Bio Soft D-40 ™ | SMA 725 ™ | Anionic | −1 | Y | Y | 0 |
| Stepan Bio Terge AS-40 ™ | SMA 725 ™ | Anionic | −1 | Y | N | 1 |
| Dodecane-1-sulfonic acid | SMA 725 ™ | Anionic | −1 | Y | N | 0 |
| PFDMP-O310F | SMA 725 ™ | Non-ionic | 0 | N | Y | 0 |
| Genapol X080 | SMA 725 ™ | Non-ionic | 0 | Y | N | 0 |
| HEGMDDE H370 | SMA 725 ™ | Non-ionic | 0 | Y | N | 0 |
| HEGMDE H360 | SMA 725 ™ | Non-ionic | 0 | Y | N | 0 |
| HXEGMDDE H375 | SMA 725 ™ | Non-ionic | 0 | Y | N | 0 |
| Lakeland PAE 136 | SMA 725 ™ | Anionic | −1 | Y | N | 0 |
| Lathanol LAL ™ | SMA 725 ™ | Anionic | −1 | Y | N | 0 |
| MNA C12 | SMA 725 ™ | Non-ionic | 0 | N | Y | 0 |
| MNA C14 | SMA 725 ™ | Non-ionic | 0 | N | Y | 0 |
| n-Decanoyl-L-Methionine | SMA 725 ™ | Anionic | −1 | N | Y | 0 |
| n-Decanoyl-L-Threonine | SMA 725 ™ | Anionic | −1 | N | Y | 0 |
| n-Dodecanoyl-L-Histidine | SMA 725 ™ | Anionic | −1 | N | Y | 0 |
| n-Dodecanoyl-L-Methionine | SMA 725 ™ | Anionic | −1 | N | Y | 0 |
| n-Dodecanoyl-L-Threonine | SMA 725 ™ | Anionic | −1 | N | Y | 0 |
| n-Octanoyl-L-Methionine | SMA 725 ™ | Anionic | −1 | N | Y | 0 |
| nDDDTP D342 | SMA 725 ™ | Non-ionic | 0 | N | Y | 0 |
| nDDTGP D323 | SMA 725 ™ | Non-ionic | 0 | N | Y | 0 |
| nDDTP D335 | SMA 725 ™ | Non-ionic | 0 | N | Y | 0 |
| Ninate 411 ™ | SMA 725 ™ | Anionic | −1 | N | Y | 0 |
| nNDTP N335 | SMA 725 ™ | Non-ionic | 0 | N | N | 0 |
| OEGMDE O330 | SMA 725 ™ | Non-ionic | 0 | Y | N | 0 |
| Poly-10-laurate | SMA 725 ™ | Non-ionic | 0 | N | Y | 0 |
| Poly10-oleate | SMA 725 ™ | Non-ionic | 0 | N | Y | 1 |
| Poly-10-palmitate | SMA 725 ™ | Non-ionic | 0 | N | Y | 0 |
| Poly-10-stearate | SMA 725 ™ | Non-ionic | 0 | N | Y | 0 |
| Span 20 ™ | SMA 725 ™ | Non-ionic | 0 | N | N | 0 |
| Stepan Mild L3 ™ | SMA 725 ™ | Anionic | −1 | Y | N | 0 |
| Stepan SLL FB ™ | SMA 725 ™ | Anionic | −1 | N | Y | 0 |
| Triton X-100 ™ | SMA 725 ™ | Non-ionic | 0 | N | Y | 0 |
| Triton X-305 ™ | SMA 725 ™ | Non-ionic | 0 | N | Y | 0 |
| Triton X-45 ™ | SMA 725 ™ | Non-ionic | 0 | N | Y | 0 |
| Tween 65 ™ | SMA 725 ™ | Non-ionic | 0 | N | Y(4) | 0 |
| Tween 80 ™ | SMA 725 ™ | Non-ionic | 0 | N | Y (4) | 1 |
| VDISTILL DV53 ™ | SMA 725 ™ | Non-ionic | 0 | N | N | 1, 3 |
| Amin GCK 30H | SMA Cumene | Anionic | −1 | Y | N | 1 |
| Amphosol 2CSF ™ | SMA Cumene | amphoteric | 1 | N | Y | 0 |
| Apo 10 | SMA Cumene | Non-ionic | 0 | Y | N | 0 |
| Apo 12 | SMA Cumene | Non-ionic | 0 | Y | N | 0 |
| Coco Glucoside | SMA Cumene | Non-ionic | 0 | N C6 ring | Y | 0 |
| PFDMP-O310F | SMA Cumene | Non-ionic | 0 | N | Y | 0 |
| Genapol X080 | SMA Cumene | Non-ionic | 0 | Y | N | 0 |
| HEGMDDE H370 | SMA Cumene | Non-ionic | 0 | Y | N | 0 |
| HEGMDE H360 | SMA Cumene | Non-ionic | 0 | Y | N | 0 |
| HEGMOE H350 | SMA Cumene | Non-ionic | 0 | Y | N | 0 |
| HXEGMDDE H375 | SMA Cumene | Non-ionic | 0 | Y | N | 0 |
| Lakeland PAE 136 ™ | SMA Cumene | Anionic | −1 | Y | N | 0 |
| MNA C12 | SMA Cumene | Non-ionic | 0 | N | Y | 0 |
| MNA C13 | SMA Cumene | Non-ionic | 0 | N | Y | 0 |
| MNA C14 | SMA Cumene | Non-ionic | 0 | N | Y | 0 |
| n-Decanoyl-L-Methionine | SMA Cumene | Anionic | −1 | N | Y | 0 |
| n-Decanoyl-L-Threonine | SMA Cumene | Anionic | −1 | N | Y | 0 |
| n-Dodecanoyl-L-Histidine | SMA Cumene | Anionic | −1 | N | Y | 0 |
| n-Dodecanoyl-L-Methionine | SMA Cumene | Anionic | −1 | N | Y | 0 |
| n-Dodecanoyl-L-Threonine | SMA Cumene | Anionic | −1 | N | Y | 0 |
| n-Octanoyl-L-Methionine | SMA Cumene | Anionic | −1 | N | Y | 0 |
| Sodium dodecylbenzene sulfonate | SMA Cumene | Anionic | −1 | N | Y | 0 |
| nDDDTP D342 | SMA Cumene | Non-ionic | 0 | N | Y | 0 |
| nDDTGP D323 | SMA Cumene | Non-ionic | 0 | N | Y | 0 |
| nDDTP D335 | SMA Cumene | Non-ionic | 0 | N | Y | 0 |
| nNDTP N335 | SMA Cumene | Non-ionic | 0 | N | N | 0 |
| OEGMDE O330 | SMA Cumene | Non-ionic | 0 | Y | N | 0 |
| Poly-10-laurate | SMA Cumene | Non-ionic | 0 | N | Y | 0 |
| Poly-10-oleate | SMA Cumene | Non-ionic | 0 | N | Y | 1 |
| Poly-10-stearate | SMA Cumene | Non-ionic | 0 | N | Y | 0 |
| Span 20 ™ | SMA Cumene | Non-ionic | 0 | N | N | 0 |
| Stepan Mild L3 ™ | SMA Cumene | Anionic | −1 | Y | N | 0 |
| Stepan SLL FB ™ | SMA Cumene | Anionic | −1 | N | Y | 0 |
| Stepan sulfonic acid ™ | SMA Cumene | Anionic | −1 | Y | N | 0 |

TABLE 12C-continued

Positively Scoring Nanonets

| Surfactant | Polymer | Surfactant class | Score | Linear head group | Branched head group | DB |
|---|---|---|---|---|---|---|
| TC Lab 35 | SMA Cumene | Amphoteric | 1 | N | Y | 0 |
| Triton X-100 ™ | SMA Cumene | Non-ionic | 0 | N | Y | 0 |
| Triton X-305 ™ | SMA Cumene | Non-ionic | 0 | N | Y | 0 |
| Triton X-45 ™ | SMA Cumene | Non-ionic | 0 | N | Y | 0 |
| Tween 40 ™ | SMA Cumene | Non-ionic | 0 | N | Y(4) | 0 |
| Tween 65 ™ | SMA Cumene | Non-ionic | 0 | N | Y(4) | 0 |
| Tween 80 ™ | SMA Cumene | Non-ionic | 0 | N | Y (4) | 1 |
| Tween 85 ™ | SMA Cumene | Non-ionic | 0 | N | Y (4) | 0 |

TABLE 12D

Positively Scoring Nanonets

| Surfactant | Polymer | Head group | HLB | CMC [mM] | Micelle size | PDI |
|---|---|---|---|---|---|---|
| 1,2-Hexanediol | DIBMA | 1,2-glycol | NA | NA | 109.7 | 0.232 |
| Amphosol 2CSF ™ | DIBMA | Dipropionate | NA | NA | 7.808 | 0.315 |
| Apo 10 | DIBMA | Phosphine oxide | NA | NA | 5.835 | 0.259 |
| Apo 12 | DIBMA | Phosphine oxide | NA | NA | 82.41 | 0.272 |
| Stepan Bio Soft D-40 ™ | DIBMA | Sulfonate | NA | NA | 5.13 | 0.322 |
| Cedepal TD-403 MFLD ™ | DIBMA | Ether sulfate | NA | NA | 6.421 | 0.235 |
| Coco Glucoside | DIBMA | Gglucopyranoside | 13.1 | NA | 27.32 | 0.154 |
| Dodecane-1-sulfonic acid | DIBMA | Sulfonate | NA | NA | 5.108 | 0.227 |
| PFDMP O310F | DIBMA | Maltoside-sugar | NA | NA | 23.83 | 0.172 |
| Genapol X080 | DIBMA | Polyethylene glycol | 12 | 0.06-0.15 | 10.58 | 0.147 |
| HEGMDDE H370 | DIBMA | Ethylene glycol | NA | 0.069 | 8.218 | 0.14 |
| HEGMDE H360 | DIBMA | Ethylene glycol | NA | 0.9 | 6.033 | 0.158 |
| HEGMOEH350 | DIBMA | Ethylene glycol | NA | 10 | 5.505 | 0.25 |
| HXEGMDDE H375 | DIBMA | Ethylene glycol | NA | NA | 9.351 | 0.079 |
| Lakeland PAE 136 ™ | DIBMA | Phosphate ester | NA | NA | 7.924 | 0.161 |
| Lathanol LAL ™ | DIBMA | Sulfoacetate | NA | NA | 6.814 | 0.151 |
| MNA C12 | DIBMA | Glucopyranoside | NA | 0.004 | 6.122 | 0.068 |
| MNA C13 | DIBMA | Glucopyranoside | NA | 0.002 | 6.423 | 0.046 |
| MNA C14 | DIBMA | Mannitol | NA | 0.001 | 7.548 | 0.217 |
| n-Decanoyl-L-Methionine | DIBMA | Amino acid | NA | NA | 85.47 | 0.172 |
| n-Decanoyl-L-Threonine | DIBMA | Amino acid | NA | NA | 90.68 | 0.213 |
| n-Dodecanoy-L-Histidine | DIBMA | Amino acid | NA | NA | 99.96 | 0.249 |
| n-Dodecanoyl-L-Methionine | DIBMA | Amino acid | NA | NA | 87.09 | 0.138 |
| n-Dodecanoyl-L-Threonine | DIBMA | Amino acid | NA | NA | 99.77 | 0.203 |
| n-Octanoyl-L-Methionine | DIBMA | Amino acid | NA | NA | 116.6 | 0.239 |
| Sodium dodecylbenzene sulfonate | DIBMA | Sulfonate | NA | NA | 4.235 | 0.53 |
| nDDDTP D342 | DIBMA | Thiomaltopyranoside | NA | 0.05 | 11.67 | 0.131 |
| nDDTGP D323 | DIBMA | Thioglucopyranoside | NA | 0.9 | 262.2 | 0.176 |
| nDDTP D335 | DIBMA | Thiomaltopyranoside | NA | 0.9 | 6.881 | 0.078 |
| Ninate 411 ™ | DIBMA | Sulfonate | NA | 1,214 mg/l | 216.2 | 0.288 |
| nNDTP N335 | DIBMA | Thioglucopyranoside | NA | 2.9 | 137 | 0.357 |
| OEGMDE O330 | DIBMA | Etheylene glycol | NA | 0.09 | 8.099 | 0.165 |
| Poly-10-laurate | DIBMA | Polyglycerol fatty acid ester | 12 | NA | 114.8 | 0.226 |
| Poly-10-oleate | DIBMA | Polyglycerol fatty acid ester | 10.5 | NA | 358 | 0.254 |
| Poly-10-stearate | DIBMA | Polyglycerol fatty acid ester | 10.5 | NA | 112.3 | 0.172 |
| Span 20 ™ | DIBMA | Sorbitan | NA | NA | 1061 | 0.472 |
| Stepan Mild L3 ™ | DIBMA | Lactylate | NA | NA | 372.9 | 0.067 |
| Stepan SLL FB ™ | DIBMA | Lactylate | NA | NA | 136.3 | 0.144 |
| Stepan sulfonic acid ™ | DIBMA | Sulfonate | NA | NA | 2.821 | 0.186 |
| TC Lab 35 | DIBMA | Acetate | 13 | NA | 23.27 | 0.328 |
| Triton X-100 ™ | DIBMA | Ethylene glycol | 13.4 | 0.24 | 10.07 | 0.089 |
| Triton X-305 ™ | DIBMA | Ethylene glycol | 17.3 | 0.65 | 10.66 | 0.181 |
| Triton X-45 ™ | DIBMA | Ethylene glycol | 9.8 | 0.1 | 156.3 | 0.325 |
| Tween 20 ™ | DIBMA | Polysorbate | 16.7 | 0.05 | 9.173 | 0.072 |
| Tween 40 ™ | DIBMA | Polysorbate | 15.6 | NA | 9.691 | 0.079 |
| Tween 60 ™ | DIBMA | Polysorbate | 14.9 | 0.022 | 134.2 | 0.637 |
| tween 65 ™ | DIBMA | Polysorbate | 15.9 | NA | 114.5 | 0.286 |
| Tween 80 ™ | DIBMA | Polysorbate | 15 | 0.012 | 10.42 | 0.026 |
| Tween 85 ™ | DIBMA | Polysorbate | NA | NA | 189.8 | 0.252 |
| 1-Octane sulfonate | SMA 2000 ™ | Sulfonate | NA | NA | 1.562 | 0.367 |
| Amin GCK 30H | SMA 2000 ™ | Acyl glycinate | NA | NA | 7.286 | 0.3 |
| Amphosol 2CSF ™ | SMA 2000 ™ | Dipropionate | NA | NA | 7.808 | 0.315 |
| Apo 10 | SMA 2000 ™ | Phosphine oxide | NA | NA | 5.835 | 0.259 |
| Apo 12 | SMA 2000 ™ | Phosphine oxide | NA | NA | 82.41 | 0.272 |
| Stepan Bio Soft D-40 ™ | SMA 2000 ™ | Sulfonate | NA | NA | 5.13 | 0.322 |
| Stepan Bio Terge AS-40 ™ | SMA 2000 ™ | Sulfonate | NA | NA | 6.434 | 0.181 |

TABLE 12D-continued

Positively Scoring Nanonets

| Surfactant | Polymer | Head group | HLB | CMC [mM] | Micelle size | PDI |
|---|---|---|---|---|---|---|
| Coco Glucoside | SMA 2000 ™ | Glucopyranoside | 13.1 | NA | 27.32 | 0.154 |
| Dodecane-1-sulfonic acid | SMA 2000 ™ | Sulfonate | NA | NA | 5.108 | 0.227 |
| PFDMP-O310F | SMA 2000 ™ | Maltoside-sugar | NA | NA | 23.83 | 0.172 |
| Genapol X080 | SMA 2000 ™ | Polyethylene glycol | 12 | 0.06-0.15 | 10.58 | 0.147 |
| HEGMDDE H370 | SMA 2000 ™ | Ethylene glycol | NA | 0.069 | 8.218 | 0.14 |
| HEGMDE H360 | SMA 2000 ™ | Ethylene glycol | NA | 0.9 | 6.033 | 0.158 |
| HEGMOEH350 | SMA 2000 ™ | Ethylene glycol | NA | 10 | 5.505 | 0.25 |
| HXEGMDDE H375 | SMA 2000 ™ | Ethylene glycol | NA | NA | 9.351 | 0.079 |
| Lakeland PAE 136 ™ | SMA 2000 ™ | Phosphate ester | NA | NA | 7.924 | 0.161 |
| Stepan Lathanol LAL ™ | SMA 2000 ™ | Sulfoacetate | NA | NA | 6.814 | 0.151 |
| MNA C13 | SMA 2000 ™ | Glucopyranoside | NA | 0.002 | 6.423 | 0.046 |
| MNA C14 | SMA 2000 ™ | Mannitol | NA | 0.001 | 7.548 | 0.217 |
| n-Decanoyl-L-Methionine | SMA 2000 ™ | Amino acid | NA | NA | 85.47 | 0.172 |
| n-Decanoyl-L-Threonine | SMA 2000 ™ | Amino acid | NA | NA | 90.68 | 0.213 |
| n-Dodecanoyl-L-Histidine | SMA 2000 ™ | Amino acid | NA | NA | 99.96 | 0.249 |
| n-Dodecanoyl-L-Methionine | SMA 2000 ™ | Amino acid | NA | NA | 87.09 | 0.138 |
| n-Dodecanoyl-L-Threonine | SMA 2000 ™ | Amino acid | NA | NA | 99.77 | 0.203 |
| n-Octanoyl-L-Methionine | SMA 2000 ™ | Amino acid | NA | NA | 116.6 | 0.239 |
| Sodium dodecylbenzene sulfonate | SMA 2000 ™ | Sulfonate | NA | NA | 4.235 | 0.53 |
| nDDDTP D342 | SMA 2000 ™ | Thiomaltopyranoside | NA | 0.05 | 11.67 | 0.131 |
| nDDTGP D323 | SMA 2000 ™ | Thioglucopyranoside | NA | 0.9 | 262.2 | 0.176 |
| nDDTP D335 | SMA 2000 ™ | Thiomaltopyranoside | NA | 0.9 | 6.881 | 0.078 |
| Ninate 411 ™ | SMA 2000 ™ | Sulfonate | NA | 1,214 mg/l | 216.2 | 0.288 |
| nNDTP N335 | SMA 2000 ™ | Thioglucopyranoside | NA | 2.9 | 137 | 0.357 |
| OEGMDE O330 | SMA 2000 ™ | Etheylene glycol | NA | 0.09 | 8.099 | 0.165 |
| Poly-10-laurate | SMA 2000 ™ | Polyglycerol fatty acid ester | 12 | NA | 114.8 | 0.226 |
| Poly-10-oleate | SMA 2000 ™ | Polyglycerol fatty acid ester | 10.5 | NA | 358 | 0.254 |
| Poly-10-stearate | SMA 2000 ™ | Polyglycerol fatty acid ester | 10.5 | NA | 112.3 | 0.172 |
| Span 20 ™ | SMA 2000 ™ | Sorbitan | NA | NA | 1061 | 0.472 |
| Stepan Mild L3 ™ | SMA 2000 ™ | Lactylate | NA | NA | 372.9 | 0.067 |
| Stepan SLL FB ™ | SMA 2000 ™ | Lactylate | NA | NA | 136.3 | 0.144 |
| Stepan sulfonic acid ™ | SMA 2000 ™ | Sulfonate | NA | NA | 2.821 | 0.186 |
| TC Lab 35 | SMA 2000 ™ | Acetate | 13 | NA | 23.27 | 0.328 |
| Triton X-100 ™ | SMA 2000 ™ | Ethylene glycol | 13.4 | 0.24 | 10.07 | 0.089 |
| Triton X-305 ™ | SMA 2000 ™ | Ethylene glycol | 17.3 | 0.65 | 10.66 | 0.181 |
| Triton X-45 ™ | SMA 2000 ™ | Ethylene glycol | 9.8 | 0.1 | 156.3 | 0.325 |
| Tween 20 ™ | SMA 2000 ™ | Polysorbate | 16.7 | 0.05 | 9.173 | 0.072 |
| Tween 40 ™ | SMA 2000 ™ | Polysorbate | 15.6 | NA | 9.691 | 0.079 |
| Tween 60 ™ | SMA 2000 ™ | Polysorbate | 14.9 | 0.022 | 134.2 | 0.637 |
| Tween 65 ™ | SMA 2000 ™ | Polysorbate | 10.5 | NA | 114.5 | 0.286 |
| Tween 80 ™ | SMA 2000 ™ | Polysorbate | 15 | 0.012 | 10.42 | 0.026 |
| Tween 85 ™ | SMA 2000 ™ | Polysorbate | 11 | NA | 189.8 | 0.252 |
| VDISTILL DV53 ™ | SMA 2000 ™ | Fatty acid | NA | NA | NA | NA |
| VDISTILL DV63 ™ | SMA 2000 ™ | Fatty acid | NA | NA | NA | NA |
| 1 octane sulfonate | SMA 2021 ™ | Sulfonate | NA | NA | 1.562 | 0.367 |
| Amin GCK 30H | SMA 2021 ™ | Acyl glycinate | NA | NA | 7.286 | 0.3 |
| Amphosol 2CSF | SMA 2021 ™ | Dipropionate | NA | NA | 7.808 | 0.315 |
| Anthraquinone-2-sulfonic acid | SMA 2021 ™ | Sulfonate | NA | NA | 1.008 | 0.343 |
| Apo 10 | SMA 2021 ™ | Phosphine oxide | NA | NA | 5.835 | 0.259 |
| Apo 12 | SMA 2021 ™ | Phosphine oxide | NA | NA | 82.41 | 0.272 |
| Cedepal TD-403 MFLD ™ | SMA 2021 ™ | Ether sulfate | NA | NA | 6.421 | 0.235 |
| Coco Glucoside | SMA 2021 ™ | Glucopyranoside | 13.1 | NA | 27.32 | 0.154 |
| Dodecane-1-sulfonic acid | SMA 2021 ™ | Sulfonate | NA | NA | 5.108 | 0.227 |
| PFDMP-O310F | SMA 2021 ™ | Maltoside-sugar | NA | NA | 23.83 | 0.172 |
| Genapol X080 | SMA 2021 ™ | Polyethylene glycol | 12 | 0.06-0.15 | 10.58 | 0.147 |
| HEGMDDE H370 | SMA 2021 ™ | Ethylene glycol | NA | 0.069 | 8.218 | 0.14 |
| HEGMDE H360 | SMA 2021 ™ | Ethylene glycol | NA | 0.9 | 6.033 | 0.158 |
| HEGMOE H350 | SMA 2021 ™ | Ethylene glycol | NA | 10 | 5.505 | 0.25 |
| HXEGMDDE H375 | SMA 2021 ™ | Ethylene glycol | NA | NA | 9.351 | 0.079 |
| Lakeland PAE 136 ™ | SMA 2021 ™ | Phosphate ester | NA | NA | 7.924 | 0.161 |
| Lathanol LAL ™ | SMA 2021 ™ | Sulfoacetate | NA | NA | 6.814 | 0.151 |
| MNA C13 | SMA 2021 ™ | Glucopyranoside | NA | 0.002 | 6.423 | 0.046 |
| MNA C14 | SMA 2021 ™ | Mannitol | NA | 0.001 | 7.548 | 0.217 |
| n-Decanoyl-L-Methionine | SMA 2021 ™ | Amino acid | NA | NA | 85.47 | 0.172 |
| n-Decanoyl-L-Threonine | SMA 2021 ™ | Amino acid | NA | NA | 90.68 | 0.213 |
| n-Dodecanoyl-L-Methionine | SMA 2021 ™ | Amino acid | NA | NA | 87.09 | 0.138 |
| n-Dodecanoyl-L-Threonine | SMA 2021 ™ | Amino acid | NA | NA | 99.77 | 0.203 |
| n-Octanoyl-L-Methionine | SMA 2021 ™ | Amino acid | NA | NA | 116.6 | 0.239 |
| Sodium dodecylbenzene sulfonate | SMA 2021 ™ | Sulfonate | NA | NA | 4.235 | 0.53 |
| nDDDTP D342 | SMA 2021 ™ | Thiomaltopyranoside | NA | 0.05 | 11.67 | 0.131 |
| nDDTGP D323 | SMA 2021 ™ | Thioglucopyranoside | NA | 0.9 | 262.2 | 0.176 |
| nDDTP D335 | SMA 2021 ™ | Thiomaltopyranoside | NA | 0.9 | 6.881 | 0.078 |
| Ninate 411 ™ | SMA 2021 ™ | Sulfonate | NA | 1,214 mg/l | 216.2 | 0.288 |
| nNDTP N335 | SMA 2021 ™ | Thioglucopyranoside | NA | 2.9 | 137 | 0.357 |
| OEGMDE O330 | SMA 2021 ™ | Etheylene glycol | NA | 0.09 | 8.099 | 0.165 |

TABLE 12D-continued

Positively Scoring Nanonets

| Surfactant | Polymer | Head group | HLB | CMC [mM] | Micelle size | PDI |
|---|---|---|---|---|---|---|
| Poly-10-laurate | SMA 2021 ™ | Polyglycerol fatty acid ester | 12 | NA | 114.8 | 0.226 |
| Poly-10-oleate | SMA 2021 ™ | Polyglycerol fatty acid ester | 10.5 | NA | 358 | 0.254 |
| Poly-10-palmitate | SMA 2021 ™ | Polyglycerol fatty acid ester | 10.5 | NA | 111.8 | 0.226 |
| Poly-10-stearate | SMA 2021 ™ | Polyglycerol fatty acid ester | NA | NA | 112.3 | 0.172 |
| Span 20 ™ | SMA 2021 ™ | Sorbitan | NA | NA | 1061 | 0.472 |
| Stepan Mild L3 ™ | SMA 2021 ™ | Lactylate | NA | NA | 372.9 | 0.067 |
| Stepan SLL FB ™ | SMA 2021 ™ | Lactylate | NA | NA | 136.3 | 0.144 |
| Stepan sulfonic acid ™ | SMA 2021 ™ | Sulfonate | NA | NA | 2.821 | 0.186 |
| TC Lab 35 | SMA 2021 ™ | Acetate | 13 | NA | 23.27 | 0.328 |
| Triton X-100 ™ | SMA 2021 ™ | Ethylene glycol | 13.4 | 0.24 | 10.07 | 0.089 |
| Triton X-305 ™ | SMA 2021 ™ | Ethylene glycol | 17.3 | 0.65 | 10.66 | 0.181 |
| Triton X-45 ™ | SMA 2021 ™ | Ethylene glycol | 9.8 | 0.1 | 156.3 | 0.325 |
| Tween 40 ™ | SMA 2021 ™ | Polysorbate | 15.6 | NA | 9.691 | 0.079 |
| Tween 60 ™ | SMA 2021 ™ | Polysorbate | 14.9 | 0.022 | 134.2 | 0.637 |
| Tween 80 ™ | SMA 2021 ™ | Polysorbate | 15 | 0.012 | 10.42 | 0.026 |
| Tween 85 ™ | SMA 2021 ™ | Polysorbate | 11 | NA | 189.8 | 0.252 |
| Amphosol 2CSF ™ | SMA 3000 ™ | Dipropionate | NA | NA | 7.808 | 0.315 |
| Anthraquinone-2-sulfonic acid | SMA 3000 ™ | Sulfonate | NA | NA | 1.008 | 0.343 |
| Apo 10 | SMA 3000 ™ | Phosphine oxide | NA | NA | 5.835 | 0.259 |
| Apo 12 | SMA 3000 ™ | Phosphine oxide | NA | NA | 82.41 | 0.272 |
| Coco Glucoside | SMA 3000 ™ | Glucopyranoside | 13.1 | NA | 27.32 | 0.154 |
| PFDMP-O310F | SMA 3000 ™ | Maltoside-sugar | NA | NA | 23.83 | 0.172 |
| Genapol X080 | SMA 3000 ™ | Polyethylene glycol | 12 | 0.06-0.15 | 10.58 | 0.147 |
| HEGMDDE H370 | SMA 3000 ™ | Ethylene glycol | NA | 0.069 | 8.218 | 0.14 |
| HEGMDE H360 | SMA 3000 ™ | Ethylene glycol | NA | 0.9 | 6.033 | 0.158 |
| HEGMOE H350 | SMA 3000 ™ | Ethylene glycol | NA | 10 | 5.505 | 0.25 |
| HXEGMDDE H375 | SMA 3000 ™ | Ethylene glycol | NA | NA | 9.351 | 0.079 |
| Lakeland PAE 136 ™ | SMA 3000 ™ | Phosphate ester | NA | NA | 7.924 | 0.161 |
| Lathanol LAL ™ | SMA 3000 ™ | Sulfoacetate | NA | NA | 6.814 | 0.151 |
| MNA C12 | SMA 3000 ™ | Glucopyranoside | NA | 0.004 | 6.122 | 0.068 |
| MNA C13 | SMA 3000 ™ | Glucopyranoside | NA | 0.002 | 6.423 | 0.046 |
| MNA C14 | SMA 3000 ™ | Mannitol | NA | 0.001 | 7.548 | 0.217 |
| n-Decanoyl-L-Methionine | SMA 3000 ™ | Amino acid | NA | NA | 85.47 | 0.172 |
| n-Decanoyl-L-Threonine | SMA 3000 ™ | Amino acid | NA | NA | 90.68 | 0.213 |
| n-Dodecanoyl-L-Histidine | SMA 3000 ™ | Amino acid | NA | NA | 99.96 | 0.249 |
| n-Dodecanoyl-L-Methionine | SMA 3000 ™ | Amino acid | NA | NA | 87.09 | 0.138 |
| n-Dodecanoyl-L-Threonine | SMA 3000 ™ | Amino acid | NA | NA | 99.77 | 0.203 |
| n-Octanoyl-L-Methionine | SMA 3000 ™ | Amino acid | NA | NA | 116.6 | 0.239 |
| Sodium dodecylbenzene sulfonate | SMA 3000 ™ | Sulfonate | NA | NA | 4.235 | 0.53 |
| nDDDTP D342 | SMA 3000 ™ | Thiomaltopyranoside | NA | 0.05 | 11.67 | 0.131 |
| nDDTGP D323 | SMA 3000 ™ | Thioglucopyranoside | NA | 0.9 | 262.2 | 0.176 |
| nDDTP D335 | SMA 3000 ™ | Thiomaltopyranoside | NA | 0.9 | 6.881 | 0.078 |
| Ninate 411 ™ | SMA 3000 ™ | Sulfonate | NA | 1,214 mg/l | 216.2 | 0.288 |
| nNDTP N335 | SMA 3000 ™ | Thioglucopyranoside | NA | 2.9 | 137 | 0.357 |
| nODTTP O320 | SMA 3000 ™ | Thiomaltopyranoside | NA | 8.5 | 6.022 | 0.324 |
| OEGMDE O330 | SMA 3000 ™ | etheylene glycol | NA | 0.09 | 8.099 | 0.165 |
| Poly-10-laurate | SMA 3000 ™ | polyglycerol fatty acid ester | 12 | NA | 114.8 | 0.226 |
| Poly-10-oleate | SMA 3000 ™ | polyglycerol fatty acid ester | 10.5 | NA | 358 | 0.254 |
| Poly-10-palmitate | SMA 3000 ™ | polyglycerol fatty acid ester | 10.5 | NA | 111.8 | 0.226 |
| Poly-10-stearate | SMA 3000 ™ | polyglycerol fatty acid ester | 11 | NA | 112.3 | 0.172 |
| Span 20 ™ | SMA 3000 ™ | Sorbitan | NA | NA | 1061 | 0.472 |
| Stepan Mild L3 ™ | SMA 3000 ™ | Lactylate | NA | NA | 372.9 | 0.067 |
| Stepan SLL FB ™ | SMA 3000 ™ | Lactylate | NA | NA | 136.3 | 0.144 |
| Stepan sulfonic acid ™ | SMA 3000 ™ | Sulfonate | NA | NA | 2.821 | 0.186 |
| TC Lab 35 | SMA 3000 ™ | Acetate | 13 | NA | 23.27 | 0.328 |
| Triton X-100 ™ | SMA 3000 ™ | Ethylene glycol | 13.4 | 0.24 | 10.07 | 0.089 |
| Triton X-305 ™ | SMA 3000 ™ | Ethylene glycol | 17.3 | 0.65 | 10.66 | 0.181 |
| Triton X-45 ™ | SMA 3000 ™ | Ethylene glycol | 9.8 | 0.1 | 156.3 | 0.325 |
| Tween 65 ™ | SMA 3000 ™ | Polysorbate | 10.5 | NA | 114.5 | 0.286 |
| Tween 85 ™ | SMA 3000 ™ | Polysorbate | 11 | NA | 189.8 | 0.252 |
| Amin GCK 30H | SMA-IBE | Acyl glycinate | NA | NA | 7.286 | 0.3 |
| Amphosol 2CSF ™ | SMA-IBE | Dipropionate | NA | NA | 7.808 | 0.315 |
| Apo 10 | SMA-IBE | Phosphine oxide | NA | NA | 5.835 | 0.259 |
| Apo 12 | SMA-IBE | Phosphine oxide | NA | NA | 82.41 | 0.272 |
| Stepan Bio Soft D-40 ™ | SMA-IBE | Sulfonate | NA | NA | 5.13 | 0.322 |
| Coco Glucoside | SMA-IBE | Glucopyranoside | 13.1 | NA | 27.32 | 0.154 |
| Fluoro octyl maltoside O310F | SMA-IBE | Maltoside-sugar | NA | NA | 23.83 | 0.172 |
| HEGMDDE H370 | SMA-IBE | Ethylene glycol | NA | 0.069 | 8.218 | 0.14 |
| HEGMDE H360 | SMA-IBE | Ethylene glycol | NA | 0.9 | 6.033 | 0.158 |
| HXEGMDDE H375 | SMA-IBE | Ethylene glycol | NA | NA | 9.351 | 0.079 |
| Lakeland PAE 136 ™ | SMA-IBE | Phosphate ester | NA | NA | 7.924 | 0.161 |
| MNA C14 | SMA-IBE | Mannitol | NA | 0.001 | 7.548 | 0.217 |
| n-Decanoyl-L-Methionine | SMA-IBE | Amino acid | NA | NA | 85.47 | 0.172 |
| n-Decanoyl-L-Threonine | SMA-IBE | Amino acid | NA | NA | 90.68 | 0.213 |
| n-Dodecanoyl-L-Histidine | SMA-IBE | Amino acid | NA | NA | 99.96 | 0.249 |

TABLE 12D-continued

Positively Scoring Nanonets

| Surfactant | Polymer | Head group | HLB | CMC [mM] | Micelle size | PDI |
|---|---|---|---|---|---|---|
| n-Dodecanoyl-L-Methionine | SMA-IBE | Amino acid | NA | NA | 87.09 | 0.138 |
| n-Dodecanoyl-L-Threonine | SMA-IBE | Amino acid | NA | NA | 99.77 | 0.203 |
| n-Octanoyl-L-Methionine | SMA-IBE | Amino acid | NA | NA | 116.6 | 0.239 |
| nDDDTP D342 | SMA-IBE | Thiomaltopyranoside | NA | 0.05 | 11.67 | 0.131 |
| nDDTGP D323 | SMA-IBE | Thioglucopyranoside | NA | 0.9 | 262.2 | 0.176 |
| nDDTP D335 | SMA-IBE | Thiomaltopyranoside | NA | 0.9 | 6.881 | 0.078 |
| OEGMDE O330 | SMA-IBE | Etheylene glycol | NA | 0.09 | 8.099 | 0.165 |
| Poly-10-laurate | SMA-IBE | Polyglycerol fatty acid ester | 12 | NA | 114.8 | 0.226 |
| Poly-10-oleate | SMA-IBE | Polyglycerol fatty acid ester | 10.5 | NA | 358 | 0.254 |
| Span 20 ™ | SMA-IBE | Sorbitan | NA | NA | 1061 | 0.472 |
| Stepan Mild L3 ™ | SMA-IBE | Lactylate | NA | NA | 372.9 | 0.067 |
| Stepan SLL FB ™ | SMA-IBE | Lactylate | NA | NA | 136.3 | 0.144 |
| Stepan sulfonic acid ™ | SMA-IBE | Sulfonate | NA | NA | 2.821 | 0.186 |
| Triton X-305 ™ | SMA-IBE | Ethylene glycol | 17.3 | 0.65 | 10.66 | 0.181 |
| Triton X-45 ™ | SMA-IBE | Ethylene glycol | 9.8 | 0.1 | 156.3 | 0.325 |
| Tween 60 ™ | SMA-IBE | Polysorbate | 14.9 | 0.022 | 134.2 | 0.637 |
| Tween 65 ™ | SMA-IBE | Polysorbate | 10.5 | NA | 114.5 | 0.286 |
| Tween 85 ™ | SMA-IBE | Polysorbate | 11 | NA | 189.8 | 0.252 |
| 1,2-Hexanediol | SMA 725 ™ | 1,2-glycol | NA | NA | 109.7 | 0.232 |
| Amin GCK 30H | SMA 725 ™ | Acyl glycinate | NA | NA | 7.286 | 0.3 |
| Amphosol 2CSF ™ | SMA 725 ™ | Dipropionate | NA | NA | 7.808 | 0.315 |
| Apo 10 | SMA 725 ™ | Phosphine oxide | NA | NA | 5.835 | 0.259 |
| Apo 12 | SMA 725 ™ | Phosphine oxide | NA | NA | 82.41 | 0.272 |
| Stepan Bio Soft D-40 ™ | SMA 725 ™ | Sulfonate | NA | NA | 5.13 | 0.322 |
| Stepan Bio Terge AS-40 ™ | SMA 725 ™ | Sulfonate | NA | NA | 6.434 | 0.181 |
| Dodecane-1-sulfonic acid | SMA 725 ™ | Sulfonate | NA | NA | 5.108 | 0.227 |
| PFDMP-O310F | SMA 725 ™ | Maltoside-sugar | NA | NA | 23.83 | 0.172 |
| Genapol X080 | SMA 725 ™ | Polyethylene glycol | 12 | 0.06-0.15 | 10.58 | 0.147 |
| HEGMDDE H370 | SMA 725 ™ | Ethylene glycol | NA | 0.069 | 8.218 | 0.14 |
| HEGMDE H360 | SMA 725 ™ | Ethylene glycol | NA | 0.9 | 6.033 | 0.158 |
| HXEGMDDE H375 | SMA 725 ™ | Ethylene glycol | NA | NA | 9.351 | 0.079 |
| Lakeland PAE 136 | SMA 725 ™ | Phosphate ester | NA | NA | 7.924 | 0.161 |
| Stepan Lathanol LAL ™ | SMA 725 ™ | Sulfoacetate | NA | NA | 6.814 | 0.151 |
| MNA C12 | SMA 725 ™ | Glucopyranoside | NA | 0.004 | 6.122 | 0.068 |
| MNA C14 | SMA 725 ™ | Mannitol | NA | 0.001 | 7.548 | 0.217 |
| n-Decanoyl-L-Methionine | SMA 725 ™ | Amino acid | NA | NA | 85.47 | 0.172 |
| n-Decanoyl-L-Threonine | SMA 725 ™ | Amino acid | NA | NA | 90.68 | 0.213 |
| n-Dodecanoyl-L-Histidine | SMA 725 ™ | Amino acid | NA | NA | 99.96 | 0.249 |
| n-Dodecanoyl-L-Methionine | SMA 725 ™ | Amino acid | NA | NA | 87.09 | 0.138 |
| n-Dodecanoyl-L-Threonine | SMA 725 ™ | Amino acid | NA | NA | 99.77 | 0.203 |
| n-Octanoyl-L-Methionine | SMA 725 ™ | Amino acid | NA | NA | 116.6 | 0.239 |
| nDDDTP D342 | SMA 725 ™ | Thiomaltopyranoside | NA | 0.05 | 11.67 | 0.131 |
| nDDTGP D323 | SMA 725 ™ | Thioglucopyranoside | NA | 0.9 | 262.2 | 0.176 |
| nDDTP D335 | SMA 725 ™ | Thiomaltopyranoside | NA | 0.9 | 6.881 | 0.078 |
| Ninate 411 ™ | SMA 725 ™ | Sulfonate | NA | 1,214 mg/l | 216.2 | 0.288 |
| nNDTP N335 | SMA 725 ™ | Thioglucopyranoside | NA | 2.9 | 137 | 0.357 |
| OEGMDE O330 | SMA 725 ™ | Etheylene glycol | NA | 0.09 | 8.099 | 0.165 |
| Poly-10-laurate | SMA 725 ™ | Polyglycerol fatty acid ester | 12 | NA | 114.8 | 0.226 |
| Poly-10-oleate | SMA 725 ™ | Polyglycerol fatty acid ester | 10.5 | NA | 358 | 0.254 |
| Poly-10-palmitate | SMA 725 ™ | Polyglycerol fatty acid ester | 10.5 | NA | 111.8 | 0.226 |
| Poly-10-stearate | SMA 725 ™ | Polyglycerol fatty acid ester | 11 | NA | 112.3 | 0.172 |
| Span 20 ™ | SMA 725 ™ | Sorbitan | 8.6 | NA | 1061 | 0.472 |
| Stepan Mild L3 ™ | SMA 725 ™ | Lactylate | NA | NA | 372.9 | 0.067 |
| Stepan SLL FB ™ | SMA 725 ™ | Lactylate | NA | NA | 136.3 | 0.144 |
| Triton X-100 ™ | SMA 725 ™ | Ethylene glycol | 13.4 | 0.24 | 10.07 | 0.089 |
| Triton X-305 ™ | SMA 725 ™ | Ethylene glycol | 17.3 | 0.65 | 10.66 | 0.181 |
| Triton X-45 ™ | SMA 725 ™ | Ethylene glycol | 9.8 | 0.1 | 156.3 | 0.325 |
| Tween 65 ™ | SMA 725 ™ | Polysorbate | 10 | NA | 114.5 | 0.286 |
| Tween 80 ™ | SMA 725 ™ | Polysorbate | 15 | 0.012 | 10.42 | 0.026 |
| VDISTILL DV53 ™ | SMA 725 ™ | Fatty acid | NA | NA | NA | NA |
| Amin GCK 30H | SMA Cumene | Acyl glycinate | NA | NA | 7.286 | 0.3 |
| Amphosol 2CSF ™ | SMA Cumene | Dipropionate | NA | NA | 7.808 | 0.315 |
| Apo 10 | SMA Cumene | Phosphine oxide | NA | NA | 5.835 | 0.259 |
| Apo 12 | SMA Cumene | Phosphine oxide | NA | NA | 82.41 | 0.272 |
| Coco Glucoside | SMA Cumene | Glucopyranoside | 13.1 | NA | 27.32 | 0.154 |
| PFDMP-O310F | SMA Cumene | Maltoside-sugar | NA | NA | 23.83 | 0.172 |
| Genapol X080 | SMA Cumene | Polyethylene glycol | 12 | 0.06-0.15 | 10.58 | 0.147 |
| HEGMDDE H370 | SMA Cumene | Ethylene glycol | NA | 0.069 | 8.218 | 0.14 |
| HEGMDE H360 | SMA Cumene | Ethylene glycol | NA | 0.9 | 6.033 | 0.158 |
| HEGMOE H350 | SMA Cumene | Ethylene glycol | NA | 10 | 5.505 | 0.25 |
| HXEGMDDE H375 | SMA Cumene | Ethylene glycol | NA | NA | 9.351 | 0.079 |
| Lakeland PAE 136 ™ | SMA Cumene | Phosphate ester | NA | NA | 7.924 | 0.161 |
| MNA C12 | SMA Cumene | Glucopyranoside | NA | 0.004 | 6.122 | 0.068 |
| MNA C13 | SMA Cumene | Glucopyranoside | NA | 0.002 | 6.423 | 0.046 |
| MNA C14 | SMA Cumene | Mannitol | NA | 0.001 | 7.548 | 0.217 |

TABLE 12D-continued

Positively Scoring Nanonets

| Surfactant | Polymer | Head group | HLB | CMC [mM] | Micelle size | PDI |
|---|---|---|---|---|---|---|
| n-Decanoyl-L-Methionine | SMA Cumene | Amino acid | NA | NA | 85.47 | 0.172 |
| n-Decanoyl-L-Threonine | SMA Cumene | Amino acid | NA | NA | 90.68 | 0.213 |
| n-Dodecanoyl-L-Histidine | SMA Cumene | Amino acid | NA | NA | 99.96 | 0.249 |
| n-Dodecanoyl-L-Methionine | SMA Cumene | Amino acid | NA | NA | 87.09 | 0.138 |
| n-Dodecanoyl-L-Threonine | SMA Cumene | Amino acid | NA | NA | 99.77 | 0.203 |
| n-Octanoyl-L-Methionine | SMA Cumene | Amino acid | NA | NA | 116.6 | 0.239 |
| Sodium dodecylbenzene sulfonate | SMA Cumene | Sulfonate | NA | NA | 4.235 | 0.53 |
| nDDDTP D342 | SMA Cumene | Thiomaltopyranoside | NA | 0.05 | 11.67 | 0.131 |
| nDDTGP D323 | SMA Cumene | Thioglucopyranoside | NA | 0.9 | 262.2 | 0.176 |
| nDDTP D335 | SMA Cumene | Thiomaltopyranoside | NA | 0.9 | 6.881 | 0.078 |
| nNDTP N335 | SMA Cumene | Thioglucopyranoside | NA | 2.9 | 137 | 0.357 |
| OEGMDE O330 | SMA Cumene | Etheylene glycol | NA | 0.09 | 8.099 | 0.165 |
| Poly-10-laurate | SMA Cumene | Polyglycerol fatty acid ester | 12 | NA | 114.8 | 0.226 |
| Poly-10-oleate | SMA Cumene | polyglycerol fatty acid ester | 10.5 | NA | 358 | 0.254 |
| Poly-10-stearate | SMA Cumene | polyglycerol fatty acid ester | 11 | NA | 112.3 | 0.172 |
| Span 20 ™ | SMA Cumene | Sorbitan | NA | NA | 1061 | 0.472 |
| Stepan Mild L3 ™ | SMA Cumene | Lactylate | NA | NA | 372.9 | 0.067 |
| Stepan SLL FB ™ | SMA Cumene | Lactylate | NA | NA | 136.3 | 0.144 |
| Stepan sulfonic acid ™ | SMA Cumene | Sulfonate | NA | NA | 2.821 | 0.186 |
| TC Lab 35 | SMA Cumene | Acetate | 13 | NA | 23.27 | 0.328 |
| Triton X-100 ™ | SMA Cumene | Etheylene glycol | 13.4 | 0.24 | 10.07 | 0.089 |
| Triton X-305 ™ | SMA Cumene | Etheylene glycol | 17.3 | 0.65 | 10.66 | 0.181 |
| Triton X-45 ™ | SMA Cumene | Etheylene glycol | 9.8 | 0.1 | 156.3 | 0.325 |
| Tween 40 ™ | SMA Cumene | Polysorbate | 15.6 | NA | 9.691 | 0.079 |
| Tween 65 ™ | SMA Cumene | Polysorbate | 15.9 | NA | 114.5 | 0.286 |
| Tween 80 ™ | SMA Cumene | Polysorbate | 10.5 | 0.012 | 10.42 | 0.026 |
| Tween 85 ™ | SMA Cumene | Polysorbate | 11 | NA | 189.8 | 0.252 |

TABLE 13

Non-ionic Surfactants and Polymer Combinations That Did Not Form a Nanonet Response in Titration Assays (No Sigmoid Detected)

| Surfactant | Alkyl Chain Carbon no. | Polymer | Average Polymer Diameter [nm] | Theoretical Polymer Diameter | Head Group | Surfactant Aggregate Diameter [nm] | Poly dispersity index (PDI) |
|---|---|---|---|---|---|---|---|
| Coco Glucoside | 18 | SMA 725 ™ | 15.03 | 6.8 | Glucopyranoside | 27.32 | 0.154 |
| HEGMOE H350 | 8 | SMA 725 ™ | 15.03 | 6.8 | Ethylene glycol | 5.505 | 0.25 |
| MNA C13 | 13 | SMA 725 ™ | 15.03 | 6.8 | Glucopyranoside | 6.423 | 0.046 |
| nHDTP H301 | 7 | SMA 725 ™ | 15.03 | 6.8 | Thioglucopyranoside | 8.935 | 0.011 |
| nODTTP O320 | 8 | SMA 725 ™ | 15.03 | 6.8 | Thiomaltopyranoside | 6.022 | 0.324 |
| Tween 20 ™ | 12 | SMA 725 ™ | 15.03 | 6.8 | Polysorbate | 9.173 | 0.072 |
| Tween 40 ™ | 16 | SMA 725 ™ | 15.03 | 6.8 | Polysorbate | 9.691 | 0.079 |
| Tween 60 ™ | 18 | SMA 725 ™ | 15.03 | 6.8 | Polysorbate | 134.2 | 0.637 |
| Tween 85 ™ | 16 | SMA 725 ™ | 15.03 | 6.8 | Polysorbate | 189.8 | 0.252 |
| Vdistill DV63 ™ | 8, 18 | SMA 725 ™ | 15.03 | 6.8 | Fatty acid | NA | NA |
| MNA C12 | 12 | SMA 2000 ™ | 5.242 | 2.6 | Glucopyranoside | 6.122 | 0.068 |
| nHDTP H301 | 7 | SMA 2000 ™ | 5.242 | 2.6 | Thioglucopyranoside | 8.935 | 0.011 |
| nODTTP O320 | 8 | SMA 2000 ™ | 5.242 | 2.6 | Thiomaltopyranoside | 6.022 | 0.324 |
| Poly-10-palmitate | 16 | SMA 2000 ™ | 5.242 | 2.6 | Polyglycerol fatty acid ester | 111.8 | 0.226 |
| nHDTP H301 | 7 | DIBMA | 92.7 | 3.2 | Thioglucopyranoside | 8.935 | 0.011 |
| nODTTP O320 | 8 | DIBMA | 92.7 | 3.2 | Thiomaltopyranoside | 6.022 | 0.324 |
| Poly-10-palmitate | 16 | DIBMA | 92.7 | 3.2 | Polyglycerol fatty acid ester | 111.8 | 0.226 |
| Vdistill DV53 ™ | 18, 18 | DIBMA | 92.7 | 3.2 | Fatty acid | NA | NA |
| Vdistill DV63 ™ | 18, 18 | DIBMA | 92.7 | 3.2 | Fatty acid | NA | NA |
| MNA C12 | 12 | SMA 2021 ™ | 6.627 | 3.7 | Glucopyranoside | 6.122 | 0.068 |
| nHDTP H301 | 7 | SMA 2021 ™ | 6.627 | 3.7 | Thioglucopyranoside | 8.935 | 0.011 |
| nODTTP O320 | 8 | SMA 2021 ™ | 6.627 | 3.7 | Thiomaltopyranoside | 6.022 | 0.324 |
| Tween 20 ™ | 12 | SMA 2021 ™ | 6.627 | 3.7 | Polysorbate | 9.173 | 0.072 |
| Tween 65 ™ | 18 | SMA 2021 ™ | 6.627 | 3.7 | Polysorbate | 114.5 | 0.286 |
| Vdistill DV53 ™ | 18, 18 | SMA 2021 ™ | 6.627 | 3.7 | Fatty acid | NA | NA |
| Vdistill DV63 ™ | 18, 18 | SMA 2021 ™ | 6.627 | 3.7 | Fatty acid | NA | NA |
| nHDTP H301 | 7 | SMA 3000 ™ | 3.713 | 2.8 | Thioglucopyranoside | 8.935 | 0.011 |
| Tween 20 ™ | 12 | SMA 3000 ™ | 3.713 | 2.8 | Polysorbate | 9.173 | 0.072 |
| Tween 40 ™ | 16 | SMA 3000 ™ | 3.713 | 2.8 | Polysorbate | 9.691 | 0.079 |
| Tween 60 ™ | 18 | SMA 3000 ™ | 3.713 | 2.8 | Polysorbate | 134.2 | 0.637 |
| Tween 80 ™ | 18 | SMA 3000 ™ | 3.713 | 2.8 | Polysorbate | 10.42 | 0.026 |
| Vdistill DV53 ™ | 18, 18 | SMA 3000 ™ | 3.713 | 2.8 | Fatty acid | NA | NA |
| Vdistill DV63 ™ | 18, 18 | SMA 3000 ™ | 3.713 | 2.8 | Fatty acid | NA | NA |
| Genapol X-080 | 13 | SMA IBE | 9.759 | 5.4 | Poly ethylene glycol | 10.58 | 0.147 |

TABLE 13-continued

Non-ionic Surfactants and Polymer Combinations That Did Not Form a Nanonet Response in Titration Assays (No Sigmoid Detected)

| Surfactant | Alkyl Chain Carbon no. | Polymer | Average Polymer Diameter [nm] | Theoretical Polymer Diameter | Head Group | Surfactant Aggregate Diameter [nm] | Poly dispersity index (PDI) |
|---|---|---|---|---|---|---|---|
| hegmoe H350 | 8 | SMA IBE | 9.759 | 5.4 | Ethylene glycol | 5.505 | 0.25 |
| MNA C12 | 12 | SMA IBE | 9.759 | 5.4 | Glucopyranoside | 6.122 | 0.068 |
| MNA C13 | 13 | SMA IBE | 9.759 | 5.4 | Glucopyranoside | 6.423 | 0.046 |
| nHDTP H301 | 7 | SMA IBE | 9.759 | 5.4 | Thioglucopyranoside | 8.935 | 0.011 |
| nNDTP N335 | 9 | SMA IBE | 9.759 | 5.4 | Thioglucopyranoside | 137 | 0.357 |
| nODTTP O320 | 8 | SMA IBE | 9.759 | 5.4 | Thiomaltopyranoside | 6.022 | 0.324 |
| Poly-10-palmitate | 16 | SMA IBE | 9.759 | 5.4 | Polyglycerol fatty acid ester | 111.8 | 0.226 |
| Poly-10-stearate | 18 | SMA IBE | 9.759 | 5.4 | Polyglycerol fatty acid ester | 112.3 | 0.172 |
| Triton X-100 ™ | 8 | SMA IBE | 9.759 | 5.4 | Ethylene glycol | 10.07 | 0.089 |
| Tween 20 ™ | 12 | SMA IBE | 9.759 | 5.4 | Polysorbate | 9.173 | 0.072 |
| Tween 40 ™ | 16 | SMA IBE | 9.759 | 5.4 | Polysorbate | 9.691 | 0.079 |
| Tween 80 ™ | 18 | SMA IBE | 9.759 | 5.4 | Polysorbate | 10.42 | 0.026 |
| Vdistill DV53 ™ | 18, 18 | SMA IBE | 9.759 | 5.4 | Fatty acid | NA | NA |
| Vdistill DV63 ™ | 18, 18 | SMA IBE | 9.759 | 5.4 | Fatty acid | NA | NA |
| nHDTP H301 | 7 | SMA Cumene | 7.123 | 1.5 | Thioglucopyranoside | 8.935 | 0.011 |
| nODTTP O320 | 8 | SMA Cumene | 7.123 | 1.5 | Thiomaltopyranoside | 6.022 | 0.324 |
| Poly-10-palmitate | 16 | SMA Cumene | 7.123 | 1.5 | Polyglycerol fatty acid ester | 111.8 | 0.226 |
| Tween 20 ™ | 12 | SMA Cumene | 7.123 | 1.5 | Polysorbate | 9.173 | 0.072 |
| Tween 60 ™ | 18 | SMA Cumene | 7.123 | 1.5 | Polysorbate | 134.2 | 0.637 |
| Vdistill DV53 ™ | 18, 18 | SMA Cumene | 7.123 | 1.5 | Fatty acid | NA | NA |
| Vdistill DV63 ™ | 18, 18 | SMA Cumene | 7.123 | 1.5 | Fatty acid | NA | NA |

TABLE 14

Anionic Surfactants and Polymer Combinations That Did Not Form a Nanonet Response in Tiitration Assays (No Sigmoid Detected)

| Surfactant | Alkyl Chain Carbon No. | Polymer | Average Polymer Diameter [nm] | Theoretical Polymer | Head Group | Surfactant Aggregate Diameter [nm] | Poly Dispersity Index (PDI) |
|---|---|---|---|---|---|---|---|
| 1-Octane sulfonate | 8 | SMA 725 ™ | 15.03 | 6.8 | Sulfonate | 1.562 | 0.367 |
| Anthraquinone-2-sulfonic | 0 | SMA 725 ™ | 15.03 | 6.8 | Sulfonate | 1.008 | 0.343 |
| Cedepal TD-403 MFLD ™ | 13 | SMA 725 ™ | 15.03 | 6.8 | Ether sulfate | 6.421 | 0.235 |
| n-Octanoyl-L-threonine | 8 | SMA 725 ™ | 15.03 | 6.8 | Amino acid | 119 | 0.372 |
| Sodium dodecylbenzene sulfonate | 12 | SMA 725 ™ | 15.03 | 6.8 | Sulfonate | 4.235 | 0.53 |
| p-Toluene sulfonic acid | 1 | SMA 725 ™ | 15.03 | 6.8 | Sulfonate | 0.8236 | 0.32 |
| Potassium ethyl xanthogenate | 2 | SMA 725 ™ | 15.03 | 6.8 | Xanthogenate | 190.7 | 0.281 |
| Sodium-1-pentasulfonate | 5 | SMA 725 ™ | 15.03 | 6.8 | Sulfonate | 0.8036 | 0.537 |
| Stepan sulfonic acid ™ | 12 | SMA 725 ™ | 15.03 | 6.8 | Sulfonate | 2.821 | 0.186 |
| Anthraquinone-2 sulfonic acid sodium salt | 0 | SMA 2000 ™ | 5.242 | 2.6 | Sulfonate | 1.008 | 0.343 |
| Cedepal TD 403 MFLD ™ | 13 | SMA 2000 ™ | 5.242 | 2.6 | Ether sulfate | 6.421 | 0.235 |
| n-Octanoyl-L-Threonine | 8 | SMA 2000 ™ | 5.242 | 2.6 | Amino acid | 119 | 0.372 |
| p-Toluene Sulfonic acid | 1 | SMA 2000 ™ | 5.242 | 2.6 | Sulfonate | 0.8236 | 0.32 |
| Potassium ethyl xanthogenate | 2 | SMA 2000 ™ | 5.242 | 2.6 | Xanthogenate | 190.7 | 0.281 |
| Sodium-1-pentasulfonate | 5 | SMA 2000 ™ | 5.242 | 2.6 | Sulfonate | 0.8036 | 0.537 |
| 1-Octane Sulfonate | 8 | DIBMA | 92.7 | 3.2 | Sulfonate | 1.562 | 0.367 |
| Amin GCK | 18, 8 | DIBMA | 92.7 | 3.2 | Acyl glycinate | 7.286 | 0.3 |
| Anthraquinone-2 sulfonic acid sodium salt | 0 | DIBMA | 92.7 | 3.2 | Sulfonate | 1.008 | 0.343 |
| Stepan Bio Terge AS-40 ™ | 14 | DIBMA | 92.7 | 3.2 | Sulfonate | 6.434 | 0.181 |
| n-Octanoyl-L-Threonine | 8 | DIBMA | 92.7 | 3.2 | Amino acid | 119 | 0.372 |
| p-Toluene Sulfonic Acid | 1 | DIBMA | 92.7 | 3.2 | Sulfonate | 0.8236 | 0.32 |
| Potassium ethyl xanthogenate | 2 | DIBMA | 92.7 | 3.2 | Xanthogenate | 190.7 | 0.281 |
| Sodium 1 pentasulfonate | 5 | DIBMA | 92.7 | 3.2 | Sulfonate | 0.8036 | 0.537 |
| Stepan Bio Soft D-40 ™ | 0 | SMA 2021 ™ | 6.627 | 3.7 | Sulfonate | 5.13 | 0.322 |
| Stepan Bio Terge AS-40 ™ | 14 | SMA 2021 ™ | 6.627 | 3.7 | Sulfonate | 6.434 | 0.181 |
| n-Octanoyl-L-Threonine | 8 | SMA 2021 ™ | 6.627 | 3.7 | Amino acid | 119 | 0.372 |
| p-Toluene sulfonic acid | 1 | SMA 2021 ™ | 6.627 | 3.7 | Sulfonate | 0.8236 | 0.32 |
| Potassium ethyl xanthogenate | 2 | SMA 2021 ™ | 6.627 | 3.7 | Xanthogenate | 190.7 | 0.281 |
| Sodium-1-pentasulfonate | 5 | SMA 2021 ™ | 6.627 | 3.7 | Sulfonate | 0.8036 | 0.537 |
| 1-Octane sulfonate | 8 | SMA 3000 ™ | 3.713 | 2.8 | Sulfonate | 1.562 | 0.367 |

TABLE 14-continued

Anionic Surfactants and Polymer Combinations That Did Not Form
a Nanonet Response in Tiitration Assays (No Sigmoid Detected)

| Surfactant | Alkyl Chain Carbon No. | Polymer | Average Polymer Diameter [nm] | Theoretical Polymer | Head Group | Surfactant Aggregate Diameter [nm] | Poly Dispersity Index (PDI) |
|---|---|---|---|---|---|---|---|
| Amin GCK | 18, 8 | SMA 3000 ™ | 3.713 | 2.8 | Acyl glycinate | 7.286 | 0.3 |
| Stepan Bio Soft D-40 ™ | 0 | SMA 3000 ™ | 3.713 | 2.8 | Sulfonate | 5.13 | 0.322 |
| Stepan Bio Terge AS-40 ™ | 14 | SMA 3000 ™ | 3.713 | 2.8 | Sulfonate | 6.434 | 0.181 |
| Cedepal TD-403 MFLD ™ | 13 | SMA 3000 ™ | 3.713 | 2.8 | Ether sulfate | 6.421 | 0.235 |
| Dodecane-1-sulfonic acid | 12 | SMA 3000 ™ | 3.713 | 2.8 | Sulfonate | 5.108 | 0.227 |
| n-Octanoyl-L-Threonine | 8 | SMA 3000 ™ | 3.713 | 2.8 | Amino acid | 119 | 0.372 |
| p-Toluene sulfonic acid | 1 | SMA 3000 ™ | 3.713 | 2.8 | Sulfonate | 0.8236 | 0.32 |
| Potassium ethyl xanthogenate | 2 | SMA 3000 ™ | 3.713 | 2.8 | Xanthogenate | 190.7 | 0.281 |
| Sodium-1-pentasulfonate | 5 | SMA 3000 ™ | 3.713 | 2.8 | Sulfonate | 0.8036 | 0.537 |
| 1 Octane sulfonate | 8 | SMA IBE | 9.759 | 5.4 | Sulfonate | 1.562 | 0.367 |
| Anthraquinone-2 sulfonic | 0 | SMA IBE | 9.759 | 5.4 | Sulfonate | 1.008 | 0.343 |
| Stepan Bio Terge AS-40 ™ | 14 | SMA IBE | 9.759 | 5.4 | Sulfonate | 6.434 | 0.181 |
| Cedepal TD 403 MFLD ™ | 13 | SMA IBE | 9.759 | 5.4 | Ether sulfate | 6.421 | 0.235 |
| Dodecane-1-sulfonic acid | 12 | SMA IBE | 9.759 | 5.4 | Sulfonate | 5.108 | 0.227 |
| Stepan Lathanol LAL ™ | 12 | SMA IBE | 9.759 | 5.4 | Sulfoacetate | 6.814 | 0.151 |
| n-Octanoyl-L-threonine | 8 | SMA IBE | 9.759 | 5.4 | Amino acid | 119 | 0.372 |
| Sodium dodecylbenzene sulfonate | 12 | SMA IBE | 9.759 | 5.4 | Sulfonate | 4.235 | 0.53 |
| Ninate 411 ™ | 12 | SMA IBE | 9.759 | 5.4 | Sulfonate | 216.2 | 0.288 |
| p-Toluene sulfonic acid | 1 | SMA IBE | 9.759 | 5.4 | Sulfonate | 0.8236 | 0.32 |
| Potassium ethyl xanthogenate | 2 | SMA IBE | 9.759 | 5.4 | Xanthogenate | 190.7 | 0.281 |
| Sodium-1-pentasulfonate | 5 | SMA IBE | 9.759 | 5.4 | Sulfonate | 0.8036 | 0.537 |
| 1-Octane sulfonate | 8 | SMA Cumene | 7.123 | 1.5 | Sulfonate | 1.562 | 0.367 |
| Anthraquinone-2-sulfonic | 0 | SMA Cumene | 7.123 | 1.5 | Sulfonate | 1.008 | 0.343 |
| Stepan Bio Soft D-40 ™ | 0 | SMA Cumene | 7.123 | 1.5 | Sulfonate | 5.13 | 0.322 |
| Stepan Bio Terge AS-40 ™ | 14 | SMA Cumene | 7.123 | 1.5 | Sulfonate | 6.434 | 0.181 |
| Cedepal TD 403 MFLD ™ | 13 | SMA Cumene | 7.123 | 1.5 | ether sulfate | 6.421 | 0.235 |
| Dodecane-1-sulfonic acid | 12 | SMA Cumene | 7.123 | 1.5 | Sulfonate | 5.108 | 0.227 |
| Stepan Lathanol LAL ™ | 12 | SMA Cumene | 7.123 | 1.5 | Sulfoacetate | 6.814 | 0.151 |
| n-Octanoyl-L-threonine | 8 | SMA Cumene | 7.123 | 1.5 | Amino acid | 119 | 0.372 |
| Ninate 411 ™ | 12 | SMA Cumene | 7.123 | 1.5 | Sulfonate | 216.2 | 0.288 |
| p-Toluene sulfonic acid | 1 | SMA Cumene | 7.123 | 1.5 | Sulfonate | 0.8236 | 0.32 |
| Potassium ethyl xanthogenate | 2 | SMA Cumene | 7.123 | 1.5 | Xanthogenate | 190.7 | 0.281 |
| Sodium-1-penta sulfonate | 5 | SMA Cumene | 7.123 | 1.5 | Sulfonate | 0.8036 | 0.537 |

Example 18

Nanonet Formation Prefers an Alkyl Chain Length of >C7 in a Pure Surfactant Aggregate System In this section, a study of the influence of surfactant alkyl chain length on nanonet formation was undertaken. A wide range of surfactant aggregate sizes was employed. The surfactants are listed in Table 15, including surfactant aggregate size. Despite the small alkyl chains, light scattering measurements of this class of surfactant aggregates displayed a broad range of surfactant aggregate size. Yet, in all five surfactant cases, with the exception of 1,2 hexane diol and SMA 725, nanonet formation did not occur. This was so with even the relatively smallest polymer particle size tested.

The results in Table 15 therefore suggest that, in some cases, factors other than relative size ratios may influence nanonet formation. Here, the results suggest that for surfactant aggregates composed purely of surfactants that contain under eight carbons in their linear, hydrophobic alkyl chain lengths nanonet formation is not likely to occur within the time scales studied.

TABLE 15

Surfactants With a Linear Alkyl Chain of Less Than Eight Carbon Atoms

| Surfactant | Surfactant Class | Head Group | Alkyl Chain Carbon no. | Conc. | Surfactant Aggregate diameter [nm] | PDI |
|---|---|---|---|---|---|---|
| p-Toluene Sulfonic Acid | Anionic | Sulfonate | 6 | 10% | 0.8236 | 0.32 |
| Potassium Ethyl Xanthogenate | Anionic | Xanthogenate | 2 | 10% | 190.7 | 0.281 |
| Sodium-1-pentasulfonate | Anionic | Sulfonate | 5 | 0.25% | 0.8036 | 0.573 |

TABLE 15-continued

Surfactants With a Linear Alkyl Chain of Less Than Eight Carbon Atoms

| Surfactant | Surfactant Class | Head Group | Alkyl Chain Carbon no. | Conc. | Surfactant Aggregate diameter [nm] | PDI |
|---|---|---|---|---|---|---|
| 1,2-Hexanediol | Anionic | Polyol | 6 | 1% | 109.7 | 0.232 |
| n-Heptyl-β-D-Thioglucopyranoside (nHDTP-H310) | Non-Ionic | Thioglucopyranoside | 7 | 3% | 8.935 | 0.11 |

Example 19

Nanonet Formation Prefers a Soluble or Emulsified Surfactant Aggregate with Diameter Greater than the Theoretical Compacted Diameter of a SMA Polymer From earlier results, it became apparent that fatty acid-containing surfactants such as VDISTILL DV53 and VDISTILL DV63 form oils and therefore cannot be mixed with at water. As a result no surfactant aggregate diameter was measured by dynamic light scattering as the surfactant did not form a stable emulsion in water. Conversion to a soap or solubilization in other surfactants may be utilized to convert an insoluble fatty acid oil into a soluble surfactant aggregate.

Non-ionic surfactants with branched hydrophilic headgroups dominate non-ionic surfactants which do not form nanonets but satisfy nanonet formation rules. Despite having a larger measured surfactant-aggregate diameter than the tested polymer, some non-ionic surfactants were still unable to form nanonets. Of these surfactants, a disproportionate number had either a polysorbate (TWEEN™) or polyglyceryol (PGL) headgroup. It is possible that these large head groups inhibit polymer interactions with the alkyl chain of the surfactant. Another possible explanation is that the large headgroups create a surfactant aggregate shape that does not reflect a sphere, which would create a false surfactant aggregate diameter or prevent polymer association. An additional possible explanation is that these surfactants do associate with the SMA polymers, but they are not stable after precipitation and the surfactant can dissociate back into solution.

The effect of a branched hydrophilic headgroup may be visually illustrated in FIG. 20. The large polyglycerol-10 headgroup class of surfactants displayed a unique trend compared to all the other surfactant classes. Instead of nanonet score increasing with decreasing HLB values, nanonet scores were higher with the more hydrophilic surfactants. However, as all of the polyglycerol-10 surfactants formed large surfactant aggregates, they still formed nanonets with at least one of all the polymers tested.

Some false positive results may be explained, in part, by error in the sizing method and concentration dependence of aggregate formation common to surfactants. As an example, for many surfactants, increase in concentration lead some surfactants to form larger structures such as worm-like micelles, disordered aggregates, gels, and even bilayers (Gao, J., Ge, W. & Li, J. Sc. China Ser. B-Chem. (2005) 48: 470. https://doi.org/10.1360/042004-71). When DLS measurements on surfactants were made in this work, surfactant solutions were serially diluted and measured until the best PDI was obtained. This means that surfactant concentration during sizing could lie anywhere from 1 to 0.01% wt/vol surfactant concentration depending on the surfactant. However, in the nanonet formulation experiments described and employed using method #1 herein, polymer and surfactant were mixed together in a concentrated stock (1%) before dilution and precipitation in the nanonet formulation titrations. This ensured that the surfactant aggregate remained above its critical micelle concentration; and therefore was present to interact with the polymer before dilution and precipitation. As a result, the effective concentration and diameter of the surfactant aggregate in the nanonet formation experiments could be significantly higher than the concentration and recorded size at which the surfactant sizing was measured.

The measured surfactant aggregate diameter for several commercially marketed surfactants, particularly Biosoft, Bioterge, Cedepal, and Ninate 411, was larger than the theoretical polymer diameter for each tested polymer (Table 15). Thus, nanonet formation was expected to occur using these surfactants with all the tested polymers. However, while each surfactant could be formulated into a nanonet with at least one polymer, other factors lead to not all combinations resulting in the formation of nanonets. For example, only select polymers formed nanonets with the following surfactants: Stepan Bio-Soft D-40™, Stepan Bio-Terge AS-40™, Cedepal TD-403 MFLD™, and Ninate 411™ surfactants (Table 15). Further, the Ninate 411™ surfactant showed no sign of the formation of nanonets with the following polymers: SMA-IBE and SMA cumene (Table 15). For these two polymers, a significant difference between DLS measured and theoretical particle diameter was observed (5.8 nm by DLS and 2.8 nm theoretical particle diameter). Additionally, these two polymers also contain different ratios of hydrophobic to hydrophilic functional groups in their repeating block units.

It is therefore unlikely that trends in polymer particle size or block hydrophobicity are preventing the formation of nanonets with Ninate 411™. What is more likely is that the tested commercially-available surfactants are not pure chemicals, and therefore may have secondary components that alter polymer behavior or that complicate sizing measurements. For example, two different Bio-Terge formulations are available for commercial purchase, Bio-Terge 40S or Bio-Terge 40K, both of which contain sodium $C_{14}$-$C_{16}$ olefin sulfonate as the primary active ingredient. However, while the 40S formulation is suitable for applications in preparing stable microemulsions, the 40k formulation is only recommended as a general washing detergent (Manufacturers product sheet).

It is likely that the undisclosed additives, solvents or remnants of the surfactant manufacturing process in these formulations can negatively affect nanonet formation. It may also be the case that there is inaccurate surfactant sizing data. This may explain some of the inconsistencies between predicted and actual observation in nanonet formation experiments between the different polymers. For example, if a given polymer surfactant combination did not result in the formation of nanonets with high efficiency, a stabilizing ligand or- co surfactant on the outside of the surfactant micelle (such as isopropyl amine in the case of Ninate 411™), may shield the surfactant aggregate and inhibit the formation of nanonets.

The size differential between a surfactant aggregate and an amphipathic polymer particle, driven by the hydrophobic effect has been tested using 7 different polymers and over 50 unique surfactants. The data strongly support the proposition that the formation of nanonets requires a surfactant aggregate with a larger diameter than the diameter of the minimum monomeric particle diameter with which the surfactant aggregate is associating. In addition, the formation of nanonets using the tested polymers was strongly favored to occur with the following: (1) greater than 7 carbons in the hydrophobic alkyl chain on the surfactant, (2) the surfactant is water miscible, (3) surfactants with relatively smaller head groups. Taken together, the results suggest that nanonet design may be enhanced by selecting an amphipathic block co-polymer, the length of which can be based on the surfactant aggregate size. The vast majority of formed nanonets displayed an increase in diameter relative to the starting polymer (FIG. 18).

Example 20

Polymer composition influences surfactant capture into Nanonets. A study of surfactants and the influence of parameters including degree of water miscibility was undertaken with respect to nanonet formation. In the study, factors found influential in forming desirable nanonets included the following: A water soluble, amphipathic block co-polymer with a block stoichiometry of XnYm. X is an anionic or non-ionic hydrophilic functional group. Y is a hydrophobic functional group. In the polymer formula, n=1 and m=1, 2 or 3.

The nanonet library was expanded by testing polymers with different functional groups. Factors explored included, polymer length, ratios of polymer functional groups, two distinct hydrophobic chemical groups. The tested polymers are outlined in Table 16. For all tested polymers, nanonets could be formed with surfactant aggregates larger than the compact polymer particle diameter (FIG. 19). The maximum sigmoid AUC scores for nanonet formation were observed with polymers that had a 2:1 styrene to maleic acid ratio, followed by 3:1, followed by the 1:1. Relatively shorter polymers generally had higher scores for nanonet formation.

Not all possible combinations of surfactant and polymer are likely to form nanonets within the time frame of the screening methods employed (see Example 15). 33/116 combinations of polymer plus surfactant did not result in a score indicating nanonet formation by screening method #1 (see Reagents and Materials Examples 15-21). These results (no nanonet formation) are able to be predicted using the teachings described herein. However, 5.4% ($14/306$) or of the formulations screened in method #2 (see Reagents and Materials Examples 15-21) resulted in a score indicating the formation of nanonets. Yet, based upon relative size alone, nanonet formation would not have been predicted. The surfactant aggregate diameter was smaller than the polymer particle diameter. Thus, nanonet formation would not have been predicted to occur using the teaching herein. These false positive results may be attributable to: In screening method #1, a relatively small rise in absorbance may have been construed by the developed computer model as sigmoid curve formation. The result would have been a low, but nonetheless positive score indicating nanonet formation; even when no nanonets were formed. False negative results may be attributable to: insufficient titration points; in some traces Nanonet formation occurred over only one tested ratio, meaning the window of association is very small. In other traces the titration curves only began to increase at the very highest concentrations of the titration. These signals would be missed in the current experiments.

ROUT Method of Statistical Analysis for Outlier Datapoint Identification

A rational basis for removing some data points initially identified by the model was also developed. For example, the results were further screened to remove those cases with low formation factors, Nf and absorbance values less than 0.2 (Table 9 and 10). The dataset for the surfactant polymer combinations analyzed by screening method #4 (see Reagents and Materials Examples 15-21) for nanonet formation were analyzed for outliers. The method employed was similar that described by Motulsky, H. J., Brown, and R. E. Detecting in *Outliers When Fitting Data With Nonlinear Regression—A New Method Based On Robust Nonlinear Regression And The False Discovery Rate*. BMC Bioinformatics 7, 123 (2006)). Using the ROUT method, outliers in surfactant size in both the positively scoring nanonets and negatively scoring nanonet datasets were identified.

Thus, screening plus ROUT analysis reduced the number of false positive results to 9/192 results. This means in only 9/192 cases, a false positive score for nanonet formation was obtained.

TABLE 16

Dynamic Light Scattering Characterization using Intensity and Number Values of Hydrolyzed Polymer Aggregates

| Polymer | [St] to [MA] ratio | Calculated Aggregate Diameter [nm] | Conc. | Aggregate Diameter [nm] (Intensity Mean d) | PDI | Conc. | Aggregate Diameter [nm] (Number Mean d) | PDI |
|---|---|---|---|---|---|---|---|---|
| SMA-2000 ™ | 2:1 | 2.6 | 0.10% | 5.242 | 0.113 | 0.10% | 4.633 | 0.292 |
| SMA-2021 ™ | 2:1 | 3.7 | 0.25% | 6.627 | 0.274 | 0.10% | 8.383 | 0.169 |
| SMA-3000 ™ | 3:1 | 2.8 | 0.25% | 3.713 | 0.213 | 0.01% | 4.68 | 0.355 |
| SMA-725 ™ | 3:1 | 6.8 | 0.10% | 15.03 | 0.219 | 0.10% | 10.16 | 0.283 |
| SMA-cumene terminated | 3:1 | 1.5 | 0.10% | 7.123 | 0.164 | 0.50% | 3.325 | 0.297 |
| SMA-IBE | 1:1 | 5.4 | 0.25% | 9.759 | 0.209 | 0.01% | 4.256 | 0.869 |
| DIBMA | NA | 3.2 | 0.50% | 76.74* | 0.135 | 0.10% | 5.704 | 0.271 |

Factors other than size relationship may also explain the results. These factors may include: (1) surfactant alkyl chain carbon number, (2) surfactant water solubility, and (3) surfactant hydrophobic lipid balance. Additionally, there may be some sources of error in surfactant aggregate and polymer particle size measurement. Other reasons for the disparity between expected and observed results may include: (1) surfactant composition, (2) surfactant purity, (3) polymer composition, (4) molecular weight distribution, (5) surfactant headgroup size, (6) surfactant packing parameters, and (7) co-monomer distribution. For example, in several cases, our measures of polymer contour length and molecular weight varied from the specifications provided with commercially available samples. What follows is a more detailed discussion of these other factors.

Surfactant Alkyl Chain Carbon Number five of the 62 tested surfactants contained small hydrophobic segments (linear alkyl chain with under 7 carbons). Interestingly, five of these surfactants did not result in a score indicating nanonet formation using method #1 (titration assay, Table 15). This was the case with all tested polymers with the exception of surfactant 1,2 hexane diol with SMA-725

DLS measurements of this class of low carbon number surfactant aggregates displayed a broad range of surfactant aggregate sizes. This latter result suggests that for aggregates composed purely of surfactants that contain under eight carbons in their linear, hydrophobic alkyl chains, nanonet formation will not likely occur. Thus, the more general conclusion is that nanonet formation is more likely to occur when the surfactant has an alkyl chain carbon number of greater than seven when measured as a pure surfactant aggregate. The effect of alkyl chain number can be further visualized by examining nanonet formation with select surfactant head groups and varying alkyl chains (FIG. 21) In almost all cases, an increase in alkyl chain number lead to an increase in nanonet score, and increased likelihood of forming a nanonet with the tested polymers (FIGS. 21A-D). Similarly, nanonet scores generally displayed an inverse effect with hydrophilic headgroups: as HLB values increased due to an increase in number of hydrophilic headgroups, nanonet scores decreased (FIGS. 21E and F). This effect of alkyl chain length and HLB in the surfactant on nanonet scores, and compatibility with different polymers suggests that nanonet formation occurs best with the 2:1 block ratio. As the polymer composition shifts from 2:1 to either 3:1 or 1:1, the number of possible nanonets to be formed generally decreases. Furthermore, as polymer length decreases, nanonets can be formed with smaller and more hydrophilic surfactant aggregates (high HLB values). It is likely that the inverse is also true: the more hydrophobic the surfactant, the larger the polymer and more hydrophobic block is preferred. For example, the 1,2-Hexanediol or VDISTILL 53™, with calculated HLB values of 7.9 (Using the Davies method, J. T. Davies, E. K. Rideal, Interfacial Phenomena, Academic Press, New York, 1961, p. 371.) and 1, respectively, were only found to associate with the most hydrophobic polymer; SMA-725™'.

Example 21

Formation of Optimized Nanonet Library

For chemical treatments of water, little to no contamination of downstream effluents by the introduced chemical is required. Therefore in a nanonet formulation the majority of surfactant must be bound to the polymer, to minimize any residual surfactant downstream in the treatment process. To identify the optimum amount of surfactant, the titration data for a given surfactant can be used. The midway point on each titration curve, also referred to as the Nf, represents the half maximal surfactant binding. The midway point was calculated according to method #4 (see Reagents and Materials Examples 15-21). At this concentration it is expected that polymer is in excess, so there is minimal surfactant in solution, and at least half of all polymer is expected be in a nanonet complex. Surfactants with high midway points (>500 ppm) for a given polymer, were considered to have low affinity and therefore these combinations were not identified to form stable nanonets.

In order to better identify stable nanonets, the height of absorption peak of each surfactant and polymer combination was filtered to 0.2 and higher to obtain an optimized nanonet library. In the titration data, a low peak absorbance is representative of little surfactant aggregate being captured by the polymer, and is therefore an inefficient nanonet combination and likely to lead to high concentrations of residual surfactant post-removal of any formed nanonet. From these results, it should be understood that these filtered combinations may still form small numbers of nanonet complexes, but they are non-optimal and that a different polymer may be more appropriate.

Using this approach, a nanonet library containing approximately 199 stable, optimized nanonets was identified. The nanonet library contains a broad range of anionic and non-ionic surfactants with linear alkyl chain lengths varying from $C_8$ to $C_{18}$. Hydrophilic headgroups contained within the nanonet library are diverse in nature, including sulfonates, phosphate esters, phosphine oxides, monosaccharides, disaccharides, thioesters, amino acids, glycols, and polyglycerols. The full nanonet library is documented in Tables 9 and 10.

TABLE 17

Copper Removal (40 uL NanoNet Library Stock Solution Was Used) with Nanonets with Non-ionic Surfactants

| Well No. | Library No. | Nanonet Library Item | Cu2+ Added [ppm] | Measured [ppm] | % Difference |
|---|---|---|---|---|---|
| A1 | 1 | Apo 10/DIBMA | 10.03 | 9.9 | −1.9 |
| A2 | 2 | Apo 12/DIBMA | 10.03 | 6.8 | −32.4 |
| A3 | 3 | Coco glucoside/DIBMA | 10.03 | 10.4 | 3.3 |
| A4 | 4 | Genapol X080/DIBMA | 10.03 | 10.1 | 0.3 |
| A5 | 5 | HEGMDDE-H370/DIBMA | 10.03 | 8 | −20.7 |
| A6 | 6 | HEGMDE-H360/DIBMA | 10.03 | 10.4 | 3.5 |
| A7 | 7 | HXEGMDDE-H375/DIBMA | 10.03 | 10.1 | −0.2 |
| A8 | 8 | DDDM-MNA-C12/DIBMA | 10.03 | 7.8 | −22.2 |

TABLE 17-continued

Copper Removal (40 uL NanoNet Library Stock Solution Was Used) with Nanonets with Non-ionic Surfactants

| Well No. | Library No. | Nanonet Library Item | Cu2+ Added [ppm] | Measured [ppm] | % Difference |
|---|---|---|---|---|---|
| A9 | 9 | pGBTM-MNA-C13/DIBMA | 10.03 | 9.3 | −8 |
| A10 | 10 | pGBTEM-MNA-C14/DIBMA | 10.03 | 8 | −20.9 |
| A11 | 11 | nDDDTP-D342/DIBMA | 10.03 | 10 | −1.2 |
| A12 | 12 | nDDTGP-D323/DIBMA | 10.03 | 8.9 | −11.4 |
| B1 | 13 | OEGMDE-O330/DIBMA | 10.03 | 7.1 | −29.4 |
| B2 | 14 | Polyglycerol-10-mono-laurate/DIBMA | 10.03 | 9.5 | −6.1 |
| B3 | 15 | Polyglycerol-10-mono-oleate/DIBMA | 10.03 | 7.1 | −29.6 |
| B4 | 16 | Span 20/DIBMA | 10.03 | 10.4 | 3.6 |
| B5 | 17 | Triton X-100 ™/DIBMA | 10.03 | 9.7 | −3.2 |
| B6 | 18 | Triton X-45 ™/DIBMA | 10.03 | 9.9 | 12.3 |
| B7 | 19 | Tween 20 ™/DIBMA | 10.03 | 7.4 | −26.9 |
| B8 | 20 | Tween 65 ™/DIBMA | 10.03 | 7.8 | −23 |
| B9 | 21 | Tween 85 ™/DIBMA | 10.03 | 9.5 | −5.2 |
| B10 | 22 | Apo 10/SMA 2000 ™ | 10.03 | 0.9 | −91.1 |
| B11 | 23 | Apo 12/SMA 2000 ™ | 10.03 | 0.5 | −95.4 |
| B12 | 24 | Coco glucoside/SMA 2000 ™ | 10.03 | 1 | −90.1 |
| C1 | 25 | Genapol X080/SMA 2000 ™ | 10.03 | 1 | −90.2 |
| C2 | 26 | HEGMDDE-H370/SMA 2000 ™ | 10.03 | 1.5 | −85.2 |
| C3 | 27 | HEGMDE-H360/SMA 2000 ™ | 10.03 | 0.9 | −90.6 |
| C4 | 28 | HEGMOE-H350/SMA 2000 ™ | 10.03 | 1.4 | −85.7 |
| C5 | 29 | HXEGMDDE-H375/SMA 2000 ™ | 10.03 | 1.1 | −89.4 |
| C6 | 30 | pGBTM-MNA-C13/SMA 2000 ™ | 10.03 | 0.8 | −91.6 |
| C7 | 31 | pGBTEM-MNA-C14/SMA 2000 ™ | 10.03 | 1.2 | −88.1 |
| C8 | 32 | nDDDTP-D342/SMA 2000 ™ | 10.03 | 1 | −90 |
| C9 | 33 | nDDTGP-D323/SMA 2000 ™ | 10.03 | 0.9 | −90.9 |
| C10 | 34 | nDDTP-D335/SMA 2000 ™ | 10.03 | 1.3 | −87.5 |
| C11 | 35 | OEGMDE-O330/SMA 2000 ™ | 10.03 | 0.9 | −91 |
| C12 | 36 | Polyglycerol-10-mono-laurate/SMA 2000 ™ | 10.03 | 1.2 | −87.8 |
| D1 | 37 | Polyglycerol-10-mono-oleate/SMA 2000 ™ | 10.03 | 1 | −90.1 |
| D2 | 38 | Span 20/SMA 2000 ™ | 10.03 | 1 | −89.8 |
| D3 | 39 | Triton X-100 ™/SMA 2000 ™ | 10.03 | 1.1 | −89.4 |
| D4 | 40 | Triton X-305 ™/SMA 2000 ™ | 10.03 | 1.1 | −88.7 |
| D5 | 41 | Triton X-45 ™/SMA 2000 ™ | 10.03 | 1 | −89.9 |
| D6 | 42 | Tween 20 ™/SMA 2000 ™ | 10.03 | 1.2 | −88.5 |
| D7 | 43 | Tween 40 ™/SMA 2000 ™ | 10.03 | 0.6 | −93.6 |
| D8 | 44 | Tween 60 ™/SMA 2000 ™ | 10.03 | 1.1 | −89.1 |
| D9 | 45 | Tween 65 ™/SMA 2000 ™ | 10.03 | 1.3 | −86.6 |
| D10 | 46 | Tween 80 ™/SMA 2000 ™ | 10.03 | 1.1 | −89.2 |
| D11 | 47 | Tween 85 ™/SMA 2000 ™ | 10.03 | 0.8 | −91.6 |
| D12 | 48 | Apo 10/SMA 2021 ™ | 10.03 | 1.4 | −86 |
| E1 | 49 | Apo 12/SMA 2021 ™ | 10.03 | 1.2 | −88.3 |
| E2 | 50 | Coco glucoside/SMA 2021 ™ | 10.03 | 1.1 | −88.9 |
| E3 | 51 | HEGMDDE-H370/SMA 2021 ™ | 10.03 | 1 | −89.6 |
| E4 | 52 | HEGMDE-H360/SMA 2021 ™ | 10.03 | 1.1 | −89.5 |
| E5 | 53 | HXEGMDDE-H375/SMA 2021 ™ | 10.03 | 1 | −89.8 |
| E6 | 54 | pGBTM-MNA-C13/SMA 2021 ™ | 10.03 | 1.2 | −87.7 |
| E7 | 55 | pGBTEM-MNA-C14/SMA 2021 ™ | 10.03 | 0.9 | −90.8 |
| E8 | 56 | nDDTGP-D323/SMA 2021 ™ | 10.03 | 1 | −90.1 |
| E9 | 57 | nDDDTP-D342/SMA 2021 ™ | 10.03 | 1.2 | −88.2 |
| E10 | 58 | OEGMDE-O330/SMA 2021 ™ | 10.03 | 1.2 | −88.3 |
| E11 | 59 | Polyglycerol-10-mono-laurate/SMA 2021 ™ | 10.03 | 0.9 | −90.6 |
| E12 | 60 | Polyglycerol-10-mono-oleate/SMA 2021 ™ | 10.03 | 0.8 | −92.5 |
| F1 | 61 | Triton X-100 ™/SMA 2021 ™ | 10.03 | 1.9 | −81.5 |
| F2 | 62 | Triton X-45 ™/SMA 2021 ™ | 10.03 | 1.3 | −87.2 |
| F3 | 63 | Tween 40 ™/SMA 2021 ™ | 10.03 | 1.2 | −87.8 |
| F4 | 64 | Tween 60 ™/SMA 2021 ™ | 10.03 | 1.2 | −88.3 |
| F5 | 65 | Tween 80 ™/SMA 2021 ™ | 10.03 | 2.2 | −78.1 |
| F6 | 66 | Tween 85 ™/SMA 2021 ™ | 10.03 | 1.2 | −88.1 |
| F7 | 67 | Apo 10/SMA 3000 ™ | 10.03 | 3.9 | −61.5 |
| F8 | 68 | Apo 12/SMA 3000 ™ | 10.03 | 4 | −59.9 |
| F9 | 69 | Coco glucoside/SMA 3000 ™ | 10.03 | 5.4 | −46.4 |
| F10 | 70 | Genapol X080/SMA 3000 ™ | 10.03 | 0.8 | −91.8 |
| F11 | 71 | HEGMDDE-H370/SMA 3000 ™ | 10.03 | 3.8 | −61.9 |
| F12 | 72 | HEGMDE-H360/SMA 3000 ™ | 10.03 | 4.1 | −59.6 |
| G1 | 73 | HXEGMDDE-H375/SMA 3000 ™ | 10.03 | 1.2 | −88.2 |
| G2 | 74 | DDDM-MNA-C12/SMA 3000 ™ | 10.03 | 4.6 | −54 |
| G3 | 75 | pGBTM-MNA-C13/SMA 3000 ™ | 10.03 | 4.3 | −57.4 |
| G4 | 76 | pGBTEM-MNA-C14/SMA 3000 ™ | 10.03 | 4.8 | −52.5 |

TABLE 17-continued

Copper Removal (40 uL NanoNet Library Stock Solution
Was Used) with Nanonets with Non-ionic Surfactants

| Well No. | Library No. | Nanonet Library Item | Cu2+ Added [ppm] | Measured [ppm] | % Difference |
|---|---|---|---|---|---|
| G5 | 77 | nDDDTP-D342/SMA 3000 ™ | 10.03 | 5.6 | −44.3 |
| G6 | 78 | nDDTGP-D323/SMA 3000 ™ | 10.03 | 1.6 | −84.4 |
| G7 | 79 | OEGMDE-O330/SMA 3000 ™ | 10.03 | 3.5 | −65.6 |
| G8 | 80 | Polyglycerol-10-mono-laurate/ SMA 3000 ™ | 10.03 | 0.8 | −92.2 |
| G9 | 81 | Polyglycerol-10-mono-oleate/ SMA 3000 ™ | 10.03 | 0.5 | −94.7 |
| G10 | 82 | Polyglycerol-10-mono-palmitate/SMA 3000 ™ | 10.03 | 1.2 | −87.9 |
| G11 | 83 | Span 20/SMA 3000 ™ | 10.03 | 0.6 | −93.6 |
| G12 | 84 | Triton X-100/SMA 3000 ™ | 10.03 | 1.8 | −81.7 |
| H1 | 85 | Triton X-45 ™/SMA 3000 ™ | 10.03 | 1.1 | −89.2 |
| H2 | 86 | Tween 65 ™/SMA 3000 ™ | 10.03 | 1.1 | −89.2 |
| H3 | 87 | Tween 85 ™/SMA 3000 ™ | 10.03 | 4 | −60.6 |
| H4 | 88 | Apo 12/SMA-IBE | 10.03 | 1.4 | −86 |
| H5 | 89 | Coco glucoside/SMA-IBE | 10.03 | 1.6 | −83.9 |
| H6 | 90 | HEGMDDE-H370/SMA-IBE | 10.03 | 1.1 | −92.8 |
| H7 | 91 | HEGMDE-H360/SMA-IBE | 10.03 | 1.6 | −84 |
| H8 | 92 | HXEGMDDE-H375/SMA-IBE | 10.03 | 1.5 | −85 |
| H9 | 93 | nDDDTP-D342/SMA-IBE | 10.03 | 1.5 | −85.1 |
| H10 | 94 | nDDTP-D335/SMA-IBE | 10.03 | 1.2 | −88.1 |
| H11 | 95 | Polyglycerol-10-mono-oleate/ SMA-IBE | 10.03 | 1.2 | −88.3 |
| H12 | 96 | Triton X-45 ™/SMA-IBE | 10.03 | 1 | −89.7 |
| A1 | 97 | Tween 85 ™/SMA-IBE | 10.03 | 1.5 | −85.1 |
| A2 | 98 | Genapol X080/SMA 725 ™ | 10.03 | 2 | −79.8 |
| A3 | 99 | nDDDTP-D342/SMA 725 ™ | 10.03 | 0.9 | −91.1 |
| A4 | 100 | nDDTGP-D323/SMA 725 ™ | 10.03 | 1 | −89.6 |
| A5 | 101 | Polyglycerol-10-mono-oleate/ SMA 725 ™ | 10.03 | 0.5 | −94.7 |
| A6 | 102 | Span 20/SMA 725 ™ | 10.03 | 1.1 | −88.6 |
| A7 | 103 | HEGMDDE-H370/SMA 725 ™ | 10.03 | 1.5 | −85.3 |
| A8 | 104 | HEGMDE-H360/SMA 725 ™ | 10.03 | 1.9 | −81.4 |
| A9 | 105 | HXEGMDDE-H375/SMA 725 ™ | 10.03 | 1.3 | −86.7 |
| A10 | 106 | pGBTEM-MNA-C14/SMA 725 ™ | 10.03 | 1.7 | −83.5 |
| A11 | 107 | Polyglycerol-10-mono-palmitate/SMA 725 ™ | 10.03 | 1 | −90.1 |
| A12 | 108 | Triton X-100 ™/SMA 725 ™ | 10.03 | 2.4 | −76.6 |
| B1 | 109 | Triton X-45 ™/SMA 725 ™ | 10.03 | 1.4 | −85.6 |
| B2 | 110 | Tween 65 ™/SMA 725 ™ | 10.03 | 1.3 | −86.7 |
| B3 | 111 | Tween 80 ™/SMA 725 | 10.03 | 1.6 | −83.7 |
| B4 | 112 | Apo 10/SMA Cumene | 10.03 | 0.8 | −91.7 |
| B5 | 113 | Apo 12/SMA Cumene | 10.03 | 1 | −90.4 |
| B6 | 114 | PFDMP-O310F/SMA Cumene | 10.03 | 1.1 | −89.4 |
| B7 | 115 | Genapol X080/SMA Cumene | 10.03 | 0.9 | −91 |
| B8 | 116 | HEGMDDE-H370/SMA Cumene | 10.03 | 0.9 | −90.8 |
| B9 | 117 | HEGMDE-H360/SMA Cumene | 10.03 | 0.9 | −90.8 |
| B10 | 118 | HXEGMDDE-H375/SMA Cumene | 10.03 | 0.8 | −92.1 |
| B11 | 119 | DDDM-MNA-C12/SMA Cumene | 10.03 | 0.7 | −92.9 |
| B12 | 120 | pGBTM-MNA-C13/SMA Cumene | 10.03 | 0.6 | −93.6 |
| C1 | 121 | nDDDTP-D342/SMA Cumene | 10.03 | 1.3 | −87.4 |
| C2 | 122 | nDDTGP-D323/SMA Cumene | 10.03 | 0.8 | −92 |
| C3 | 123 | nDDTP-D335/SMA Cumene | 10.03 | 0.8 | −92.1 |
| C4 | 124 | OEGMDE-O330/SMA Cumene | 10.03 | 1.3 | −87.4 |
| C5 | 125 | Polyglycerol-10-mono-laurate/ SMA Cumene | 10.03 | 1.4 | −86.5 |
| C6 | 126 | Polyglycerol-10-mono-oleate/ SMA Cumene | 10.03 | 1.2 | −88.4 |
| C7 | 127 | Span 20/SMA Cumene | 10.03 | 0.7 | −93.3 |
| C8 | 128 | Triton X-100 ™/SMA Cumene | 10.03 | 1 | −90.4 |
| C9 | 129 | Triton X-45 ™/SMA Cumene | 10.03 | 1.2 | −88.3 |
| C10 | 130 | Tween 65 ™/SMA Cumene | 10.03 | 1.4 | −85.9 |
| C11 | 131 | Tween 85 ™/SMA Cumene | 10.03 | 1.2 | −87.9 |

TABLE 18

Copper Removal (40 uL Nanonet Library Stock Solution Was Used) with Nanonets with Anionic Surfactants

| Well No. | Library No. | Nanonet Library Item | Cu2+ Added [ppm] | Measured [ppm] | % Difference |
|---|---|---|---|---|---|
| A1 | 1 | Stepan Bio-Soft D-40 ™/DIBMA | 10.03 | 9.2 | −8.2 |
| A2 | 2 | Lakeland PAE136 ™/DIBMA | 10.03 | 8.9 | −11.6 |
| A3 | 3 | Stepan Lathanol LAL ™/DIBMA | 10.03 | 9.6 | −4.5 |
| A4 | 4 | n-Decanoyl-L-threonine/DIBMA | 10.03 | 9.4 | −6 |
| A5 | 5 | n-Dodecanoyl-L-threonine/DIBMA | 10.03 | 9.5 | −5.2 |
| A6 | 6 | n-Decanoyl-L-methionine/DIBMA | 10.03 | 9 | −10.7 |
| A7 | 7 | n-Dodecanoyl-L-methionine/DIBMA | 10.03 | 8.8 | −12.4 |
| A8 | 8 | Ninate 411 ™/DIBMA | 10.03 | 9.8 | −2.3 |
| A9 | 9 | n-Octanoyl-L-methionine/DIBMA | 10.03 | 9.3 | −7.5 |
| A10 | 10 | Stepan Mild L3 ™/DIBMA | 10.03 | 8.5 | −15.1 |
| A11 | 11 | Stepan Bio-Terge AS-40 ™/SMA 2000 ™ | 10.03 | 1.3 | −87.2 |
| A12 | 12 | Stepan Bio-Soft D-40 ™/SMA 2000 ™ | 10.03 | 1.2 | −88.2 |
| B1 | 13 | Dodecane-1-sulfonic acid sodium salt/SMA 2000 ™ | 10.03 | 1.5 | −85.1 |
| B2 | 14 | Lakeland PAE 136 ™/SMA 2000 ™ | 10.03 | 0.8 | −91.7 |
| B3 | 15 | Stepan Lathanol LAL ™/SMA 2000 ™ | 10.03 | 1.2 | −88.4 |
| B4 | 16 | n-Decanoyl-L-methionine/SMA 2000 ™ | 10.03 | 1.4 | −86.3 |
| B5 | 17 | n-Dodecanoyl-L-methionine/SMA 2000 ™ | 10.03 | 1.6 | −83.6 |
| B6 | 18 | n-Decanoyl-L-threonine/SMA 2000 ™ | 10.03 | 1.5 | −84.9 |
| B7 | 19 | n-Dodecanoyl-L-histidine/SMA 2000 ™ | 10.03 | 0.7 | −93.4 |
| B8 | 20 | Stepan Mild L3 ™/SMA 2000 ™ | 10.03 | 1.4 | −86.3 |
| B9 | 21 | n-Dodecanoyl-L-threonine/SMA 2000 ™ | 10.03 | 1.4 | −86 |
| B10 | 22 | Sodium dodecylbenzene sulfonate/SMA 2000 ™ | 10.03 | 1.4 | −86.3 |
| B11 | 23 | Ninate 411 ™/SMA 2000 ™ | 10.03 | 1.5 | −85.1 |
| B12 | 24 | Stepan SLL-FB ™/SMA 2000 ™ | 10.03 | 0.9 | −90.9 |
| C1 | 25 | Stepan Sulfonic Acid ™/SMA 2000 ™ | 10.03 | 2.5 | −75.5 |
| C2 | 26 | Dodecane-1-sulfonic acid sodium salt/SMA 2021 ™ | 10.03 | 1.1 | −88.9 |
| C3 | 27 | Lakeland PAE 136 ™/SMA 2021 ™ | 10.03 | 1.3 | −87.2 |
| C4 | 28 | Stepan Lathanol LAL/SMA 2021 ™ | 10.03 | 1.4 | −86.3 |
| C5 | 29 | n-Decanoyl-L-methionine/SMA 2021 ™ | 10.03 | 1.1 | −89 |
| C6 | 30 | Cedepal TD-403 MFLD ™/SMA 2021 ™ | 10.03 | 1.2 | −88.1 |
| C7 | 31 | Stepan Mild L3 ™/SMA 2021 ™ | 10.03 | 9.2 | −8.7 |
| C8 | 32 | n-Dodecanoyl-L-methionine/SMA 2021 ™ | 10.03 | 1.6 | −84.3 |
| C9 | 33 | n-Decanoyl-L-methionine/SMA 3000 ™ | 10.03 | 4.6 | −54.6 |
| C10 | 34 | n-Decanoyl-L-methionine/SMA 3000 ™ | 10.03 | 4.6 | −54.3 |
| C11 | 35 | n-Decanoyl-L-threonine/SMA 2021 ™ | 10.03 | 1.9 | −81.2 |
| C12 | 36 | n-Dodecanoyl-L-threonine/SMA 2021 ™ | 10.03 | 1.6 | −84.3 |
| D1 | 37 | Sodium dodecylbenzene sulfonate/SMA 2021 ™ | 10.03 | 1.5 | −84.7 |
| D2 | 38 | Ninate 411 ™/SMA 2021 ™ | 10.03 | 1.5 | −85.4 |
| D3 | 39 | Stepan SLL-FB ™/SMA 2021 ™ | 10.03 | 2.1 | −79.1 |
| D4 | 40 | Stepan Sulfonic Acid ™/SMA 2021 ™ | 10.03 | 1.7 | −82.7 |
| D5 | 41 | Lakeland PAE 136 ™/SMA 3000 ™ | 10.03 | 4.1 | −59.6 |
| D6 | 42 | n-Dodecanoyl-L-threonine/SMA 3000 ™ | 10.03 | 4.5 | −54.9 |
| D7 | 43 | Ninate 411 ™/SMA 3000 ™ | 10.03 | 3.2 | −68.3 |
| D8 | 44 | Stepan Mild L3 ™/SMA 3000 ™ | 10.03 | 4.6 | −54.2 |
| D9 | 45 | Stepan SLL-FB ™/SMA 3000 ™ | 10.03 | 4.2 | −58 |
| D10 | 46 | Stepan Sulfonic Acid ™/SMA 3000 ™ | 10.03 | 3.4 | −66.5 |
| D11 | 47 | n-Decanoyl-L-methionine/SMA-IBE | 10.03 | 2 | −79.8 |
| D12 | 48 | n-Dodecanoyl-L-methionine/SMA-IBE | 10.03 | 1.4 | −85.8 |
| E1 | 49 | Stepan Mild L3 ™/SMA-IBE | 10.03 | 1.7 | −83.5 |
| E2 | 50 | Stepan SLL-FB ™/SMA-IBE | 10.03 | 1.6 | −84 |
| E3 | 51 | Amin GCK30H/SMA 725 ™ | 10.03 | 2 | −79.8 |
| E4 | 52 | Stepan Bio-Terge AS-40 ™/SMA 725 ™ | 10.03 | 1.5 | −85.3 |

TABLE 18-continued

Copper Removal (40 uL Nanonet Library Stock Solution Was Used) with Nanonets with Anionic Surfactants

| Well No. | Library No. | Nanonet Library Item | Cu2+ Added [ppm] | Measured [ppm] | % Difference |
|---|---|---|---|---|---|
| E5 | 53 | n-Dodecanoyl-L-histidine/SMA 725 ™ | 10.03 | 1.1 | −88.7 |
| E6 | 54 | Stepan Lathanol LAL ™/SMA 725 ™ | 10.03 | 1.3 | −86.9 |
| E7 | 55 | n-Decanoyl-L-methionine/SMA 725 ™ | 10.03 | 1.7 | −83.5 |
| E8 | 56 | n-Dodecanoyl-L-methionine/SMA 725 ™ | 10.03 | 1.6 | −84.2 |
| E9 | 57 | Dodecane-1-sulfonic acid sodium salt/SMA 725 ™ | 10.03 | 1.4 | −86.1 |
| E10 | 58 | Lakeland PAE 136 ™/SMA 725 ™ | 10.03 | 1.6 | −84.2 |
| E11 | 59 | n-dodecanoyl-L-threonine/SMA 725 ™ | 10.03 | 1.3 | −87.4 |
| E12 | 60 | Stepan Mild L3 ™/SMA 725 ™ | 10.03 | 1.5 | −84.8 |
| F1 | 61 | Stepan SLL-FB ™/SMA 725 ™ | 10.03 | 1.3 | −86.6 |
| F2 | 62 | Lakeland PA E136 ™/SMA Cumene | 10.03 | 1.3 | −87 |
| F3 | 63 | n-Dodecanoyl-L-threonine/SMA Cumene | 10.03 | 2 | −80 |
| F4 | 64 | Stepan Mild L3 ™/SMA Cumene | 10.03 | 1.4 | −85.7 |
| F5 | 65 | Stepan SLL-FB ™/SMA Cumene | 10.03 | 1.3 | −86.6 |
| F6 | 66 | n-Decanoyl-L-methionine/SMA Cumene | 10.03 | 1.4 | −85.6 |
| F7 | 67 | n-Dodecanoyl-L-methionine/SMA Cumene | 10.03 | 3.1 | −68.9 |
| F8 | 68 | n-Dodecanoyl-L-histidine/SMA Cumene | 10.03 | 1.4 | −85.6 |

Example 22

Proof of Concept Screen of Nanonet Library for Sequestering Divalent Metal Ions Zinc and Copper Found in Seawater)

Metals contained in seawater are a threat to aquatic systems and organisms. Removal of heavy metals from seawater or wastewater is often approached by precipitation of dissolved metal ion followed by filtration. However, these methods can be challenging as they require control over pH of seawater.

The nanonet libraries with anionic and non-ionic surfactants were screened for zinc and copper metal ion removal from seawater spiked with zinc and copper metal ions (see Reagents and Materials Examples 15-21, method #3). All hydrolyzed SMA-containing polymers showed excellent $Cu^{2+}$ metal ion removal from seawater especially the polymers SMA-2000™, SMA-2021™, and SMA-725™ with surfactants with sulfonate and amino acid-containing head groups (FIG. 22). In contrast, nanonets with DIBMA showed remaining $Cu^{2+}$ metal ion (<10 ppm) in seawater. FIG. 23 illustrates excellent $Cu^{2+}$ metal ion removal from seawater with nanonets with non-ionic surfactants and SMA-2000™, SMA-2021™, SMA-Cumene Terminated™, and SMA-725™. Contrary, nanonets with SMA-3000™ and DIBMA™ were less efficient in metal ion removal. Overall, nanonets with anionic surfactants were less efficient for zinc metal ion removal from seawater, specifically in combination with SMA-3000™ and DIBMA™ (FIG. 24). Interestingly, the surfactant N-Dodecanoyl-L-Histidine in combination with SMA-2000™, SMA-725™, and SMA-Cumene Terminated™ was most efficient in $Zn^{2+}$ metal ion removal along with SMA-725™ and Dodecane-1-sulfonic acid (FIG. 24). Nanonets with non-ionic surfactants and SMA-2000™ and SMA-Cumene Terminated™ removed zinc metal ion with less than 5 ppm remaining $Zn^{2+}$ in solution (FIG. 25). Nanonets with SMA-3000™ and DIBMA™ were less efficient in metal ion removal. This work demonstrates that new water treatment formulations that are specific for single metal species can be rapidly identified through screening of nanonet libraries.

TABLE 19

Zinc Removal (40 uL Nanonet Library Stock Solution Was Used) with Nanonets with Non-ionic Surfactants

| Well No. | Library No. | Nanonet Library Item | Zn2+ Added [ppm] | Measured [ppm] | % Difference |
|---|---|---|---|---|---|
| A1 | 1 | Apo 10/DIBMA | 10.07 | 11.6 | 15.3 |
| A2 | 2 | Apo 12/DIBMA | 10.07 | 10.1 | 0.6 |
| A3 | 3 | Coco glucoside/DIBMA | 10.07 | 11.5 | 13.7 |
| A4 | 4 | Genapol X080/DIBMA | 10.07 | 11.2 | 10.8 |
| A5 | 5 | HEGMDDE-H370/DIBMA | 10.07 | 11.7 | 16.1 |
| A6 | 6 | HEGMDDE-H360/DIBMA | 10.07 | 11.6 | 15.5 |
| A7 | 7 | HXEGMDDE-H375/DIBMA | 10.07 | 11.7 | 16 |
| A8 | 8 | DDDM-MNA-C12/DIBMA | 10.07 | 11.2 | 11.6 |
| A9 | 9 | pGBTM-MNA-C13/DIBMA | 10.07 | 11.3 | 12.4 |
| A10 | 10 | pGBTEM-MNA-C14/DIBMA | 10.07 | 11.3 | 12.4 |

TABLE 19-continued

Zinc Removal (40 uL Nanonet Library Stock Solution Was Used) with Nanonets with Non-ionic Surfactants

| Well No. | Library No. | Nanonet Library Item | Zn2+ Added [ppm] | Measured [ppm] | % Difference |
|---|---|---|---|---|---|
| A11 | 11 | nDDDTP-D342/DIBMA | 10.07 | 11 | 9.1 |
| A12 | 12 | nDDTGP-D323/DIBMA | 10.07 | 11.3 | 12.6 |
| B1 | 13 | OEGMDE-O330/DIBMA | 10.07 | 10.5 | 4.7 |
| B2 | 14 | Polyglycerol-10-mono-laurate/DIBMA | 10.07 | 11.3 | 12.4 |
| B3 | 15 | Polyglycerol-10-mono-oleate/DIBMA | 10.07 | 10.9 | 8.6 |
| B4 | 16 | Span 20 ™/DIBMA | 10.07 | 10.4 | 3.8 |
| B5 | 17 | Triton X-100 ™/DIBMA | 10.07 | 11 | 9.5 |
| B6 | 18 | Triton X-45 ™/DIBMA | 10.07 | 11.9 | 18.3 |
| B7 | 19 | Tween 20 ™/DIBMA | 10.07 | 10.7 | 6.2 |
| B8 | 20 | Tween 65 ™/DIBMA | 10.07 | 10.7 | 6.1 |
| B9 | 21 | Tween 85 ™/DIBMA | 10.07 | 10.6 | 5.4 |
| B10 | 22 | Apo 10/SMA 2000 ™ | 10.07 | 5.3 | −47 |
| B11 | 23 | Apo 12/SMA 2000 ™ | 10.07 | 5.5 | −45.1 |
| B12 | 24 | Coco glucoside/SMA 2000 ™ | 10.07 | 5 | −50.2 |
| C1 | 25 | Genapol X080 X080/SMA 2000 ™ | 10.07 | 5.2 | −48.8 |
| C2 | 26 | HEGMDDE-H370/SMA 2000 ™ | 10.07 | 5.3 | −47 |
| C3 | 27 | HEGMDE-H360/SMA 2000 ™ | 10.07 | 5.7 | −43.1 |
| C4 | 28 | HEGMOE-H350/SMA 2000 ™ | 10.07 | 5.5 | −45.8 |
| C5 | 29 | HXEGMDDE-H375/SMA 2000 ™ | 10.07 | 4.6 | −54.6 |
| C6 | 30 | pGBTM-MNA-C13/SMA 2000 ™ | 10.07 | 5.5 | −45.3 |
| C7 | 31 | pGBTEM-MNA-C14/SMA 2000 ™ | 10.07 | 5 | −50.5 |
| C8 | 32 | nDDDTP-D342/SMA 2000 ™ | 10.07 | 5.1 | −49.7 |
| C9 | 33 | nDDTGP-D323/SMA 2000 ™ | 10.07 | 5.2 | −48 |
| C10 | 34 | nDDDTP-D335/SMA 2000 ™ | 10.07 | 5.4 | −46.4 |
| C11 | 35 | OEGMDE-O330/SMA 2000 ™ | 10.07 | 5.2 | −48.4 |
| C12 | 36 | Polyglycerol-10-mono-laurate/SMA 2000 ™ | 10.07 | 4.9 | −51.8 |
| D1 | 37 | Polyglycerol-10-mono-oleate/SMA 2000 ™ | 10.07 | 4.7 | −53.3 |
| D2 | 38 | Span 20/SMA 2000 ™ | 10.07 | 5.6 | −44.7 |
| D3 | 39 | Triton X-100 ™/SMA 2000 ™ | 10.07 | 5.9 | −41.4 |
| D4 | 40 | Triton X-305 ™/SMA 2000 ™ | 10.07 | 5 | −50.4 |
| D5 | 41 | Triton X-45 ™/SMA 2000 ™ | 10.07 | 5 | −50.7 |
| D6 | 42 | Tween 20 ™/SMA 2000 ™ | 10.07 | 5 | −50.1 |
| D7 | 43 | Tween 40 ™/SMA 2000 ™ | 10.07 | 4.6 | −54.2 |
| D8 | 44 | Tween 60 ™/SMA 2000 ™ | 10.07 | 5.1 | −49 |
| D9 | 45 | Tween 65 ™/SMA 2000 ™ | 10.07 | 5.6 | −44.3 |
| D10 | 46 | Tween 80 ™/SMA 2000 ™ | 10.07 | 9 | −10.2 |
| D11 | 47 | Tween 85 ™/SMA 2000 ™ | 10.07 | 4.8 | −52 |
| D12 | 48 | Apo 10/SMA 2021 ™ | 10.07 | 6.7 | −33.4 |
| E1 | 49 | Apo 12/SMA 2021 ™ | 10.07 | 6.6 | −34.1 |
| E2 | 50 | Coco glucoside/SMA 2021 ™ | 10.07 | 6.9 | −31.9 |
| E3 | 51 | HEGMDDE-H370/SMA 2021 ™ | 10.07 | 7.2 | −28.5 |
| E4 | 52 | HEGMDE-H360/SMA 2021 ™ | 10.07 | 7.2 | −28.9 |
| E5 | 53 | HXEGMDDE-H375/SMA 2021 ™ | 10.07 | 7.2 | −28.6 |
| E6 | 54 | pGBTM-MNA-C13/SMA 2021 ™ | 10.07 | 7.3 | −27.3 |
| E7 | 55 | pGBTEM-MNA-C14/SMA 2021 ™ | 10.07 | 7.5 | −26 |
| E8 | 56 | nDDTGP-D323/SMA 2021 ™ | 10.07 | 6.9 | −31.6 |
| E9 | 57 | nDDDTP-D342/SMA 2021 ™ | 10.07 | 7.2 | −28.8 |
| E10 | 58 | OEGMDE-O330/SMA 2021 ™ | 10.07 | 6.8 | −32.5 |

TABLE 19-continued

Zinc Removal (40 uL Nanonet Library Stock Solution Was Used) with Nanonets with Non-ionic Surfactants

| Well No. | Library No. | Nanonet Library Item | Zn2+ Added [ppm] | Measured [ppm] | % Difference |
|---|---|---|---|---|---|
| E11 | 59 | Polyglycerol-10-mono-laurate/SMA 2021 ™ | 10.07 | 8.2 | −18.8 |
| E12 | 60 | Polyglycerol-10-mono-oleate/SMA 2021 ™ | 10.07 | 6.4 | −36.2 |
| F1 | 61 | Triton X-100 ™/SMA 2021 ™ | 10.07 | 7.2 | −28.4 |
| F2 | 62 | Triton X-45 ™/SMA 2021 ™ | 10.07 | 7 | −30.7 |
| F3 | 63 | Tween 40 ™/SMA 2021 ™ | 10.07 | 7.8 | −23 |
| F4 | 64 | Tween 60 ™/SMA 2021 ™ | 10.07 | 6.6 | −34.4 |
| F5 | 65 | Tween 80 ™/SMA 2021 ™ | 10.07 | 7 | −30.9 |
| F6 | 66 | Tween 85 ™/SMA 2021 ™ | 10.07 | 7.1 | −29.3 |
| F7 | 67 | Apo 10/SMA 3000 ™ | 10.07 | 10 | −1 |
| F8 | 68 | Apo 12/SMA 3000 ™ | 10.07 | 11 | 8.9 |
| F9 | 69 | Coco glucoside/SMA 3000 ™ | 10.07 | 10.2 | 1 |
| F10 | 70 | Genapol X080/SMA 3000 ™ | 10.07 | 10.6 | 5.5 |
| F11 | 71 | HEGMDDE-H370/SMA 3000 ™ | 10.07 | 10.5 | 4.6 |
| F12 | 72 | HEGMDE-H360/SMA 3000 ™ | 10.07 | 11.5 | 14.5 |
| G1 | 73 | HXEGMDDE-H375/SMA 3000 ™ | 10.07 | 9.9 | −1.2 |
| G2 | 74 | DDDM-MNA-C12/SMA 3000 ™ | 10.07 | 11.1 | 10 |
| G3 | 75 | pGBTM-MNA-C13/SMA 3000 ™ | 10.07 | 10.3 | 2.2 |
| G4 | 76 | pGBTEM-MNA-C14/SMA 3000 ™ | 10.07 | 10.4 | 3 |
| G5 | 77 | nDDDTP-D342/SMA 3000 ™ | 10.07 | 9.6 | −4.8 |
| G6 | 78 | nDDTGP-D323/SMA 3000 ™ | 10.07 | 10.4 | 3.3 |
| G7 | 79 | OEGMDE-O330/SMA 3000 ™ | 10.07 | 10.7 | 6.1 |
| G8 | 80 | Polyglycerol-10-mono-laurate/SMA 3000 ™ | 10.07 | 10.8 | 7 |
| G9 | 81 | Polyglycerol-10-mono-oleate/SMA 3000 ™ | 10.07 | 10.2 | 1.2 |
| G10 | 82 | Polyglycerol-10-mono-palmitate/SMA 3000 ™ | 10.07 | 6.4 | −36.5 |
| G11 | 83 | Span 20 ™/SMA 3000 ™ | 10.07 | 12.7 | 26.1 |
| G12 | 84 | Triton X-100 ™/SMA 3000 ™ | 10.07 | 6.6 | −34.7 |
| H1 | 85 | Triton X-45 ™/SMA 3000 ™ | 10.07 | 11.2 | 10.8 |
| H2 | 86 | Tween 65 ™/SMA 3000 ™ | 10.07 | 5.8 | −42.6 |
| H3 | 87 | Tween 85 ™/SMA 3000 ™ | 10.07 | 9 | −10.2 |
| H4 | 88 | Apo 12/SMA-IBE | 10.07 | 6.9 | −31.9 |
| H5 | 89 | Coco glucoside/SMA-IBE | 10.07 | 7 | −30.4 |
| H6 | 90 | HEGMDDE-H370/SMA-IBE | 10.07 | 7.2 | −52.1 |
| H7 | 91 | HEGMDE-H360/SMA-IBE | 10.07 | 6.2 | −38.1 |
| H8 | 92 | HXEGMDDE-H375/SMA-IBE | 10.07 | 7.5 | −25.6 |
| H9 | 93 | nDDDTP-D342/SMA-IBE | 10.07 | 7.4 | −26.8 |
| H10 | 94 | nDDTP-D335/SMA-IBE | 10.07 | 6.5 | −35.2 |
| H11 | 95 | Polyglycerol-10-mono-oleate/SMA-IBE | 10.07 | 7.9 | −21.3 |
| H12 | 96 | Triton X-45 ™/SMA-IBE | 10.07 | 8.5 | −15.5 |
| A1 | 97 | Tween 85 ™/SMA-IBE | 10.07 | 7 | −30.2 |
| A2 | 98 | Genapol X080/SMA 725 ™ | 10.07 | 4.6 | −53.9 |
| A3 | 99 | nDDDTP-D342/SMA 725 ™ | 10.07 | 6.9 | −31.9 |
| A4 | 100 | nDDTGP-D323/SMA 725 ™ | 10.07 | 4.2 | −58.2 |
| A5 | 101 | Polyglycerol-10-mono-oleate/SMA 725 ™ | 10.07 | 5.1 | −49.3 |
| A6 | 102 | Span 20 ™/SMA 725 ™ | 10.07 | 4.8 | −52.8 |
| A7 | 103 | HEGMDDE-H370/SMA 725 ™ | 10.07 | 7.1 | −29.3 |
| A8 | 104 | HEGMDE-H360/SMA 725 ™ | 10.07 | 7.1 | −29.5 |
| A9 | 105 | HXEGMDDE-H375/SMA 725 ™ | 10.07 | 8.2 | −18.3 |
| A10 | 106 | pGBTEM-MNA-C14/SMA 725 ™ | 10.07 | 7.7 | −23.5 |

TABLE 19-continued

Zinc Removal (40 uL Nanonet Library Stock Solution Was Used) with Nanonets with Non-ionic Surfactants

| Well No. | Library No. | Nanonet Library Item | Zn2+ Added [ppm] | Measured [ppm] | % Difference |
|---|---|---|---|---|---|
| A11 | 107 | Polyglycerol-10-mono-palmitate/SMA 725 ™ | 10.07 | 7.3 | −27.2 |
| A12 | 108 | Triton X-100 ™/SMA 725 ™ | 10.07 | 6.7 | −33.4 |
| B1 | 109 | Triton X-45 ™/SMA 725 ™ | 10.07 | 6.8 | −32.5 |
| B2 | 110 | Tween 65 ™/SMA 725 ™ | 10.07 | 6.8 | −32.5 |
| B3 | 111 | Tween 80 ™/SMA 725 ™ | 10.07 | 7.2 | −28.1 |
| B4 | 112 | Apo 10/SMA Cumene | 10.07 | 5.4 | −46.7 |
| B5 | 113 | Apo 12/SMA Cumene | 10.07 | 6 | −40.8 |
| B6 | 114 | PFDMP-O310F/SMA Cumene | 10.07 | 6.1 | −39.1 |
| B7 | 115 | Genapol X080/SMA Cumene | 10.07 | 5.3 | −47.7 |
| B8 | 116 | HEGMDDE-H370/SMA Cumene | 10.07 | 5.8 | −42.1 |
| B9 | 117 | HEGMDE-H360/SMA Cumene | 10.07 | 5.4 | −46.1 |
| B10 | 118 | HXEGMDDE-H375/SMA Cumene | 10.07 | 4.9 | −51.8 |
| B11 | 119 | DDDM-MNA-C12/SMA Cumene | 10.07 | 5.6 | −44 |
| B12 | 120 | pGBTM-MNA-C13/SMA Cumene | 10.07 | 6.1 | −39.2 |
| C1 | 121 | nDDDTP-D342/SMA Cumene | 10.07 | 5.6 | −44.6 |
| C2 | 122 | nDDTGP-D323/SMA Cumene | 10.07 | 5.2 | −48 |
| C3 | 123 | nDDTP-D335/SMA Cumene | 10.07 | 5.9 | −41.8 |
| C4 | 124 | OEGMDE-O330/SMA Cumene | 10.07 | 7.1 | −29.7 |
| C5 | 125 | Polyglycerol-10-mono-laurate/SMA Cumene | 10.07 | 6.4 | −36.8 |
| C6 | 126 | Polyglycerol-10-mono-oleate/SMA Cumene | 10.07 | 5.7 | −43.7 |
| C7 | 127 | Span 20 ™/SMA Cumene | 10.07 | 4.6 | −54.2 |
| C8 | 128 | Triton X-100 ™/SMA Cumene | 10.07 | 5.4 | −46.2 |
| C9 | 129 | Triton X-45 ™/SMA Cumene | 10.07 | 8.4 | −16.7 |
| C10 | 130 | Tween 65 ™/SMA Cumene | 10.07 | 7.3 | −27.4 |
| C11 | 131 | Tween 85 ™/SMA Cumene | 10.07 | 6.8 | −32.4 |

TABLE 20

Zinc Removal (40 uL Nanonet Library Stock Solution Was Used) with Nanonets with Anionic Surfactants

| Well No. | Library No. | Nanonet Library Item | Zn2+ Added [ppm] | Measured [ppm] | % Difference |
|---|---|---|---|---|---|
| A1 | 1 | Stepan Bio-Soft D-40 ™/DIBMA | 10.07 | 10.3 | 2.2 |
| A2 | 2 | Lakeland PAE 136 ™/DIBMA | 10.07 | 10.5 | 4.1 |
| A3 | 3 | Stepan Lathanol LAL ™/DIBMA | 10.07 | 10.2 | 1.2 |
| A4 | 4 | n-Decanoyl-L-threonine/DIBMA | 10.07 | 10.9 | 8.1 |
| A5 | 5 | n-Dodecanoyl-L-threonine/DIBMA | 10.07 | 10.5 | 3.8 |
| A6 | 6 | n-Decanoyl-L-methionine/DIBMA | 10.07 | 9.6 | −4.6 |
| A7 | 7 | n-Dodecanoyl-L-methionine/DIBMA | 10.07 | 10.6 | 5.5 |
| A8 | 8 | Ninate 411 ™/DIBMA | 10.07 | 10.7 | 6 |
| A9 | 9 | n-Octanoyl-L-methionine/DIBMA | 10.07 | 10.8 | 7.1 |
| A10 | 10 | Stepan Mild L3 ™/DIBMA | 10.07 | 11 | 9.5 |
| A11 | 11 | Stepan Bio-Terge AS-40 ™/SMA 2000 ™ | 10.07 | 7.8 | −22.7 |
| A12 | 12 | Stepan Bio-Soft D-40 ™/SMA 2000 ™ | 10.07 | 8 | −20.5 |
| B1 | 13 | Dodecane-1-sulfonic acid sodium salt/SMA 2000 ™ | 10.07 | 7.7 | −23.2 |

TABLE 20-continued

Zinc Removal (40 uL Nanonet Library Stock Solution
Was Used) with Nanonets with Anionic Surfactants

| Well No. | Library No. | Nanonet Library Item | Zn2+ Added [ppm] | Measured [ppm] | % Difference |
|---|---|---|---|---|---|
| B2 | 14 | Lakeland PAE 136 ™/SMA 2000 ™ | 10.07 | 7.9 | −21.4 |
| B3 | 15 | Stepan Lathanol LAL ™/SMA 2000 ™ | 10.07 | 7.3 | −27.1 |
| B4 | 16 | n-Decanoyl-L-methionine/SMA 2000 ™ | 10.07 | 7.6 | −24.1 |
| B5 | 17 | n-Dodecanoyl-L-methionine/SMA 2000 ™ | 10.07 | 8 | −20.8 |
| B6 | 18 | n-Decanoyl-L-threonine/SMA 2000 ™ | 10.07 | 7.2 | −28.7 |
| B7 | 19 | n-Dodecanoyl-L-histidine/SMA 2000 ™ | 10.07 | 3.6 | −64.1 |
| B8 | 20 | Stepan Mild L3 ™/SMA 2000 ™ | 10.07 | 8.2 | −18.8 |
| B9 | 21 | n-Dodecanoyl-L-threonine/SMA 2000 ™ | 10.07 | 8.2 | −18.9 |
| B10 | 22 | Sodium dodecylbenzene sulfonate/SMA 2000 ™ | 10.07 | 7.3 | −27.6 |
| B11 | 23 | Ninate 411 ™/SMA 2000 ™ | 10.07 | 8.2 | −18.2 |
| B12 | 24 | Stepan SLL-FB ™/SMA 2000 ™ | 10.07 | 7.5 | −25.9 |
| C1 | 25 | Stepan Sulfonic Acid ™/SMA 2000 ™ | 10.07 | 8.1 | −20 |
| C2 | 26 | Dodecane-1-sulfonic acid sodium salt/SMA 2021 ™ | 10.07 | 7.3 | −27.9 |
| C3 | 27 | Lakeland PAE 136 ™/SMA 2021 ™ | 10.07 | 6.4 | −36.5 |
| C4 | 28 | Stepan Lathanol LAL ™/SMA 2021 ™ | 10.07 | 7.3 | −27.6 |
| C5 | 29 | n-Decanoyl-L-methionine/SMA 2021 ™ | 10.07 | 7.2 | −28.4 |
| C6 | 30 | Cedepal TD-403 MFLD ™/SMA 2021 ™ | 10.07 | 7.1 | −29 |
| C7 | 31 | Stepan Mild L3 ™/SMA 2021 ™ | 10.07 | 7.7 | −23.6 |
| C8 | 32 | n-Dodecanoyl-L-methionine/SMA 2021 ™ | 10.07 | 11.3 | 12.6 |
| C9 | 33 | n-Decanoyl-L-methionine/SMA 3000 ™ | 10.07 | 11.8 | 16.9 |
| C10 | 34 | n-Dodecanoyl-L-methionine/SMA 3000 ™ | 10.07 | 10.9 | 8.5 |
| C11 | 35 | n-Decanoyl-L-threonine/SMA 2021 ™ | 10.07 | 7.6 | −24.4 |
| C12 | 36 | n-Dodecanoyl-L-threonine/SMA 2021 ™ | 10.07 | 8.1 | −19.7 |
| D1 | 37 | Sodium dodecylbenzene sulfonate/SMA 2021 ™ | 10.07 | 7.7 | −23.8 |
| D2 | 38 | Ninate 411 ™/SMA 2021 ™ | 10.07 | 8.3 | −17.5 |
| D3 | 39 | Stepan SLL-FB ™/SMA 2021 ™ | 10.07 | 8.6 | −14.1 |
| D4 | 40 | Stepan Sulfonic Acid ™/SMA 2021 ™ | 10.07 | 8.7 | −13.9 |
| D5 | 41 | Lakeland PAE 136 ™/SMA 3000 ™ | 10.07 | 11.1 | 9.8 |
| D6 | 42 | n-Dodecanoyl-L-threonine/SMA 3000 ™ | 10.07 | 10.5 | 4.5 |
| D7 | 43 | Ninate 411 ™/SMA 3000 ™ | 10.07 | 11.4 | 12.8 |
| D8 | 44 | Stepan Mild L3 ™/SMA 3000 ™ | 10.07 | 11.4 | 12.9 |
| D9 | 45 | Stepan SLL-FB ™/SMA 3000 ™ | 10.07 | 11 | 8.7 |
| D10 | 46 | Stepan Sulfonic Acid ™/SMA 3000 ™ | 10.07 | 11.9 | 17.8 |
| D11 | 47 | n-Decanoyl-L-methionine/SMA-IBE | 10.07 | 9.2 | −8.3 |
| D12 | 48 | n-Dodecanoyl-L-methionine/SMA-IBE | 10.07 | 8.2 | −19 |
| E1 | 49 | Stepan Mild L3 ™/SMA-IBE | 10.07 | 7.1 | −29.6 |
| E2 | 50 | Stepan SLL-FB ™/SMA-IBE | 10.07 | 6.2 | −37.9 |
| E3 | 51 | Amin GCK30H/SMA 725 ™ | 10.07 | 5.7 | −43.8 |
| E4 | 52 | Stepan Bio-Terge AS-40 ™/SMA 725 ™ | 10.07 | 6.7 | −33.5 |
| E5 | 53 | n-Dodecanoyl-L-histidine/SMA 725 ™ | 10.07 | 3.4 | −66.6 |
| E6 | 54 | Stepan Lathanol LAL ™/SMA 725 ™ | 10.07 | 6.6 | −34.3 |
| E7 | 55 | n-Decanoyl-L-methionine/SMA 725 ™ | 10.07 | 6.8 | −32.7 |
| E8 | 56 | n-Dodecanoyl-L-methionine/SMA 725 ™ | 10.07 | 5.8 | −42.2 |

TABLE 20-continued

Zinc Removal (40 uL Nanonet Library Stock Solution Was Used) with Nanonets with Anionic Surfactants

| Well No. | Library No. | Nanonet Library Item | Zn2+ Added [ppm] | Measured [ppm] | % Difference |
|---|---|---|---|---|---|
| E9 | 57 | Dodecane-1-sulfonic acid sodium salt/SMA 725 ™ | 10.07 | 5.7 | −43.5 |
| E10 | 58 | Lakeland PAE 136 ™/SMA725 ™ | 10.07 | 5.9 | −41.8 |
| E11 | 59 | n-Dodecanoyl-L-threonine/ SMA 725 ™ | 10.07 | 6.4 | −36.7 |
| E12 | 60 | Stepan Mild L3 ™/SMA 725 ™ | 10.07 | 7.9 | −22 |
| F1 | 61 | Stepan SLL-FB ™/SMA 725 ™ | 10.07 | 5.7 | −43 |
| F2 | 62 | Lakeland PAE136/SMA Cumene | 10.07 | 5.9 | −41.3 |
| F3 | 63 | n-Dodecanoyl-L-threonine/ SMA Cumene | 10.07 | 5.9 | −41 |
| F4 | 64 | Stepan Mild L ™3/SMA Cumene | 10.07 | 6.1 | −39.1 |
| F5 | 65 | Stepan SLL-FB ™/SMA Cumene | 10.07 | 5.5 | −45 |
| F6 | 66 | n-Decanoyl-L-methionine/SMA Cumene | 10.07 | 6.4 | −36.2 |
| F7 | 67 | n-Dodecanoyl-L-methionine/ SMA Cumene | 10.07 | 7.2 | −28.6 |
| F8 | 68 | n-Dodecanoyl-L-histidine/SMA Cumene | 10.07 | 5.5 | −45.4 |

Example 23

Nanonet Formation Utilizing a Derivatized SMA Polymer

To demonstrate the alternative hydrophilic functional groups can be utilized to make nanonets, SMA-2000™ was derivatized by reacting the anhydride with ethanolamine. The resulting polymer was able to complex with all three Triton series surfactants (TX-100™, TX-305™, TX-45™), confirming that derivatized polymers with alternative hydrophilic functional groups can also be utilized to form nanonets.

Triton™ X series were titrated at a concentration range of 1000-0 ppm with Derivatized SMA 2000™ polymer at a concentration of 200 ppm; nanonet activated with 10 uL of HCl

TABLE 21

Nanonet Formation Efficiency Test with Triton ™ Series Surfactants and SMA-725 ™, SMA-2000 ™

| Surfactant | Polymer [400 PPM] | Concentration [PPM] | Nanonet Absorbance [280 nm] | Control Absorbance [280 nm] |
|---|---|---|---|---|
| Triton X100 ™ | SMA 2000 ™ | 1000 | 0.2253 | 1.1656 |
| Triton X100 ™ | SMA 2000 ™ | 500 | 0.1728 | 0.5988 |
| Triton X100 ™ | SMA 2000 ™ | 250 | 0.1571 | 0.3206 |
| Triton X100 ™ | SMA 2000 ™ | 100 | 0.0768 | 0.1449 |
| Triton X100 ™ | SMA 2000 ™ | 64.8 | 0.0773 | 0.1257 |
| Triton X100 ™ | SMA 2000 ™ | 0 | 0.0619 | 0.0516 |
| Triton X100 ™ | SMA 725 ™ | 1000 | 1.2527 | 1.1345 |
| Triton X100 ™ | SMA 725 ™ | 500 | 1.549 | 0.5752 |
| Triton X100 ™ | SMA 725 ™ | 295.16 | 0.172 | 0.3518 |
| Triton X100 ™ | SMA 725 ™ | 250 | 0.1353 | 0.302 |
| Triton X100 ™ | SMA 725 ™ | 100 | 0.0698 | 0.1394 |
| Triton X100 ™ | SMA 725 ™ | 0 | 0.0511 | 0.1441 |
| Triton X45 ™ | SMA 2000 ™ | 1000 | 0.1186 | 1.4812 |
| Triton X45 ™ | SMA 2000 ™ | 616.18 | 0.0973 | 0.8388 |
| Triton X45 ™ | SMA 2000 ™ | 500 | 0.1049 | 0.7703 |
| Triton X45 ™ | SMA 2000 ™ | 250 | 0.0783 | 0.4892 |
| Triton X45 ™ | SMA 2000 ™ | 100 | 0.0654 | 0.1734 |
| Triton X45 ™ | SMA 2000 ™ | 0 | 0.0707 | 0.0518 |
| Triton X45 ™ | SMA 725 ™ | 1000 | 0.1837 | 1.6766 |
| Triton X45 ™ | SMA 725 ™ | 500 | 0.128 | 1.3428 |
| Triton X45 ™ | SMA 725 ™ | 250 | 0.1147 | 0.785 |
| Triton X45 ™ | SMA 725 ™ | 100 | 0.0703 | 0.3648 |
| Triton X45 ™ | SMA 725 ™ | 92.92 | 0.1003 | 0.3679 |
| Triton X45 ™ | SMA 725 ™ | 0 | 0.0552 | 0.0502 |

TABLE 22

Nanonet Formation with Triton ™ Series Surfactant and Ethanolamine Derived SMA-2000 ™

| Surfactant | Concentration Surfactant [ppm] | Control (Absorbance at 540 nm) | Ethanolamine derived SMA-2000 ™ (Absorbance at 540 nm) |
|---|---|---|---|
| Triton X-100 ™ | 1000 | 0.0474 | 0.0689 |
| Triton X-100 ™ | 500 | 0.0473 | 0.1056 |
| Triton X-100 ™ | 250 | 0.0471 | 0.1909 |
| Triton X-100 ™ | 125 | 0.048 | 0.1271 |
| Triton X-100 ™ | 50 | 0.0474 | 0.0843 |
| Triton X-100 ™ | 0 | 0.0406 | 0.0616 |
| Triton X-305 ™ | 1000 | 0.0484 | 0.0493 |
| Triton X-305 ™ | 500 | 0.0475 | 0.076 |
| Triton X-305 ™ | 250 | 0.0467 | 0.0843 |
| Triton X-305 ™ | 125 | 0.0462 | 0.0746 |
| Triton X-305 ™ | 50 | 0.0444 | 0.0716 |
| Triton X-305 ™ | 0 | 0.0408 | 0.0664 |
| Triton X-45 ™ | 1000 | 0.6694 | 0.7939 |
| Triton X-45 ™ | 500 | 0.309 | 0.8672 |
| Triton X-45 ™ | 250 | 0.1338 | 0.9615 |
| Triton X-45 ™ | 125 | 0.0951 | 1.0042 |
| Triton X-45 ™ | 50 | 0.0517 | 0.116 |
| Triton X-45 ™ | 0 | 0.0388 | 0.0636 |

Example 24

Effect of Polymer on Settling Speed of Nanonets Floc

Experimental Protocol 3 mL of a 4000 ppm $Ca^{2+}$ solution made from calcium chloride (83%-87%, Downflake) is added to an Eppendorf vial.

TABLE 23

Information on Polymers Used in This Set of Experiments.

| Polymer Name | Molecular Weight [kDa} | Stryene to Maleic Anhydride Ratio |
|---|---|---|
| SMA-725 ™ | 130 | 3:1 |
| SMA-2000 ™ | 7.5 | 2:1 |
| SMA-3000 ™ | 9.5 | 3:1 |

The polymer-surfactant nanonet complex is made by adding a 2% polymer solution to a 1% surfactant solution at a 2.5:1 polymer-to-surfactant ratio. To bind the nanonets to the free calcium ions, 100 uL of the polymer-surfactant mixture (97 ppm surfactant, 473 ppm polymer) is added to the calcium solution, after which clear white flocs can be seen in solution.

To test the effect of adding polymer alone, 71 uL of the 2% polymer solution (473 ppm polymer) is added to the calcium solution.

The mixture is shaken at 600 RPM (light shaking) for one minute. Light shaking ensures that the floc-break up is minimized during mixing, as this would increase the time required for batch settling.

The quartz cuvette use to contain the sample must be cleaned five times with deionized (DI) water and hand dried with a kimwipe until the outer faces are dry and optically clean.

After one minute of mixing, the flocculated suspension is immediately transferred to a clean quartz cuvette, after which the time lapse is started. Videos are taken at a frequency of 0.2 Hz for 25 minutes.

Calculation of Batch Settling Parameters

A Python script was written to track the settling of the flocs. The region of interest (ROI) was taken as the area of the floc bed after 25 minutes of sedimentation. To do this, a box is manually selected spanning the inner walls of the cuvette and the bottom of the meniscus.

From here, an image processing routine automatically extracts the position of the interface between the clear liquid phase and the consolidated bed after sedimentation. The consolidated bed height can be calculated and a new ROI of the sedimentation region can be generated for subsequent analysis.

Within this new ROI, an average grayscale pixel intensity can be calculated over time; the flocs are white in color (in contrast to a dark black-colored background) so it is expected that this value will increase during sedimentation. This value can be interpreted as the amount of floc sediment at the bottom of the cuvette.

To output a single, quantifiable parameter of interest from a series of images tracking sedimentation, a sigmoid function is fitted to the apparent floc sediment data.

An example of this curve fitting of the apparent sedimentation is illustrated in FIG. 26.

After curve fitting, a $t_{50}$ value (center of sigmoid) can be reported which serves as an indicator of the settling speed. Depending on the nature of phase separation, this may also serve as an indicator of floc size (faster settling=lower $t_{50}$).

Results

Polymer Selection Directly Influences Settling Speed

A graph of the $t_{50}$ for the three polymers is illustrated in the FIG. 27.

It is evident that the speed of sedimentation is directly impacted by the selection of polymer. SMA-725™ has the highest molecular weight and it is expected that this would settle the fastest by this rationale.

There is a difference in settling speed between the different polymers SMA-725™ and SMA-3000™. In general, the longer polymer settles significantly faster than the shorter polymers (SMA-725™>SMA-2000™/3000™). However, SMA-2000™ settles faster than SMA-3000™ in these experiments, despite SMA2000™ being a slightly shorter polymer. This lack of correlation between polymer length and settling speed suggests that there are additional polymer properties that can influence the phase separation behavior of the nanonets beyond polymer length. This assay suggests that efficient nanonet design requires more than just a large surfactant aggregate and small polymer; polymer size and chemical identity will also significantly effect nanonet removal in wastewater treatment processes.

Example 25

Preparation and Characterization of Nanonet Fe

100 L of a 1.5M stock solution of KOH was heated to 95° C. To this solution, 10 kg of pre-ground SMA 725 was added with vigorous mixing. The solution was left for 3 hours to hydrolyze, at which point 4 kg of oleic acid was pumped into the mixture. The solution was left to mix at 95° C. After 1 hour, 10 L of a pre-heated 20% polyglycerol-10-stearate solution was added to the mixture. The solution was allowed to cool to 60° C. while continuing mixing, at which point the solution was pumped through a 1 micron filter to remove any non-hydrolyzed polymer. Addition of distilled or deionized water was then added to the solution to compensate for any evaporative loss.

11 batches of nanonet Fe were prepared as described and each batch was measured for particle diameter and viscosity. The nanonet batches were recorded in Table 24 below. Particle diameter was measured by dynamic light scattering on a Malvern NanoZS and calculated from intensity values. Viscosity was measured on a Brookfield VII rheometer at 23° C.

TABLE 24

Characteristics of a 10% nanonet Fe solution

| Batch # | Size (nm) | Viscosity (Cp) |
|---|---|---|
| 1 | 10.15 | 14 |
| 2 | 9.89 | 18 |
| 3 | 11.31 | 18 |
| 4 | 11.99 | 18 |
| 5 | 10.9 | 20 |
| 6 | 6.67 | 18 |
| 7 | 13.02 | 12 |
| 8 | 8.89 | 16 |
| 9 | 8.72 | 16 |
| 10 | 9.12 | 14 |
| 11 | 10.15 | 20 |

Example 26

Treatment of Produced Water with NanoNet Fe in a Water Treatment Process

In the following example, produced water sourced from the Permian Basin in Texas, United States was treated with nanonet Fe, Batch 7, from Example 25.

Incoming produced water was pumped at a 4 GPM flow rate from 1000 L totes through a 484 Mazzei venturi eductor. 50 ppm nanonets were dosed into the eductor, along with concurrent addition of air at approximately 3 L/min. The water traveled through a reaction tank, then into a flocculation loop. The water then entered a dissolved air flotation unit, where nanonet-Iron complexes floated to the surface and were removed from the water. The iron levels, turbidity, total dissolved solids, oxidative reductive potential, and alkalinity displayed in the FIGS. 28A-28E.

Example 27

Treatment of Produced Water with NanoNet Fe in a Water Treatment Process with Addition of Anionic Flocculant Incoming produced water was pumped at an 8 GPM flow rate through a 784 Mazzei venturi eductor. 30 ppm nanonet Fe, Batch 11, from Example 25 was actively dosed using a peristaltic pump into an venturi eductor. The treated fluid then flowed into a mixing tank, which was weakly aerated by a recycle sparge coming from the outflow of the treatment train. To aid capture of iron, the mixing tank was rapidly mixed using a dynamic, high shear mixer. The treated fluid exited the mixing tank, at which point it was dosed with 1 ppm of an anionic flocculant. The treated fluid then passed through a series of high speed and low speed mixing chambers to enhance unfolding of the flocculant and flocculation of the nanonet-iron complexes. The treated fluid subsequently entered a floatation chamber and flocs floated to the surface by addition of dissolved air. The final effluent exits the DAF through a series of weirs and is pumped through a final polishing filter with average pore size of 20 micron. The incoming and outgoing iron and bacterial levels from treating water with this process are displayed in the Tables 25 and 26 below.

TABLE 25

Iron concentrations (ppm) after treatment of produced water with nanonets.

| | Day 1 | | Day 2 | | Day 3 | | Day 4 | |
|---|---|---|---|---|---|---|---|---|
| | Ave. | Std. Dev. | Ave. | Std. Dev. | Ave. | Std. Dev. | Ave. | Std. Dev. |
| Influent | 14.4 | 0.53 | 18.2 | 2.70 | 33.48 | 10.38 | 36.08 | 12.07 |
| Post-DAF | 0.67 | 0.10 | 1.49 | 1.50 | 0.99 | 0.50 | 2.62 | 1.62 |
| Post-Filter | 0.24 | 0.42 | 0.1 | 0.17 | 0 | 0 | 0.42 | 0.67 |

TABLE 26

ATP levels (pg/mL) of produced water before and after treatment with nanonet Fe in a dissolved air flotation process treatment train

| | Trial 1 | | | Trial 2 | | |
|---|---|---|---|---|---|---|
| Influent | 2697 | | | 3724 | | |
| Post-DAF | 111 | 137 | 449 | 330 | 100 | 86 |
| Post-Filter | 130 | 10 | 259 | 129 | 27 | 25 |

Example 28

Reduction in Oxidative Demand Through Addition of Nanonet Fe

The overall demand for oxidative chemicals in the treatment of water in oilfield operations is likely to be lowered by the removal of ferrous iron from solution. To test this hypothesis, a solution of ferrous iron was treated both with and without nanonets, followed by sodium chlorite. The solutions were filtered and the filtrate then dosed with a fixed amount of chlorine dioxide. Increasing amounts of nanonets lead to a substantial increase in oxidant residual, demonstrating removal of oxidative demand in the system.

FIGS. 29A and 29B show side by side comparison of iron removal with Nanonets, repeated. Produced water supplemented with 50 ppm $Fe^{2+}$, was first treated with $NaClO_2$ at the indicated concentration, then sequentially treated with the indicated dose of Nanonet Fe (0, 10, 20, 40 ppm as increasingly lighter bars). The solutions were mixed by inversion and allowed to sit for 5 minutes at room temperature (no aeration). The resulting solutions were gravity filtered (10 micron cellulose filter), and a sample of the resulting filtrate was analyzed for iron content by ferrozine assay (A). Subsequently the filtrate was treated with 25 ppm $ClO_2$ and left to incubate for 5 minutes, after which time the residual $ClO_2$ was measured (B).

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. Furthermore, numeric ranges are provided so that the range of values is recited in addition to the individual values within the recited range being specifically recited in the absence of the range. The word "comprising" is used herein as an open-ended term, substantially equivalent to the phrase "including, but not limited to", and the word "comprises" has a corresponding meaning. As used herein, the singular forms "a", "an" and "the" include plural references unless the context clearly dictates otherwise. Thus, for example, reference to "a thing" includes more than one such thing. Citation of references herein is not an admission that such references are prior art to the present invention. Furthermore, material appearing in the background section of the specification is not an admission that such material is prior art to the invention. Any priority document(s) are incorporated herein by reference as if each individual priority document were specifically and individually indicated to be incorporated by reference herein and as though fully set forth herein. The invention includes all embodiments and variations substantially as hereinbefore described and with reference to the examples and drawings.

What is claimed is:

1. A nanonet comprising:
   a) a surfactant aggregate having an average aggregate diameter; and
   b) a polymer having an alkyl chain having at least 8 carbon atoms in length and having an average particle diameter in which the average particle diameter is the same or smaller than the average aggregate diameter, wherein the polymer is selected from the group consisting of:
   poly (styrene-co-maleic anhydride) having a styrene:maleic anhydride ratio of 3:1 and a Mw of 130,000 g/mol,
   poly (styrene-co-maleic anhydride) having a styrene:maleic anhydride ratio of 2:1 and a Mw of 7,500 g/mol,
   poly (styrene-co-maleic anhydride) having a styrene:maleic anhydride ratio of 3:1 and a Mw of 9,000 g/mol,
   poly (styrene-co-maleic anhydride) having a styrene:maleic anhydride ratio of 2:1 and a Mw of 22,000 g/mol,
   polymethacrylate, di-isobutylene-co-maleic acid (DIBMA), styrene carbamate block co-polymers, and styrene maleimide block co-polymers,
   provided that when the surfactant is selected from the group consisting of: 2-[4-(2,4,4-trimethylpentan-2-yl)phenoxy]ethanol ($C_{14}H_{22}O(C_2H_{40})_n$ (n=9-10)), 2-[4-(2,4,4-trimethylpentan-2-yl)phenoxy]ethanol ($C_{14}H_{22}O(C_2H_4O)_n$ (n=30)), N-dodecyl-beta-D-maltoside (DDM), sodium oleate, sodium cholate, sodium deoxycholate (DOC), beta-octyl glucoside (Beta-OG), lauryl dimethylamine n-oxide (LDAO), then the polymer is not selected from the group consisting of: poly(Styrene-co-maleic anhydride) having a styrene:maleic anhydride ratio of 2:1 and a Mw of 7,500 g/mol, poly(Styrene-co-maleic anhydride) having a styrene:maleic anhydride ratio of 2:1 and a Mw of 22,000 g/mol, and Di-isobutylene-co-maleic acid (DIBMA).

2. The nanonet of claim 1 wherein the nanonet has a diameter larger than the average polymer particle diameter.

3. The nanonet of claim 1 wherein the surfactant is selected from the group consisting of: anionic surfactants, nonionic surfactants, sugar-derived surfactants, glycidyl-derived surfactants, acid alcohol-derived fatty surfactants, saccharide polyethyleneoxide combination surfactants, saccharide ester surfactants, sulfonated sugar based surfactants, aldonamide based surfactants, amide sugar based surfactants, amino alcohol surfactants, amino acid based surfactants, polyol surfactants, 1,2 Glycol surfactants, and zwitterionic surfactants.

4. The nanonet of claim 1 wherein the surfactant is a nonionic surfactant.

5. The nanonet of claim 1 wherein the surfactant is an ionic surfactant.

6. The nanonet of claim 1 wherein the surfactant is an anionic surfactant.

7. The nanonet of claim 1 wherein the surfactant has a neutral charge.

8. The nanonet of claim 1 wherein the surfactant is an uncharged surfactant.

9. The nanonet of claim 1 wherein the surfactant is soluble in water.

10. The nanonet of claim 1 wherein the surfactant is insoluble in water.

11. The nanonet of any claim 1 wherein the polymer is a long polymer.

12. The nanonet of claim 1 wherein the polymer has a molecular weight of at least 1,500 Da.

13. The nanonet of claim 1 wherein the polymer has a molecular weight of at least 26,000 Da.

14. The nanonet of claim 1 wherein the polymer has a molecular weight of at least 100,000 Da.

15. The nanonet of claim 1 wherein the polymer has a molecular weight of at least 125,000 Da.

16. The nanonet of claim 1 wherein the polymer is an amphipathic polymer.

17. The nanonet of claim 1 wherein the polymer is a block co-polymer.

18. The nanonet of claim 17 wherein the polymer comprises a ratio of hydrophobic:hydrophilic groups of from about 1:1 to about 4:1.

19. The nanonet of claim 17 wherein the polymer comprises a ratio of hydrophobic:hydrophilic groups of from about 1:1 to about 3:1.

20. The nanonet of claim 17 wherein the polymer comprises a ratio of hydrophobic:hydrophilic groups of from about 2:1 to about 3:1.

21. The nanonet of claim 17 wherein the polymer comprises a ratio of hydrophobic:hydrophilic groups of about 2:1.

22. The nanonet of claim 17 wherein the polymer comprises a ratio of hydrophobic:hydrophilic groups of about 3:1.

23. The nanonet of claim 1 wherein the surfactant is selected from the group consisting of: octylphenol ethoxylates, nonylphenol ethoxylates, polyglycerol-10-oleate, polyglycerol-10-laurate 1, polyglycerol-10-stearate, polyglycerol-10-laurate 2, polyglycerol-10-palmitate, 2-[4-(2,4,4-trimethylpentan-2-yl)phenoxy]ethanol ($C_{14}H_{22}O$ ($C_2H_4O)_n$ (n=4,5)), 2-[4-(2,4,4-trimethylpentan-2-yl)phenoxy]ethanol ($C_{14}H_{22}O(C_2H_4O)_n$ (n=9-10)), 2-[4-(2,4,4-trimethylpentan-2-yl)phenoxy]ethanol ($C_{14}H_{22}O(C_2H_4O)_n$ (n=30)), sodium oleate, LDAO, and mixtures thereof.

24. The nanonet of claim 1 wherein the surfactant is a mixture of polyglycerol-10-palmitate and sodium oleate.

25. The nanonet of claim 1 wherein the surfactant is a mixture of polyglycerol-10-palmitate and potassium oleate.

26. The nanonet of claim 1 wherein the polymer is poly (Styrene-co-maleic anhydride) having a styrene: maleic anhydride ratio of 3:1 and a Mw of 130,000 g/mol.

27. The nanonet of claim 1 wherein at least a portion of the polymer is hydrolyzed.

28. The nanonet of claim 1 further comprising a sequestered non-water moiety.

29. The nanonet of claim 28 wherein the sequestered non-water moiety is an iron moiety.

30. A method of sequestering a non-water moiety from an aqueous solution, the method comprising:
a) adding a surfactant aggregate having an average aggregate diameter to the aqueous solution comprising the non-water moiety; and
b) adding a polymer having an average particle diameter in which the average particle diameter is the same or smaller than the average aggregate diameter to the aqueous solution comprising the non-water moiety, wherein the polymer is selected from the group consisting of:
poly (styrene-co-maleic anhydride) having a styrene: maleic anhydride ratio of 3:1 and a Mw of 130,000 g/mol,
poly (styrene-co-maleic anhydride) having a styrene: maleic anhydride ratio of 2:1 and a Mw of 7,500 g/mol,
poly (styrene-co-maleic anhydride) having a styrene: maleic anhydride ratio of 3:1 and a Mw of 9,000 g/mol,
poly (styrene-co-maleic anhydride) having a styrene: maleic anhydride ratio of 2:1 and a Mw of 22,000 g/mol,
polymethacrylate, di-isobutylene-co-maleic acid (DIBMA), styrene carbamate block co-polymers, and styrene maleimide block co-polymers, thereby forming a treated aqueous solution,
provided that when the surfactant is selected from the group consisting of: 2-[4-(2,4,4-trimethylpentan-2-yl) phenoxy]ethanol ($C_{14}H_{22}O(C_2H_4O)_n$ (n=9-10)), 2-[4-(2,4,4-trimethylpentan-2-yl)phenoxy]ethanol ($C_{14}H_{22}O(C_2H_4O)_n$ (n=30)), N-dodecyl-beta-D-maltoside (DDM), sodium oleate, sodium cholate, sodium deoxycholate (DOC), beta-octyl glucoside (Beta-OG), lauryl dimethylamine n-oxide (LDAO), then the polymer is not selected from the group consisting of: poly(Styrene-co-maleic anhydride) having a styrene: maleic anhydride ratio of 2:1 and a Mw of 7,500 g/mol, poly(Styrene-co-maleic anhydride) having a styrene: maleic anhydride ratio of 2:1 and a Mw of 22,000 g/mol, and Di-isobutylene-co-maleic acid (DIBMA).

31. The method of claim 30 further comprising adding a precipitation agent to the treated aqueous solution.

32. The method of claim 30 further comprising mixing.

33. The method of claim 30 further comprising removal of solid particles from the treated aqueous solution.

34. The method of claim 30 wherein the removal of solid particles comprises at least one selected from the group consisting of: filtration, centrifugation, gravity separation, flotation, skimming, and electromagnetic attraction.

35. A method of sequestering a non-water moiety from an aqueous solution, the method comprising adding a nanonet, the nanonet comprising:
a) a surfactant aggregate having an average aggregate diameter; and
b) a polymer having an average particle diameter in which the average particle diameter is the same or smaller than the average aggregate diameter, wherein the polymer is selected from the group consisting of:
poly (styrene-co-maleic anhydride) having a styrene: maleic anhydride ratio of 3:1 and a Mw of 130,000 g/mol,
poly (styrene-co-maleic anhydride) having a styrene: maleic anhydride ratio of 2:1 and a Mw of 7,500 g/mol,
poly (styrene-co-maleic anhydride) having a styrene: maleic anhydride ratio of 3:1 and a Mw of 9,000 g/mol,
poly (styrene-co-maleic anhydride) having a styrene: maleic anhydride ratio of 2:1 and a Mw of 22,000 g/mol,
polymethacrylate, di-isobutylene-co-maleic acid (DIBMA), styrene carbamate block co-polymers, and styrene maleimide block co-polymers,
provided that when the surfactant is selected from the group consisting of: 2-[4-(2,4,4-trimethylpentan-2-yl) phenoxy ethanol ($C_{14}H_{22}O(C_2H_4O)_n$ (n=9-10)), 2-[4-(2,4,4-trimethylpentan-2-yl)phenoxy]ethanol ($C_{14}H_{22}O(C_2H_4O)_n$ (n=30)), N-dodecyl-beta-D-maltoside (DDM), sodium oleate, sodium cholate, sodium deoxycholate (DOC), beta-octyl glucoside (Beta-OG), lauryl dimethylamine n-oxide (LDAO), then the polymer is not selected from the group consisting of: poly(Styrene-co-maleic anhydride) having a styrene: maleic anhydride ratio of 2:1 and a Mw of 7,500 g/mol, poly(Styrene-co-maleic anhydride) having a styrene: maleic anhydride ratio of 2:1 and a Mw of 22,000 g/mol, and Di-isobutylene-co-maleic acid (DIBMA) to the aqueous solution comprising a non-water moiety, thereby forming a treated aqueous solution.

36. The method of claim 35 wherein the nanonet has a diameter larger than the average polymer particle diameter.

37. The method of claim 35 wherein the surfactant is selected from the group consisting of: anionic surfactants, nonionic surfactants, sugar-derived surfactants, glycidyl-derived surfactants, fatty acid alcohol-derived surfactants, saccharide polyethyleneoxide combination surfactants, saccharide ester surfactants, sulfonated sugar based surfactants, aldonamide based surfactants, amide sugar based surfactants, amino alcohol surfactants, amino acid based surfactants, polyol surfactants, 1,2 Glycol surfactants, and zwitterionic surfactants.

38. The method of claim 35 wherein the surfactant is a nonionic surfactant.

39. The method of claim 35 wherein the surfactant is an ionic surfactant.

40. The method of claim 35 wherein the surfactant is an anionic surfactant.

41. The method of claim 35 wherein the surfactant has a neutral charge.

42. The method of claim 35 wherein the surfactant is an uncharged surfactant.

43. The method of claim 35 wherein the surfactant is soluble in water.

44. The method of claim 35 wherein the surfactant is insoluble in water.

45. The method of claim 35 wherein the polymer is a long polymer.

46. The method of claim 35 wherein the polymer has a molecular weight of at least 1,500 Da.

47. The method of claim 35 wherein the polymer has a molecular weight of at least 26,000 Da.

48. The method of claim 35 wherein the polymer has a molecular weight of at least 100,000 Da.

49. The method of claim 35 wherein the polymer has a molecular weight of at least 125,000 Da.

50. The method of claim 35 wherein the polymer is an amphipathic polymer.

51. The method of claim 35 wherein the polymer comprises an alkyl chain having at least 8 carbon atoms in length.

52. The method of claim 35 wherein the polymer is a block co-polymer.

53. The method of claim 52 wherein the polymer comprises a ratio of hydrophobic:hydrophilic groups of from about 1:1 to about 4:1.

54. The method of claim 52 wherein the polymer comprises a ratio of hydrophobic:hydrophilic groups of from about 1:1 to about 3:1.

55. The method of claim 52 wherein the polymer comprises a ratio of hydrophobic:hydrophilic groups of from about 2:1 to about 3:1.

56. The method of claim 52 wherein the polymer comprises a ratio of hydrophobic:hydrophilic groups of about 2:1.

57. The method of claim 52 wherein the polymer comprises a ratio of hydrophobic:hydrophilic groups of about 3:1.

58. The method of claim 35 wherein the surfactant is selected from the group consisting of: octylphenol ethoxylates, nonylphenol ethoxylates, polyglycerol-10-oleate, polyglycerol-10-laurate 1, polyglycerol-10-stearate, polyglycerol-10-laurate 2, polyglycerol-10-palmitate, 2-[4-(2,4,4-trimethylpentan-2-yl)phenoxy]ethanol ($C_{14}H_{22}O$ ($C_2H_4O)_n$ (n=4,5)), 2-[4-(2,4,4-trimethylpentan-2-yl)phenoxy]ethanol ($C_{14}H_{22}O(C_2H_4O)_n$ (n=9-10)), 2-[4-(2,4,4-trimethylpentan-2-yl)phenoxy]ethanol ($C_{14}H_{22}O(C_2H_4O)_n$ (n=30)), sodium oleate, LDAO, and mixtures thereof.

59. The method of claim 35 wherein the surfactant is a mixture of polyglycerol-10-palmitate and sodium oleate.

60. The method of claim 35 wherein the surfactant is a mixture of polyglycerol-10-palmitate and potassium oleate.

61. The method of claim 35 wherein the polymer is poly (Styrene-co-maleic anhydride) having a styrene: maleic anhydride ratio of 3:1 and a Mw of 130,000 g/mol.

62. The method of claim 35 wherein at least a portion of the polymer is hydrolyzed.

63. The method of claim 35 further comprising a sequestered non-water moiety.

64. The method of claim 63 wherein the sequestered non-water moiety is an iron moiety.

65. The method of claim 35 further comprising adding a precipitation agent to the treated aqueous solution.

66. The method of claim 65 further comprising mixing.

67. The method of claim 66 further comprising removal of solid particles from the treated aqueous solution.

68. The method of claim 67 wherein the removal of solid particles comprises at least one selected from the group consisting of: filtration, centrifugation, gravity separation, flotation, skimming, and electromagnetic attraction.

69. A nanonet comprising:
a) a water soluble surfactant aggregate having an average aggregate diameter; and
b) a polymer having an average particle diameter in which the average particle diameter is the same or smaller than the average aggregate diameter, wherein the polymer is selected from the group consisting of:
poly (styrene-co-maleic anhydride) having a styrene: maleic anhydride ratio of 3:1 and a Mw of 130,000 g/mol,
poly (styrene-co-maleic anhydride) having a styrene: maleic anhydride ratio of 2:1 and a Mw of 7,500 g/mol,
poly (styrene-co-maleic anhydride) having a styrene: maleic anhydride ratio of 3:1 and a Mw of 9,000 g/mol,
poly (styrene-co-maleic anhydride) having a styrene: maleic anhydride ratio of 2:1 and a Mw of 22,000 g/mol,
polymethacrylate, di-isobutylene-co-maleic acid (DIBMA), styrene carbamate block co-polymers, and styrene maleimide block co-polymers,
provided that when the surfactant is selected from the group consisting of: 2-[4-(2,4,4-trimethylpentan-2-yl) phenoxy]ethanol ($C_{14}H_{22}O(C_2H_4O)_n$ (n=9-10)), 2-[4-(2,4,4-trimethylpentan-2-yl)phenoxy]ethanol ($C_{14}H_{22}O(C_2H_4O)_n$ (n=30)), N-dodecyl-beta-D-maltoside (DDM), sodium oleate, sodium cholate, sodium deoxycholate (DOC), beta-octyl glucoside (Beta-OG), lauryl dimethylamine n-oxide (LDAO), then the polymer is not selected from the group consisting of: poly(Styrene-co-maleic anhydride) having a styrene: maleic anhydride ratio of 2:1 and a Mw of 7,500 g/mol, poly(Styrene-co-maleic anhydride) having a styrene: maleic anhydride ratio of 2:1 and a Mw of 22,000 g/mol, and Di-isobutylene-co-maleic acid (DIBMA).

70. The nanonet of claim 69 wherein the polymer has a molecular weight of at least 1,500 Da.

71. The nanonet of claim 69 wherein the polymer has a molecular weight of at least 125,000 Da.

72. The nanonet of claim 69 wherein the polymer is an amphipathic polymer.

73. The nanonet of claim 69 wherein the polymer is a block co-polymer.

74. The nanonet of claim 69 wherein at least a portion of the polymer is hydrolyzed.

75. The nanonet of claim 69 further comprising a sequestered non-water moiety.

* * * * *

UNITED STATES PATENT AND TRADEMARK OFFICE
CERTIFICATE OF CORRECTION

PATENT NO. : 12,226,750 B2
APPLICATION NO. : 17/299462
DATED : February 18, 2025
INVENTOR(S) : Michael Carlson et al.

Page 1 of 1

It is certified that error appears in the above-identified patent and that said Letters Patent is hereby corrected as shown below:

In the Claims

In Claim 3, Column 132, Line 18, please delete "derived surfactants, acid alcohol-derived fatty surfactants," and insert --derived surfactants, fatty acid alcohol-derived surfactants,--

Signed and Sealed this
Twenty-ninth Day of April, 2025

Coke Morgan Stewart
*Acting Director of the United States Patent and Trademark Office*